US012764677B2

(12) United States Patent
Lim et al.

(10) Patent No.: US 12,764,677 B2
(45) Date of Patent: Oct. 13, 2026

(54) METHOD AND APPARATUS FOR POWER HEADROOM REPORTING FOR UPLINK DATA REPETITIVE TRANSMISSION IN NETWORK COOPERATIVE COMMUNICATIONS

(71) Applicant: Samsung Electronics Co., Ltd., Suwon-si (KR)

(72) Inventors: Seongmok Lim, Suwon-si (KR); Youngrok Jang, Suwon-si (KR); Sungjin Park, Suwon-si (KR); Ameha Tsegaye Abebe, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/858,897

(22) Filed: Jul. 6, 2022

(65) Prior Publication Data

US 2023/0045905 A1 Feb. 16, 2023

(30) Foreign Application Priority Data

Jul. 6, 2021 (KR) ........................ 10-2021-0088576
Aug. 11, 2021 (KR) ........................ 10-2021-0106185

(51) Int. Cl.
*H04W 52/36* (2009.01)
*H04W 72/21* (2023.01)

(52) U.S. Cl.
CPC ......... *H04W 52/365* (2013.01); *H04W 72/21* (2023.01)

(58) Field of Classification Search
CPC ..... H04W 52/365; H04W 72/21; H04W 8/24; H04B 7/024
See application file for complete search history.

(56) References Cited

U.S. PATENT DOCUMENTS

2014/0219234 A1 8/2014 Kim et al.
2015/0350944 A1* 12/2015 Chen .................. H04W 52/365 370/252

(Continued)

FOREIGN PATENT DOCUMENTS

CN 112703753 A 4/2021
WO 2020168296 A1 8/2020

(Continued)

OTHER PUBLICATIONS

Moderator (Nokia, Nokia Shanghai Bell), "Summary #1 of Multi-TRP PUCCH and PUSCH Enhancements", 3GPP TSG RAN WG1 #105-e, May 19-27, 2021, R1-2106073, 80 pages.

(Continued)

*Primary Examiner* — Qun Shen

(57) ABSTRACT

Provided is a method performed by a user equipment (UE) in a wireless communication system, the method including receiving, from a base station, higher layer configuration information including information associated with a sounding reference signal (SRS) resource set and downlink control information (DCI) including scheduling information for a physical uplink shared channel (PUSCH), identifying, from the DCI, a plurality of SRS resource indicators (SRIs) for PUSCH repetition in case that two SRS resource sets are configured by the information associated with the SRS resource set, identifying an SRS resource for the PUSCH repetition based on the plurality of SRIs, determining a power headroom report (PHR) between a first PHR based on actual transmission and a second PHR based on a reference format configured from the higher layer configuration information, and transmitting the determined PHR on the PUSCH.

11 Claims, 39 Drawing Sheets

(56) References Cited

U.S. PATENT DOCUMENTS

| | | | | |
|---|---|---|---|---|
| 2019/0075001 | A1 * | 3/2019 | Stern-Berkowitz | H04L 5/0091 |
| 2019/0281588 | A1 * | 9/2019 | Zhang | H04W 52/08 |
| 2019/0306874 | A1 * | 10/2019 | Lohr | H04L 5/001 |
| 2020/0068493 | A1 * | 2/2020 | Ding | H04W 52/325 |
| 2020/0204312 | A1 * | 6/2020 | Xu | H04W 36/085 |
| 2020/0229104 | A1 * | 7/2020 | MolavianJazi | H04W 52/367 |
| 2020/0267667 | A1 * | 8/2020 | MolavianJazi | H04W 52/48 |
| 2020/0396764 | A1 * | 12/2020 | Lin | H04W 74/006 |
| 2021/0045070 | A1 * | 2/2021 | Yi | H04W 72/0446 |
| 2021/0204227 | A1 * | 7/2021 | Bergljung | H04W 52/38 |
| 2022/0217654 | A1 * | 7/2022 | Kang | H04W 52/346 |
| 2022/0303812 | A1 * | 9/2022 | Chung | H04W 52/281 |
| 2023/0029850 | A1 | 2/2023 | Park et al. | |
| 2023/0123957 | A1 * | 4/2023 | Jung | H04L 5/0053 370/329 |
| 2023/0141329 | A1 * | 5/2023 | Ling | H04L 5/0051 455/522 |
| 2024/0224200 | A1 * | 7/2024 | Matsumura | H04W 72/1268 |

FOREIGN PATENT DOCUMENTS

| | | | |
|---|---|---|---|
| WO | 2020218900 | A1 | 10/2020 |
| WO | 2020/232145 | A1 | 11/2020 |
| WO | 2021/074485 | A1 | 4/2021 |
| WO | 2021133121 | A1 | 7/2021 |

OTHER PUBLICATIONS

International Search Report and Written Opinion of the International Searching Authority dated Oct. 20, 2022 in connection with International Patent Application No. PCT/KR2022/009752, 9 pages.

Supplementary European Search Report dated Sep. 4, 2024, in connection with European Application No. 22837970.7, 12 pages.

Ericsson, "On PDCCH, PUCCH and PUSCH enhancements for multi-TRP," R1-103550, 3GPP TSG-RAN WG1 Meeting E104bis-e, eMeeting, Apr. 12-20, 2021, 30 pages.

Office Action dated Mar. 17, 2026, in connection with Japanese Application No. 2024-500394, 6 pages.

Qualcomm Incorporated, Enhancements on Multi-TRP for PDDCH, PUCCH and Pusch 3GPP TSG-RAN WG1 Meeting #104-e, R1-2101447, e-Meeting, Jan. 25-Feb. 5, 2021, 28 pages.

Nokia, et al., "Enhancements for Multi-TRP URLLC schemes", 3GPP TSG RAN WG1 #105-e Meeting, R1-2105274, e-Meeting, May 2021, 24 pages.

vivo, "Enhancements on Multi-TRP for PUCCH and PUSCH", 3GPP TSG RAN WG1 #105-e, R1-2104344, e-Meeting, May 2021, 19 pages.

CATT, "Enhancements on multi-TRP/panel for PDCCH, PUCCH and PUSCH", 3GPP TSG RAN WG1 Meeting #104-e, R1-2100344, e-Meeting, Jan. 25-Feb. 5, 2021, 17 pages.

* cited by examiner

METHOD AND APPARATUS FOR POWER HEADROOM REPORTING FOR UPLINK DATA REPETITIVE TRANSMISSION IN NETWORK COOPERATIVE COMMUNICATIONS

CROSS-REFERENCE TO RELATED APPLICATION

This application is based on and claims priority under 35 U.S.C. § 119 to Korean Patent Application Nos. 10-2021-0088576, filed on Jul. 6, 2021, and 10-2021-0106185, filed on Aug. 11, 2021, in the Korean Intellectual Property Office, the disclosures of which are incorporated by reference herein in their entirety.

BACKGROUND

1. Field

The disclosure relates to operations of a user equipment (UE) and a base station (BS) in a wireless communication system. More particularly, the disclosure relates to a method and apparatus for performing power headroom reporting in a wireless communication system.

2. Description of the Related Art

In order to meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed-elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems (including New Radio (NR) communication system) to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, methods for seamlessly providing these services are required.

SUMMARY

Provided are a method and apparatus for efficiently performing power headroom reporting in a wireless communication system supporting cooperative communication.

Provided are a method and apparatus for performing power headroom reporting in a wireless communication system using multiple transmission and reception points (TRPs).

Provided are a method and apparatus for configuring power headroom information according to repetitive transmissions of an uplink (UL) control signal in a wireless communication system using multiple TRPs.

Additional aspects will be set forth in part in the description which follows and, in part, will be apparent from the description, or may be learned by practice of the presented embodiments of the disclosure.

According to an embodiment of the disclosure, a method performed by a user equipment (UE) in a wireless communication system includes receiving, from a base station, higher layer configuration information including information associated with a sounding reference signal (SRS) resource set and downlink control information (DCI) including scheduling information for a physical uplink shared channel (PUSCH), identifying, from the DCI, a plurality of SRS resource indicators (SRIs) for PUSCH repetition in case that two SRS resource sets are configured by the information associated with the SRS resource set, identifying an SRS resource for the PUSCH repetition based on the plurality of SRIs, determining a power headroom report (PHR) between a first PHR based on actual transmission and a second PHR based on a reference format configured from the higher layer configuration information, and transmitting the determined PHR on the PUSCH.

According to an embodiment of the disclosure, a user equipment (UE) in a wireless communication system includes a transceiver, and at least one processor operably coupled to the transceiver, wherein the at least one processor is configured to receive, from a base station, higher layer configuration information including information associated with a sounding reference signal (SRS) resource set and downlink control information (DCI) including scheduling information for a physical uplink shared channel (PUSCH), identify, from the DCI, a plurality of SRS resource indicators (SRIs) for PUSCH repetition in case that two SRS resource sets are configured by the information associated with the SRS resource set, identify an SRS resource for the PUSCH repetition based on the plurality of SRIs, determine a power headroom report (PHR) between a first PHR based on actual transmission and a second PHR based on a reference format configured from the higher layer configuration information, and transmit the determined PHR on the PUSCH.

According to an embodiment of the disclosure, a method performed by a base station in a wireless communication system includes receiving, from a user equipment (UE), a capability of the UE, identifying higher layer configuration information based on the capability of the UE, transmitting, to the UE, the higher layer configuration information including information associated with a sounding reference signal (SRS) resource set and downlink control information (DCI) including scheduling information for a physical uplink shared channel (PUSCH), and receiving, from the UE, the PUSCH including power headroom report (PHR).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
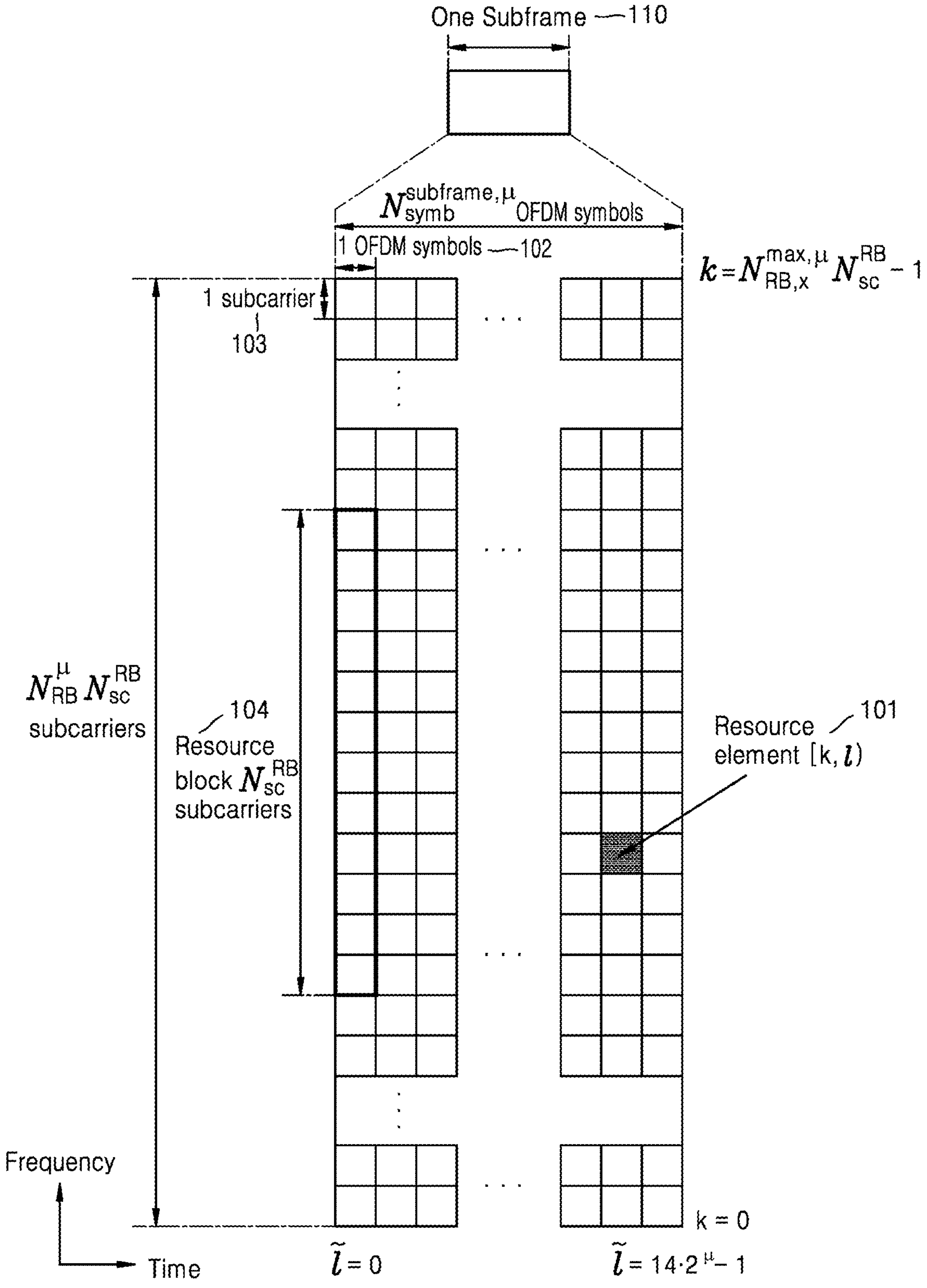
FIG. 1 illustrates a diagram of a basic structure of a time-frequency domain in a wireless communication system according to an embodiment of the disclosure.

FIGS. 1 through 39, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described more fully with reference to the accompanying drawings.

When embodiments of the disclosure are described herein, a description of techniques which are well known in the technical field to which the disclosure pertains and are not directly related to the disclosure will be omitted. This is to clearly convey the concept of the disclosure by omitting descriptions of unnecessary details.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Throughout the disclosure, the expression “at least one of a, b or c” indicates only a, only b, only c, both a and b, both a and c, both b and c, all of a, b, and c, or variations thereof.

Throughout the specification, a layer may also be referred to as an entity.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. In the descriptions of the disclosure, well-known functions or configurations are not described in detail when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire description of the present specification.

Hereinafter, a base station is an entity that allocates resources to a terminal, and may be at least one of gNode B, gNB, eNode B, eNB, Node B, base station (BS), a radio access unit, a BS controller, or a node on a network. Also, the BS may be a network entity including at least one of an integrated access and backhaul donor (IAB-donor) that is a gNB to provide a network access to terminal(s) via a network of backhaul and access links in a new radio (NR) system, or an IAB node that is a radio access network (RAN) node to support NR access link(s) to terminal(s) and to provide NR backhaul links to the IAB-donor or another IAB node. A terminal may be wirelessly accessed via an IAB-node and may transmit or receive data to an IAB-donor connected with at least one IAB-node via a backhaul link. The terminal may include a user equipment (UE), a mobile station (MS), a cellular phone, a smartphone, a computer, or a multimedia system capable of performing a communication function. In the disclosure, a downlink (DL) refers to a wireless transmission path of a signal to be transmitted from a BS to a UE, and an uplink (UL) refers to a wireless transmission path of a signal to be transmitted from a UE to a BS. Although the following descriptions may be provided about long term evolution (ITE) or LTE-Advanced (LTE-A) systems as an example, embodiments of the disclosure are also applicable to other communication systems having similar technical backgrounds or channel structure. For example, embodiments of the disclosure may be applicable to a system including $5^{th}$ generation (5G) wireless communication technology New Radio (NR) developed after the LTE-A system, and hereinafter, 5G may indicate a concept including LTE, LTE-A, and other similar services according to the related art. The disclosure is applicable to other communication systems through modification at the discretion of one of ordinary skill in the art without greatly departing from the scope of the disclosure.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions, may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that, in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit", as used in the present embodiment of the disclosure refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, a " . . . unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and " . . . units-"may be combined into fewer components and" . . . units" or further separated into additional components and " . . . units". Further, the components and " . . . units" may be implemented to operate one or more central processing units (CPUs) in a device or a secure multimedia card. Also, a " . . . unit" may include one or more processors in embodiments of the disclosure.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced, (LTE-A) of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a DL and has adopted a single carrier frequency division multiple access (SC-FDMA) scheme in an UL. The UL refers to a radio link of data or a control signal transmitted from a UE (or an MS) to a BS (e.g., eNB), and the DL refers to a radio link of data or a control signal transmitted from a BS to a UE. The multiple access schemes identify data or control information of different users in a manner that time-frequency resources for carrying the data or control information of the users are allocated and managed not to overlap each other, that is, to achieve orthogonality therebetween.

As a post-LTE communication system, i.e., the 5G communication system is requested to freely reflect various requirements from users and service providers, and thus, has to support services that simultaneously satisfy the various requirements. The services being considered for the 5G communication system include enhanced mobile broadband (eMBB), massive machine-type communication (mMTC), ultra-reliability low-latency communication (URLLC) services, or the like.

The eMBB aims to provide a further-improved data rate than a data rate supported by the legacy LTE, LTE-A, or LTE-Pro. For example, in the 5G communication system, the eMBB should be able to provide a peak data rate of 20 Gbps in a DL and a peak data rate of 10 Gbps in an UL at one BS. Also, the 5G communication system has to simultaneously provide the improved peak data rate and an increased user-perceived data rate of a UE. In order to satisfy such requirements, there is a need for an improvement in transmission/reception technology including an improved multiple-input multiple-output (MIMO) transmission technology. Also, a data rate requested in the 5G communication system may be satisfied by using a frequency bandwidth wider than 20 MHz in the 3 GHz to 6 GHz or 6 GHz or more frequency band, instead of the LTE transmitting a signal by using maximum 20 MHz in the 2 GHz band.

Concurrently, the mMTC is being considered to support application services such as IoT in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/$km^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery lifetime of 10 to 15 years because it is difficult to frequently replace the battery of the terminal.

Lastly, the URLLC refers to cellular-based wireless communication services used for mission-critical purposes. For example, services for remote control of robots or machinery, industrial automation, unmanned aerial vehicles, remote health care, emergency alerts, and the like may be considered. Therefore, the URLLC should provide communications providing very low latency and very high reliability. For example, a service supporting the URLLC should satisfy air interface latency of less than 0.5 milliseconds, and simultaneously has a requirement for a packet error rate of 10-5 or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services of the 5G, i.e., the eMBB, the URLLC, and the mMTC may be multiplexed and transmitted in one system. Here, in order to satisfy different requirements of the services, the services may use different transceiving schemes and different transceiving parameters. Obviously, the 5G is not limited to the afore-described three services.

For convenience of description, the disclosure may use some of terms and names defined in the $3^{rd}$ Generation Partnership Project (3GPP) LTE standards (standards of 5G, NR, LTE, or similar system). However, the disclosure is not limited to these terms and names, and may be equally applied to systems conforming to other standards. Hereinafter, terms identifying an access node, terms indicating network entities, terms indicating messages, terms indicating an interface between network entities, and terms indicating various pieces of identification information, as used in the following description, are exemplified for convenience of description. Accordingly, the disclosure is not limited to terms to be described below, and other terms indicating objects having equal technical meanings may be used.

[NR Time-Frequency Resource]

Hereinafter, a frame structure of a 5G system will now be described in detail with reference to drawings.

In FIG. 1, the horizontal axis represents a time domain and the vertical axis represents a frequency domain. A basic unit of a resource in the time-frequency domain is a resource element (RE) 101 and may be defined as 1 OFDM symbol 102 in the time domain and 1 subcarrier 103 in the frequency domain. In the frequency domain, $$N_{sc}^{RB}$$

(e.g., 12) consecutive REs may constitute one resource block (RB) 104. In FIG. 1, $$N_{slot}^{subframe,\mu}$$

indicates the number of OFDM symbols per one subframe 110 for subcarrier spacing configuration (μ), and more detailed descriptions of a resource structure in the 5G system may be referred to rules of TS 38.211 Section 4.

Figure 2:
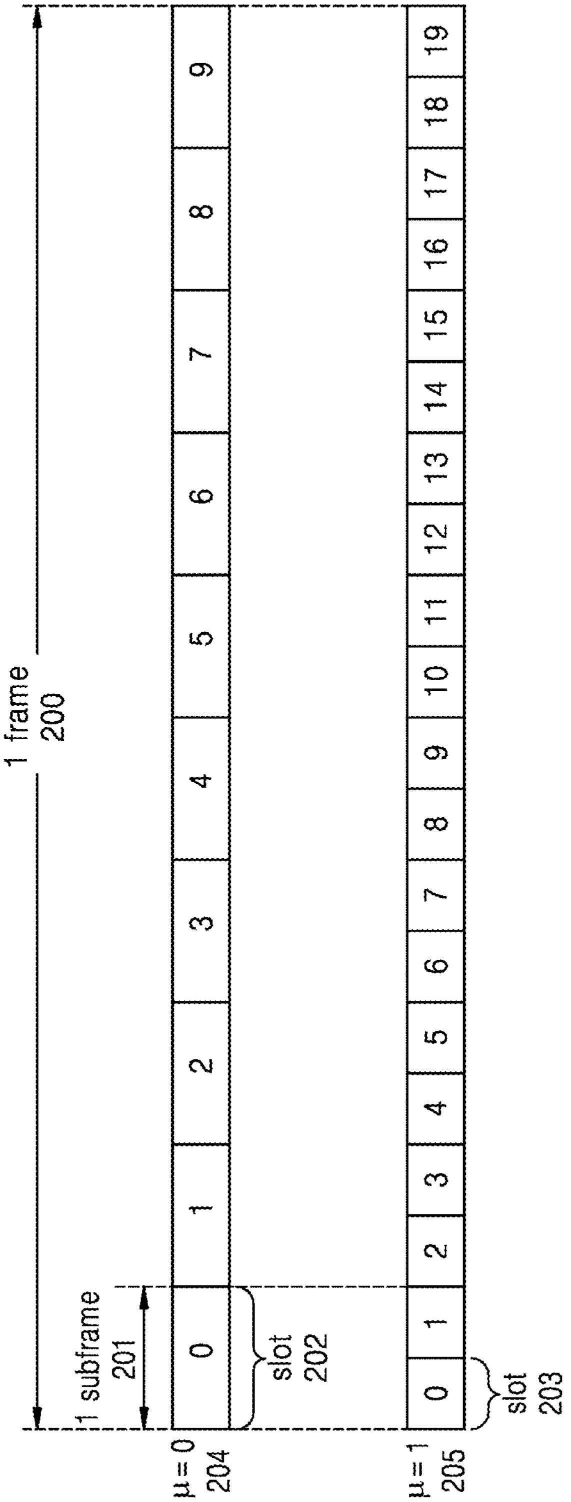
FIG. 2 illustrates a diagram of structures of a frame, a subframe, and a slot in a wireless communication system according to an embodiment of the disclosure.

FIG. 2 illustrates a diagram of structures of a frame, a subframe, and a slot in a wireless communication system according to an embodiment of the disclosure.

FIG. 2 illustrates an example of structures of a frame 200, a subframe 201, and a slot 202. One frame 200 may be defined as 10 ms. One subframe 201 may be defined as 1 ms, and thus, one frame 200 may comprise 10 subframes 201. One slot 202 or 203 may be defined as 14 OFDM symbols (that is, the number of symbols per 1 slot $$(N_{symb}^{slot})$$

may be 14). One subframe 201 may comprise one or more slots 202 or 203, and the number of slots 202 or 203 per one subframe 201 may vary according to a configuration value μ 204 or 205 indicating a configuration of a subcarrier spacing. The example of FIG. 2 shows a case 204 in which μ=0 and a case 205 in which μ=1, as a configuration value of a subcarrier spacing. When μ=0 (204), one subframe 201 may comprise one slot 202, and when μ=1 (205), one subframe 201 may comprise two slots 203. That is, the number of slots per one subframe $$(N_{slot}^{subframe,\mu})$$

may vary according to a configuration value μ with respect to a subcarrier spacing, and thus, the number of slots per one frame $$(N_{slot}^{frame,\mu})$$

may vary accordingly.

$N_{slot}^{subframe,\mu}$ and $N_{slot}^{frame,\mu}$ according to each subcarrier spacing configuration value μ may be defined as in Table 1 below.

TABLE 1

| μ | $N_{symb}^{slot}$ | $N_{slot}^{frame\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Hereinafter, configuration of bandwidth parts (BWPs) in the 5G communication system will now be described with reference to the drawings.

Figure 3:
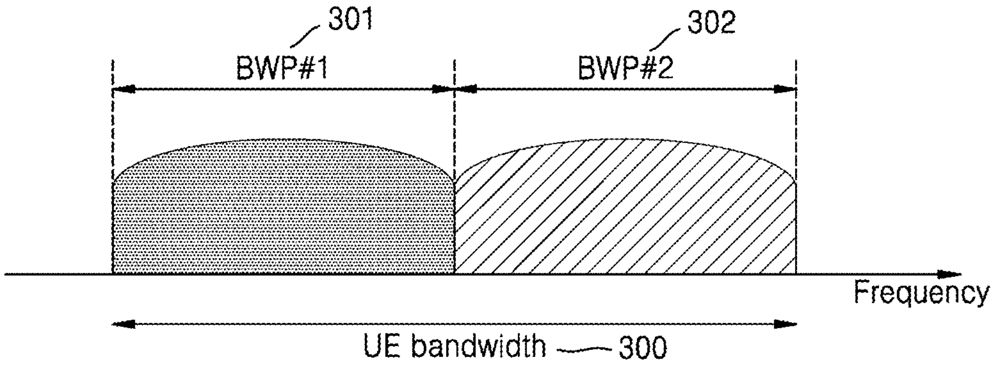
FIG. 3 illustrates a diagram of an example of configuration of bandwidth parts (BWPs) in a wireless communication system according to an embodiment of the disclosure.

FIG. 3 illustrates a diagram of an example of configuration of BWPs in a wireless communication system according to an embodiment of the disclosure.

In the example of FIG. 3, UE bandwidth 300 is configured into two BWPs, i.e., BWP #1 301 and BWP #2 302. A BS may configure a UE with one or more BWPs, and may configure, for each BWP, a plurality of pieces of information as in Table 2 below.

TABLE 2

```
BWP : :=                     SEQUENCE {
  bwp-Id                       BWP-Id,
  locationAndBandwidth         INTEGER (1..65536 ),
  subcarrierSpacing            ENUMERATED {n0, n1, n2, n3, n4, n5},
  cyclicPref ix                ENUMERATED { extended }
  }
```

In Table 2 above, "locationAndBandwidth" indicates a location and bandwidth in a frequency region of a corresponding BWP, "subcarrierSpacing" indicates a subcarrier spacing to be used in the corresponding BWP, and "cyclicPrefix" indicates whether or not a cyclic prefix (CP) is to be used for the corresponding BWP.

The disclosure is not limited to the example, and thus, various parameters associated with the BWP may be configured for the UE, in addition to the configuration information. The plurality of pieces of information may be transmitted from the BS to the UE by higher layer signaling, e.g., radio resource control (RRC) signaling. At least one BWP among the configured one or more BWPs may be activated. Whether to activate a configured BWP may be indicated from the BS to the UE semi-statically by RRC signaling or dynamically by downlink control information (DCI).

According to some embodiments of the disclosure, the UE may be configured by the BS with an initial BWP for initial access in a Master Information Block (MIB) before the UE is RRC connected. In more detail, the UE may receive configuration information for a control resource set (CORESET) and search space in which a physical downlink control channel (PDCCH) may be transmitted for receiving system information (e.g., remaining system information (RMSI) or system information block 1 (SIB1)), based on the MIB, requested for initial access in an initial access process. Each of the control resource set and the search space which are configured in the MIB may be regarded with identity (ID) 0. The control resource set and the search space which are configured in the MIB may be respectively referred to as a common control resource set and a common search space. The BS may notify, in the MIB, the UE of configuration information such as frequency allocation information, time allocation information, numerology, etc., for control resource set #0. Also, the BS may notify, in the MIB, the UE of configuration information such as a monitoring periodicity and occasion for the control resource set #0, i.e., configuration information for search space #0. The UE may regard a frequency region configured as the control resource set #0 obtained from the MIB, as the initial BWP for initial access. Here, the ID of the initial BWP may be regarded as 0. The control resource set may be referred to as a control region, a control resource region, or the like.

Configuration of the BWP supported by the 5G system may be used for various purposes.

According to some embodiments of the disclosure, when a bandwidth supported by the UE is smaller than a system bandwidth, the BS may support, via configuration of the BWP, data transmission and reception by the UE. For example, the BS may configure the UE with a frequency location of the BWP, and the UE may transmit or receive data in a particular frequency location in the system bandwidth.

Also, according to some embodiments of the disclosure, in order to support different numerologies, the BS may configure a plurality of BWPs for the UE. For example, in order to support data transmission and reception using both 15 KHz subcarrier spacing and 30 KHz subcarrier spacing for a certain UE, the BS may configure two BWPs with 15 KHz and 30 KHz subcarrier spacings, respectively. The different BWPs may be frequency division multiplexed, and in a case where a UE attempts to transmit and receive data with particular subcarrier spacing, a BWP configured with the subcarrier spacing may be activated.

Also, according to some embodiments of the disclosure, in order to reduce power consumption of the UE, the BS may configure BWPs with different bandwidth sizes for the UE. For example, when the UE supports very large bandwidth, e.g., 100 MHz bandwidth, and always transmits or receives data in the bandwidth, very high power consumption may occur. Particularly, in a situation where there is no traffic, monitoring unnecessary DL control channel in the large 100 MHz bandwidth may be very inefficient in terms of power consumption. In order to reduce the power consumption of the UE, the BS may configure a BWP with relatively small bandwidth, e.g., a 20 MHz BWP, for the UE. In the situation that there is no traffic, the UE may perform monitoring in the 20 MHz BWP, and when data occurs, the UE may transmit or receive the data on the 100 MHz BWP based on an indication from the BS.

In a method of configuring a BWP, UEs before being RRC connected may receive, based on the MIB, configuration information for the initial BWP in an initial access process. In more detail, the UE may be configured, based on the MIB of a physical broadcast channel (PBCH), with a control resource set for a DL control channel on which DCI for scheduling a system information block (SIB) may be transmitted. A bandwidth of the control resource set configured based on the MIB may be regarded as the initial BWP, and the UE may receive, on the initial BWP, a physical downlink shared channel (PDSCH) on which the SIB is transmitted. The initial BWP may also be used for other system information (OSI), paging, or random access, in addition to reception of the SIB.

[Switching of BWP]

When one or more BWPs are configured for the UE, the BS may indicate, to the UE, switching or transition of BWP by using a BWP indicator field in DCI. For example, as illustrated in FIG. 3, when a currently-activated BWP is BWP #1 301, the BS may indicate BWP #2 302 with a bandwidth indicator in DCI to the UE, and the UE may perform BWP switching to the BWP #2 302 indicated with the BWP indicator in the received DCI.

As described above, the DCI-based BWP switching may be indicated by DCI that schedules a PDSCH or a physical uplink shared channel (PUSCH), and thus, when the UE receives a BWP switching request, the UE may need to transmit or receive, on the switched BWP without difficulty, the PDSCH or the PUSCH scheduled by the DCI. For this end, a requirement for a delay time $T_{BWP}$ required for BWP switching is defined in the 3GPP standard, and, for example, may be defined as shown in Table 3 below.

TABLE 3

| | NR Slot | BWP switch delay $T_{BWP}$ (slots) | |
|---|---|---|---|
| μ | length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

*Note* 1

Depends on UE capability.

Note 2

If the BWP switch involves changing of SCS, the BWP switch delay is determined by the larger one between the SCS before BWP switch and the SCS after BWP switch.

The requirement for BWP switching delay time may support type 1 or type 2 depending on a capability of the UE. The UE may report a supportable BWP delay time type to the BS.

According to the requirement for the BWP switching delay time, when the UE receives DCI including the BWP switching indicator in slot n, the UE may complete switching to a new BWP indicated by the BWP switching indicator no later than slot $n+T_{BWP}$. By doing so, the UE may transmit or receive, on the new BWP, a data channel scheduled by the DCI. When the BS attempts to schedule the data channel on the new BWP, the BS may determine to allocate a time domain resource for the data channel by considering the BWP switching delay time ($T_{BWP}$) of the UE. That is, when the BS schedules a data channel on a new BWP, as for a method of determining time domain resource allocation for the data channel, the BS may schedule the data channel after the BWP switching delay time. Accordingly, the UE may not expect the DCI, which indicates BWP switching, to indicate a slot offset value (K0 or K2) smaller than the BWP switching delay time $T_{BWP}$.

If the UE receives DCI indicating BWP switching (e.g., DCI format 1_1 or 0_1), the UE may not perform any transmission or reception during a time interval from a third symbol of the slot in which a PDCCH including the DCI is received to a starting point of a slot indicated by a slot offset value (K0 or K2) indicated in a time domain resource allocation indicator field in the DCI. For example, when the UE has received DCI indicating BWP switching in slot n and a slot offset value indicated by the DCI is K, the UE may not perform any transmission or reception from a third symbol of the slot n to a symbol before slot n+k (i.e., a last symbol of slot n+K−1).

[SS/PBCH Block]

Hereinafter, a synchronization signal (SS)/PBCH block in the 5G system will now be described.

An SS/PBCH block may refer to a physical layer channel block including primary SS (PSS), secondary SS (SSS), and PBCH. In detail, functions of PSS, SSS, and PBCH are as described below.

PSS: a reference signal for DL time/frequency synchronization, which may provide partial information of a cell ID.

SSS: a reference signal for DL time/frequency synchronization, which provides the rest of the cell ID information not provided by the PSS. In addition, the SSS may serve as another reference signal for demodulation of the PBCH.

PBCH: The PBCH may provide essential system information requested for transmission or reception of data channel and control channel for UE. The essential system information may include search-space-associated control information indicating radio resource mapping information of the control channel, scheduling control information for a separate data channel to transmit system information, and the like.

SS/PBCH block: The SS/PBCH block may be a combination of PSS, SSS, and PBCH. One or more SS/PBCH blocks may be transmitted in 5 ms, and each of the SS/PBCH blocks may be identified by an index.

The UE may detect the PSS and the SSS in the initial access process, and may decode the PBCH. The UE may obtain an MIB from the PBCH and may be configured with control resource set (CORESET) #0 (e.g., control resource set whose control resource set index is 0) via the MIB. The UE may assume that demodulation reference signals (DMRSs) transmitted in the selected SS/PBCH block and control resource set #0 are quasi-co-located (QCL), and may perform monitoring with respect to the CORESET #0. The UE may receive system information from the DCI transmitted in the control resource set #0. The UE may obtain random-access-channel (RACH) related configuration information required for initial access from the received system information. The UE may transmit, to the BS, a physical RACH (PRACH) by considering the selected SS/PBCH index, and upon reception of the PRACH, the BS may obtain information about the SS/PBCH block index selected by the UE. The BS may identify that the UE has selected a certain block among the SS/PBCH blocks and monitors the control resource set #0 associated with the selected SS/PBCH block.

[PDCCH: Associated with DCI]

Hereinafter, DCI in the 5G system will now be described in detail.

In the 5G system, scheduling information for UL data (or PUSCH) or DL data (or PDSCH) is transmitted in the DCI from the BS to the UE. The UE may monitor a fallback DCI format and a non-fallback DCI format for PUSCH or PDSCH. The fallback DCI format may include a fixed field predefined between the BS and the UE, and the non-fallback DCI format may include a configurable field.

The DCI may be transmitted on a PDCCH after channel coding and modulation processes. A cyclic redundancy check (CRC) may be added to a DCI message payload, and the CRC may be scrambled by a radio network temporary identifier (RNTI) that corresponds to an ID of the UE. Depending on a purpose of the DCI message, e.g., UE-specific data transmission, power control command, random access response, or the like, different RNTIs may be used. That is, the RNTI may not be explicitly transmitted but may be transmitted in a CRC calculation process. Upon reception of a DCI message transmitted on the PDCCH, the UE may check CRC by using an allocated RNTI, and may identify that the DCI message is transmitted to the UE, based on a result of the CRC checking.

For example, DCI that schedules a PDSCH for system information (SI) may be scrambled by SI-RNTI. DCI that schedules a PDSCH for a random access response (RAR) message may be scrambled by an RA-RNTI. DCI that schedules a PDSCH for a paging message may be scrambled by a P-RNTI. DCI that indicates a slot format indicator (SFI) may be scrambled by an SFI-RNTI. DCI that indicates a transmit power control (TPC) may be scrambled by a TPC-RNTI. DCI that schedules UE-specific PDSCH or PUSCH may be scrambled by a Cell RNTI (C-RNTI).

DCI format 0_0 may be used for the fallback DCI that schedules a PUSCH, and here, the CRC may be scrambled by a C-RNTI. The DCI format 0_0 with the CRC scrambled by the C-RNTI may include a plurality of pieces of information shown in Table 4 below.

TABLE 4

| |
|---|
| Identifier for DCI formats - [1] bit |
| Frequency domain resource assignment - $\left\lceil \left\lceil \log_2\left(N_{RB}^{UL,BWP}\left(N_{RB}^{UL,BWP}+1\right)/2\right\rceil\right\rceil$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| TPC command for scheduled PUSCH - [2] bits |
| UL/SUL indicator - 0 or 1 bit |

DCI format 0_1 may be used for the non-fallback DCI that schedueies a PUSCH, and here, the CRC may be scrambled by a C-RNTI. The DCI format 0_1 with the CRC scrambled by the C-RNTI may include a plurality of pieces of information shown in Table 5 below.

TABLE 5

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P\rceil$ bits |
| For resource allocation type 1, $\left\lceil\log_2\left(N_{RB}^{UL,BWP}\left(N_{RB}^{UL,BWP}+1\right)/2\right)\right\rceil$ bits |
| Time domain resource assignment - 1, 2, 3 or 4 bits |
| VRB-to-PRB mapping - 0 or 1 bit, only for resource allocation type 1. |
| 0 bit if only resource allocation type 0 is configured; |
| 1 bit otherwise. |
| Frequency hopping flag - 0 or bit only for resource allocation type 1. |
| 0 bit if only resource allocation type 0 is configured; |
| 1 bit otherwise. |
| Modulation and coding scheme - 5 bits |
| New data indicator - 1 bits |
| Redundancy version - 2 bits |
| HARQ process number - 4 bits |
| 1st downlink assignment index - 1 or 2 bits |
| 1 bit for semi-static HARQ-ACK codebook; |
| 2 bits for dynamic HARQ-ACK codebook with single HARK-ACK codebook. |
| 2nd downlink sssignment index - 0 or 2 bits |
| 2 bits for dynamic HARQ-ACK codebook with two HARQ-ACK sub-codebooks; |
| 0 bit otherwise. |
| TPC command Sor scheduled PUSCH - 2 bits |
| SRS resource indicator $-\left\lceil\log_2\left(\sum_{k=1}^{L_{max}}\binom{N_{SRS}}{k}\right)\right\rceil$ or $\lceil\log_2(N_{SRS})\rceil$ bits |
| $\left\lceil\log_2\left(\sum_{k=1}^{L_{max}}\binom{N_{SRS}}{k}\right)\right\rceil$ bits for non-codebook based PUSCH transmission; |
| $\lceil\log_2(N_{SRS})\rceil$ bits for codebook based PUSCH transmission. |
| Precoding information and number of layers - up to 6 bits |
| Antenna ports - up to 5 bits |
| SRS request - 2 bits |
| CSI request - 0, 1, 2, 3, 4, 5, or 6 bits |
| CBG transmission information - 0, 2, 4, 6, or 8 bits |
| PTRS-DMRS association - 0 or 2 bits |
| beta_offset indicator - 0 or 2 bits |
| OMRS sequence initialization - 0 or 1 bit |

DCI format 1_0 may be used for the fallback DCI that schedules a PDSCH, and here, the CRC may be scrambled by a C-RNTI. The DCI format 1_0 with the CRC scrambled by the C-RNTI may include a plurality of pieces of information shown in Table 6 below.

TABLE 6

| |
|---|
| Identifier for DCI formats - [1] bit |
| Frequency domain resource assignment - $[\lceil \log_2(N_{RB}^{DL,BWP}(N_{RB}^{DL,BWP}+1)/2)\rceil]$ bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |
| TPC command for scheduled PUCCH - [2] bits |
| PUCCH resource indicator- 3 bits |
| PDSCH-to-HARQ feedback timing indicator- [3] bits |

DCI format 1_1 may be used for the non-fallback DCI that schedules a PDSCH, and here, the CRC may be scrambled by a C-RNTI. The DCI format 1_1 with the CRC scrambled by the C-RNTI may include a plurality of pieces of information shown in Table 7 below.

TABLE 7

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P\rceil$ bits |
| For resource allocation type 1, $\lceil \log_2(N_{RB}^{DL,BWP}(N_{RB}^{DL,BWP}+1)/2)\rceil$ bits |
| Time domain resource assignment - 1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| PRB bundling size indicator - 0 or 1 bit |
| Rate matching indicator - 0, 1, or 2 bits |
| ZP CSI-RS trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information - 0 or 1 bit |
| DMRS sequence initialization - 1 bit |

[PDCCH: CORESET, REG, CCE, Search Space]

A DL control channel in the 5G communication system will now be described in detail with reference to related drawings.

Figure 4:
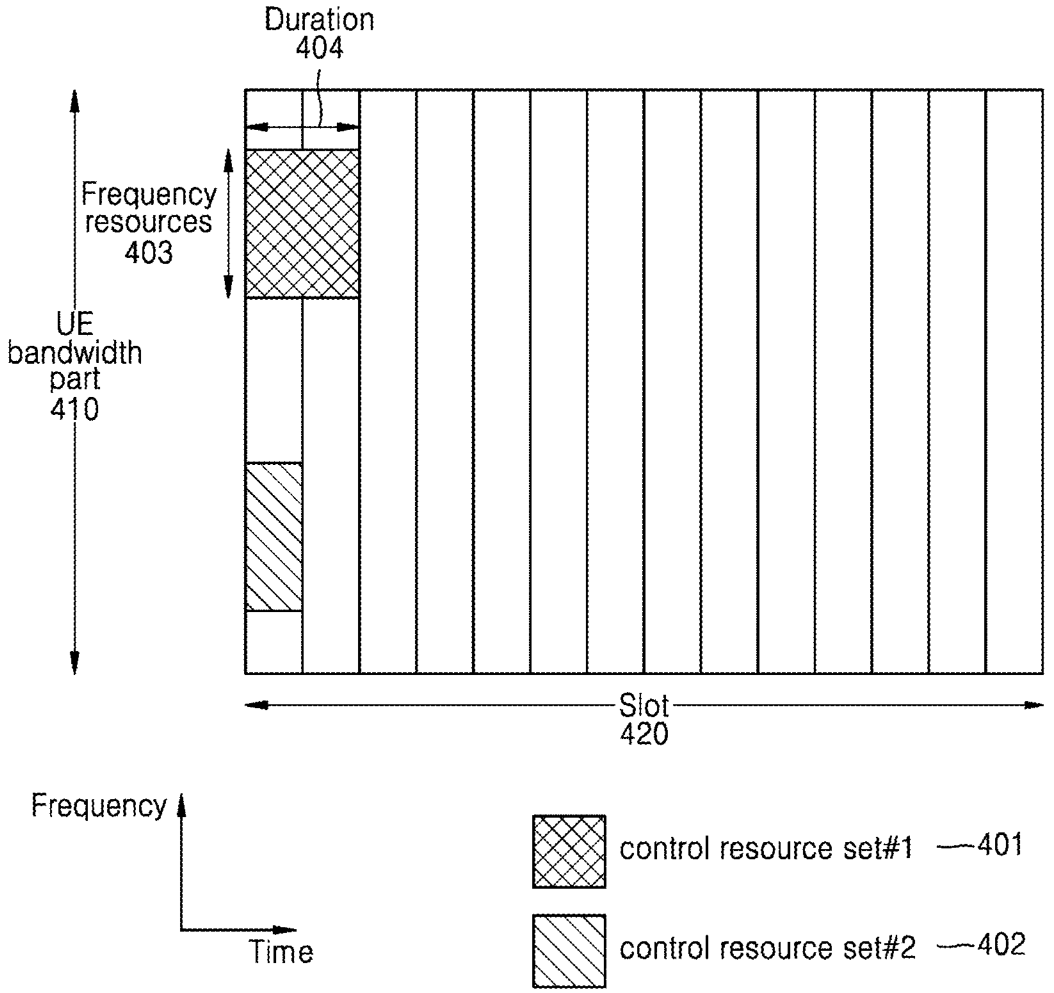
FIG. 4 illustrates a diagram of an example of configuring a control resource set of a downlink (DL) control channel in a wireless communication system according to an embodiment of the disclosure.

FIG. 4 illustrates a diagram of an example of control resource sets (or CORESETs) in which a DL control channel is transmitted in the 5G wireless communication system. FIG. 4 illustrates the example in which UE BWP 410 is configured on the frequency axis, and two control resource sets (control resource set #1 401 and control resource set #2 402) are configured in a slot 420 on the time axis. The control resource sets 401 and 402 may be configured on particular frequency resources 403 in the full UE BWP 410 on the frequency axis. In FIG. 4, the particular frequency resources 403 correspond to an example of frequency resources configured in the control resource set #1 401. The control resource sets 401 and 402 may be configured as one or more OFDM symbols on the time axis, and duration of the control resource sets 401 and 402 may be defined as control resource set duration 404. Referring to the example of FIG. 4, the control resource set #1 401 may be configured as control resource set duration of two symbols, and the control resource set #2 402 may be configured as control resource set duration of one symbol.

The control resource set in the 5G communication system described above may be configured by the BS for the UE by higher layer signaling (e.g., system information (SI), MIB, or RRC signaling). Configuring the UE with a control resource set may be understood as providing the UE with information such as a control resource set ID, a frequency location of the control resource set, length of symbols of the control resource set, or the like. For example, configuration information for the control resource set may include a plurality of pieces of information shown in Table 8 below.

TABLE 8

```
ControlResourceSet ::=              SEQUENCE {
  -- Corresponds to L1 parameter 'CORESET-ID'
  controlResourceSetId              ControlResourceSetId,
  frequencyDomainResources          BIT STRING (SIZE (45)),
  duration                        INTEGER (1..maxCoReSet-
                                  Duration),
  cce-REG-MappingType               CHOICE {
    interleaved                     SEQUENCE {
      reg-BundleSize                  ENUMERATED {n2, n3, n6},
      precoderGranularity             ENUMERATED {sameAs
    REG-bundle, allContigousRBs},
      interleaverSize                 ENUMERATED {n2, n3, n6}
      shiftIndex
      INTEGER(0..maxNrofPhysicalResourceBlocks-1)
      OPTIONAL
 },
    nonInterleaved                  NULL
  },
  tci-StatesPDCCH                   SEQUENCE(SIZE (1..
    maxNrofTCI-                         OPTIONAL,
    StatesPDCCH)) OF
    TCI-StateId
  tci-PresentInDCI                  ENUMERATED {enabled}
                                        OPTIONAL, -- Need S
}
```

In Table 8 above, tci-StatesPDCCH (i.e., transmission configuration indication (TCI) state) configuration information may include information about channel state information reference signal (CSI-RS) indexes or one or more SS/PBCH block indexes having a QCL relation with a DMRS transmitted in the corresponding control resource set.

Figure 5:
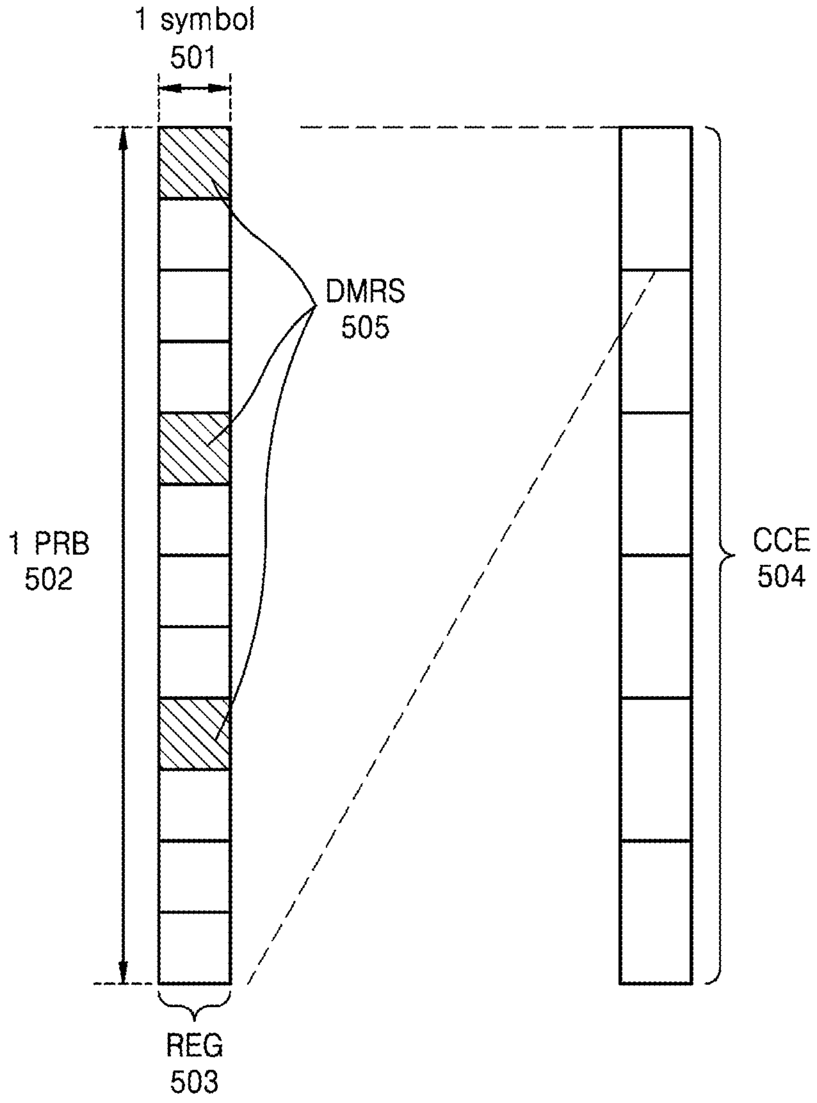
FIG. 5 illustrates a diagram of a structure of a DL control channel in a wireless communication system according to an embodiment of the disclosure.

FIG. 5 illustrates a diagram of an example of a basic unit of time and frequency resources that configure a DL control channel to be used in the 5G communication system. Referring to FIG. 5, a basic unit of time and frequency resources that configure a control channel may be referred to as a resource element group (REG) 503. The REG 503 may be defined by one OFDM symbol 501 on the time axis and one physical resource block (PRB) 502, i.e., 12 subcarriers on the frequency axis. The BS may configure a DL control channel allocation unit by connecting one or more REGs 503.

As illustrated in FIG. 5, when a basic unit with which the DL control channel is allocated is referred to as a control channel element (CCE) 504 in the 5G communication system, the one CCE 504 may include a plurality of REGs 503. When describing, as an example, the REG 503 shown in FIG. 5, the REG 503 may include 12 REs, and when one CCE 504 includes 6 REGs 503, the one CCE 504 may include 72 REs. When the DL control resource set is configured, it may include a plurality of CCEs 504, and a particular DL control channel may be transmitted by being mapped to one or more CCEs 504 based on an aggregation level (AL) in the control resource set. The CCEs 504 in the control resource set may be identified by numbers, and the numbers may be allocated to the CCEs 504 in a logical mapping scheme.

The basic unit of the DL control channel shown in FIG. 5, i.e., the REG 503, may include both REs to which DCI is mapped and a region to which DMRS 505 that is a reference signal for decoding the DCI is mapped. As shown in FIG. 5, three DMRSs 505 may be transmitted in one REG 503. The number of CCEs required to transmit the PDCCH may be 1, 2, 4, 8, or 16 depending on the AL, and different numbers of CCEs may be used to implement link adaptation of the DL control channel. For example, when AL=L, one DL control channel may be transmitted in L CCEs. The UE needs to detect a signal without knowing information about the DL control channel, and search space representing a set of CCEs may be defined for the blind decoding. The search space may be defined as a set of DL control channel candidates that include CCEs on which the UE needs to attempt decoding at a given AL. Because there are various ALs each making a bundle with 1, 2, 4, 8, or 16 CCEs, the UE may have a plurality of search spaces. A search space set may be defined as a set of search spaces at all the configured ALs.

The search spaces may be classified into common search spaces and UE-specific search spaces. A certain group of UEs or all the UEs may monitor a common search space of the PDCCH so as to receive dynamic scheduling of the system information or receive cell-common control information such as a paging message. For example, the UE may monitor the common search space of the PDCCH so as to receive PDSCH scheduling allocation information for transmitting an SIB including cell operator information or the like. Because a certain group of UEs or all the UEs need to receive the PDCCH, the common search space may be defined as a set of pre-defined CCEs. UE-specific PDSCH or PUSCH scheduling allocation information may be received by monitoring the UE-specific search space of the PDCCH. The UE-specific search space may be UE-specifically defined as a function of various system parameters and an ID of the UE.

In the 5G communication system, parameters of the search space of the PDCCH may be configured by the BS for the UE by using higher layer signaling (e.g., SIB, MIB, or RRC signaling). For example, the BS may configure the UE with the number of PDCCH candidates at each AL, monitoring periodicity for the search space, monitoring occasion on symbols in the slot for the search space, a type of the search space (common search space or UE-specific search space), a combination of a DCI format to be monitored in the search space and an RNTI, a control resource set index to monitor the search space, or the like. For example, configuration information for the search space of the PDCCH may include a plurality of pieces of information shown in Table 9 below.

TABLE 9

```
SearchSpace ::=                       SEQUENCE {
  -- Identity of the search space. SearchSpaceId = 0 identifies the
     SearchSpace configured via PBCH (MIB) or ServingCellConfigCommon.
  searchSpaceId                         SearchSpaceId,
  controlResourceSetId                  ControlResourceSetId,
  monitoringSlotPeriodicityAndOffset      CHOICE {
    sl1                                 NULL,
    sl2                                 INTEGER (0..1),
    sl4                                 INTEGER (0..3),
    sl5                               INTEGER (0..4),
    sl8                                 INTEGER (0..7),
    sl10                                INTEGER (0..9),
    sl16                                INTEGER (0..15),
    sl20                                INTEGER (0..19)
  }
        OPTIONAL,
  duration                              INTEGER (2..2559)
  monitoringSymbolWithinSlot                BIT STRING (SIZE
    (14))                                     OPTIONAL,
  nrofCandidates                        SEQUENCE {
    aggregationLevel1                   ENUMERATED {n0, n1, n2, n3, n4, n5, n6,
    n8},
    aggregationLevel2                   ENUMERATED {n0, n1, n2, n3, n4, n5, n6,
    n8},
    aggregationLevel4                   ENUMERATED {n0, n1, n2, n3, n4, n5, n6,
    n8},
    aggregationLevel8                   ENUMERATED {n0, n1, n2, n3, n4, n5, n6,
    n8},
    aggregationLevel16                   ENUMERATED {n0, n1, n2, n3, n4, n5,
    n6, n8}
  },
  searchSpaceType                       CHOICE {
    -- Configures this search space as common search space (CSS) and DCI
    formats to monitor.
    common                              SEQUENCE {
```

TABLE 9-continued

```
    }
  ue-Specific                          SEQUENCE {
    -- Indicates whether the UE monitors in this USS for DCI formats 0-0 and
  1-0 or for formats 0-1 and 1-1.
    formats                              ENUMERATED (formats0-0-And-1-0,
  formats0-1-And-1-1),
      . . .
  }
```

Based on the configuration information, the BS may configure the UE with one or more search space sets. According to some embodiments of the disclosure, the BS may configure search space set 1 and search space set 2 for the UE. The BS may configure the UE to monitor DCI format A scrambled by an X-RNTI in the search space set 1 in the common search space and monitor DCI format B scrambled by a Y-RNTI in the search space set 2 in the UE-specific search space. In X-RNTI and Y-RNTI above, "X" and "Y" may each correspond to one of various RNTIs to be described below.

Based on the configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, combinations of DCI formats and RNTIs below may be monitored. Obviously, the combinations are not limited to an example below.

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI
- In the UE-specific search space, combinations of DCI formats and RNTIs below may be monitored. Obviously, the combinations are not limited to an example below.
- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The RNTIs may conform to definitions and purposes below.

- C-RNTI (Cell RNTI): for UE-specific PDSCH scheduling
- TC-RNTI (Temporary Cell RNTI): for UE-specific PDSCH scheduling
- CS-RNTI (Configured Scheduling RNTI): for semi-statically configured UE-specific PDSCH scheduling
- RA-RNTI (Random Access RNTI): for PDSCH scheduling in a random access process
- P-RNTI (Paging RNTI): for scheduling a PDSCH on which paging is transmitted
- SI-RNTI (System Information RNTI): for scheduling a PDSCH on which system information is transmitted
- INT-RNTI (Interruption RNTI): for indicating whether to puncture the PDSCH
- TPC-PUSCH-RNTI (Transmit Power Control for PUSCH RNTI): for indicating power control command for a PUSCH
- TPC-PUCCH-RNTI (Transmit Power Control for PUCCH RNTI): for indicating power control command for a PUCCH
- TPC-SRS-RNTI (Transmit Power Control for SRS RNTI): for indicating power control command for an SRS The DCI formats described above may conform to definitions in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, a search space at aggregation level L with control resource set p and search space set s may be represented as in Equation 1 below.

$$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\left\lfloor\frac{N_{CCE,p}}{L}\right\rfloor\right\}+i \quad \text{Equation 1}$$

- L: aggregation level (AL)
- $n_{CI}$: carrier index
- $N_{CCE,p}$: a total number of CCEs being present in control resource set p $$n_{s,f}^{\mu}:$$

slot index $$M_{s,max}^{(L)}:$$

the number of PDCCH candidate groups at aggregation level L $$m_{s,n_{CI}}=0,\ \ldots\ ,M_{s,max}^{(L)}-1:$$

an index of the PDCCH candidate groups at aggregation level L i=0, . . . , L−1

$$Y_{p,n^{\mu}_{s,f}}=\left(A_p\cdot Y_{p,n^{\mu}_{s,f}-1}\right)\bmod D,$$

$Y_{p,-1}=n_{RNTI}\neq 0$, $A_p=39827$ for p mod 3=0, $A_p=39829$ for p mod 3=1, $A_p=39839$ for p mod 3=2, D=65537

$n_{RNTI}$: UE identifier $$Y_{p,n^{\mu}_{s,f}}$$

value may correspond to 0 for common search space.

$$Y_{p,n^{\mu}_{s,f}}$$

value may be a value that changes by a UE Identity (C-RNTI or ID configured by the BS for the UE) and time index for the UE-specific search space.

In the 5G communication system, it is possible to configure a plurality of search space sets with different parameters (e.g., the parameters in Table 9), and thus, a group of search space sets the UE monitors may be different every time. For example, when the search space set #1 is configured with X-slot periodicity and the search space set #2 is configured with Y-slot periodicity, where X and Y are different, the UE may monitor both the search space set #1 and the search space set #2 in a particular slot, and may monitor one of the search space set #1 and the search space set #2 in another particular slot.

[PDCCH: Span]

The UE may report, at each subcarrier spacing, UE capability about a case of having a plurality of PDCCH monitoring occasions in a slot, and may use a concept of span. A span refers to consecutive symbols on which the UE may monitor a PDCCH in a slot, and each PDCCH monitoring occasion is in one span. The span may be represented by (X, Y), where X refers to a minimum number of symbols between first symbols of two successive spans and Y refers to the number of consecutive symbols on which to monitor the PDCCH in one span. Here, the UE may monitor the PDCCH in a section in Y symbols from the first symbol of the span within the span.

Figure 6:
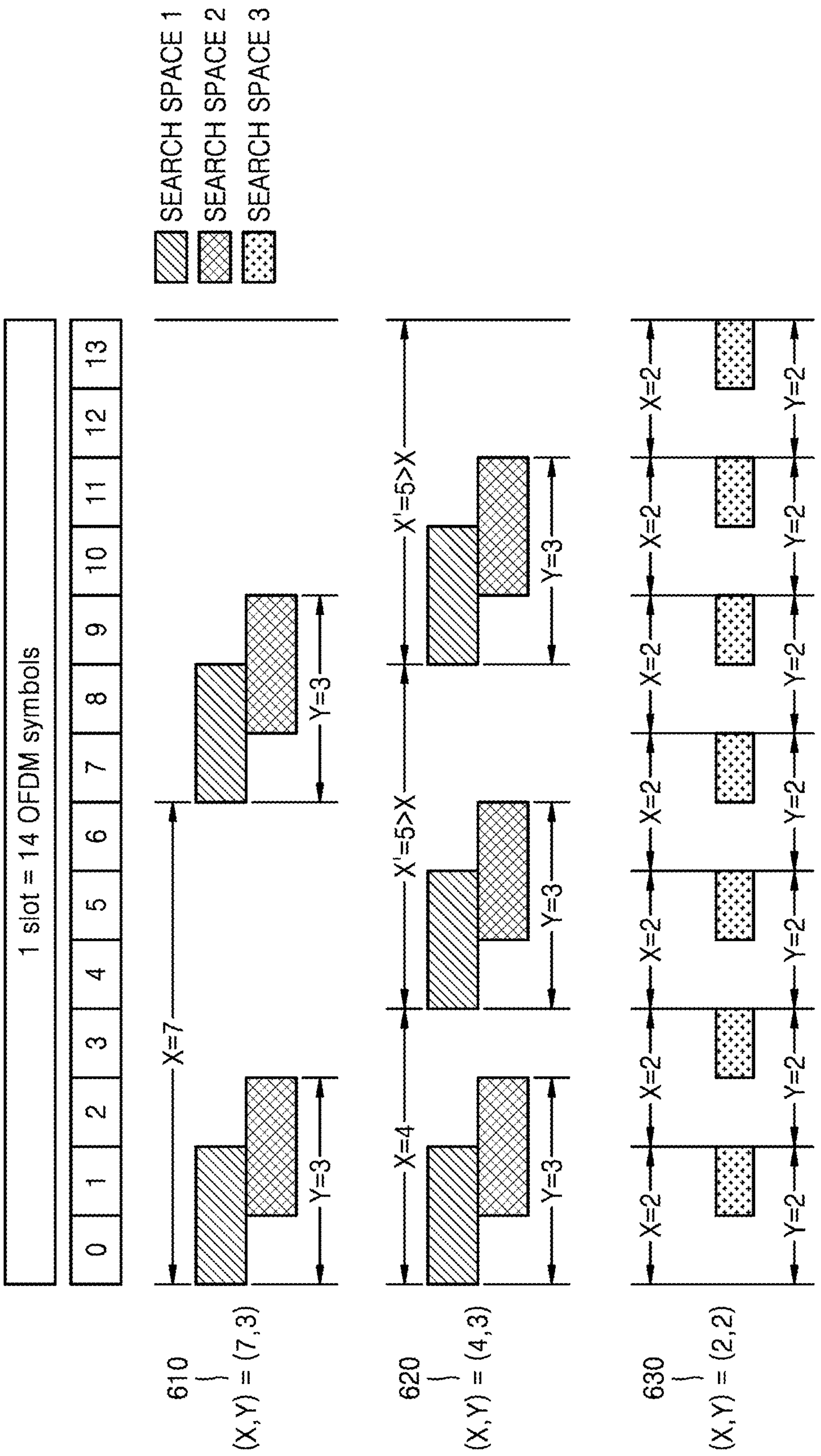
FIG. 6 illustrates a diagram of a case in which a user equipment (UE) can have a plurality of a physical downlink control channel (PDCCH) monitoring occasions in a slot in a wireless communication system, in terms of spans, according to an embodiment of the disclosure.

FIG. 6 illustrates a diagram of a case in which a UE can have a plurality of PDCCH monitoring occasions in a slot, in terms of spans, in a wireless communication system.

Referring to FIG. 6, for example, there may be spans (X,Y)=(7,3), (4,3), or (2,2), and these cases are respectively represented by reference numerals 610, 620, and 630 in FIG. 6. For example, 610 may indicate a case in which two spans that may be represented by (7,3) in a slot exist. In this case, a gap X between first symbols of the two spans is represented by X=7, and there may be a PDCCH monitoring occasion in a total of Y symbols (i.e., 3 symbols) from the first symbol of each span. Search spaces 1 and 2 may be present on consecutive symbols represented by Y=3. In another example, 620 indicates a case in which there are a total of three spans that may be represented by (4, 3) in a slot. In this case, a gap between the second and third spans may be distant by 5 symbols (X'=5) being greater than X (i.e., 4 symbols) which is a minimum number of symbols. 630 may indicate a case in which there are a total of seven spans that may be represented by (2, 2) in a slot. In this case, there may be a PDCCH monitoring occasion in a total of Y=2 symbols from the first symbol of each span, and a search space 3 may be present on Y=2 symbols.

[PDCCH: UE Capability Reporting]

A slot position where the afore-described common search space and UE-specific search space are located may be indicated by monitoringSlotPeriodicityAndOffset parameter of Table 9 above indicating the configuration information for the search space of the PDCCH, and a symbol position in the slot may be indicated by a bitmap through monitoringSymbolsWithinSlot parameter of Table 9. A symbol position in a slot where the UE is able to monitor a search space may be reported to the BS through UE capabilities below.

UE capability 1 (hereinafter, represented as feature group (FG) 3-1) may indicate, when there is one monitoring occasion (MO) for type 1 and type 3 common search spaces or UE-specific search spaces in a slot as in Table 11 below, a capability to monitor the MO when the MO is located on the first three symbols in the slot. The UE capability 1 is mandatory capability that has to be supported by every UE supporting NR, and whether to support the UE capability 1 may not be explicitly reported to the BS.

TABLE 11

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6 RB bit-map and duration of 1-3 OFDM symbols for FR1<br>For type 1 CSS without dedicated RRC configuration and for type 0, 0A, and 2 CSSs, CORESET resource allocation of 6 RB bit-map and duration 1-3 OFDM symbols for FR2<br>For type 1 CSS with dedicated RRC configuration and for type 3 CSS, UE specific SS, CORESET resource allocation of 6 RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell | n/a |

TABLE 11-continued

| Index | Feature group | Components | Field name in TS 38.331 [2] |
|---|---|---|---|
| | | PDCCH aggregation levels 1, 2, 4, 8, 16<br>UP to 3 search space sets in a slot tor a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter, represented as FG 3-2) may indicate, when there is one monitoring occasion (MO) for common search spaces or UE-specific search spaces in a slot as in Table 12 below, a capability of monitoring regardless of where the start symbol position of the MO is. The UE capability is optionally supported by the UE, and whether to support the UE capability may be explicitly reported to the BS.

TABLE 12

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE-specific search spaces in a slot as in Tables 13a and 13b below, an MO pattern the UE can monitor. The pattern consists of a gap X between start symbols of different MOs, and a maximum symbol length Y for one MO. Combinations of (X, Y) supported by the UE may be one or more of {(2,2), (4,3), (7,3)}. The UE UE capability 3 (hereinafter, represented as FG 3-5, 3-5*a*, or 3-5*b*) indicates, when there are a plurality of monitoring occasions (MOs) for common search spaces or capability is optionally supported by the UE, and whether to support the UE capability and the combination of (X,Y) may be explicitly reported to the BS.

TABLE 13a

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {<br>3-5. withoutDCI-Gap<br>3-5a. withDCI-Gap<br>} |
| 3-5a | For type 1 CSS with dedicated RRC configuration, type 3 CSS, | For type 1 CSS with dedicated RRC configuration, type 3 CSS and UE-SS, monitoring occasion can be any OFDM symbol(s) of a slot for Case 2, with minimum time separation (including the cross-slot | |

TABLE 13a-continued

| Index | Feature group | Components | Field name in TS 38.331 [2] |
|---|---|---|---|
| | and UE-SS, monitoring occasion can be any OFDM symbol(s) of a slot for Case 2 with a DCI gap | boundary case) between two DL unicast DCIs, between two UL unicast DCIs, or between a DL and an UL unicast DCI in different monitoring occasions where at least one of them is not the monitoring occasions of FG-3-1, for a same UE as<br>2OFDM symbols for 15 kHz<br>40FDM symbols for 30 kHz<br>7OFDM symbols for 60 kHz with NCP<br>11OFDM symbols for 120 kHz<br>Up to one unicast DL DCI and up to one unicast UL DCI in a monitoring occasion except for the monitoring occasions of FG 3-1.<br>In addition for TDD the minimum separation between the first two UL unicast DCIs within the first 3 OFDM symbols of a slot can be zero OFDM symbols. | |

TABLE 13b

| | | |
|---|---|---|
| 3-5b | All PDCCH monitoring occasion can be any OFDM symbol(s) of a slot for Case 2 with a span gap | PDCCH monitoring occasions of FG-3-1, plus additonal PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions par slot, including PDCCH monitoring occasions of FG-3-1, is no more than floor(14/X) (X is minimum among values reported by UE). |

TABLE 13b-continued

| | | |
|---|---|---|
| | | The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. |

The UE may report, to the BS, whether to support UE capability 2 and/or the UE capability 3 and associated parameters. The BS may perform time domain resource allocation for the common search space and the UE-specific search space, based on the reported UE capability. When allocating the resource, the BS may not arrange the MO in a position where the UE cannot perform monitoring.

[PDCCH: BD/CCE Limit]

When a plurality of search space sets are configured for the UE, conditions below may be considered for a method of determining a search space set to be monitored by the UE.

When the UE is configured with r15monitoringcapability as a value of higher layer signaling monitoringCapabilityConfig-r16, the UE may define maximum values of the number of PDCCH candidate groups to be monitored and the number of CCEs that configure the whole search spaces (here, the whole search spaces refer to a whole CCE set corresponding to a union region of a plurality of search space sets) for each slot, and when the UE is configured with r16monitoringcapability as a value of monitoringCapabilityConfig-r16, the UE may define maximum values of the number of PDCCH candidate groups to be monitored and the number of CCEs that configure the whole search spaces (here, the whole search spaces refer to a whole CCE set corresponding to a union region of a plurality of search space sets) for each span. monitoringCapabilityConfig-r16 above may be referred to configuration information of Table 14a and Table 14b below.

TABLE 14a

| PDCCH-Config information element |
|---|

```
-- ASN1START
-- TAG-PDCCH-CONFIG-START
PDCCH-Config ::=                         SEQUENCE {
  controlResourceSetToAddModList           SEQUENCE(SIZE (1..3)) OF ControlResourceSet      OPTIONAL, -- Need N
  controlResourceSetToReleaseList          SEQUENCE(SIZE (1..3)) OF ControlResourceSetId    OPTIONAL, -- Need N
  searchSpacesToAddModList                 SEQUENCE(SIZE (1..10)) OF SearchSpace            OPTIONAL, -- Need N
  searchSpacesToReleaseList                SEQUENCE(SIZE (1..10)) OF SearchSpaceId          OPTIONAL, -- Need N
  downlinkPreemption                       SetupRelease { DownlinkPreemption }              OPTIONAL, -- Need M
  tpc-PUSCH                                SetupRelease { PUSCH-TPC-CommandConfig }         OPTIONAL, -- Need M
  tpc-PUCCH                                SetupRelease { PUCCH-TPC-CommandConfig }         OPTIONAL, -- Need M
  tpc-SRS                                  SetupRelease { SRS-TPC-CommandConfig}            OPTIONAL, -- Need M
  ...,
  [[
  controlResourceSetToAddModList2-r16      SEQUENCE (SIZE (1..2)) OF ControlResourceSet     OPTIONAL, -- Need N
  controlResourceSetToReleaseList-r16      SEQUENCE (SIZE (1..5)) OF ControlResourceSetId-
                                         r16                                                OPTIONAL, -- Need N
  searchSpaceToAddModListExt-r16           SEQUENCE(SIZE (1..10)) OF SearchSpaceExt-r16     OPTIONAL, -- Need N
  uplinkCancellation-r16                   SetupRelease { UplinkCancellation-r16 }          OPTIONAL, -- Need M
  monitoringCapabilityConfig-r16           ENUMERATED { r15monitoringcapability,            OPTIONAL, -- Need M
                                           r16monitoringcapability }
  searchSpaceSwitchConfig-r16              SearchSpaceSwitchConfig-r16                      OPTIONAL, -- Need R
  ]]
}
SearchSpaceConfig-r16 ::=                SEQUENCE {
  cellGroupForSwitchList-r16               SEQUENCE(SIZE (1..4)) OF CellGroupForSwitch-r16  OPTIONAL, -- Need R
  searchSpaceSwitchDelay-r16               INTEGER (10..52)                                 OPTIONAL, -- Need R
}
CellGroupForSwitch-r16 ::=               SEQUENCE(SIZE (1..16)) OF ServCellIndex
-- TAG-PDCCH-CONFIG-STOP
-- ASN1STOP
```

TABLE 14b

| PDCCH-Config field descriptions |
|---|
| controlResourceSetToAddModList, controlResourceSetToAddModList2<br>List of UE specifically configured Control Resource Sets (CORESETs) to be used by the UE. The network configures at most 3 CORESETs per BWP per cell (including UE-specific and common CORESETs).The UE shall consider entries in controlResourceSetToAddModList and in controlResourceSetToAddModList2as a single list, i.e. an entry created using controlResourceSetToAddModList can be modified using controlResourceSetToAddModList2 and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon. |
| controlResourceSetToReleaseList<br>List of UE specifically configured Control Resource Sets (CORESETs) to be released by the UE.This field only applies to CORESETs configured by controlResourceSetToAddModList and does not release the field commonControlResourceSet configured by PDCCH-ConfigCommon. |
| downlinkPreemption<br>Configuration of downlink preemption indications to be monitored in this cell (see TS 38.213 [13], clause 11.2). |
| monitoringCapabilityConfig<br>Configures either Rel-15 PDCCH monitoring capability or Rel-16 PDCCH monitoring capability for PDCCH monitoring on a serving cell. Value r15monitoringcapability enables the Rel-15 monitoring capability, and value r16monitoringcapability enables the Rel-16 PDCCH monitoring capability (see TS 38.213 [13], clause 10.1). |
| searchSpacesToAddModList, searchSpacesToAddModListExt<br>List of UE specifically configured Search Spaces. The network configures at most 10 Search Spaces per BWP per cell (including UE-specific and common Search Spaces). If the network includes searchSpaceToAddModListExt, if includes the same number of entries, and listed in the same order, as in searchSpacesToAddModList. |
| tpc-PUCCH<br>Enabled and configure reception of group TPC commands for PUCCH. |

TABLE 14b-continued

| PDCCH-Config field descriptions |
|---|
| tpc-PUSCH<br>Enabled and configure reception of group TPC commands for PUSCH. |
| tpc-SRS<br>Enabled and configure reception of group TPC commands for SRS. |
| uplinkCancellation<br>Configuration of uplink cancellation indications to be monitored in this cell (see TS 38.213[13], clause 11.2A). |

[Condition 1: Restriction on Maximum Number of PDCCH Candidate Groups]

A maximum number $M^{\mu}$ of PDCCH candidate groups the UE can monitor may conform to Table 15a below when defined based on a slot and may conform to Table 15b below when defined based on a span on a cell configured with $15 \cdot 2^{\mu}$ kHz subcarrier spacing, according to the configuration value of higher layer signaling as described above.

TABLE 15a

| μ | Maximum number of PDCCH candidates per slot and per serving cell ($M^{\mu}$) |
|---|---|
| 0 | 44 |
| 1 | 36 |
| 2 | 22 |
| 3 | 20 |

TABLE 15b

| μ | Maximum number $M^{\mu}$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

[Condition 2: Restriction on Maximum Number of CCEs]

A maximum number $C^{\mu}$ of CCEs that configure the whole search spaces (here, the whole search spaces refer to a whole CCE set corresponding to a union region of a plurality of search space sets) may conform to Table 16a below when defined based on a slot and may conform to Table 16b below when defined based on a span on a cell configured with $15 \cdot 2^{\mu}$ kHz subcarrier spacing, according to the configuration value of higher layer signaling as described above.

TABLE 16a

| μ | Maximum number of non-overlapped CCEs per slot and per serving cell ($C^{\mu}$) |
|---|---|
| 0 | 56 |
| 1 | 56 |
| 2 | 48 |
| 3 | 32 |

TABLE 16b

| μ | Maximum number of non-overlapped CCEs per slot and per serving cell ($C^{\mu}$) |
|---|---|
| 0 | 56 |
| 1 | 56 |
| 2 | 48 |
| 3 | 32 |

For convenience of description, a situation that satisfies both conditions 1 and 2 at a particular time is defined as "condition A". Accordingly, failing to satisfy the condition A may mean that at least one of the condition 1 or the condition 2 is not satisfied.

[PDCCH: Overbooking]

A case where the condition A is not satisfied at a particular time according to configuration of the search space sets by the BS may occur. When the condition A is not satisfied at the particular time, the UE may select and monitor only some of the search space sets configured to satisfy the condition A at the particular time, and d the BS may transmit a PDCCH in the selected search space set.

In order to select some search spaces among all of the configured search space sets, a method below may be performed.

In a case where the condition A for the PDCCH is not satisfied at a particular time (or in a particular slot), the UE may priorly select a search space set whose search space type is configured as the common search space over a search space set that is configured as the UE-specific search space, from among the search space sets that exist at the particular time.

When all the search space sets configured as the common search space are selected (i.e., when the condition A is satisfied even after all the search space sets configured as the common search space are selected), the UE (or the BS) may select search space sets configured as the UE-specific space. Here, when there are a plurality of search space sets configured as the UE-specific search space, a search space set having a lower search space index may have higher priority. The UE may select UE-specific search space sets within a range in which they satisfy the condition A, in consideration of the priorities.

[QCL, TCI State]

One or more different antenna ports (which may be substituted with one or more channels, signals, or combinations thereof, but for convenience of description in the disclosure, collectively called different antenna ports) may be associated with each other according to QCL configurations described in Table 17 below in a wireless communication system. The TCI state is to announce/indicate a QCL relation between a PDCCH (or PDCCH DMRS) and other RS or channel, and when a reference antenna port A (reference RS #A) and other target antenna port B (target RS #B) are QCLed with each other, it may mean that the UE is allowed to apply some or all of large-scale channel parameters estimated from the antenna port A to measurement of channels from the antenna port B. QCL may need to associate different parameters depending on a situation such as 1) time tracking affected by average delay and delay spread, 2) frequency tracking affected by Doppler shift and Doppler spread, 3) radio resource management (RRM) affected by an average gain, 4) beam management affected by a spatial parameter, or the like. Accordingly, NR may support four types of QCL relations as in Table 17 below.

TABLE 17

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, spatial channel correlation, or the like.

The QCL relation may be configured for the UE via an RRC parameter TCI-state and QCL-Info as described in Table 18 below. Referring to Table 18, the BS may configure the UE with one or more TCI states to notify the UE maximally up to two QCL relations (qcl-Type1 and qcl-Type2) for an RS that refers to an ID of the TCI state, i.e., a target RS. Here, QCL information (QL-Info) included in each of the TCI states includes a BWP index and a serving cell index of a reference RS indicated by the QCL information, a type and ID of the reference RS, and a QCL type as in Table 17 above.

TABLE 18

```
TCI-State ::=            SEQUENCE {
    tci-StateId              TCI-StateId,
    (ID of corresponding TCI state)
    qcl-Type1                QCL-Info,
    (QCL information of first reference RS of RS(targer RS)
    referring to corresponding TCI state)
    qcl-Type2                QCL-Info         OPTIONAL, -- Need R
  (QCL information of second reference RS or RS(targer RS)
  referring to corresponding TCI state)
```

TABLE 18-continued

```
    . . .
}
QCL-Info ::=            SEQUENCE {
    cell                    ServCellIndex   OPTIONAL, -- Need R
  (serving cell index of reference RS indicated by corresponding
  QCL information)
    bwp-id                  BWP-ID          OPTIONAL, -- Cond CSI-
RS-Indicated
  (BWP index of reference RS indicated by corresponding QCL)
    referenceSignal         CHOICE {
        csi-rs                  NZP-CSI-RS-ResourceId,
        ssb                     SSB-Index
      (one of CSI-RS ID or SSB ID indicated by corresponding
      QCL information)
    },
    qcl-Type                ENUMERATED (typeA, typeB, typeC,
                            typeD),
    . . .
}
```

Figure 7:
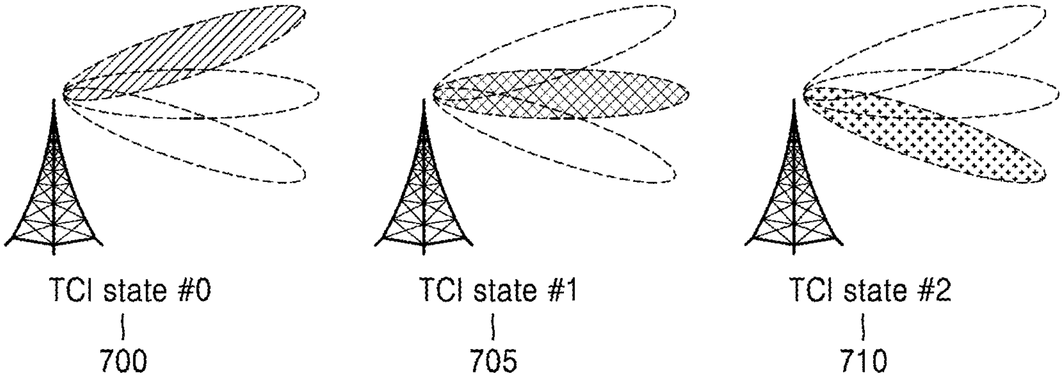
FIG. 7 illustrates a diagram of examples of base station (BS) beam allocation according to transmission configuration indication (TCI) state configurations according to an embodiment of the disclosure.

FIG. 7 illustrates a diagram of examples of BS beam allocation according to TCI state configurations. Referring to FIG. 7, the BS may deliver information about N different beams to the UE via N different TCI states. For example, in a case of N=3 as shown in FIG. 7, the BS may associate qcl-Type2 parameters included in three TCI states 700, 705 and 710 with CSI-RSs or SSBs corresponding to the different beams and may configure the qci-Type2 parameters as QCL type D. By doing so, the BS may announce/indicate that antenna ports referring to the different TCI states 700, 705 and 710 are associated with different spatial Rx parameters, i.e., different beams.

Tables 19a to 19e below represent valid TCI state configurations according to target antenna port types.

Table 19a below represents a valid TCI state configuration when the target antenna port is a CSI-RS for tracking (TRS). The TRS refers to non-zero-power (NZP) CSI-RS in which a repetition parameter is not configured but trs-Info is configured as true among CSI-RSs in configuration information shown in Table 20a and Table 20b below. In Table 19a, configuration no. 3 may be used for an aperiodic TRS.

TABLE 19a

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 19b below represents valid TCI state configuration when the target antenna port is a CSI-RS for CSI. The CSI-RS for CSI refers to an NZP CSI-RS in which a parameter indicating repetition (e.g., a repetition parameter) is not configured and trs-Info is not configured to true among CSI-RSs.

TABLE 19b

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 19c below represents valid TCI state configuration when the target antenna port is a CSI-RS for beam management (meaning the same as BM, CSI-RS for L1 reference signal received power (RSRP) reporting). The CSI-RS for BM refers to NZP CSI-RS in which a repetition parameter is configured and which has a value of 'On' or 'Off' and in which trs-Info is not configured to true among CSI-RSs.

TABLE 19c

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 19d below represents valid TCI state configuration when the target antenna port is a PDCCH DMRS.

TABLE 19d

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 19e below represents valid TCI state configuration when the target antenna port is a PDSCH DMRS.

TABLE 19e

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A QCL configuration method according to Tables 19a to 19e above according to an embodiment of the disclosure is to configure and operate a target antenna port and a reference antenna port in each stage as described below: "SSB"=>"TRS"=>"CSI-RS for CSI, CSI-RS for BM, PDCCH DMRS, or PDSCH DMRS". By doing so, it is possible to help a reception operation by the UE by associating statistical characteristics that may be measured from the SSB and TRS with the respective antenna ports.

Configuration information of trs-Info associated with the NZP CSI-RS may be referred to Table 20a and Table 20b below.

TABLE 20a

| NZP-CSI-RS-ResourceSet information element |
|---|

```
-- ASN1START
 - TAG-NZP-CSI-RS-RESOURCESET-START
NZP-CSI-RS-ResourceSet ::=      SEQUENCE {
   nzp-CSI-ResourceSetId           NZP-CSI-RS-ResourceSetId,
   nzp-CSI-RS-Resources            SEQUENCE (SIZE (1..maxNrofNZP-CSI-RS-
                                   ResourcesPerSet)) OF
NZP-CSI-RS-ResourceId,
   repetition                                ENUMERATED { on, off }
OPTIONAL, -- Need S
   aperiodicTriggeringOffset                          INTEGER(0..6)
OPTIONAL, -- Need S
   trs-Info                                     ENUMERATED {true}
OPTIONAL, -- Need R
   . . .,
   [ [
   aperiodicTriggeringOffset-r16                    INTEGER(0..31)
OPTIONAL -- Need S
   ] ],
   }
-- TAG-NZP-CSI-RS-RESOURCESET-STOP
-- ASN1STOP
```

TABLE 20b

| NZP-CSI-RS-ResourceSet field descriptions |
|---|
| aperiodicTriggeringOffset, aperiodicTriggeringOffset-r16<br>Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0. |
| nzp-CSI-RS-Resources<br>NZP-CSI-RS-Resources associated with this NZP-CSI-RS resource set (see TS 38.214 [19], clause 5.2). For CSI, there are at most 8 NZP CSI RS resources per resource set. |
| repetition<br>Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or “no report”. |
| trs-info<br>Indicates that the antenna port for all NZP-CSI-RS resources in the CSI-RS resource set is same. If the field is absent or released the UE applies the value false (see TS 38.214 [19], clause 5.2.2.3.1). |

[PDCCH: Associated with TCI State]

In more detail, TCI state combinations applicable to a POOCH DMRS antenna port are as described in Table 21 below. In Table 21, the fourth row indicates a combination assumed by the UE before RRC configuration, and configuration after RRC configuration is not possible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |

TABLE 21-continued

| Valid TCI state Configuration | DL RS 1 | qcl-Type1 | DL RS 2 (if configured) | qcl-Type2 (if configured) |
|---|---|---|---|---|
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
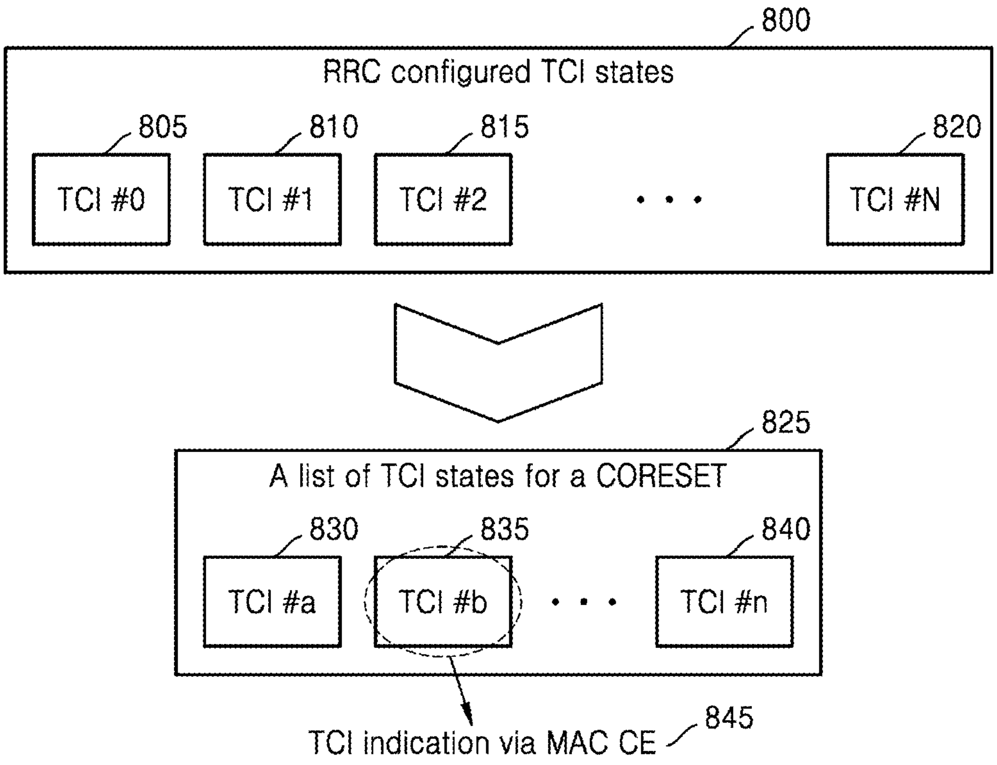
FIG. 8 illustrates a diagram of an example of a TCI state allocation method for a PDCCH in a wireless communication system according to an embodiment of the disclosure.

NR may support a hierarchical signaling method as shown in FIG. 8 for dynamic allocation of PCCH beams.

FIG. 8 illustrates a diagram of an example of a TCI state allocation method for a PDCCH in a wireless communication system according to an embodiment of the disclosure.

Referring to FIG. 8, the BS may configure N TCI states 805, 810 and 820 for the UE by RRC signaling 800, and may configure some of them as TCI states for a CORESET in 825. Afterward, the BS may indicate one of the TCI states 830, 835 and 840 for the CORESET to the UE by medium access control control element (MAC CE) signaling in 845. Afterward, the UE may receive a PDCCH based on beam information included in the TCI state indicated by the MAC CE signaling.

Figure 9:
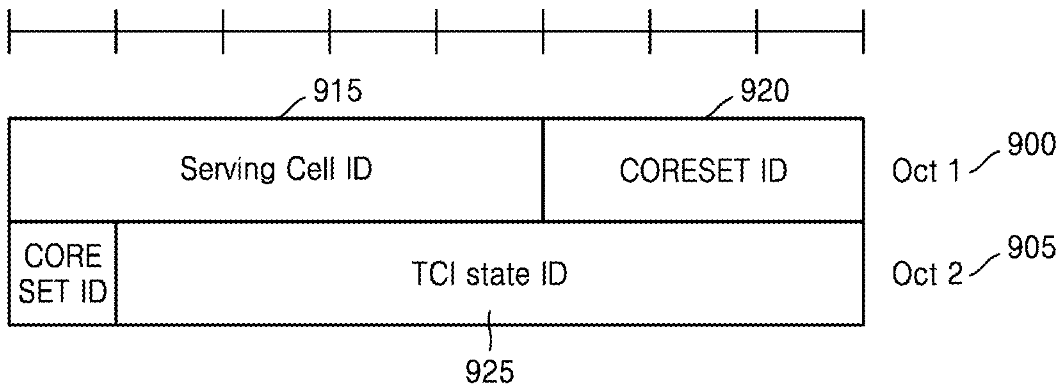
FIG. 9 illustrates a diagram of a TCI indication medium access control control element (MAC CE) signaling structure for a PDCCH demodulation reference signal (DMRS) in a wireless communication system according to an embodiment of the disclosure.

FIG. 9 illustrates a diagram of a TCI indication MAC CE signaling structure for the PDCCH DMRS in a wireless communication system according to an embodiment of the disclosure.

Referring to FIG. 9, TCI indication MAC CE signaling for the PDCCH DMRS may comprise 2 bytes (16 bits) Oct1 900 and Oct2 905 and may include a serving cell ID 915 of 5 bits, a CORESET ID 920 of 4 bits, and a TCI state ID 925 of 7 bits.

Figure 10:
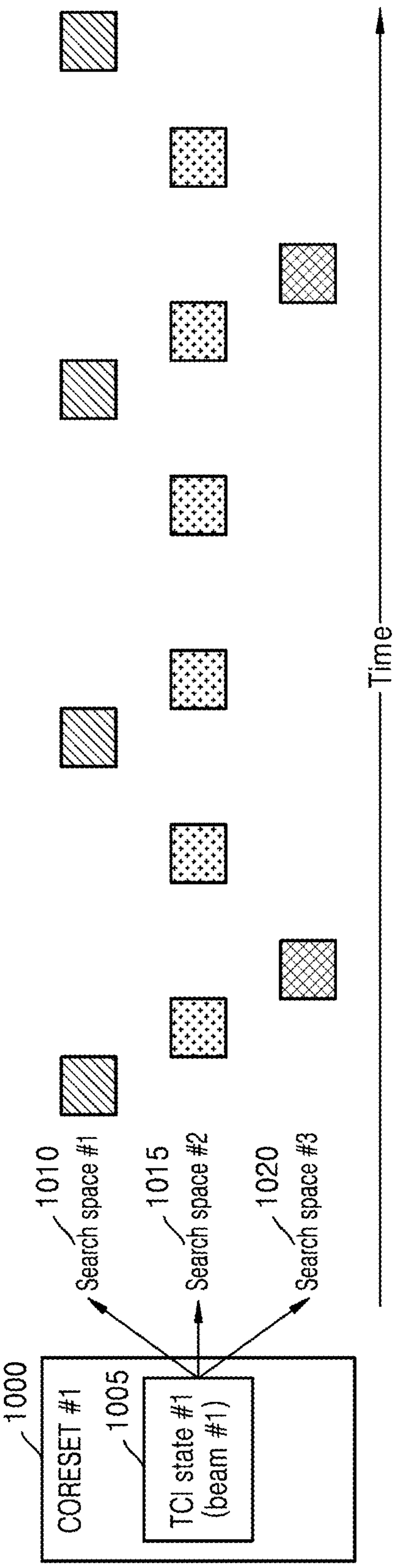
FIG. 10 illustrates a diagram of an example of beam configuration of a control resource set and search space in a wireless communication system according to an embodiment of the disclosure.

FIG. 10 illustrates a diagram of an example of beam configuration of a CORESET and search space in a wireless communication system according to an embodiment of the disclosure.

Referring to FIG. 10, the BS may indicate, to the UE, a TCI state 1005 in a TCI state list included in CORESET configuration 1000 by MAC CE signaling. Afterward, the UE may consider that same QCL information (beam #1 1005) is applied to all of one or more search spaces #1 1010, #2 1015 and #3 1020 associated with the CORESET until another TCI state is indicated for the CORESET by another MAC CE signaling. The afore-described PDCCH beam allocation method has a problem in indicating beam switching earlier than the MAC CE signaling delay and has a problem in applying the same beam uniformly for each CORESET regardless of search space characteristics, such that it is difficult for flexible PDCCH beam operation.

Hereinafter, embodiments of the disclosure provide a more flexible PDCCH beam configuration and operation method. Although several distinct examples will now be described for convenience of describing the embodiments of the disclosure, the examples are not mutually exclusive but may be applied in a suitable combination of two or more embodiments depending on the situation.

The BS may configure the UE with one or more TCI states for a particular CORESET, and may activate one of the configured TCI states by an MAC CE activation command. For example, TCI states {TCI state #0, TCI state #1 and TCI state #2} may be configured for CORESET #1, and the BS may transmit, to the UE, an activation command to assume TCI state #0 for the TCI state for CORESET #1 via MAC CE. The UE may correctly receive a DMRS of the CORESET based on QCL information in the activated TCI state, based on the activation command for the TCI state received via the MAC CE.

When the UE fails to receive the MAC CE activation command for a TCI state for a CORESET indexed with 0 (i.e., the CORESET #0), the UE may assume that a DMRS transmitted in CORESET #0 is QCLed with an SS/PBCH block (SSB) identified in an initial access procedure or in a non-contention based random access procedure that is not triggered by a PDCCH command.

With respect to a CORESET (CORESET #X) configured with a different index value (X) instead of index 0, when the UE is not configured with a TCI state for the CORESET #X or is configured with one or more TCI states but fails to receive the MAC CE activation command for activating one of the configured one or more TCI states, the UE may assume that a DMRS transmitted in CORESET #X is QCLed with an SS/PBCH block identified in an initial access procedure.

[PDCCH: Associated with QCL Prioritization Rule]

Hereinafter, an operation of determining QCL priority for a PDCCH will now be described in detail.

When the UE operates with carrier aggregation in a single cell or a band and a plurality of CORESETs existing in an activated BWP in the single or multiple cells have same or different QCL-typeD characteristics and overlap on a time domain in a particular PDCCH monitoring occasion, the UE may select a particular CORESET according to the QCL priority determination operation and may monitor CORESETs having the same QCL-TypeD characteristics as the selected CORESET. That is, when the plurality of CORESETs overlap on the time domain, the UE may receive only one QCL-TypeD characteristic. In this case, a reference for determining QCL priority may be as described below.

Reference 1: A CORESET associated with the common search space of the lowest index in a cell corresponding to the lowest index among cells including the common search space.

Reference 2: A CORESET associated with the UE-specific search space of the lowest index in a cell corresponding to the lowest index among cells including the UE-specific search space.

As described above, when one of the references is not fulfilled, the other one of the references may be applied. For example, in a case where CORESETs overlap on a time domain in a particular PDCCH monitoring occasion, if all the CORESETs are not associated with the common search space but associated with the UE-specific search space, i.e., when the reference 1 is not fulfilled, the UE may skip application of the reference 1 and may apply the reference 2.

When the UE selects a CORESET according to the afore-described references, the UE may additionally consider two conditions below for QCL information configured for the CORESET. First, if CORESET 1 has CSI-RS 1 as a reference signal having QCL-TypeD association and a reference signal having QCL-TypeD association with the CSI-RS 1 is SSB1, and CORESET 2 has a reference signal SSB 1 having QCL-TypeD association, the UE may consider that the two CORESETs 1 and 2 have different QCL-TypeD characteristics. Second, if CORESET 1 has CSI-RS 1 configured for cell 1 as a reference signal having QCL-TypeD association, and a reference signal having QCL-TypeD association with the CSI-RS 1 is SSB 1, and CORESET 2 has a reference signal CSI-RS 2 configured for cell 2 as a reference signal having QCL-TypeD association and a reference signal having the QCL-TypeD association with CSI-RS 2 is a same SSB 1, the UE may consider that the two CORESETs 1 and 2 have same QCL-TypeD characteristics.

Figure 11:
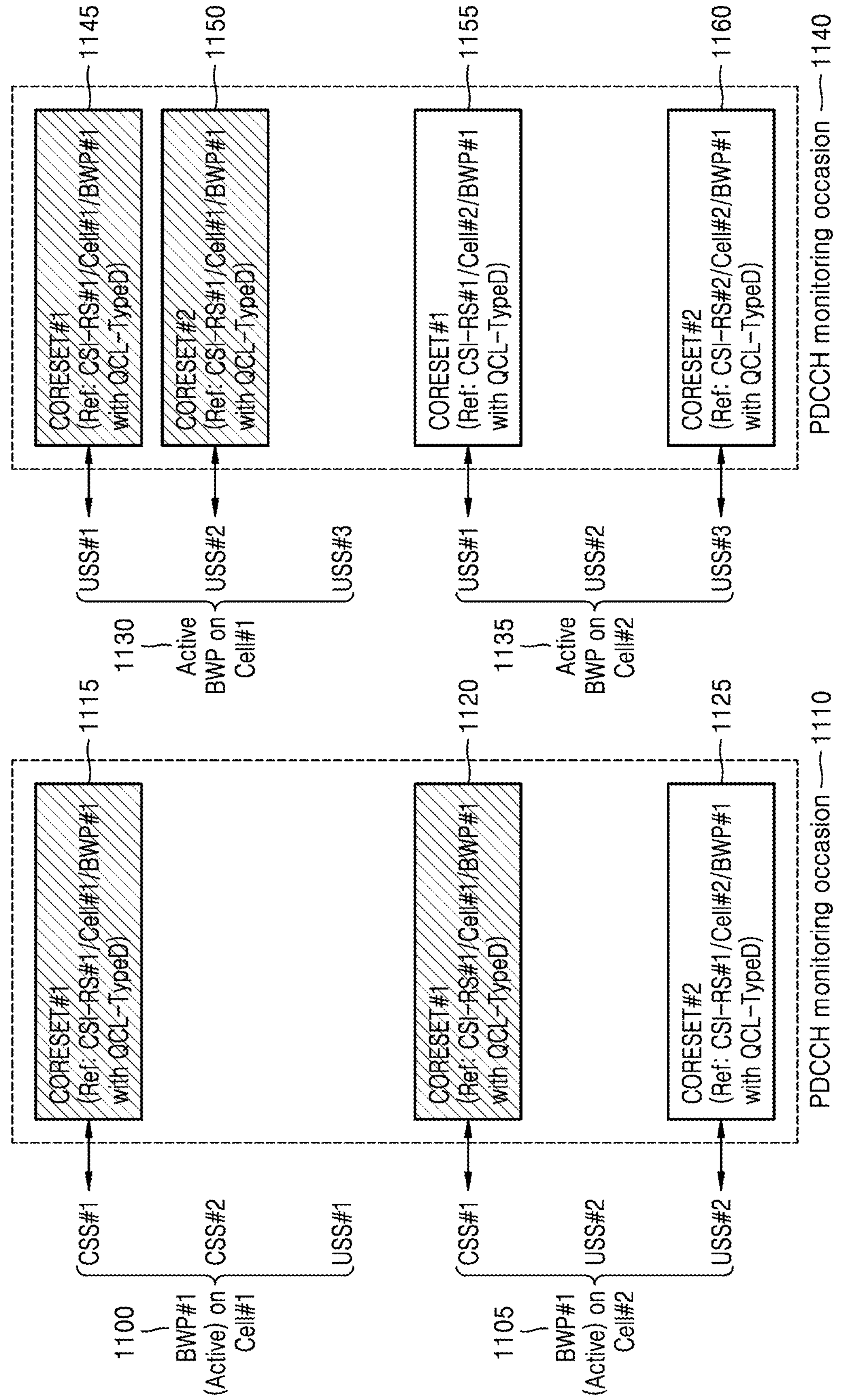
FIG. 11 illustrates a diagram for describing a method by which a UE selects a receivable control resource set by considering priorities in receiving a DL control channel in a wireless communication system according to an embodiment of the disclosure.

FIG. 11 illustrates a diagram for describing a method by which the UE selects a receivable CORESET by considering priorities in receiving a DL control channel in a wireless communication system according to an embodiment of the disclosure.

For example, the UE may be configured to receive a plurality of CORESETs overlapping on a time domain in a particular PDCCH monitoring occasion 1110, and the plurality of CORESETs may be associated with the UE-specific search space or the common search space on a plurality of cells. In a particular PDCCH monitoring occasion, there may be CORESET #1 1115 associated with common search space #1 in BWP #1 1100 of cell #1, and there may be CORESET #1 1120 associated with common search space #1 and CORESET #2 1125 associated with UE-specific search space #2 in BWP #1 1105 of cell #2. The CORESET #1 1115 and the CORESET #1 1120 may have QCL-TypeD association with CSI-RS resource #1 configured in the BWP #1 of the cell #1, and the CORESET #2 1125 may have QCL-TypeD association with CSI-RS resource #1 configured in the BWP #1 of the cell #2. Accordingly, when the reference 1 is applied to the PDCCH monitoring occasion 1110, all other CORESETs having a reference signal of the same QCL-TypeD as the CORESET #1 1115 may be received. Accordingly, the UE may receive the CORESETs 1115 and 1120 in the PDCCH monitoring occasion 1110. In another example, the UE may be configured to receive a plurality of CORESETs overlapping on a time domain in a particular PDCCH monitoring occasion 1140, and the plurality of CORESETs may be associated with the common search space on a plurality of cells or the UE-specific search space. In the PDCCH monitoring occasion, there may be CORESET #1 1145 associated with UE-specific search space #1 and CORESET #2 1150 associated with UE-specific search space #2 in BWP #1 1130 of the cell #1, and there may be CORESET #1 1155 associated with UE-specific search space #1 and CORESET #2 1160 associated with UE-specific search space #3 in BWP #1 1135 of the cell #2. The CORESET #1 1145 and the CORESET #2 1150 may have QCL-TypeD association with the CSI-RS resource #1 configured in the BWP #1 of the cell #1, and the CORESET #1 1155 may have QCL-TypeD association with the CSI-RS resource #1 configured in the BWP #1 of the cell #2, and the CORESET #2 1160 may have QCL-TypeD association with the CSI-RS resource #2 configured in the BWP #1 of the cell #2. Because there is no common search space when the reference 1 is applied to the PDCCH monitoring occasion 1140, the next reference 2 may be applied. When the reference 2 is applied to the PDCCH monitoring occasion 1140, all other CORESETs having a reference signal of a same QCL-TypeD as the CORESET #1 1145 may be received. Accordingly, the UE may receive the CORESETs 1145 and 1150 in the PDCCH monitoring occasion 1140.

Figure 12:
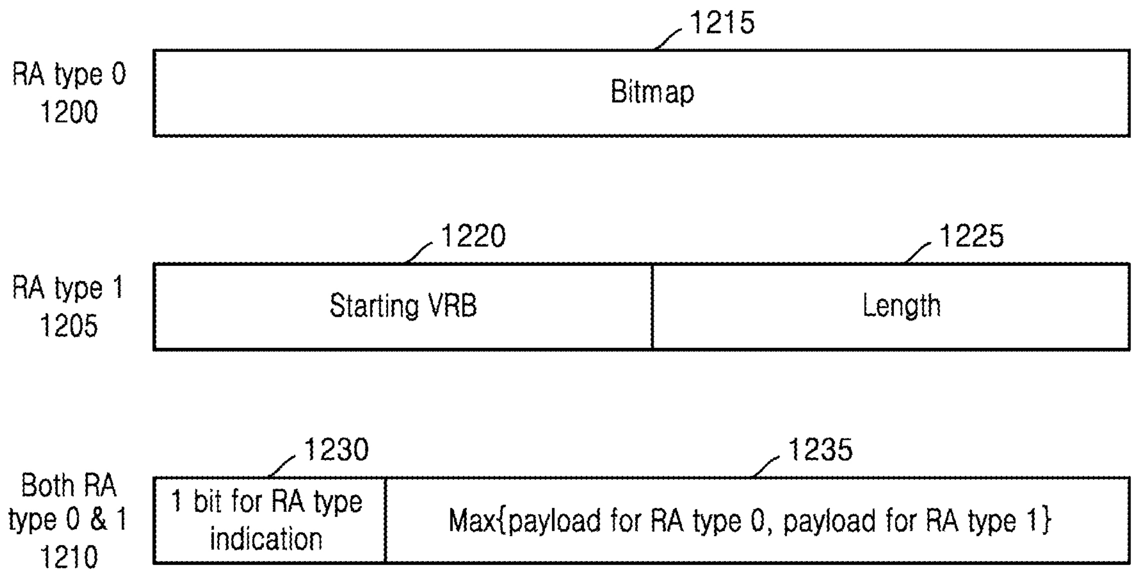
FIG. 12 illustrates a diagram of an example of a physical downlink shared channel (PDSCH) frequency-axis resource allocation in a wireless communication system according to an embodiment of the disclosure.

FIG. 12 illustrates a diagram of an example of PDSCH frequency-axis resource allocation in a wireless communication system according to an embodiment of the disclosure.

Referring to FIG. 12, three frequency-axis resource allocation methods of RA type 0 1200, RA type 1 1205, and dynamic switching 1210 (RA type 0, RA type 1) which are configurable by a higher layer signaling are illustrated. If the UE is configured, by higher layer signaling, to use only RA type 0 1200, some DCI to allocate a PDSCH to the UE include a bitmap 1215 consisting of $N_{RBG}$ bits. Here, the $N_{RGB}$ refers to the number of resource block groups (RBGs) determined as in Table 22 below according to a size of a BWP allocated by the BWP indicator and a higher layer parameter rbg-Size, and data is transmitted on an RBG represented by 1 based in the bitmap.

TABLE 22

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured, by higher layer signaling, to use only RA type 1 1205, some DCI to allocate a PDSCH to the UE includes frequency-axis resource allocation information consisting of $$\lceil \log_2(N_{RB}^{DL,BWP}(N_{RB}^{DL,BWP}+1)/2\rceil$$

bits. The $N^{DL,BWP}_{RB}$ indicates the number of RBs of a BWP. Accordingly, the BS may configure a starting VRB 1220 and length of frequency-axis resources 1225 successively allocated from the starting VRB 1220.

If the UE is configured, by higher layer signaling, to use both the RA type 0 and the RA type 1 (1210), some DCI to allocate a PDSCH to the UE includes frequency-axis resource allocation information consisting of bits 1235 corresponding to a larger value among a payload for configuring the RA type 0 and a payload for configuring the RA type 1. In this case, 1 bit 1230 may be added to the most significant bit (MSB) of the frequency-axis allocation information in the DCI, thereby indicating the use of the RA type 0 or the RA type 1. For example, when the bit 1230 has a value of '0', it indicates that the RA type 0 is to be used, and when the bit has a value of '1', it indicates that the RA type 1 is to be used.

[PDSCH/PUSCH: Associated with Time Resource Allocation]

Hereinafter, a time domain resource allocation method for a data channel in the next generation wireless communication system (5G or NR system) will now be described.

The BS may configure the UE with Table of time domain resource allocation information for a DL data channel (PDSCH) and a UL data channel (PUSCH) by higher layer signaling (e.g., RRC signaling). For the PDSCH, Table including maximally up to 16 (maxNrofDL-Allocations=16) entries may be configured, and for the PUSCH, Table including maximally up to 16 (maxNrofUL-Allocations=16) entries may be configured. In an embodiment of the disclosure, the time domain resource allocation information may include PDCCH-to-PDSCH slot timing (corresponding to a time interval in slots between a reception time of PDCCH and a transmission time of PDSCH scheduled by the received PDCCH, and indicated as K0), PDCCH-to-PUSCH slot timing (corresponding to a time interval in slots between a reception time of PDCCH and a transmission time of PUSCH scheduled by the received PDCCH, and indicated as K2), information about location and length of a start symbol scheduled on the PDSCH or the PUSCH in the slot, a mapping type of PDSCH or PUSCH, or the like. For example, information as described in Table 23 or Table 24 below may be transmitted from the BS to the UE.

TABLE 23

PDSCH-TimeDomainResourceAllocationList information element

```
PDSCH-TimeDomainResourceAllocationList ::= SEQUENCE (SIZE(1..
maxNrofDL-Allocation)) OF PDSCH-TimeDomainResourceAllocation
PDSCH-TimeDomainResourceAllocation ::= SEQUENCE {
  k0                                          INTEGER(0..32)
OPTIONAL, - Need S
  (PDCCH-to-PDSCH timing, slot until)
  mappingType                 ENUMERATED {typeA, typeB},
  (PDSCH mapping type)
  startSymbolAndLength        INTEGER (0..127)
  (start symbol and length of PDSCH)
```

TABLE 24

PUSCH-TimeDomainResourceAllocation information element

```
PUSCH-TimeDomainResourceAllocationList ::= SEQUENCE (SIZE(1..
maxNrofUL-Allocation)) OF PUSCH-TimeDomainResourceAllocation
PUSCH-TimeDomainResourceAllocation ::= SEQUENCE {
    k2                    INTEGER (0..32)    OPTIONAL, -- Need S
(PDCCH-to-PUSCH timing, slot unit)
    mappingType           ENUMERATED {typeA, typeB},
(PUSCH mapping type)
startSymbolAndLength      INTEGER (0..127)
(start symbol and length of PUSCH)
}
```

The BS may notify the UE of at least one of the entries in Table 23 and 24 about the time domain resource allocation information by L1 signaling (e.g., DCI) (e.g., the one entry may be indicated in a 'time domain resource allocation' field in the DCI). The UE may obtain the time domain resource allocation information for the PDSCH or the PUSCH, based on the DCI received from the BS.

Figure 13:
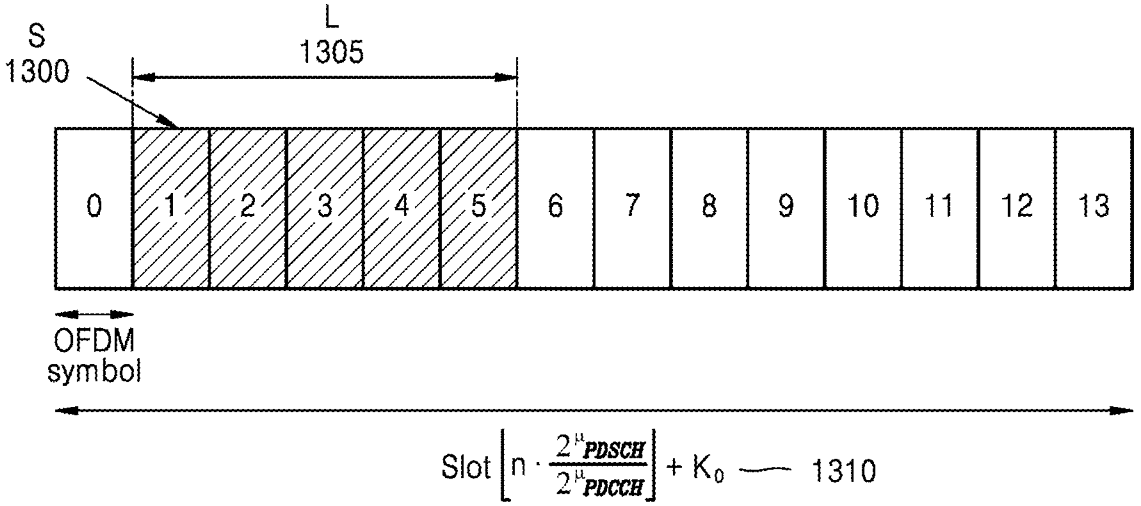
FIG. 13 illustrates a diagram of an example of PDSCH time-axis resource allocation in a wireless communication system according to an embodiment of the disclosure.

FIG. 13 illustrates a diagram of an example of PDSCH time-axis resource allocation in a wireless communication system according to an embodiment of the disclosure.

Referring to FIG. 13, the BS may indicate a position of a PDSCH resource in the time axis based on subcarrier spacings (SCSs) ($\mu_{PDSCH}$, $\mu_{PDCCH}$) of a data channel and a control channel and a scheduling offset $K_0$, which are configured by using a higher layer signaling, and a start position S 1300 and length 1305 of OFDM symbols in a slot 1310 dynamically indicated by DCI.

Figure 14:
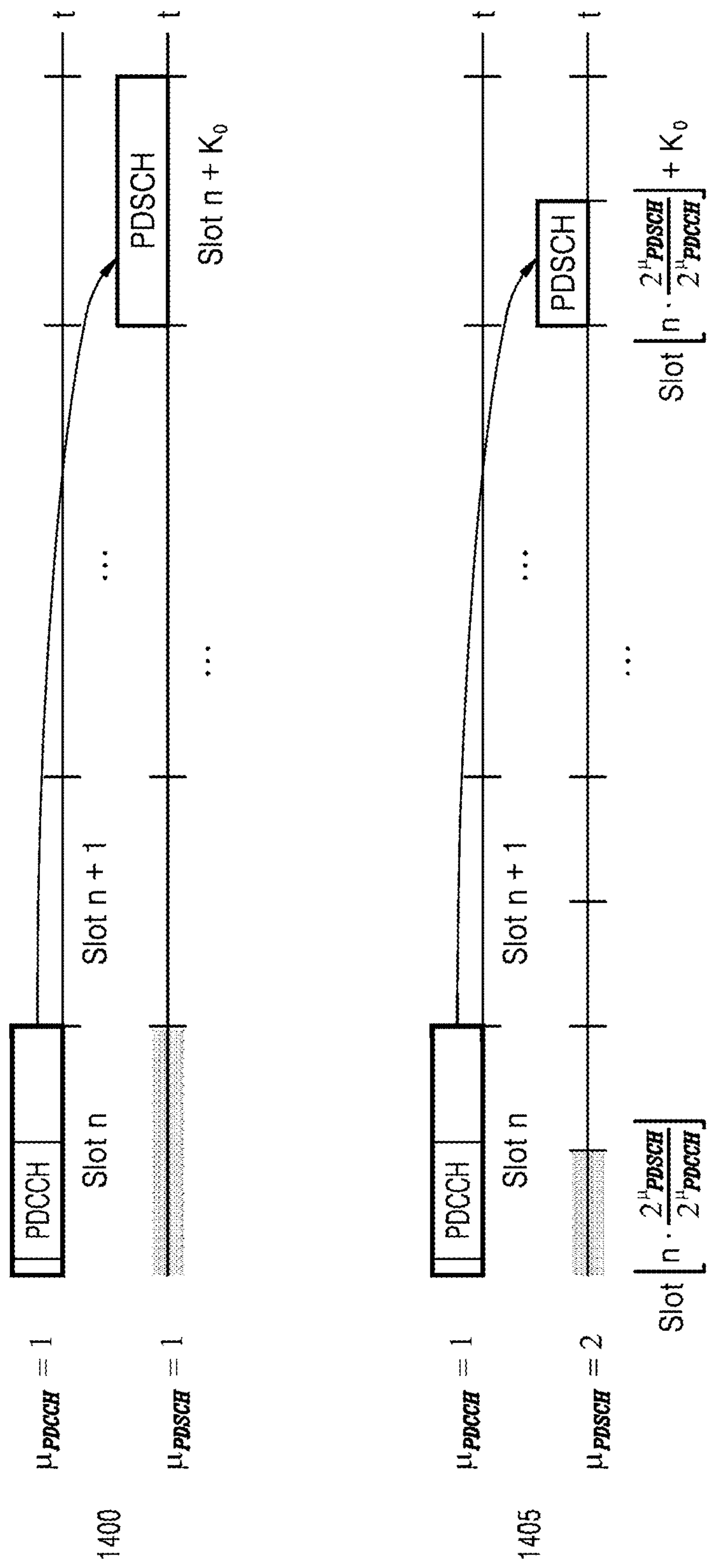
FIG. 14 illustrates a diagram of an example of time-axis resource allocation based on subcarrier spacings (SCSs) of a data channel and a control channel in a wireless communication system according to an embodiment of the disclosure.

FIG. 14 illustrates a diagram of an example of time-axis resource allocation based on SCSs of a data channel and a control channel in a wireless communication system according to an embodiment of the disclosure.

Referring to FIG. 14, when SCSs $\mu_{PDSCH}$ and $\mu_{PDCCH}$ of the data channel and the control channel are equal (i.e., $\mu_{PDSCH}=\mu_{PDCCH}$) 1400, slot numbers for data and control are equal, such that the BS and the UE may generate a scheduling offset according to the preset slot offset $K_0$. On the other hand, when SCSs of the data channel and the control channel are different (i.e., $\mu_{PDSCH}\neq\mu_{PDCCH}$) 1405, slot numbers for data and control are different, such that the BS and the UE may generate a scheduling offset according to the preset slot offset $K_0$ based on the SCS of the PDCCH. For example, when the UE has received DCI indicating BWP switching in slot n, and the slot offset value indicated by the DCI is $K_0$, the UE may receive data on a PDSCH scheduled in slot n+$K_0$.

[Associated with SRS]

Hereinafter, a UL channel estimation method using sounding reference signal (SRS) transmission of the UE will now be described. The BS may configure the UE with at least one SRS configuration for each UL BWP so as to transmit configuration information for SRS transmission, and may configure the UE with at least one SRS resource set for each SRS configuration. For example, the BS and the UE may exchange higher layer signaling information to deliver information about the SRS resource set.

- srs-ResourceSetId: SRS resource set index
- srs-ResourceIdList: a set of SRS resource indexes referred to from the SRS resource set
- resourceType: time-axis transmission configuration of an SRS resource referred to from the SRS resource set, which may be configured to one of 'periodic', 'semi-persistent', and 'aperiodic'. If resourceType is configured to 'periodic' or 'semi-persistent', associated CSI-RS information may be provided according to the usage of the SRS resource set. If resourceType is configured to 'aperiodic', an aperiodic SRS resource trigger list and slot offset information may be provided, and associated CSI-RS information may be provided according to the usage of the SRS resource set.
- usage: configuration of the usage of an SRS resource referred to from the SRS resource set, which may be configured to one of 'beamManagement', 'codebook', 'nonCodebook', and 'antennaSwitching'.
- alpha, p0, pathlossReferenceRS, srs-PowerControlAdjustmentStates: provides parameter configuration for transmission power control for an SRS resource referred to from the SRS resource set.

The UE may determine that an SRS resource included in a set of SRS resource indexes referred to from the SRS resource set follows information configured for the SRS resource set.

Also, the BS and the UE may transmit or receive higher layer signaling information for delivering individual configuration information for an SRS resource. For example, the individual configuration information for the SRS resource may include time-frequency axis mapping information in a slot of the SRS resource, and the time-frequency axis mapping information may include information about intra-slot or inter-slot frequency hopping of the SRS resource. Furthermore, the individual configuration information for the SRS resource may include time-axis transmission configuration for the SRS resource, which may be configured to one of 'periodic', 'semi-persistent', and 'aperiodic'. This may be limited to having the same time-axis transmission configuration as the SRS resource set including the SRS resource. When the time-axis transmission configuration for the SRS resource is configured to 'periodic' or 'semi-persistent', additional SRS resource transmission periodicity and slot offset (e.g., periodicityAndOffset) may be included in the time-axis transmission configuration.

The BS may activate or deactivate, or trigger SRS transmission to the UE by higher layer signaling including RRC signaling or MAC CE signaling, or L1 signaling (e.g., DCI). For example, the BS may activate or deactivate periodic SRS transmission to the UE by higher layer signaling. The BS may indicate activation of an SRS resource set for which resourceType is configured to 'periodic' by higher layer signaling, and the UE may transmit an SRS resource referred to from the activated SRS resource set. Time-frequency axis resource mapping of the SRS resource to be transmitted in a slot follows resource mapping information configured for the SRS resource, and slot mapping including transmission periodicity and slot offset follows periodicityAndOffset configured for the SRS resource. Furthermore, a spatial domain transmission filter applied to the SRS resource to be transmitted may refer to spatial relation info configured for the SRS resource, or may refer to associated CSI-RS information configured for the SRS resource set including the SRS resource. The UE may transmit the SRS resource in a UL BWP activated for the periodic SRS resource activated by higher layer signaling.

For example, the BS may activate or deactivate semi-persistent SRS transmission to the UE by higher layer signaling. The BS may indicate activation of an SRS resource set by MAC CE signaling, and the UE may transmit an SRS resource referred to from the activated SRS resource set. The SRS resource set activated by MAC CE signaling may be limited to an SRS resource set for which the resourceType is configured to 'semi-persistent'. Intra-slot time-frequency axis resource mapping of the SRS resource to be transmitted follows resource mapping information configured for the SRS resource, and slot mapping including transmission periodicity and slot offset follows periodicityAndOffset configured for the SRS resource. Also, a spatial domain transmission filter applied to the SRS resource to be transmitted may refer to spatial relation info configured for the SRS resource or may refer to associated CSI-RS information configured for the SRS resource set including the SRS resource. If spatial relation info is configured for the SRS resource, the spatial domain transmission filter may not follow the spatial relation info but may be determined by referring to configuration information about spatial relation info delivered by MAC CE signaling that activates semi-persistent SRS transmission. The UE may transmit the SRS resource in a UL BWP activated for the semi-persistent SRS resource activated by higher layer signaling.

For example, the BS may trigger aperiodic SRS transmission to the UE by DCI. The BS may indicate one of aperiodic SRS resource triggers (aperiodicSRS-ResourceTrigger) via an SRS request field of the DCI. The UE may determine that an SRS resource set including the aperiodic SRS resource trigger indicated by the DCI in an aperiodic SRS resource trigger list among configuration information of the SRS resource set has been triggered. The UE may transmit an SRS resource referred to from the triggered SRS resource set. Intra-slot time-frequency axis resource mapping of the SRS resource to be transmitted follows resource mapping information configured for the SRS resource. Also, slot mapping of the SRS resource to be transmitted may be determined by a slot offset between a PDCCH including the DCI and the SRS resource, and may be referred to a value (or values) included in a slot offset set configured for the SRS resource set. In more detail, for the slot offset between the PDCCH including the DCI and the SRS resource, a value indicated by a time domain resource assignment field of the DCI among offset value(s) included in the slot offset set configured for the SRS resource set may be applied. Furthermore, a spatial domain transmission filter applied to the SRS resource to be transmitted may refer to spatial relation info configured for the SRS resource or may refer to associated CSI-RS information configured for the SRS resource set including the SRS resource. The UE may transmit the SRS resource in a UL BWP activated for the aperiodic SRS resource triggered by the DCI.

When the BS triggers aperiodic SRS transmission to the UE by DCI, a minimum time interval between a PDCCH including the DCI that triggers the aperiodic SRS transmission and an SRS to be transmitted may be required for the UE to transmit the SRS by applying configuration information for the SRS resource. The time interval for SRS transmission by the UE may be defined as the number of symbols between a last symbol of the PDCCH including the DCI that triggers the aperiodic SRS transmission and a first symbol to which an SRS resource to be initially transmitted among SRS resource(s) is mapped. The minimum time interval may be determined by referring to a PUSCH preparation procedure time required for the UE to prepare PUSCH transmission. Also, the minimum time interval may have a different value according to the usage of the SRS resource set including the SRS resource to be transmitted. For example, the minimum time interval may be determined to be N2 symbols defined by referring to a PUSCH preparation procedure time of the UE and considering a UE processing capability based on the UE capability. Also, when the usage of the SRS resource set is configured to ‘codebook’ or ‘antennaSwitching’ by considering the usage of the SRS resource set including the SRS resource to be transmitted, the minimum time interval may be determined to be N2 symbols, and when the usage of the SRS resource set is configured to ‘nonCodebook’ or ‘beamManagement’, the minimum time interval may be determined to be N2+14 symbols. When the time interval for aperiodic SRS transmission is equal to or greater than the minimum time interval, the UE may transmit an aperiodic SRS, and when the time interval for aperiodic SRS transmission is smaller than the minimum time interval, the UE may ignore the DCI that triggers the aperiodic SRS.

TABLE 25

```
SRS-Resource ::=                SEQUENCE {
  srs-ResourceId                    SRS-ResourceId,
  nrofSRS-Ports                     ENUMERATED {port1, ports2,
                                    ports4},
  ptrs-PortIndex                  ENUMERATED {n0, n1 }
OPTIONAL, -- Need R
  transmissionComb                  CHOICE {
    n2                                SEQUENCE {
      combOffset-n2                     INTEGER (0..1),
      cyclicShift-n2                  INTEGER (0..7)
    },
    n4                                SEQUENCE {
      combOffset-n4                     INTEGER (0..3),
      cyclicShift-n4                  INTEGER (0..11)
    }
  },
```

TABLE 25-continued

```
  resourceMapping                 SEQUENCE {
    startPosition                   INTEGER (0..5),
    nrofSymbols                       ENUMERATED {n1, n2, n4},
    repetitionFactor                ENUMERATED {n1, n2, n4}
  },
  freqDomainPosition            INTEGER (0..67),
  freqDomainShift               INTEGER (0..268),
  freqHopping                     SEQUENCE {
    c-SRS                           INTEGER (0..63),
    b-SRS                           INTEGER (0..3),
    b-hop                           INTEGER (0..3)
  },
  groupOrSequenceHopping          ENUMERATED { neither, group
Hopping, sequenceHopping },
  resourceType                  CHOICE {
    aperiodic                     SEQUENCE {
      . . .
    },
    semi-persistent               SEQUENCE {
      periodicityAndOffset-sp         SRS-PeriodicityAndOffset,
      . . .
    },
    periodic                      SEQUENCE {
      periodicityAndOffset-p          SRS-PeriodicityAndOffset,
      . . .
    }
  },
  sequenceId                      INTEGER (0..1023),
  spatialRelationInfo           SRS-SpatialRelationInfo
OPTIONAL, -- Need R
  . . .
}
```

The base station may configure, through the higher layer parameter, spatialRelationInfo in Table 25, the UE to apply transmission beam or receiving beam with respect to the reference signal for transmitting corresponding SRS resource. For example, the configuration of spatial Relation Info may include information as in Table 26 below.

TABLE 26

```
SRS-SpatialRelationInfo ::=     SEQUENCE {
  servingCellId                   ServCellIndex
OPTIONAL, -- Need S
  referenceSignal                 CHOICE {
    ssb-Index                       SSB-Index,
    csi-RS-Index                    NZP-CSI-RS-ResourceId,
    srs                             SEQUENCE {
      resourceId                      SRS-ResourceId,
      uplinkBWP                       BWP-Id
    }
  }
}
```

Referring to the spatial RelationlInfo configuration, in order to use beam information of a particular reference signal, an SS/PBCH block index, a CSI-RS index or an SRS index may be configured as an index of a reference signal to be referred to. Higher layer signaling referenceSignal is configuration information indicating which beam information of a reference signal is to be referred to for the SRS transmission, and ssb-index refers to an index of an SS/PBCH, csi-RS-index refers to an index of a CSI-RS, and srs refers to an index of an SRS. When a value of the higher layer signaling referenceSignal is configured to ‘ssb-Index’, the UE may apply a reception beam, which has been used to receive an SS/PBCH block corresponding to the ssb-index, to a transmission beam for corresponding SRS transmission. When a value of the higher layer signaling referenceSignal is configured to ‘csi-RS-Index’, the UE may apply a reception beam, which has been used to receive a CSI-RS corresponding to the csi-RS-index, to a transmission beam for corresponding SRS transmission. When a value of the higher layer signaling referenceSignal is configured to 'srs', the UE may apply a transmission beam, which has been used to transmit an SRS corresponding to the srs, to a transmission beam for corresponding SRS transmission.

[PUSCH: Associated with Transmission Scheme]

Hereinafter, a PUSCH transmission scheduling scheme will now be described. PUSCH transmission may be dynamically scheduled by UL grant in DCI or may be operated by configured grant Type 1 or Type 2. Dynamic scheduling indication for PUSCH transmission may be indicated by DCI format 0_0 or 0_1.

Configured grant Type 1 PUSCH transmission may be semi-statically configured not by receiving UL grant in DCI but by receiving configuredGrantConfig including rrc-ConfiguredUplinkGrant of Table 27 below by higher layer signaling. Configured grant Type 2 PUSCH transmission may be semi-persistently scheduled by UL grant in DCI after receiving configuredGrantConfig that does not include rrc-ConfiguredUplinkGrant of Table 27 by higher layer signaling. When the PUSCH transmission is operated by configured grant, parameters to be applied to the PUSCH transmission are applied by higher layer signaling configuredGrantConfig of Table 27 except for dataScramblingIdentityPUSCH, txConfig, codebookSubset, maxRank, scaling of UCI-OnPUSCH provided by higher layer signaling that is pusch-Config of Table 28 below. When the UE receives transformPrecoder in higher layer signaling that is configuredGrantConfig of Table 27, the UE applies tp-pi2BPSK in pusch-Config of Table 28 to the PUSCH transmission operated by the configured grant.

TABLE 27

```
ConfiguredGrantConfig ::=                SEQUENCE {
   frequencyHopping                         ENUMERATED {intraSlot , interSlot}
OPTIONAL, -- Need S,
   cg-DMRS-Configuration                    DMRS-UplinkConfig,
   mcs-Table                                ENUMERATED {qam256, qam64LowSE}
OPTIONAL, -- Need S
   mcs-TableTransformPrecoder               ENUMERATED {qam256, qam64LowSE}
OPTIONAL, -- Need S
   uci-OnPUSCH                              SetupRelease { CG-UCI-OnPUSCH }
OPTIONAL, -- Need M
   resourceAllocation                       ENUMERATED { resourceAllocationType0,
resourceAllocationType1, dynamicSwitch },
   rbg-Size                                 ENUMERATED {config2}
OPTIONAL, -- Need S
   powerControlLoopToUse                    ENUMERATED {n0, n1},
   p0-PUSCH-Alpha                           P0-PUSCH0-AlphaSetId,
   transformPrecoder                        ENUMERATED {enabled, disabled}
OPTIONAL, -- Need S
   nrofHARQ-Processes                       INTEGER(1..15),
   repK                                     ENUMERATED {n1, n2, n4, n8},
   repK-RV                                  ENUMERATED {s1-0231, s2-0303, s3-0000}
OPTIONAL, -- Need R
   periodicity                              ENUMERATED {
                                               sym2, sym7, sym1x14, sym2x14, sym4x14,
sym5x14, sym8x14, sym10x14, sym16x14, sym20x14,
                                               sym32x14, sym40x14, sym64x14, sym80x14,
sym128x14, sym160x14, sym256x14, sym320x14, sym512x14,
                                               sym640x14, sym1024x14, sym1280x14,
sym2560x14, sym5120x14,
                                               sym6, sym1x12, sym2x12, sym4x12,
sym5x12, sym8x12, sym10x12, sym16x12, sym20x12, sym32x12,
                                               sym40x12, sym64x12, sym80x12, sym128x12,
sym160x12, sym256x12, sym320x12, sym512x12, sym640x12,
                                               sym1280x12, sym2560x12
   },
   configuredGrantTimer                       INTEGER (1..64)
OPTIONAL, -- Need R
   rrc-ConfiguredUplinkGrant                  SEQUENCE {
      timeDomainOffset                         INTEGER (0..5119),
      timeDomainAllocation                     INTEGER (0..15),
      frequencyDomainAllocation                BIT STRING (SIZE(18)),
      antennaPort                              INTEGER (0..31),
      dmrs-SeqInitialization                   INTEGER (0..1)
OPTIONAL, -- Need R
      precodingAndNumberOfLayers               INTEGER (0..63),
      srs-ResourceIndicator                    INTEGER (0..15)
OPTIONAL, -- Need R
      mcsAndTBS                                INTEGER (0..31),
      frequencyHoppingOffset                   INTEGER (1.. maxNrofPhysicalResourceBlocks-1)
- Need R
OPTIONAL, -      pathlossReferenceIndex         INTEGER (0..maxNrofPUSCH-PathlossReferenceRSs-1),
      . . .
   }
OPTIONAL, -- Need R
   . . .
}
```

Hereinafter, a PUSCH transmission method will now be described. A DMRS antenna port for PUSCH transmission is equal to an antenna port for SRS transmission. PUSCH transmission may follow a codebook based transmission method or a non-codebook based transmission method depending on whether a value of txConfig in higher layer signaling that is pusch-Config of Table 28 below is 'codebook' or 'nonCodebook'.

As described above, PUSCH transmission may be dynamically scheduled by DCI format 0_0 or 0_1, or may be semi-statically configured by the configured grant. If the UE receives an indication of scheduling of PUSCH transmission by DCI format 0_0, the UE performs beam configuration for PUSCH transmission by using pucch-spatialRelationInfoID corresponding to a UE-specific PUCCH resource corresponding to a smallest ID in an activated UL BWP in the serving cell, and in this regard, the PUSCH transmission is based on a single antenna port. The UE does not expect scheduling for the PUSCH transmission by DCI format 0_0 in a BWP on which a PUCCH resource including pucch-spatialRelationInfo is not configured. When the UE is not configured with txConfig in the pusch-Config of Table 28 below, the UE does not expect to be scheduled by DCI format 0_1.

TABLE 28

```
PUSCH-Config ::=                          SEQUENCE {
  dataScramblingIdentityPUSCH                 INTEGER (0..1023)
OPTIONAL, -- Need S
  txConfig                                  ENUMERATED {codebook, nonCodebook}
OPTIONAL, -- Need S
  dmrs-UplinkForPUSCH-MappingTypeA              SetupRelease { DMRS-UplinkConfig }
OPTIONAL, -- Need M
  dmrs-UplinkForPUSCH-MappingTypeH              SetupRelease { DMRS-UplinkConfig }
OPTIONAL, -- Need M
  pusch-PowerControl                        PUSCH-PowerControl
OPTIONAL, -- Need M
  frequencyHopping                              ENUMERATED {intraSlot, interSlot}
OPTIONAL, -- Need S
  frequencyHoppingOffsetLists               SEQUENCE (SIZE (1..4)) OF INTEGER (1..
maxNrofPhysicalResourceBlocks-1)
OPTIONAL, -- Need M
  resourceAllocation                        ENUMERATED { resourceALlocationType0,
resourceAllocationType1, dynamicSwitch},
  pusch-TimeDomainAllocationList            SetupRelease { PUSCH-
TimeDomainResourceAllocationList }             OPTIONAL, -- Need M
  pusch-AggregationFactor                   ENUMERATED { n2, n4, n8 }
OPTIONAL, -- Need S
  mcs-Table                                 ENUMERATED {qam256, qam64LowSE}
OPTIONAL, -- Need S
  mcs-TableTransformPrecoder                  ENUMERATED {qam256, qam64LowSE}
OPTIONAL, -- Need S
  transformPrecoder                         ENUMERATED {enabled, disabled}
OPTIONAL, -- Need S
  codebookSubset                              ENUMERATED {fullyAndPartialAnd-
NonCoherent, partialAndNonCoherent,nonCoherent}
OPTIONAL, -- Cond codebookBased
  maxRank                                     INTEGER (1..4)
OPTIONAL, -- Cond codebookBased
  rbg-Size                                  ENUMERATED { config2}
OPTIONAL, -- Need S
  uci-OnPUSCH                                 SetupRelease { UCI-OnPUSCH}
OPTIONAL, -- Need M
  tp-pi2BPSK                                ENUMERATED {enabled}
OPTIONAL, -- Need S
  ...
}
```

Hereinafter, codebook based PUSCH transmission will now be described. Codebook based PUSCH transmission may be dynamically scheduled by DCI format 0_0 or 0_1, or may be semi-statically operated by the configured grant. When the codebook based PUSCH transmission is dynamically scheduled by DCI format 0_1 or semi-statically configured by the configured grant, the UE determines a precoder for PUSCH transmission based on an SRS resource indicator (SRI), a transmission precoding matrix indicator (TPMI), and a transmission rank (the number of PUSCH transmission layers).

Here, the SRI may be given by an SRS resource indicator that is a field in DCI or may be configured by srs-ResourceIndicator that is higher layer signaling. The UE may be configured with at least one SRS resource for codebook based PUSCH transmission, and may be configured with up to two SRS resources. When the UE receives the SRI by DCI, an SRS resource indicated by the SRI refers to an SRS resource corresponding to the SRI among SRS resources transmitted before the PDCCH including the SRI. Also, the TPMI and the transmission rank may be given by precoding information and number of layers that is a field in the DCI or may be configured by precodingAndNumberOfLayers that is higher layer signaling. The TPMI is used to indicate a precoder to be applied to PUSCH transmission. If the UE is configured with one SRS resource, the TPMI is used to indicate a precoder to be applied in the configured one SRS resource. If the UE is configured with a plurality of SRS resources, the TPMI is used to indicate a precoder to be applied in the SRS resource indicated by the SRI.

The precoder to be used in PUSCH transmission is selected from a UL codebook having the same number of antenna ports as a value of nrofSRS-Ports in SRS-Config that is higher layer signaling. In the codebook based PUSCH transmission, the UE determines a codebook subset based on the TPMI and codebookSubset in pusch-Config that is higher layer signaling. The codebookSubset in the pusch-Config that is higher layer signaling may be configured to one of 'fullyAndPartialAndNonCoherent', 'partialAndNonCoherent', and 'nonCoherent', based on the UE capability reported by the UE to the BS. If the UE reports 'partialAndNonCoherent' in the UE capability, the UE does not expect that a value of codebookSubset that is higher layer signaling is configured to be 'fullyAndPartialAndNonCoherent'. If the UE reports 'nonCoherent' in the UE capability, the UE does not expect that a value of codebookSubset that is higher layer signaling is configured to be 'fullyAndPartialAndNonCoherent' or 'partialAndNonCoherent'. When nrofSRS-Ports in SRS-ResourceSet that is higher layer signaling indicates two SRS antenna ports, the UE does not expect that a value of codebookSubset that is higher layer signaling is configured to be 'partialAndNonCoherent'.

The UE may be configured with one SRS resource set with a value of the usage in SRS-ResourceSet that is higher layer signaling being configured to 'codebook', and one SRS resource in the SRS resource set may be indicated by the SRI. If several SRS resources are configured in the SRS resource set in which a value of the usage in SRS-ResourceSet that is higher layer signaling is configured to 'codebook', the UE expects that nrofSRS-Ports in SRS-Resource that is higher layer signaling is configured to have the same value for all SRS resources.

The UE transmits, to the BS, one or multiple SRS resources included in the SRS resource set with a value of the usage configured to 'codebook' by higher layer signaling, and the BS selects one of the SRS resources transmitted from the UE and indicates the UE to perform PUSCH transmission by using transmission beam information of the SRS resource. Here, for the codebook based PUSCH transmission, the SRI is used as information for selecting an index of the one SRS resource and is included in DCI. In addition, the BS may add, to the DCI, information indicating a TPMI and a rank to be used by the UE for PUSCH transmission. The UE performs, by using the SRS resource indicated by the SRI, PUSCH transmission by applying the precoder indicated by the rank and the TPMI indicated based on the transmission beam of the SRS resource.

Hereinafter, non-codebook based PUSCH transmission will now be described. Non-codebook based PUSCH transmission may be dynamically scheduled by DCI format 0_0 or 0_1, or semi-statically operated by the configured grant. When at least one SRS resource in an SRS resource set in which a value of the usage in SRS-ResourceSet that is higher layer signaling is configured to 'nonCodebook' is configured, the UE may be scheduled for non-codebook based PUSCH transmission by DCI format 0_1.

For the SRS resource set with a value of the usage in SRS-ResourceSet that is higher layer signaling being configured to 'nonCodebook', the UE may be configured with one associated non-zero power CSI-RS (NZP CSI-RS) resource. The UE may perform calculation on a precoder for SRS transmission by measuring the NZP CSI-RS resource associated with the SRS resource set. If a difference between a last reception symbol of an aperiodic NZP CSI-RS resource associated with the SRS resource set and a first symbol of aperiodic SRS transmission from the UE is less than 42 symbols, the UE does not expect that information about the precoder for SRS transmission is to be updated.

When a value of resourceType in SRS-ResourceSet that is higher layer signaling is configured to 'aperiodic', an associated NZP CSI-RS is indicated by the field SRS request in DCI format 0_1 or 1_1. Here, when the associated NZP CSI-RS resource is an aperiodic NZP CSI-RS resource, it indicates existence of an NZP CSI-RS associated for a case where the value of the field SRS request in DCI format 0_1 or 1_1 is not '00'. Here, the DCI shall not indicate cross carrier or cross BWP scheduling. Also, if the value of the SRS request indicates the existence of the NZP CSI-RS, the NZP CSI-RS is located in a slot in which a PDCCH including the SRS request field is transmitted. Here, TCI states configured for a scheduled subcarrier are not configured to QCL-TypeD.

If a periodic or semi-persistent SRS resource set is configured, an associated NZP CSI-RS may be indicated by associated CSI-RS in SRS-ResourceSet that is higher layer signaling. For non-codebook based transmission, the UE does not expect both the spatialRelationInfo that is higher layer signaling for an SRS resource and associated CSI-RS in the SRS-ResourceSet that is higher layer signaling to be configured.

When the UE is configured with a plurality of SRS resources, the UE may determine a precoder and a transmission rank to be applied to PUSCH transmission, based on the SRI indicated by the BS. Here, the SRI may be indicated by an SRS resource indicator that is a field in DCI or may be configured by srs-ResourceIndicator that is higher layer signaling. Likewise, in regard to the codebook based PUSCH transmission, when the UE is provided the SRI by DCI, an SRS resource indicated by the SRI refers to an SRS resource corresponding to the SRI among SRS resources transmitted before the PDCCH including the SRI. The UE may use one or more SRS resources in SRS transmission, and a maximum number of SRS resources available for simultaneous transmission on the same symbol in one SRS resource set and a maximum number of SRS resources are determined based on UE capability reported by the UE to the BS. In this case, the SRS resources simultaneously transmitted by the UE occupy a same RB. The UE configures one SRS port for each SRS resource. Only one SRS resource set with a value of the usage in SRS-ResourceSet that is higher layer signaling is configured to 'nonCodebook' may be configured, and maximally up to four SRS resources for non-codebook based PUSCH transmission may be configured.

The BS transmits one NZP-CSI-RS associated with the SRS resource set to the UE, and the UE calculates a precoder to be used in transmission of one or more SRS resources in the SRS resource set, based on a result of measurement performed in reception of the NZP_CSI-RS. The UE applies the calculated precoder to transmit, to the BS, one or more SRS resources in the SRS resource set with the usage configured to 'nonCodebook', and the BS selects one or more SRS resources from among the received one or more SRS resources. Here, for the non-codebook based PUSCH transmission, the SRI may indicate an index that can represent a combination of one or more SRS resources, and may be included in DCI. Here, the number of SRS resources indicated by the SRI transmitted from the BS may be the number of transmission layers of the PUSCH, and the UE transmits the PUSCH by applying, to each layer, the precoder applied to SRS resource transmission.

[PUSCH: Preparation Procedure Time]

Hereinafter, a PUSCH preparation procedure time will now be described. When the BS schedules the UE to transmit a PUSCH by using DCI format 0_0, 0_1 or 0-2, the UE may need a PUSCH preparation procedure time to transmit the PUSCH by applying a transmission method (an SRS resource transmission precoding method, the number of transmission layers, or a spatial domain transmission filter) indicated by DCI. In consideration of information above, NR defines a PUSCH preparation procedure time. The PUSCH preparation procedure time of the UE may be calculated using Equation 2 below.

$$T_{proc,2}=\max((N_2+d_{2,1}+d_2)(2048+144)\kappa 2^{-\mu}+T_c+T_{ext}+T_{switch},d_{2,2}) \quad \text{Equation 2}$$

Variables in $T_{proc,2}$ expressed in Equation 2 above may have the following meanings.

$N_2$: the number of symbols determined according to UE processing capability 1 or 2 and numerology p. When the UE capability 1 is reported in a UE capability report, it may have a value based on Table 29 below, and when the UE capability 2 is reported in the UE capability report and when it is configured, by higher layer signaling, that the UE capability 2 is available, it may have a value based on Table 30 below.

TABLE 29

| μ | PUSCH preparation time $N_2$ [symbols] |
|---|---|
| 0 | 10 |
| 1 | 12 |
| 2 | 23 |
| 3 | 36 |

TABLE 30

| μ | PUSCH preparation time $N_2$ [symbols] |
|---|---|
| 0 | 5 |
| 1 | 5.5 |
| 2 | 11 for frequency range 1 |

$d_{2,1}$: This may indicate the number of symbols which is determined to be 0 when resource elements of the first OFDM symbol are all configured to comprise DMRSs, or 1 otherwise.

K: 64

μ: This follows a value of: $\mu_{DL}$ or $\mu_{UL}$ which makes $T_{proc,2}$ larger. $\mu_{DL}$ refers to numerology of a DL in which a PDCCH including DCI that schedules the PUSCH is transmitted, and $\mu_{UL}$ refers to numerology of a UL in which the PUSCH is transmitted.

$T_c$: This may have a value of $1/(\Delta f_{max}\cdot N_f)$, and may be $\Delta f_{max}=480\cdot 10^3$ Hz and $N_f=4096$.

$d_{2,2}$: This may follow a BWP switching time when the DCI that schedules the PUSCH indicates BWP switching, or may be '0' otherwise.

$d_2$: When OFDM symbols of a PUCCH, a PUSCH having a high priority index and a PUCCH having a low priority index overlap on the time domain, a $d_2$ value of the PUSCH having the high priority index is used. Otherwise, $d_2$ is 0.

$T_{ext}$: When the UE uses a shared spectrum channel access scheme, the UE may calculate $T_{ext}$ and may apply $T_{ext}$ to the PUSCH preparation procedure time. Otherwise, $T_{ext}$ is assumed to be 0.

$T_{switch}$: When a UL switching interval is triggered, $T_{switch}$ is assumed as a switching interval time. Otherwise, $T_{switch}$ is assumed to be 0.

In consideration of time-axis resource mapping information of the PUSCH scheduled by the DCI and an impact of timing advance between the UL and the DL, the BS and the UE may determine that the PUSCH preparation procedure time is not sufficient when a first symbol of the PUSCH starts before a first UL symbol on which CP starts after $T_{proc,2}$ from a last symbol of the PDCCH including the DCI that schedules the PUSCH. Otherwise, the BS and the UE may determine that the PUSCH preparation procedure time is sufficient. Only when the PUSCH preparation procedure time is sufficient, the UE may transmit the PUSCH, and when the PUSCH preparation procedure time is not sufficient, the UE may ignore the DCI that schedules the PUSCH.

[PUSCH: Associated with Repetitive Transmission]

Hereinafter, UL data channel repetitive transmissions in the 5G system will now be described in detail. The 5G system may support two types of UL data channel repetitive transmission methods, i.e., PUSCH repetitive transmission type A and PUSCH repetitive transmission type B. The UE may be configured with one of the PUSCH repetitive transmission types A or B by higher layer signaling.

PUSCH Repetitive Transmission Type A

As described above, symbol length and a start symbol position of a UL data channel may be determined in a time domain resource allocation method in one slot, and the BS may notify the UE of the number of repetitive transmissions by higher layer signaling (e.g., RRC signaling) or L1 signaling (e.g., DCI).

The UE may repetitively transmit a UL data channel having a same length and start symbol as those of the UL data channel in consecutive slots, based on the number of repetitive transmissions received from the BS. In this case, when a slot configured by the BS for the UE in a DL or at least one of symbols of a UL data channel configured for the UE is configured for DL, the UE skips UL data channel transmission but counts the number of repetitive transmissions of the UL data channel.

PUSCH Repetitive Transmission Type B

As described above, a start symbol and length of a UL data channel may be determined in a time domain resource allocation method in one slot, and the BS may notify the UE of numberofrepetitions that is the number of repetitive transmissions by higher layer signaling (e.g., RRC signaling) or L1 signaling (e.g., DCI).

Based on the start symbol and length of the UL data channel which are previously configured, nominal repetition of the UL data channel is determined as described below. A slot in which n-th nominal repetition starts is given by $$K_s+\left\lfloor\frac{S+n\cdot L}{N_{symb}^{slot}}\right\rfloor$$

and a symbol starting in the slot is given by $$\mathrm{mod}(S+n\cdot L,\ N_{symb}^{slot}).$$

A slot in which the n-th nominal repetition ends is given by $$K_s+\left\lfloor\frac{S+(n+1)\cdot L-1}{N_{symb}^{slot}}\right\rfloor,$$

and a symbol that ends in the slot is given by $$\mathrm{mod}(S+(n+1)\cdot L-1,\ N_{symb}^{slot}).$$

Here, n=0, . . . , numberofrepetitions−1, S indicates a start symbol of the configured UL data channel, and L indicates symbol length of the configured UL data channel. $K_s$ indicates a slot in which the PUSCH transmission starts, and $$N_{symb}^{slot}$$

indicates the number of symbols per slot.

The UE determines an invalid symbol for the PUSCH repetitive transmission type B. A symbol configured for DL by tdd-UL-DL-ConfigurationCommon or tdd-UL-DL-ConfigurationDedicated is determined as an invalid symbol for the PUSCH repetitive transmission type B. In addition, the invalid symbol may be configured by a higher layer parameter (e.g., InvalidSymbolPattern). The higher layer parameter (e.g., InvalidSymbolPattern) may provide a symbol-level bitmap spanning one slot or two slots such that the invalid symbol may be configured. In the bitmap, '1' represents the invalid symbol. In addition, periodicity and a pattern of the bitmap may be configured by a higher layer parameter (e.g., periodicityAndPattern). If the higher layer parameter (e.g., InvalidSymbolPattern) is configured and parameter InvalidSymbolPatternIndicator-ForDCIFormat0_1 or InvalidSymbolPatternIndicator-ForDCIFormat0_2 indicates '1', the UE applies an invalid symbol pattern, and when the parameter indicates '0', the UE does not apply the invalid symbol pattern. If the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, the UE may consider symbols other than the invalid symbol as valid symbols for each nominal repetition. When one or more valid symbols are included in each nominal repetition, the nominal repetition may include one or more actual repetitions. Here, each of the actual repetitions includes a set of consecutive valid symbols available for the PUSCH repetitive transmission type B in one slot.

Figure 15:
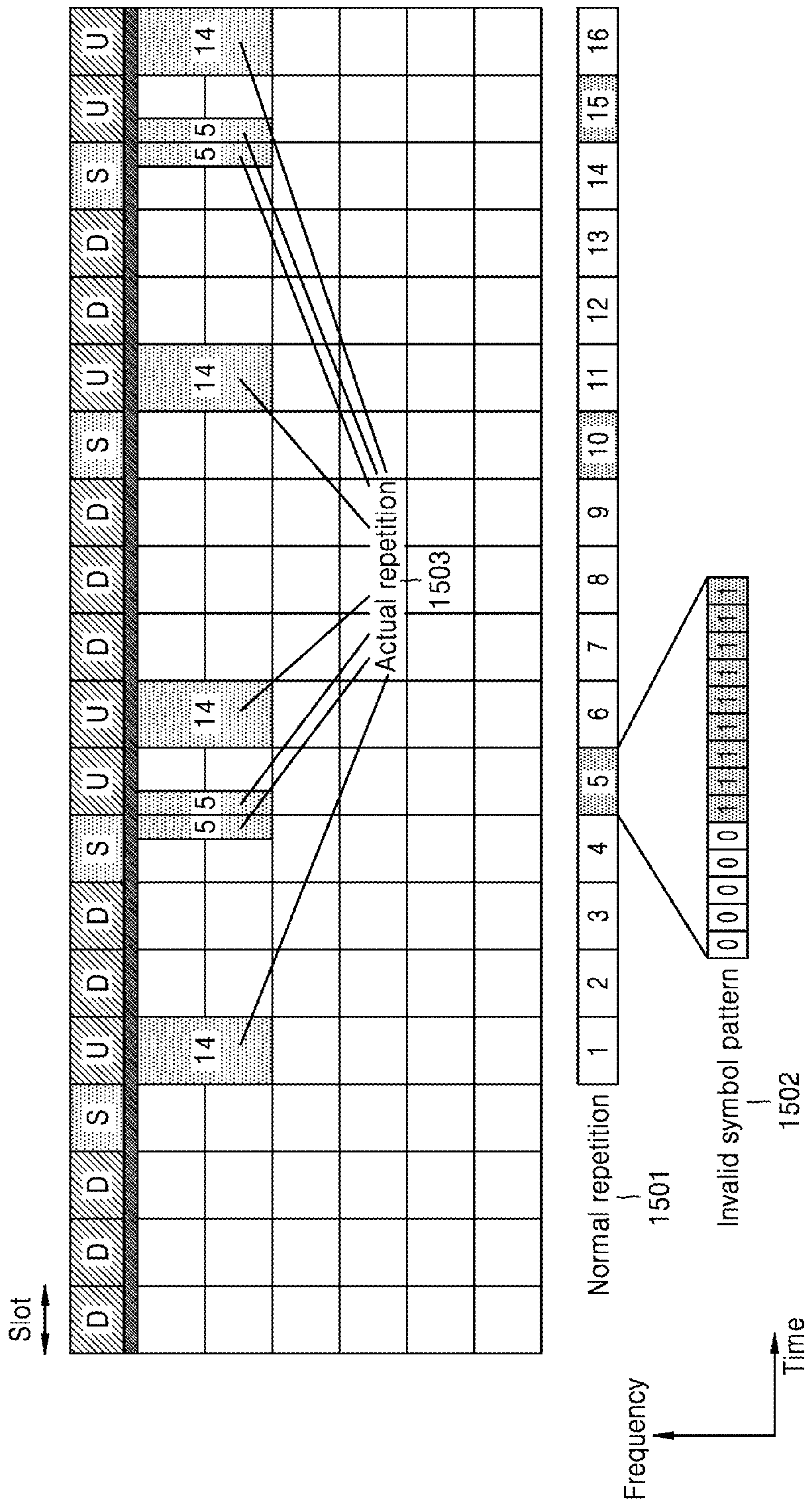
FIG. 15 illustrates a diagram of an example of physical uplink shared channel (PUSCH) repetitive transmission type B in a wireless communication system according to an embodiment of the disclosure.

FIG. 15 illustrates a diagram of an example of PUSCH repetitive transmission type B in a wireless communication system according to an embodiment of the disclosure.

Referring to the example of FIG. 15, the UE may be configured with a start symbol S of a UL data channel as 0, may be configured with length L of the UL data channel as 14, and may be configured with the number of repetition times as 16. In this case, nominal repetition 1501 indicates 16 consecutive slots. Afterward, the UE may determine a symbol configured as a DL symbol in each nominal repetition 1501 as an invalid symbol. Also, the UE may determine symbols configured to '1' in an invalid symbol pattern 1502 as invalid symbols. In a case where valid symbols other than the invalid symbols are configured as one or more consecutive symbols in a slot in each nominal repetition, the valid symbols may be configured and transmitted as actual repetition 1503.

Also, for PUSCH repetitive transmission, the NR release 16 may define additional methods below for UL-grant based PUSCH transmission and configured-grant based PUSCH transmission that over a slot boundary.

Method 1 (mini-slot level repetition): two or more PUSCH repetitive transmissions in one slot or over boundaries of consecutive slots are scheduled by one UL grant. For Method 1, time domain resource allocation information in DCI indicates a resource for the first repetitive transmission. Also, time domain resource information of the remaining repetitive transmissions may be determined according to the time domain resource information of the first repetitive transmission and the UL or DL direction determined for each symbol of each slot. Each repetitive transmission occupies consecutive symbols.

Method 2 (multi-segment transmission): two or more PUSCH repetitive transmissions in consecutive slots are scheduled by one UL grant. Here, one transmission is designated for each slot, and each transmission may have a different start point or repetition length. Also, in Method 2, time domain resource allocation information in DCI indicates start points and repetition lengths of all the repetitive transmissions. Also, in a case where repetitive transmissions are performed in one slot according to Method 2, when there are several groups of consecutive UL symbols in the slot, each repetitive transmission is performed per each of the UL symbol groups. When there is only one group of consecutive UL symbols in the slot, one PUSCH repetitive transmission is performed according to the method of NR release 15.

Method 3: two or more PUSCH repetitive transmissions in consecutive slots are scheduled by two or more UL grants. Here, one transmission is designated per each slot, and the n-th UL grant may be received before the PUSCH transmission scheduled by the (n−1)-th UL grant is completed.

Method 4: By one UL grant or one configured grant, one or more PUSCH repetitive transmissions in one slot may be supported, or two or more PUSCH repetitive transmissions over boundaries of consecutive slots may be supported. The number of repetitions indicated by the BS to the UE is a nominal value, and an actual number of PUSCH repetitions performed by the UE may be greater than the nominal number of repetitions. Time domain resource allocation information in DCI or configured grant refers to a resource of a first repetitive transmission indicated by the BS. Time domain resource information of the rest of repetitive transmissions may be determined by referring to at least the resource information of the first repetitive transmission and UL or DL direction of symbols. If the time domain resource information of the repetitive transmission indicated by the BS span boundaries of slots or includes a UL/DL transition point, the repetitive transmission may be divided into a plurality of repetitive transmissions. Here, one repetitive transmission may be included in each UL period in one slot.

[PUSCH: Frequency Hopping Procedure]

Hereinafter, frequency hopping on a UL data channel (e.g., PUSCH) in the 5G system will now be described in detail.

The 5G system may support two methods for each PUSCH repetitive transmission type as the frequency hopping method of a UL data channel. First, the PUSCH repetitive transmission type A may support intra-slot frequency hopping and inter-slot frequency hopping, and the PUSCH repetitive transmission type B may support inter-repetition frequency hopping and inter-slot frequency hopping.

The intra-slot frequency hopping method supported in the PUSCH repetitive transmission type A is a method by which the UE performs transmission by changing a resource by a configured frequency offset at two hops in one slot, the resource being allocated in the frequency domain. In the intra-slot frequency hopping, a start RB at each hop may be represented by using Equation 3 below.

$$RB_{start} = \begin{cases} RB_{start} & i = 0 \\ (RB_{start} + RB_{offset}) \bmod N_{BWP}^{size} & i = 1 \end{cases} \quad \text{Equation 3}$$

In Equation 5, i=0 and i=1 respectively represent a first hop and a second hop, and $RB_{start}$ represents a start RB in a UL BWP and is calculated from the frequency resource allocation method. $RB_{offset}$ represents a frequency offset between two hops by a higher layer parameter. The number of symbols of the first hop may be represented by $$\lfloor N_{symb}^{PUSCH,s}/2 \rfloor,$$

and the number of symbols of the second hop may be represented by $$N_{symb}^{PUSCH,s} - \lfloor N_{symb}^{PUSCH,s}/2 \rfloor. \; N_{symb}^{PUSCH,s}$$

is a length of PUSCH transmission in one slot and is represented by the number of OFDM symbols.

The inter-slot frequency hopping method supported in the PUSCH repetitive transmission types A and B is a method by which the UE performs transmission by changing a resource by a configured frequency offset in each slot, the resource being allocated in the frequency domain. In the inter-slot frequency hopping, a start RB during slot $$n_S^{\mu}$$

may be represented using Equation 4 below.

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases} \quad \text{Equation 4}$$

In Equation 4, $$n_S^{\mu}$$

is a current slot number in the multi-slot PUSCH transmission, and $RB_{start}$ represents a start RB in a UL BWP and is calculated from the frequency resource allocation method. $RB_{offset}$ represents a frequency offset between two hops by a higher layer parameter.

The inter-repetition frequency hopping method supported in the PUSCH repetitive transmission type B is to perform transmission by shifting a resource by a configured frequency offset, the resource being allocated in the frequency domain for one or more actual repetitions in each nominal repetition. $RB_{start}(n)$ that is an index of the start RB in the frequency domain for one or more actual repetitions in the n-th nominal repetition may follow Equation 5 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 5}$$

In Equation 5, n indicates an index of nominal repetition, and $RB_{offset}$ indicates an RB offset between two hops by a higher layer parameter:

[PUSCH Transmit Power]

Hereinafter, a method of determining transmit power for a UL data channel in the 5G system will now be described in detail.

In the 5G system, transmit power for a UL data channel may be determined by using Equation 6 below.

Equation 6

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix} [\text{dBm}]$$

In Equation 6, j indicates a grant type of a PUSCH, and in more detail, j=0 indicates PUSCH grant for a random access response, j=1 indicates configured grant, and j∈{2, 3, . . . , J−1} indicates dynamic grant. $P_{CMAX,f,c}(i)$ indicates maximum output power configured for the UE with respect to PUSCH transmission occasion i on carrier f of a serving cell c. $P_{0\_PUSCH,b,f,c}(j)$ indicates a parameter of a total sum of $P_{O\_NOMINAL\_PUSCH,f,c}(j)$ configured as a higher layer parameter and $P_{O\_UE\_PUSCH,b,f,c}(j)$ that can be determined by higher layer configuration and SRI (when it is dynamic grant PUSCH).

$$M_{RB,b,f,c}^{PUSCH}(i)$$

refers to a bandwidth of resource allocation indicated by the number of resource blocks with respect to PUSCH transmission occasion i, and $\Delta_{TF,b,f,c}(i)$ indicates a value determined based on a modulation coding scheme (MCS) and a type (e.g., whether UL-SCH is included or whether CSI is included) of information being transmitted on a PUSCH. $\alpha_{b,f,c}(j)$ indicates a value for compensation of pathloss and may be determined by higher layer configuration and SRI (when it is dynamic grant PUSCH). $PL_{b,f,c}(q_d)$ indicates a UL pathloss estimation value measured by the UE using a reference signal with reference signal index $q_d$, and the UE may determine the reference signal index $q_d$ by higher layer configuration and SRI (when it is dynamic grant PUSCH or ConfiguredGrantConfig-based configured grant PUSCH (type 2 configured grant PUSCH)) or higher layer configuration. $f_{b,f,c}(i,l)$ indicates a closed loop power control value which may be supported by an accumulation scheme and an absolute scheme. If a higher layer parameter tpc-Accumulation is not configured for the UE, the closed loop power control value may be determined by the accumulation scheme. Here, $f_{b,f,c}(i,l)$ is determined as $$f_{b,f,c}(i - i_0, l) + \sum_{m=0}^{C(D_i)-1} \delta_{PUSCH,b,f,c}(m, l)$$

obtained by adding a closed loop power control value for a previous PUSCH transmission occasion $i-i_0$ to TPC command values for a closed loop index I received by DCI between a $K_{PUSCH}(i-i_0)-1$ symbol for transmitting the PUSCH transmission occasion $i-i_0$ to a $K_{PUSCH}(i)$ symbol for transmitting the PUSCH transmission occasion i. If the higher layer parameter tpc-Accumulation is configured for the UE, $f_{b,f,c}(i,l)$ may be determined as $\delta_{PUSCH,b,f,c}(i,l)$ that is a TPC command value for the closed loop index I received by DCI. The closed loop index I may be configured to 0 or 1 when a higher layer parameter twoPUSCH-PC-AdjustementStates is configured for the UE, and its value may be determined by higher layer configuration and SRI (when it is dynamic grant PUSCH). Mapping relations between TPC command fields and TPC values $\delta PUSCH_{b,f,c}$ in DCI according to the accumulation scheme and the absolute scheme may be defined as in Table 31 below.

TABLE 31

| TPC command field | Accumulated $\delta_{PUSCH,b,f,c}$ [dB] | Absolute $\delta_{PUSCH,b,f,c}$ [dB] |
|---|---|---|
| 0 | −1 | −4 |
| 1 | 0 | −1 |
| 2 | 1 | 1 |
| 3 | 3 | 4 |

[Related to PHR]

The power headroom report indicates that the UE measures a difference (i.e., available transmit power of the UE) between nominal UE maximum transmit power and estimated power for UL transmission and transmits information about the difference to the BS. The power headroom report may be used for the BS to support power aware packet scheduling. The estimated power for UL transmission may include estimated power for UL-SCH (PUSCH) transmission per activated serving cell, estimated power for UL-SCH and PUCCH transmission in a special cell (SpCell) of a different MAC entity (e.g., E-UTRA MAC entity in EN-DC, NE-DC, and NGEN-DC cases in the 3GPP standard), estimated power for SRS transmission per activated serving cell, or the like. The UE may trigger a power headroom reporting when one of trigger events below is satisfied:

[Trigger event 1] When a higher layer parameter phr-ProhibitTimer expires and a MAC entity has a UL resource for new transmission, pathloss with respect to at least one activated serving cell is further changed than a higher layer parameter phr-Tx-PowerFactor-Change dB after most recent PHR transmission. Here, an activated DL BWP for the at least one activated serving cell is not a dormant BWP. Here, a pathloss change with respect to one cell is determined to be a difference between currently-measured pathloss with respect to current pathloss reference and pathloss measured with respect to pathloss reference at a most-recent PHR transmission time.

[Trigger event 2] A higher layer parameter phr-Periodic-Timer expires.

[Trigger event 3] A power headroom report function is configured or reconfigured by a higher layer, which is not configuration or reconfiguration not to support a power headroom report.

[Trigger event 4] A secondary cell (SCell) is activated for a certain MAC entity having a UL for which firstActiveDownlinkBWP-Id is not configured as a dormant BWP. The firstActiveDownlinkBWP-Id indicates an identifier of a DL BWP (when configured for a SpCell) to be activated when RRC (re)configuration is performed or an identifier of a DL BWP (when configured for the SCell) to be used when the SCell is activated.

[Trigger event 5] A primary and secondary cell (PSCell) is added. (That is, the PSCell is newly added or changed).

[Trigger event 6] When a higher layer parameter phr-PrhoibitTimer expires and a MAC entity has a UL resource for new transmission, all of a) and b) conditions below are satisfied for certain activated serving cells of a certain MAC entity having a configured UL:

a) When there is a UL resource allocated for transmission or a PUCCH is transmitted to a corresponding cell.

b) When a MAC entity has a UL resource for transmission or transmits a PUCCH to a corresponding cell, requested power backoff due to power management for the corresponding cell is larger than a higher layer parameter phr-Tx-PowerFactorChange dB after most recent PHR transmission.

[Trigger event 7] An activated BWP of a SCell for a certain MAC entity having a configured UL is switched from a dormant BWP to a non-dormant DL BWP.

[Trigger event 8] If a higher layer parameter mpe-Reporting-FR2 is configured for the UE so as to indicate whether to report maximum allowed UE output power reduction (MPE P-MPR) to satisfy a maximum permissible exposure (MPE) in frequency range 2 (FR2), and mpe-ProhibitTimer is not running, when a power headroom report is referred to as ‘MPE P-MPR report’, measured P-MPR applied to satisfy a FR2 MPE requirement condition for at least one activated FR2 serving cell after most recent power headroom report is equal to or greater than a higher layer parameter mpe-Threshold.

According to the trigger events above, a power headroom report may be triggered and the UE may determine a power headroom report according to additional conditions below.

[Additional condition according to temporary required power backoff] When required power backoff is temporarily reduced (to several tens of miliseconds) due to power management, an MAC entity shall not trigger a power headroom report. If the required power backoff is temporarily reduced and a power headroom report is triggered due to other trigger events, a value of $P_{CMAX,f,c}$/PH indicating a ratio of maximum power to remaining (available) power shall not be temporarily reduced due to the power headroom report. That is, PHR shall not be triggered due to temporary power backoff. For example, a condition is added such that, when PHR is triggered due to other PHR trigger event (expiry of periodictimer, or the like), PH to which temporary power reduction due to required power backoff is reflected is not to be reported and PH excluding an effect due to required power backoff is to be reported.

[Power headroom report condition according to UE implementation] If one HARQ process is configured by cg-RetransmissionTimer and a MAC protocol data unit (PDU) for transmission already includes a power headroom report according to the HARQ process but transmission by a lower layer is not performed yet, a method of processing power headroom report content is determined depending on UE implementation.

When one or more events among the trigger events occur and thus a power headroom report is triggered, and a UL transmission resource allocated by DCI can accommodate a MAC entity and subheader for the power headroom report, the UE performs power headroom reporting. Here, the transmission resource indicates a resource for UL transmission scheduled by a first DCI format for scheduling initial transmission of a transport block or scheduled by very first UL grant after the triggering of the power headroom report. That is, after occurrence of the triggering of the power headroom, the UE may perform power headroom reporting via UL transmission scheduled by the first DCI format or the very first UL grant among UL resource that can accommodate the MAC entity and subheader for the power headroom. Alternatively, after occurrence of the triggering of the power headroom, the UE may perform power headroom reporting via configured grant PUSCH transmission that can accommodate the MAC entity and subheader for the power headroom.

When the UE performs power headroom reporting for a specific cell, the UE may select, calculate, and report one of two types of power headroom information. The first type refers to power headroom information calculated, as an actual PHR, based on transmit power for a UL signal (e.g., PUSCH) that is actually transmitted. The second type refers to, virtual PHR (or reference format), power headroom information calculated based on a transmit power parameter configured by a higher layer, without a UL signal (e.g., PUSCH) that is actually transmitted. After the power headroom report is triggered, the UE may calculate an actual PHR based on DCI and periodic/semi-persistent SRS transmission and higher layer information for configured grant transmission, which are received up to a time point including a PDCCH monitoring occasion in which the first DCI format for scheduling a PUSCH for transmitting a MAC CE including the power headroom report is received. If the UE receives DCI or determines periodic/semi-persistent SRS transmission or configured grant transmission after the PDCCH monitoring occasion in which the first DCI format is received, the UE may calculate a virtual PHR for a corresponding cell. Alternatively, after the power headroom report is triggered, the UE may calculate an actual PHR based on higher layer information for DCI and periodic/semi-persistent SRS transmission and configured grant transmission received up to a time point before $T'_{proc,2}=T_{proc,2}$ corresponding to the PUSCH preparation procedure time with respect to a very first UL symbol of a configured grant PUSCH for transmission of the power headroom information. If the UE receives DCI or determines periodic/semi-persistent SRS transmission or configured grant transmission after the time point before $T'_{proc,2}$ with respect to the very first UL symbol of the configured grant PUSCH, the UE may calculate a virtual PHR for a corresponding cell.

When the UE calculates actual PHR based on actual PUSCH transmission, power headroom report information for serving cell c, carrier f, BWP b, and PUSCH transmission time i may be calculated by using Equation 7 below.

$$PH_{type1b,f,c}(i, j, q_d, l) = P_{CMAXf,c}(i) - \left\{P_{O\_PUSCHb,f,c}(j) + 10\log_{10}\left(2^{\mu} \cdot M^{PUSCH}_{RB,b,f,c}(i)\right) + \alpha_{b,f,c}(j) \cdot PL_{b,f,c}(q_d) + \Delta_{TFb,f,c}(i) + f_{b,f,c}(i, l)\right\}[\text{dB}] \quad \text{Equation 7}$$

In another example, when the UE calculates a virtual PHR based on transmit power parameters configured by a higher layer, power headroom report information for serving cell c, carrier f, BWP b, and PUSCH transmission time i may be calculated by using Equation 8 below.

$$PH_{type1b,f,c}(i,j,q_d,l) = \tilde{P}_{C_{MAX,f,c}}(i) - \{P_{O\_PUSCH,f,c}(j) + \alpha_{b,f,c}(j) \cdot PL_{b,f,c}(q_d) + f_{b,f,c}(i,l)\}[\text{dB}] \quad \text{Equation 8}$$

According to Equation 7 above, power headroom information may be calculated by using a difference between maximum output power and transmit power with respect to PUSCH transmission occasion i. According to Equation 8, power headroom information may be calculated by using a difference between maximum output power $\tilde{P}_{C_{MAX,f,c}}(i)$ of a case where parameters (maximum power reduction (MPR), additional MPR (A-MPR), power management MPR (P-MPR), and the like) associated with MPR and $\Delta T_c$ are assumed to be 0 and reference PUSCH transmit power using default transmit power parameters (e.g., $P_{O\_NOMINAL\_PUSCH,fc}(0)$, p0 and alpha of P0-PUSCH-AlpahSet with p0-PUSCH-AlphaSetId=0, $PL_{b,f,c}(q_d)$ corresponding to pusch-PathlossReferenceRS-Id=0, and a closed loop power control value with closed loop index I=0). Descriptions of each parameter in Equation 7 and Equation 8 above may be referred to parameter descriptions with reference to Equation 6 above. The A-MPR is MPR satisfying an additional emission requirement indicated by a BS by higher layer signaling (for example, when additionalSpectrumEmission indicated by RRC and NR frequency band are combined (TS 38.101-1 in Table 6.2.3.1-1A), a network signaling label is determined and an A-MPR value corresponding thereto is defined according to TS 38.101-1 in Table 6.2.3.1-1). The P-MPR is maximum allowed UE output power reduction for a serving cell c, and is MPR capable of satisfying applicable electromagnetic energy absorption requirements. The A-MPR and P-MPR may be referred to the 3GPP standard TS 38.101-1 section 6.2. In a communication system to which the disclosure is applicable, first type power headroom information may indicate power headroom information for PUSCH transmit power, second type power headroom information may indicate power headroom information for PUCCH transmit power, and third type power headroom information may indicate power headroom information for SRS transmit power. However, the disclosure is not limited thereto.

When MR-DC or UL-CA is not supported, the BS configures the UE with "false" for a higher layer parameter "multiplePHR". This indicates that the UE supports power headroom reporting for a PCell via an MAC CE having a single entry, as indicated by a reference numeral 1610 of FIG. 16. Each field of FIG. 16 may be defined as described below. However, this is merely an example and the disclosure is not limited thereto.

- P: P comprised of 1 bit is set to 0, if mpe-Reporting-FR2 is configured and serving cell operates in FR2, when P-MPR applied according to TS38.133 is smaller than P-MPR_00, and is set to 1 otherwise. When mpe-Reporting-FR2 is not configured or serving cell operates in frequency range 1 (FR1), P indicates whether or not power backoff is applied to adjust transmit power. If power backoff is not applied due to power management and thus, corresponding Pcmax,c field has different value, corresponding P region is set to 1;
- $P_{CMAX,f,c}$: This field indicates, in power headroom report, maximum transmit power value used in calculation of power headroom. This may have information of 6 bits and may select one of a total of 64 nominal UE transmit power levels.
- MPE: When mpe-Reporting-FR2 is configured and serving cell operates in FR2, and P field is set to 1, MPE region indicates power backoff value applied to satisfy MPE (maximum permissible exposure) requirement. This is field comprised of 2 bits and indicates one value among a total of 4 measured P-MPR values. When mpe-Reporting-FR2 is not configured, or serving cell operates in FR1, or P field is set to 0, this may exist as reserved bit as R.

R: This is reserved bit and is set to 0.

PH: This field indicates power headroom level. This may be comprised of 6 bits and may select one value among a total of 64 power headroom levels.

When the UE supports multi-RAT dual connectivity (MR-DC) or uplink carrier aggregation (UL-CA), the BS configures the UE with 'true' for a higher layer parameter 'multiplePHR' so as to perform PHR for each serving cell. This indicates that the UE supports a power headroom report for a plurality of serving cells by an MAC CE having a plurality of entries, as indicated by a first format 1700 or a second format 1702 shown in FIG. 17. The first format 1700 of FIG. 17 is a PHR MAC CE format that is usable for a case where the UE is configured with a plurality of serving cells and a highest value among indexes of the serving cells is smaller than 8. The second format 1702 of FIG. 17 is a PHR MAC CE format that is usable for a case where the UE is configured with a plurality of serving cells and a highest value among indexes of the serving cells is equal to or greater than 8. Unlike the PHR MAC CE format of FIG. 16, the first format 1700 or the second format 1702 which is shown in FIG. 17 may have a variable size according to a group or the number of serving cells. The information corresponding thereto may include second type PH information for a SpCell of a different MAC entity (for example, LTE), and first type PH information for a PCell. When the highest value among the indexes of the serving cells is smaller than 8, a field indicating serving cell information may be configured as one octet. When the highest value among the indexes of the serving cells is equal to or greater than 8, the field indicating serving cell information may be configured as four octets. A PHR MAC CE may include power headroom information according to an order of the indexes of the serving cells. When a power headroom report is triggered, a MAC entity may transmit the PHR MAC CE including the power headroom information via a transmittable PUSCH. Here, whether the power headroom information is calculated based on actual transmission (i.e., whether it is actual PHR) or calculated based on a transmit power parameter configured by a higher layer (i.e., whether it is virtual PHR) may be determined based on DCI and a higher layer signal received up to a specific time point (time including a PDCCH monitoring occasion in which a first DCI format is detected or a time point before $T'_{proc,2}$ from a first symbol of an initial PUSCH), as described above. Fields of the PHR MAC CE formats 1700 or 1702 shown in FIG. 17 may have the same meanings (definitions) as most fields of the PHR MAC CE format 1610 of FIG. 16, and Ci and V may have following meanings.

$C_i$: This region indicates existence or non-existence of power headroom region for serving cell having ServCellIndex i. When power headroom for serving cell i is reported, corresponding $C_i$ region is set to 0;

V: This region indicates whether power headroom value is calculated based on actual transmission or reference format. For first-type power headroom information, when PUSCH is actually transmitted, V is set to 0, and when reference format for PUSCH is used, it is set to 1. For second-type PH information, when PUCCH is actually transmitted, V is set to 0, and when reference format for PUCCH is used, it is set to 1. For third-type PH information, when SRS is actually transmitted, V is set to 0, and when reference format for SRS is used, it is set to 1. Also, when V value is 0 for first-type, second-type, third-type power headroom information, $P_{cmax,f,c}$ and MPE fields exist, and when V value is 1, $P_{cmax,f,c}$ and MPE fields therefor may be omitted.

[Associated with UE Capability Report]

In LTE and NR, the UE may perform a procedure for reporting a capability supported by the UE to a serving BS when the UE is connected to the serving BS. In descriptions below, this procedure is called a UE capability report.

The BS may transmit, to the UE in a connected state, a UE capability enquiry message requesting to report a UE capability report. The message may include a UE capability request for each radio access technology (RAT) type of the BS. The request for each RAT type may include supported frequency band combination information, or the like. Also, for the UE capability enquiry message, UE capability for each of the plurality of RAT types may be requested by an RRC message container transmitted by the BS, or the BS may transmit the UE capability enquiry message including a UE capability request for each RAT type which is repeated multiple times. That is, the UE capability enquiry is repeated multiple times in one message, and the UE may configure a corresponding UE capability information message corresponding thereto and may report it multiple times. In the next generation mobile communication system, a UE capability request for multi-RAT dual connectivity (MR-DC) as well as NR, LTE, E-UTRA-NR dual connectivity (EN-DC) may be performed. Also, it is common that the UE capability enquiry message is transmitted in an initial stage after the UE is connected to the BS, but the UE capability enquiry message may be requested in any condition when the BS needs.

When the UE receives, from the BS, a request to report the UE capability, the UE configures a UE capability according to an RAT type and band information requested from the BS. Examples of a method by which the UE configures a UE capability in the NR system are summarized below.

1. If the UE is provided an LTE and/or NR band list in a request for UE capability from the BS, the UE may configure a band combination (BC) for EN-DC and NR stand-alone (SA). That is, the UE configures a candidate BC list for the EN-DC and NR SA, based on bands requested to the BS in FreqBandList. Also, the bands may have priorities in order of being listed in FreqBandList.
2. If the BS requests a UE capability report by setting a flag "eutra-nr-only" or "eutra" in a UE capability enquiry message, the UE completely removes information about NR SA BCs from the configured candidate BC list. This operation may occur only when an LTE BS (eNB) requests a "eutra" capability.
3. Afterward, the UE removes fallback BCs from the configured candidate BC list. Here, the fallback BC refers to a BC that is obtainable by removing a band corresponding to at least one SCell from a random BC, and may be omitted because the BC before the band corresponding to the at least one SCell being removed may already cover the fallback BC. This operation is also applied in MR-DC, i.e., even to LTE bands. BCs that remain after this operation are a final "candidate BC list".
4. The UE selects BCs to be reported, by selecting BCs being appropriate for a requested RAT type from the final "candidate BC list". In this operation, the UE configures supportedBandCombinationList in a defined order. That is, the UE may configure BCs and UE capability to be reported, in order of preset RAT-types. (nr→eutra-nr→eutra). Also, the UE may configure featureSetCombination for the configured supportedBandCombinationList, and may configure a "candidate feature set combination" list from the candidate BC list from which a list of the fallback BCs (including equal or low-level capability) is removed. The "candidate feature set combinations" include all feature set combinations for NR and EUTRA-NR BCs, and may be obtained from feature set combinations of UE-NR-Capabilities and UE-MRDC-Capabilities containers.

5. Also, if the requested RAT type is eutra-nr and has an impact on the list, featureSetCombinations are all included in both two containers that are the UE-MRDC-Capabilities and UE-NR-Capabilities. However, a feature set of NR is included only in UE-NR-Capabilities.

After the UE capability is configured, the UE transmits, to the BS, a UE capability information message including the UE capability. The BS performs scheduling and transmission/reception management appropriate for the UE, based on the UE capability received from the UE.

[Associated with CA/DC]

Figure 18:
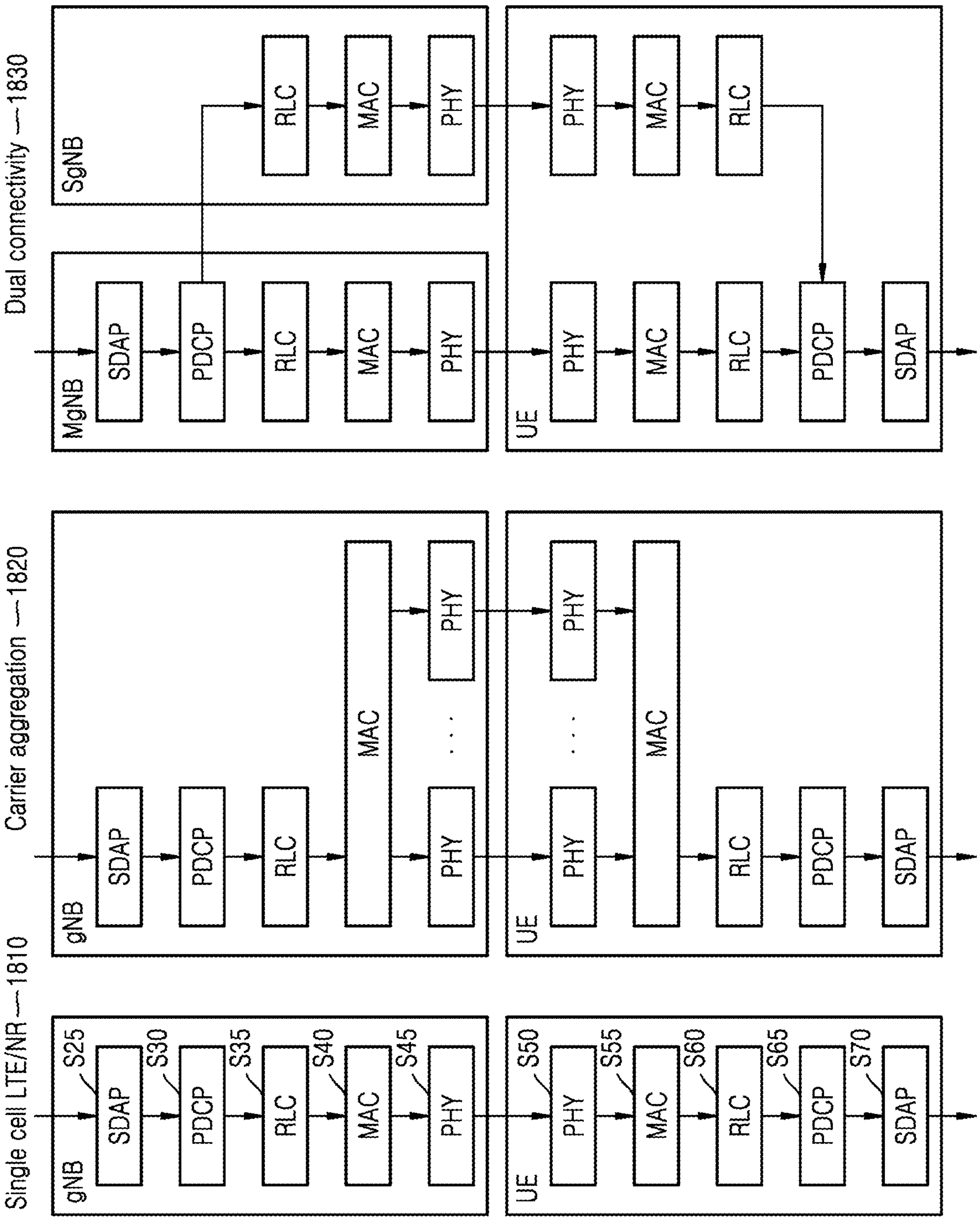
FIG. 18 illustrates a diagram of radio protocol architecture of a BS and a UE in situations of a single cell, carrier aggregation and dual connectivity according to an embodiment of the disclosure.

FIG. 18 illustrates a diagram of radio protocol architecture of a BS and a UE in situations of a single cell 1810, carrier aggregation 1820 and dual connectivity 1830 according to an embodiment of the disclosure.

Referring to FIG. 18, a radio protocol of a next generation wireless communication system may include, in each of the UE and the NR BS, an NR service data adaptation protocol (NR SDAP) layer S25 or S70, an NR packet data convergence protocol (NR PDCP) layer S30 or S65, an NR radio link control (NR RLC) layer S35 or S60, and an NR medium access control (NR MAC) layer S40 or S55. In descriptions below, each layer entity may be understood as a functional block that handles its corresponding layer.

Main functions of the NR SDAP layer S25 or S70 may include some of the following functions.

Transfer of user plane data

Mapping between a quality of service (QoS) flow and a data radio bearer (DRB) for both DL and UL Marking QoS flow ID in both DL and UL packets Reflective QoS flow to DRB mapping for the UL SDAP protocol data units (PDUs).

With respect to the SDAP layer entity, information about whether to use a header of the SDAP layer entity or to use functions of the SDAP layer entity may be configured for the UE by using a RRC message per PDCP layer entity, per bearer, or per logical channel. When the SDAP header is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. QoS information may be used as data processing priority information or scheduling information for seamlessly supporting a service.

Main functions of the NR PDCP layer S30 or S65 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer service data units (SDUs)

Retransmission of PDCP SDUs

Ciphering and deciphering

Timer-based SDU discard in uplink.

In the above descriptions, the reordering function of the NR PDCP entity may indicate a function of reordering PDCP PDUs received from a lower layer, on a PDCP sequence number (SN) basis, and may include a function of delivering the reordered data to an upper layer in order. Alternatively, the reordering function of the NR PDCP entity may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer S35 or S60 may include some of the following functions.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above descriptions, the in-sequence delivery function of the NR RLC entity indicates a function of delivering RLC SDUs received from a lower layer to an upper layer in order. When a plurality of RLC SDUs segmented from one RLC SDU are received, the in-sequence delivery function of the NR RLC entity may include a function of reassembling the RLC SDUs and delivering the reassembled RLC SDU, a function of reordering received RLC PDUs on a RLC SN or PDCP SN basis, a function of recording missing RLC PDUs by reordering the received RLC PDUs, a function of reporting status information of the missing RLC PDUs to a transmitter, and a function of requesting to retransmit the missing RLC PDUs. The in-sequence delivery function of the NR RLC entity may include a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a certain timer expires. Alternatively, the in-sequence delivery function of the NR RLC entity may include a function of delivering all RLC SDUs received so far, to an upper layer in order although a missing RLC SDU exists when a certain timer expires. The NR RLC entity may process the RLC PDUs in order of reception and deliver the RLC PDUs to the NR PDCP entity (regardless of SNs (out-of-sequence delivery)), and when a segment is received, the NR RLC entity may reassemble the segment with other segments stored in a buffer or to be subsequently received, into a whole RLC PDU and may process and deliver the RLC PDU to the NR PDCP entity. The NR RLC layer may not have a concatenation function, and the concatenation function may be performed by the NR MAC layer or be substituted with a multiplexing function of the NR MAC layer.

In the descriptions above, the out-of-sequence delivery function of the NR RLC entity may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer S40 or S55 may be connected to a plurality of NR RLC layer entities configured for one UE, and main functions of the NR MAC layer S40 or S55 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer S45 or S50 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

The radio protocol architecture may be variously changed according to carrier (or cell) operation schemes. For example, when the BS transmits data to the UE on a single carrier (or cell), the BS and the UE use protocol architecture having a single structure for each layer, as shown in reference numeral 1810 of FIG. 18. On the other hand, when the BS transmits data to the UE based on a CA in which multiple carriers are used at a single transmission and reception point (TRP), the BS and the UE use protocol architecture having a single structure up to the RLC layer, in which the PHY layer is multiplexed via the MAC layer, as shown in reference numeral 1820. In another example, when the BS transmits data to the UE based on a dual connectivity (DC) in which multiple carriers are used at multiple TRPs, the BS and the UE use protocol architecture having a single structure up to the RLC layer, in which the PHY layer is multiplexed via the MAC layer, as shown in reference numeral 1830.

Referring to the above descriptions associated with PDCCH and beam configuration, the current Rel-15 and Rel-16 NR do not support PDCCH repetitive transmission, such that it is difficult to obtain required reliability in a scenario such as URLLC that requires high reliability. The disclosure provides a PDCCH repetitive transmission method via multiple TRP points, thereby improving PDCCH reception reliability of the UE. Particular methods will now be described in embodiments below.

The disclosure may be applied to at least one of a frequency division duplex (FDD) system or a time division duplex (TDD) system. However, this is merely an example, and the disclosure may also be applied to a cross division duplex system in which the FDD and TDD systems are combined. In the following descriptions, high signaling (or higher layer signaling) may indicate a method by which the BS transmits a signal to the UE by using a DL data channel of the physical layer or by which the UE transmits a signal to the BS by using a UL data channel of the physical layer, and may be referred to as RRC signaling, PDCP signaling, or an MAC CE.

Hereinafter, in the disclosure, when the UE determines whether to apply the cooperative communication, the UE may use various methods in which PDCCH(s) that allocates a PDSCH, to which the cooperative communication is applied, has a particular format, PDCCH(s) that allocates a PDSCH, to which the cooperative communication is applied, includes a particular indicator to indicate whether the cooperative communication is applied, PDCCH(s) that allocates a PDSCH, to which the cooperative communication is applied, is scrambled by a particular RNTI, or application of the cooperative communication is assumed in a particular section indicated by a higher layer. For convenience of description, a case in which the UE receives the PDSCH to which the cooperative communication is applied based on conditions similar to those as described above will now be referred to as a non-coherent joint transmission (NC-JT) case.

Hereinafter, in the disclosure, determining priorities between A and B may refer to selecting one of A and B which has a higher priority according to a preset priority rule and performing an operation corresponding thereto or omitting or dropping an operation for the other one having a lower priority.

Hereinafter, in the disclosure, the above examples will now be described in several embodiments, but the examples are not independent and one or more embodiments may be applied simultaneously or in combination.

[Associated with NC-JT]

According to an embodiment of the disclosure, the NC-JT may be used for the UE to receive a PDSCH from a plurality of TRPs.

Unlike the legacy communication system, the 5G wireless communication system may support not only services requiring high data rate but may also support both services having very short latency and services requiring a high connection density. In a wireless communication network including multiple cells, TRPs, or beams, cooperative communication between the respective cells, TRPs and/or beams may satisfy various service requirements by increasing strength of a signal received by the UE or efficiently performing control on interference between the respective cells, TRPs and/or beams.

JT is a representative transmission technology for the cooperative communication, and is a technology for increasing strength or throughput of a signal, which received by the UE, by transmitting the signal to one UE via many different cells, TRPs or/and beams. Here, properties of respective channels between the cells, TRPs and/or beams and the UE may significantly differ, and in particular, for NC-JT that supports non-coherent precoding between the cells, the TRPs and/or the beams, individual precoding, MCS, resource allocation, TCI indication, and the like may be required according to a channel property for each link between the cells, the TRPs and/or the beams and the UE.

The NC-JT transmission described above may be applied to at least one of a DL data channel (e.g., PDSCH), a DL control channel (e.g., PDCCH), a UL data channel (e.g., PUSCH), or a UL control channel (e.g., PUCCH). In PDSCH transmission, transmission information such as precoding, MCS, resource allocation, TCI, and the like is indicated by DL DCI, and for NC-JT transmission, the transmission information has to be independently indicated for each cell, TRP and/or beam. The independent indication may be a main cause of an increase in payload required for transmission of the DL DCI, and may have a negative impact on reception performance for a PDCCH that transmits the DCI. Therefore, in order to support JT of the PDSCH, it is required for NC-JT transmission that a tradeoff between an amount of DCI information and control information reception performance shall be carefully designed.

Figure 19:
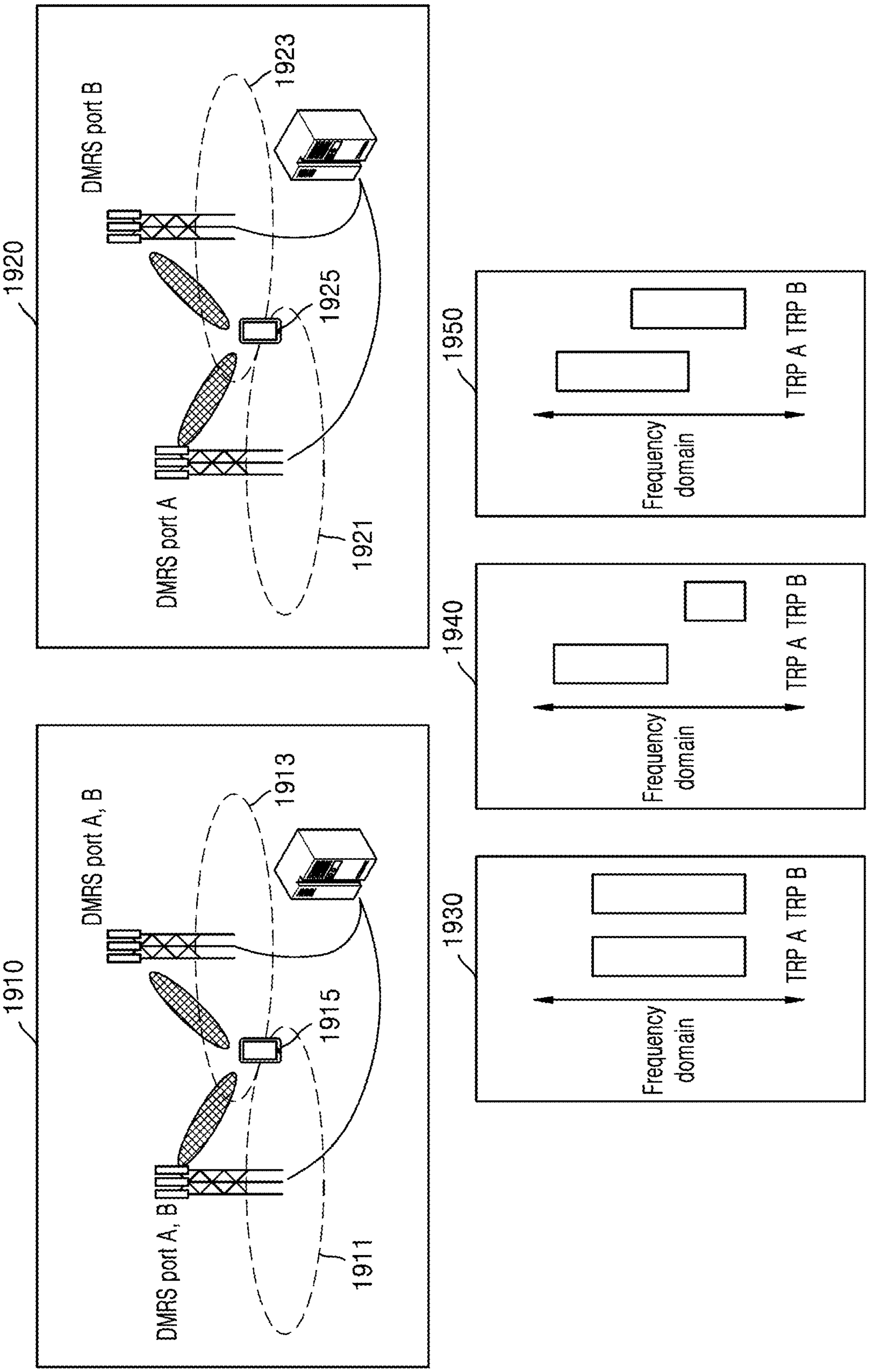
FIG. 19 illustrates a diagram of antenna port configuration and resource allocation for cooperative communication in a wireless communication system according to an embodiment of the disclosure.

FIG. 19 illustrates a diagram of antenna port configuration and resource allocation for transmitting a PDSCH by using cooperative communication in a wireless communication system according to an embodiment of the disclosure.

Referring to FIG. 19, an example of PDSCH transmission in each JT scheme will now be described and examples for allocating radio resources for each TRP are illustrated.

Referring to FIG. 19, an example 1910 of coherent joint transmission (C-JT) that supports coherent precoding between respective cells, TRPs and/or beams is shown.

For the C-JT, TRP A 1911 and TRP B 1913 transmit single data (PDSCH) to a UE 1915, and joint precoding may be performed at the multiple TRPs. This may mean that a DMRS is transmitted via the same DMRS ports TRP A 1911 and TRP B 1913 to transmit a same PDSCH. For example, TRP A 1911 and TRP B 1913 may transmit a DMRS to the UE via DMRS port A and DMRS port B, respectively. In this case, the UE may receive one DCI information so as to receive one PDSCH demodulated based on the DMRS transmitted via the DMRS ports A and B.

Referring to FIG. 19, an example 1920 of NC-JT that supports non-coherent precoding between the respective cells, TRPs and/or beams for PDSCH transmission is shown. This may indicate that DMRSs are transmitted via different DMRS ports for TRP A 1921 and TRP B 1923 to transmit different PDSCHs. For example, TRP A 1921 may transmit a DMRS to a UE 1925 via DMRS port A, and TRP B 1923 may transmit a DMRS to the UE 1925 via DMRS port B. A UE may receive DCI information to receive PDSCHs demodulated based on DMRSs respectively transmitted via DMRS port A and DMRS port B.

In a case of NC-JT, a PDSCH may be transmitted to a UE for each cell, TRP and/or beam, and individual precoding may be applied to each PDSCH. Each cell, TRP and/or beam transmits a different PDSCH or a different PDSCH layer to the UE, such that throughput may be improved compared to singe cell, TRP and/or beam transmission. Also, each cell, TRP and/or beam repetitively transmits the same PDSCH to the UE, such that reliability may be improved compared to singe cell, TRP and/or beam transmission. For convenience of description, a cell, TRP and/or beam will be collectively called a TRP.

In the example of FIG. 19, various radio resource allocations such as a case where frequency and time resources used for PDSCH transmission at the multiple TRPs are the same in 1930, a case where frequency and time resources used for PDSCH transmission at the multiple TRPs do not overlap each other in 1940, and a case where some of frequency and time resources used at the multiple TRPs overlap each other in 1950 may be considered.

In order to simultaneously allocate a plurality of PDSCHs to one UE so as to support NC-JT, various forms, structures, and relations of DCI may be considered.

Figure 20:
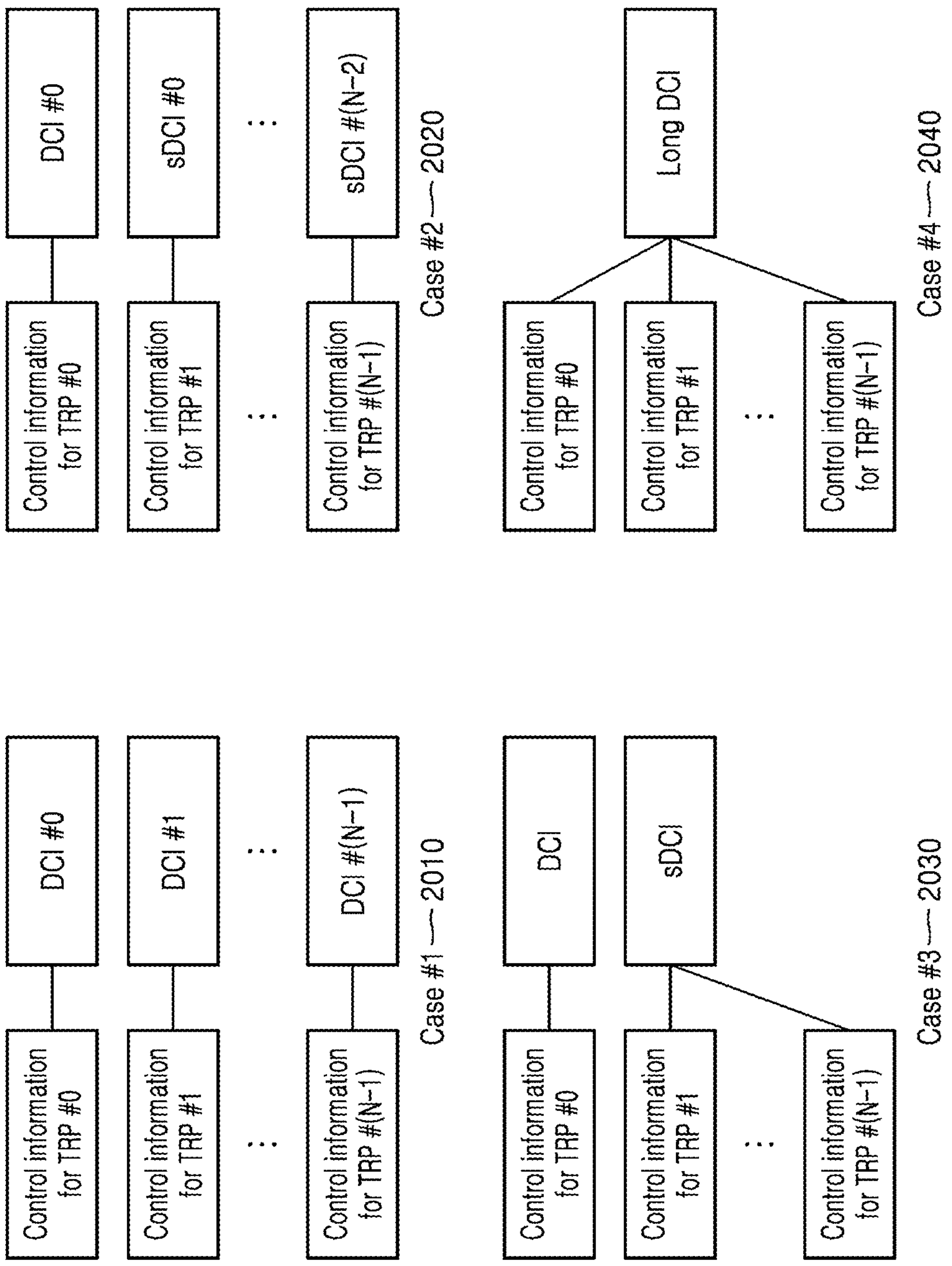
FIG. 20 illustrates a diagram of an example of configuration of downlink control information (DCI) for cooperative communication in a wireless communication system according to an embodiment of the disclosure.

FIG. 20 illustrates-a diagram of an example of configuration of DCI for NC-JT where TRPs transmit different PDSCHs or different PDSCH layers to the UE in a wireless communication system according to an embodiment of the disclosure.

Referring to FIG. 20, case #1 2010 shows a case where N−1 different PDSCHs are transmitted from additional N−1 TRPs (TRP #1 to TRP #(N−1)) in addition to a serving TRP (TRP #0) used in single PDSCH transmission, in which control information for the PDSCHs transmitted from the additional N−1 TRPs is transmitted independently from control information for the PDSCH transmitted from the serving TRP. That is, the UE may obtain the control information for the PDSCHs transmitted from different TRPs (TRP #0 to TRP #(N−1)) by a plurality of pieces of separate DCI (DCI #0 to DCI #(N−1)). Formats of the plurality of pieces of separate DCI may be equal to or different from each other, and payloads of the plurality of pieces of separate DCI may also be equal to or different from each other. In case #1 2010 described above, degrees of freedom of each PDSCH control or allocation may be fully ensured, but when each DCI is transmitted from different TRPs, the reception performance may deteriorate due to a coverage difference between the plurality of pieces of separate DCI.

Case #2 2020 shows a case where N−1 different PDSCHs are transmitted from additional N−1 TRPs (TRP #1 to TRP #(N−1) in addition to a serving TRP (TRP #0) used in single PDSCH transmission, in which a plurality of pieces of control information (DCI) for the PDSCHs of the additional N−1 TRPs are transmitted and each of the plurality of pieces of DCI (sDCI #0 to sDCI #(N−2)) is dependent on the control information (DCI #0) for the PDSCH transmitted from the serving TRP.

For example, DCI #0 that is control information for the PDSCH transmitted from the serving TRP (TRP #0) includes all information elements of DCI format 1_0, DCI format 1_1, and DCI format 1_2, but shortened DCI (hereinafter sDCI) (sDCI #0 to sDCI #(N−2)) that is control information for the PDSCHs transmitted from the cooperative TRPs (TRP #1 to TRP #(N−1)) may include only some of the information elements of DCI format 1_0, DCI format 1_1, and DCI format 1_2. Therefore, as the sDCI for transmission of the control information for the PDSCHs transmitted from the cooperative TRPs has a small payload compared to normal DCI (nDCI) for transmission of control information associated with the PDSCH transmitted from the serving TRP, the sDCI may include reserved bits compared to the nDCI.

In case #2 2020 described above, the degree of freedom of each PDSCH control or allocation may be limited depending on content of the information element included in the sDCI, but, as reception performance for the sDCI is superior to that of the nDCI, a probability of coverage difference for each DCI may be reduced.

Case #3 2030 of FIG. 20 shows a case where N−1 different PDSCHs are transmitted from additional N−1 TRPs (TRP #1 to TRP #(N−1)) in addition to a serving TRP (TRP #0) used in single PDSCH transmission, in which one control information (sDCI) for the PDSCHs of the additional N−1 TRPs is transmitted and the DCI is dependent on the control information (DCI) for the PDSCH transmitted from the serving TRP.

For example, DCI #0 that is control information for the PDSCH transmitted from the serving TRP (TRP #0) may include all information elements of DCI format 1_0, DCI format 1_1, and DCI format 1_2, and control information for the PDSCHs transmitted from the cooperative TRPs (TRP #1 to TRP #(N−1)) may collect and transmit only some of the information elements of DCI format 1_0, DCI format 1_1, and DCI format 1_2 into ‘secondary’ DCI (sDCI). For example, the sDCI may include at least one of HARQ-related information such as frequency domain resource allocation, time domain resource allocation, an MCS or the like, for the cooperative TRPs. In addition, information that is not included in the sDCI, such as a BWP indicator or a carrier indicator, may follow the DCI (DCI #0, normal DCI, and nDCI) of the serving TRP.

Case #3 2030 of FIG. 20 may have a limited degree of freedom of each PDSCH control or allocation depending on content of an information element included in the sDCI, but may control sDCI reception performance and have reduced complexity of DCI blind decoding of the UE compared to case #1 2010 or case #2 2020.

Case #4 2040 of FIG. 20 shows a case where N−1 different PDSCHs are transmitted from additional N−1 TRPs (TRP #1 to TRP #(N−1)) in addition to a serving TRP, TRP #0 used for single PDSCH transmission, in which control information for the PDSCHs transmitted from the additional N−1 TRPs is transmitted in the same DCI (long DCI) as the control information for the PDSCH transmitted from the serving TRP. That is, the UE may obtain the control information for the PDSCHs transmitted from the different TRPs (TRP #0 to TRP #(N−1)) by single DCI. In case #4 2040, DCI blind decoding complexity of the UE may not increase, but a degree of freedom of PDSCH control or allocation may be decreased such as the number of cooperative TRPs being limited due to limitations on the long DCI payload.

In the descriptions and embodiments below of the disclosure, sDCI may refer to various auxiliary DCI such as shortened DCI, secondary DCI, or normal DCI (with DCI formats 1_0 to 1_1 described above) including control information of a PDSCH transmitted from a cooperative TRP, and the descriptions thereof may be similarly applied to the various auxiliary DCI unless otherwise specified.

In the descriptions and embodiments below of the disclosure, the above case #1 2010, case #2 2020, and case #3 2030 in which one or more pieces of DCI (PDCCHs) are used to support NC-JT may be classified as multiple-PDCCH-based NC-JT, and the case #4 2040 in which single DCI (a PDCCH) is used to support NC-JT may be classified as single-PDCCH-based NC-JT. In the multiple-PDCCH based PDSCH transmission, a CORESET in which the DCI of the serving TRP (TRP #0) is scheduled may be distinguished from CORESETs in which the DCI of the cooperative TRPs (TRP #1 to TRP #(N−1)) is scheduled. As a method of distinguishing between CORESETs, there may be a method of distinguishing between CORESETs by an upper layer indicator for each CORESET, a method of distinguishing between CORESETs through beam configuration for each CORESET, or the like. Furthermore, in the single-PDCCH based NC-JT, single DCI does not schedule a plurality of PDSCHs but schedules a single PDSCH having a plurality of layers, and the plurality of layers may be transmitted from multiple TRPs. Here, a connection relation between a layer and a TRP to transmit the layer may be indicated by TCI for the layer.

In embodiments of the disclosure, the term "cooperative TRP" may be substituted with various terms including a "cooperative panel" or a "cooperative beam" when actually applied.

In embodiments of the disclosure, the expression that "NC-JT is applied" is used for convenience of description, but it may be variously interpreted based on the context such as "the UE simultaneously receives one or more PDSCHs on one BWP", "the UE simultaneously receives PDSCHs on one BWP based on two or more TCI indication", "a PDSCH received by the UE is associated with one or more DMRS port group", or the like.

In the disclosure, radio protocol architecture for NC-JT may be variously used according to TRP usage scenarios. For example, when there is no or small backhaul delay between cooperative TRPs, a structure based on MAC layer multiplexing similar to what is shown in reference numeral 1820 of FIG. 18 may be used (CA-like method). On the other hand, when there is a backhaul delay between cooperative TRPs, the delay being significantly large that cannot be ignored (e.g., when 2 ms or more time is required to exchange information such as CSI, scheduling, HARQ-ACK, or the like between the cooperative TRPs), an independent structure for each TRP from the RLC layer which is similar to reference numeral 1830 of FIG. 18 may be used to secure robustness to delay (DC-like method).

A UE that supports C-JT/NC-JT may receive C-JT/NC-JT related parameters or setting values from higher layer configuration, and may set RRC parameters based on this. For the higher layer configuration, the UE may use a UE capability parameter, e.g., tci-StatePDSCH. Here, the UE capability parameter, e.g., tci-StatePDSCH, may define TCI states for PDSCH transmission, and the number of TCI states may be configured to 4, 8, 16, 32, 64, or 128 in FR1 and 64 or 128 in FR2, and among the configured numbers, up to 8 states being indicatable in 3 bits of a TCI field of DCI may be configured in an MAC CE message. The maximum value of 128 refers to a value indicated by maxNumberConfiguredTCIstatesPerCC in parameter tci-StatePDSCH included in capability signaling of the UE. In this manner, a series of configuration processes from higher layer configuration to MAC CE configuration may be applied to a beamforming indication or beamforming switching command for at least one PDSCH at one TRP.

[Multi-DCI Based Multi-TRP]

As an embodiment of the disclosure, the multi-DCI based multi-TRP transmission method will now be described. The multi-DCI based multi-TRP transmission method may include an operation of configuring a DL control channel for multi-PDCCH based NC-JT transmission.

In transmission of DCI for PDSCH scheduling of each TRP, The multi-PDCCH based NC-JT may have a CORESET or a search space distinguished for each TRP. The CORESET or search space for each TRP may be configured as at least one of cases below.

- Higher layer index configuration for each CORESET: CORESET configuration information configured by a higher layer may include an index value, and a TRP that transmits the PDCCH in the configured CORESET may be identified by the index value for the configured CORESET. That is, in a set of CORESETs having a same higher layer index value, it may be assumed that a same TRP transmits a PDCCH or a PDCCH scheduling a PDSCH of the same TRP is transmitted. The index for each CORESET may be called CORESETPoolIndex, and it may be assumed that a PDCCH is transmitted from the same TRP for CORESETs for which the same CORESETPoolIndex value is configured. For a CORESET for which a CORESETPoolIndex value is not configured, it may be assumed that a default value of CORESETPoolIndex is configured, and the default value may be 0.
- In the disclosure, when each of a plurality of CORESETs included in PDCCH-Config that is higher layer signaling has more than one type of CORESETPoolIndex, i.e., when CORESETPoolIndex varies for each CORESET, the UE may assume that the BS may use the multi-DCI based multi-TRP transmission method.
- In contrast to this method, in the disclosure, when each of a plurality of CORESETs included in PDCCH-Config that is higher layer signaling has one type of CORESETPoolIndex, i.e., when all the CORESETs have the same CORESETPoolIndex of 0 or 1, the UE may assume that the BS performs transmission by using single TRP, instead of using the multi-DCI based multi-TRP transmission method.

Multiple PDCCH-Config configuration: Multiple PDCCH-Configs are configured in one BWP, and each PDCCH-Config may include PDCCH configuration for each TRP. That is, one PDCCH-Config may be configured with a CORESET list for each TRP and/or a search space list for each TRP, and one or more CORESETs and one or more search spaces included in one PDCCH-Config may be regarded to correspond to a particular TRP.

CORESET beam/beam group configuration: a TRP corresponding to a CORESET may be identified based on a beam or beam group configured for each CORESET. For example, when a same TCI state is configured for a plurality of CORESETs, it may be assumed that the CORESETs are transmitted at the same TRP or a PDCCH scheduling a PDSCH of the same TRP is transmitted in the CORESET.

Search space beam/beam group configuration: a beam or beam group is configured for each search space, and by doing so, a TRP for each search space may be identified. For example, when a same beam/beam group or TCI state is configured for a plurality of search spaces, it may be assumed that the same TRP transmits a PDCCH in the search space or a PDCCH scheduling a PDSCH of the same TRP is transmitted in the search space.

By identifying the CORESET or search space for each TRP, classification of PDSCH and HARQ-ACK information for each TRP may be possible, such that it is possible to generate separate HARQ-ACK codebook and to use separate PUCCH resource for each TRP.

The above configuration may be independent for each cell or each BWP. For example, two different CORESETPoolIndex values may be configured for a PCell, but a CORESETPoolIndex value may not be configured for in a particular SCell. In this case, it may be assumed that NC-JT transmission is configured for the PCell and is not configured for the SCell for which the CORESETPoolIndex value is not configured.

Figure 21:
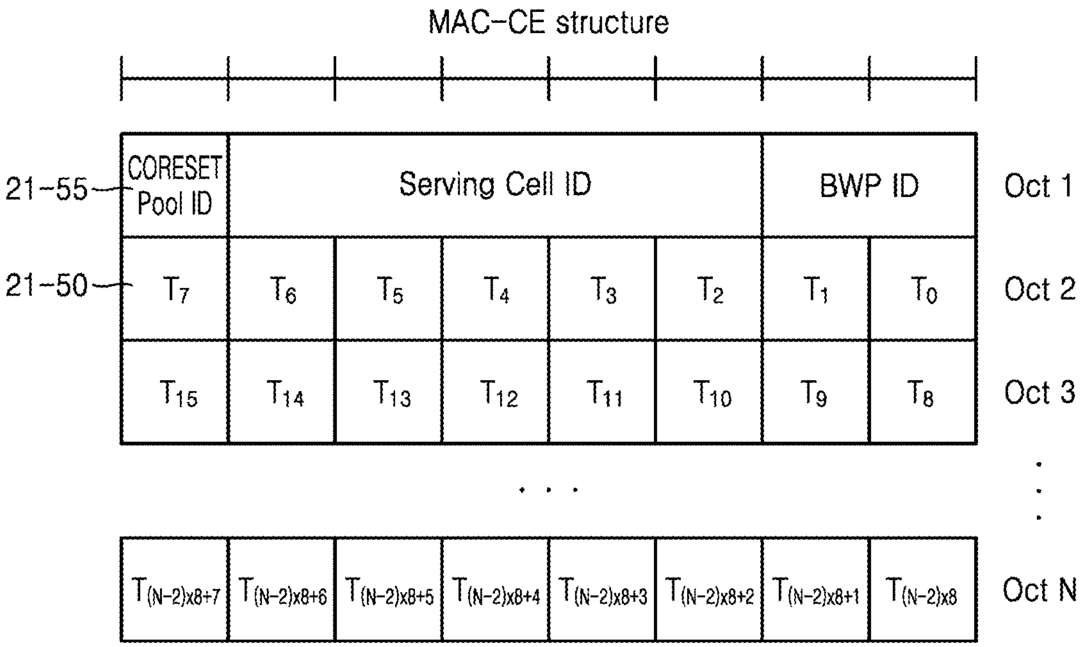
FIG. 21 illustrates a diagram for describing a MAC CE for activation of a beam for a PDSCH according to an embodiment of the disclosure.

A PDSCH TCI state activation/deactivation MAC CE that is applicable to the multi-DCI based multi-TRP transmission method may follow the configuration related to FIG. 21. Here, meanings and configurable values of each field in the MAC CE are as described below.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CEapplies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells.

$T_i$: if there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined -continued by its ordinal position among all the TCI States with Ti field set to 1, i.e. the final TCI State with $T_i$ field set to 1 shall be mapped to the codepoint value 0, second TCI State with Ti field set to 1 shall be mapped to the codepoint value 1 and so on. The maximum number of activated TCI states is 8;

CORESET Pool ID: This field indicates that mapping between the activated TCI states and the codepoint of the DCI Transmission Configuration Indication set by field Ti is specified to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 0. If the coresetPoolIndex is not configured for any CORESET. MAC entity shall ignore the CORESET Pool ID field in this MAC CE when receiving the MAC CE. If the Serving Cell in the MAC CE is configured in a cell that contains more than one Serving Cell, the CORESET Pool ID field shall be ignored when receiving the MAC CE.

If the UE is not configured with CORESETPoolIndex for each of CORESETs in PDCCH-Config that is higher layer signaling, the UE may ignore a CORESET Pool ID field 21-55 in the MAC CE 21-50. If the UE may support the multi-DCI based multi-TRP transmission method, i.e., if the UE is configured with a different CORESETPoolIndex for each CORESET in PDCCH-Config that is higher layer signaling, the UE may activate a TCI state in DCI included in the PDCCH transmitted in CORESETs having a same value of CORESETPoolIndex as the value of the CORESET pool ID field 21-55 in the MAC CE 21-50. For example, when the CORESET Pool ID field 21-55 in the MAC CE 21-50 has a value of 0, a TCI state in DCI included in the PDCCH transmitted in CORESETs having CORESETPoolIndex of 0 may follow activation information of the MAC CE 21-50.

When the UE is configured by the BS to use the multi-DCI based multi-TRP transmission method, i.e., when there may be more than one type of CORESETPoolIndex for each of the plurality of CORESETs included in PDCCH-Config that is higher layer signaling or each CORESET has a different CORESETPoolIndex, the UE may detect that, for PDSCHs scheduled from the PDCCH in each CORESET having two different values of CORESETPoolIndex, restrictions exist as described below.

1) If PDSCHs indicated from PDCCHs in the respective CORESETs having two different values of CORESETPoolIndex are fully or partially overlapped, the UE may apply, to different CDM groups, TCI states indicated by the respective PDCCHs. That is, two or more TCI states may not be applied to one CDM group.
2) When PDSCHs indicated from PDCCHs in the respective CORESETs having two different values of CORESETPoolIndex are fully or partially overlapped, the UE may expect that the number of actual front loaded DMRS symbols, the number of actual additional DMRS symbols, a position of an actual DMRS symbol, and a DMRS type are not different for each PDSCH.
3) The UE may expect that BWPs indicated from PDCCHs in respective CORESETs having two different values of CORESETPoolIndex are the same and SCSs are also the same.
4) The UE may expect that information about PDSCHs scheduled from PDCCHs in the respective CORESETs having two different values of CORESETPoolIndex is fully included in the respective PDCCHs.

[Single-DCI Based Multi-TRP]

As an embodiment of the disclosure, the single-DCI based multi-TRP transmission method will now be described. The single-DCI based multi-TRP transmission method may include configuring a DL control channel for single-PDCCH based NC-JT transmission.

In the single-DCI based multi-TRP transmission method, PDSCHs transmitted by a plurality of TRPs may be scheduled in one DCI. Here, in order to indicate the number of TRPs that transmit the PDSCHs, the number of TCI states may be used. That is, when the number of TCI states indicated in DCI that schedules the PDSCH is two, it may be assumed as the single-PDCCH based NC-JT transmission, and when the number of TCI states is one, it may be assumed as the single-TRP transmission. TCI states indicated in the DCI may correspond to one or two TCI states among TCI states activated by an MAC CE. When the TCI states of the DCI correspond to two TCI states activated by an MAC CE, a correspondence relation is obtained between a TCI codepoint indicated by the DCI and the TCI states activated by the MAC CE, and the TCI states activated by the MAC CE corresponding to the TCI codepoint may be two.

In another example, if at least one codepoint among all codepoints of the TCI state fields in the DCI indicates two TCI states, the UE may assume that the BS can perform transmission based on the single-DCI based multi-TRP method. Here, at least one codepoint indicating two TCI states in the TCI state field may be activated by an Enhanced PDSCH TCI state activation/deactivation MAC CE.

Figure 22:
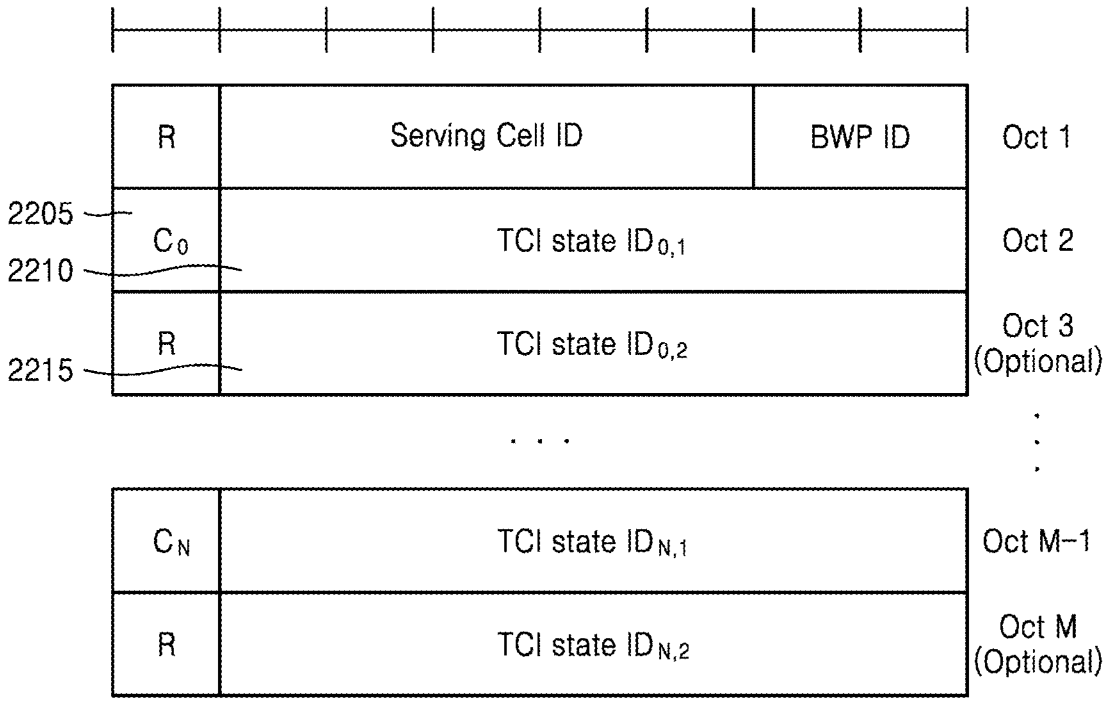
FIG. 22 illustrates a diagram of a structure of an Enhanced PDSCH TCI state activation/deactivation MAC CE according to an embodiment of the disclosure.

FIG. 22 illustrates a diagram of a structure of an Enhanced PDSCH TCI state activation/deactivation MAC CE. Meanings and configurable values of each field in the MAC CE are as described below.

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9] The length of the BWP ID field is 2 bits;

$C_i$: This field indicates whether the octet containing TCI state $ID_{i,2}$ is present. If this field is set to "1". the octet containing TCI state $ID_{i,2}$ is present. If this field is set to "0" the octet containing TCI state $ID_{i,2}$ is not present;

-continued

TCI state $ID_{i,j}$: This field indicates the TCI state identified by TCI-StateId as specified in TS 38.331 [5], where i is the index of the codepoint of the DCI Transmission configuration indication field as specified in TS 38.212 [5] and TCI state $ID_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the Ci field. The maximum number of activated TCI codepaint is B and the maximum number of TCI states mapped to a TCI codepoint is 2.

R: Reserved bit, set to "0".

In FIG. 22, when a value of $C_0$ field 2205 is 1, a MAC CE corresponding thereto may include TCI state $ID_{0,2}$ field 2215 in addition to TCI state $ID_{0,1}$ field 2210. This means that TCI state $ID_{0,1}$ and TCI state $ID_{0,2}$ are activated for 0th codepoint of a TCI state field included in DCI, and when the BS indicates the corresponding codepoint to the UE, the UE may receive an indication of two TCI states. If a value of $C_0$ field 2205 is 0, a MAC CE corresponding thereto cannot include the TCI state $ID_{0,2}$ field 2215, and this means that one TCI state corresponding to TCI state $ID_{0,1}$ for the 0th codepoint of the TCI state field included in the DCI is activated.

The above configuration may be independent for each cell or each BWP. For example, there may be up to two activated TCI states corresponding to one TCI codepoint in the PCell, but there may be up to one activated TCI state corresponding to one TCI codepoint in a particular SCell. In this case, it may be assumed that NC-JT transmission is configured for the PCell and is not configured for the SCell.

[Single-DCI Based Multi-TRP PDSCH Repetitive Transmission Schemes (TDM/FDM/SDM) Identification Methods]

Hereinafter, a method of identifying a single-DCI based multi-TRP PDSCH repetitive transmission scheme will now be described. The UE may receive, from the BS, an indication of different single-DCI based multi-TRP PDSCH repetitive transmission schemes (e.g., TDM, FDM, and SDM) according to a value indicated by the DCI field and a higher layer signaling configuration. Table 32 below represents a method of distinguishing between single- or multi-TRP based schemes indicated to the UE according to a value of a particular DCI field and the higher layer signaling configuration.

TABLE 32

| comb | Number of TCI states | Number of CDM groups | repetitionNumber configuration and indication condition | repetitionScheme associated configurations | transmission scheme indicated to UE |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TPR SDM |
| 6 | 2 | 2 | Condition 3 | Not configured | Multi-TPR SDM |
| 7 | 2 | 2 | Condition 3 | Configured | Multi-TPR SDM |
| 8 | 2 | 2 | Condition 3 | Configured | Multi-TPR FDM scheme A/FDM scheme B/TDM scheme A |
| 9 | 2 | 2 | Condition 1 | Not configured | Multi-TPR TDM scheme B |

Respective columns of Table 32 above will now be described below.

The number of TCI states (second column): may indicate the number of TCI states indicated by a TCI state field in DCI, and may be one or two.

The number of CDM groups (third column): may indicate the number of different CDM groups of DMRS ports indicated by an antenna port field in the DCI. It may be one, two, or three.

repetitionNumber configuration and indication conditions (fourth column): may have three conditions according to whether repetitionNumber for all TDRA entries that are indicatable by a Time Domain Resource Allocation field in the DCI is configured and whether a TDRA entry that is actually indicated has configuration of repetitionNumber.

Condition 1: Case where at least one of all TDRA entries that are indicatable by a Time Domain Resource Allocation field includes configuration of repetitionNumber, and the TDRA entry indicated by the Time Domain Resource Allocation field in the DCI includes configuration of repetitionNumber greater than 1

Condition 2: Case where at least one of all TDRA entries that are indicatable by a Time Domain Resource Allocation field includes configuration of repetitionNumber, and the TDRA entry indicated by the Time Domain Resource Allocation field in the DCI does not include configuration of repetitionNumber Condition 3: Case where all TDRA entries that are indicatable by a Time Domain Resource Allocation field do not include configuration of repetitionNumber Association with repetitionScheme configuration (fifth column): indicates whether to configure repetitionScheme that is higher layer signaling. repetitionScheme that is higher layer signaling may be configured with one of 'tdmSchemeA', 'fdmSchemeA', and 'fdmSchemeB'.

Transmission scheme indicated to the UE (sixth column): indicates single or multiple TRP schemes indicated according to each combination (first column) represented in Table 32 above.

Single-TRP: indicates single-TRP based PDSCH transmission. If the UE is configured with pdsch-AggegationFactor in PDSCH-config that is higher layer signaling, the UE may receive scheduling of the single-TRP based PDSCH repetitive transmission corresponding to the number of times the UE is configured. Otherwise, the UE may receive scheduling of the single-TRP based PDSCH single transmission.

Single-TRP TDM scheme B: indicates single-TRP based inter-slot time resource division based PDSCH transmission. According to Condition 1 associated with repetitionNumber, the UE repetitively transmits a PDSCH in the time domain by the number of slots corresponding to repetitionNumber greater than 1 configured to the TDRA entry indicated by the Time Domain Resource Allocation field. Here, for each of the slots as many as repetitionNumber, a start symbol and a symbol length of the PDSCH indicated by the TDRA entry are equally applied, and a same TCI state is applied for each PDSCH repetitive transmission. This scheme is similar to a slot aggregation scheme in that inter-slot PDSCH repetitive transmission is performed on a time resource, but is different from the slot aggregation in that whether to indicate repetitive transmission may be dynamically determined based on the Time Domain Resource Allocation field in the DCI.

Multi-TRP SDM: indicates a multi-TRP based spatial resource division PDSCH transmission scheme. It is a method of dividing a layer and receiving them from each TRP, and although the method is not a repetitive transmission scheme but may increase reliability of PDSCH transmission in that transmission may be performed with a decreased coding rate by increasing the number of layers. The UE may receive the PDSCH by respectively applying two TCI states indicated by the TCI state field in the DCI to the two CDM groups indicated from the BS.

Multi-TRP FDM scheme A: indicates a multi-TRP based frequency resource division PDSCH transmission scheme, and this scheme is not repetitive transmission like multi-TRP SDM because it has one PDSCH transmission occasion, but may perform transmit with high reliability by increasing an amount of frequency resource and thus decreasing the coding rate. Multi-TRP FDM scheme A may respectively apply two TCI states indicated by the TCI state field in the DCI to non-overlapping frequency resources. If a PRB bundling size is determined to be wideband, the UE performs reception by applying the first TCI state to first ceil(N/2) RBs and the second TCI state to the remaining floor(N/2) RBs, where N is the number of RBs indicated by the Frequency Domain Resource Allocation field. Here, ceil(.) and floor(.) are operators indicating rounding up and rounding down at a first decimal point. If the PRB bundling size is determined to be 2 or 4, reception is performed by applying the first TCI state to PRGs at even places and applying the second TCI state to PRGs at odd places.

Multi-TRP FDM scheme B: indicates a multi-TRP based frequency resource division PDSCH repetitive transmission scheme, and this scheme has two PDSCH transmission occasions and thus, may repetitively transmit a PDSCH on each occasion. Equally, in regard to the multi-TRP FDM scheme A, the multi-TRP FDM scheme B may respectively apply two TCI states indicated by the TCI state field in the DCI to non-overlapping frequency resources. If a PRB bundling size is determined to be wideband, the UE performs reception by applying the first TCI state to first ceil(N/2) RBs and the second TCI state to the remaining floor(N/2) RBs, where N is the number of RBs indicated by the Frequency Domain Resource Allocation field. Here, ceil(.) and floor(.) are operators indicating rounding up and rounding down at a first decimal point. If the PRB bundling size is determined to be 2 or 4, reception is performed by applying the first TCI state to PRGs at even places and applying the second TCI state to PRGs at odd places.

Multi-TRP TDM scheme A: indicates a multi-TRP based time resource division intra-slot PDSCH repetitive transmission scheme. The UE has two PDSCH transmission occasions in one slot, and the first reception occasion may be determined based on a start symbol and symbol length of a PDSCH indicated by the Time Domain Resource Allocation field in the DCI. A start symbol of the second reception occasion of the PDSCH may be a position after a symbol offset corresponding to StartingSymbolOffsetK that is higher layer signaling from a last symbol of the first transmission occasion, and a transmission occasion may be determined to be as long as the symbol length indicated. If StartingSymbolOffsetK that is higher layer signaling is not configured, the symbol offset may be assumed to be 0.

- Multi-TRP TDM scheme B: indicates a multi-TRP based time resource division inter-slot PDSCH repetitive transmission scheme. The UE may have one PDSCH transmission occasion in one slot, and may receive repetitive transmission based on a start symbol and symbol length of the same PDSCH during slots corresponding to repetitionNumber indicated in the Time Domain Resource Allocation field in the DCI. If repetitionNumber is 2, the UE may receive the PDSCH repetitive transmission in first and second slots by respectively applying first and second TCI states. If repetitionNumber is greater than 2, the UE may use different TCI state application schemes depending on which tciMapping that is higher layer signaling is configured. If tciMapping is configured as cyclicMapping, the first and second TCI states are respectively applied to the first and second PDSCH transmission occasions, and this TCI state application method is equally applied to the remaining PDSCH transmission occasions. If tciMapping is configured as sequenticalMapping, the first TCI state is applied to the first and second PDSCH transmission occasions and the second TCI state is applied to the third and fourth PDSCH transmission occasions, and this TCI state application method is equally applied to the remaining PDSCH transmission occasions.

As described above with reference to a power headroom operation, power headroom (PH) information is calculated in consideration of single TRP, and in PH reporting, a UE calculates one PH information for each activated serving cell and reports it to a BS. However, as PUSCH repetitive transmission in consideration of multiple TRPs is supported in the NR Release 17, the UE may report remaining power for a UL signal being transmitted to each BS. By doing so, the BS may identify remaining power for a UL signal to each TRP, and may use reported PH information so as to perform next UL signal scheduling. Therefore, a method of configuring PH information for each TRP and a new MAC CE format for reporting are required. Also, when PH reporting for each activated serving cell is performed in a CA environment that supports multiple cells, PUSCH repetitive transmission in consideration of multiple TRPs may be supported for a cell to which a MAC CE including PH information is transmitted or other activated serving cell. In the NR Release 15/16, it is defined that PH information of the other activated serving cell is configured, based on an overlapping time point with respect to a PUSCH including a PH report for a cell to which a PH is reported. This is an operation for determining a reference time in which PH information is calculated. However, the reference time may be defined (PH information is configured for a first PUSCH transmission occasion included in a first slot among slots overlapping with a slot including a PUSCH for PH reporting) only for one PUSCH transmission occasion. Therefore, even when an overlapped PUSCH has been repeatedly transmitted according to PUSCH repetitive transmission in consideration of multiple TRPs, PH information only for one TRP is reported to the BS. Therefore, there is a demand for a method of configuring PH information about a PUSCH in consideration of multiple TRPs and reporting the PH information to the BS in a CA environment. In the disclosure, a method of calculating PH information for a serving cell supporting PUSCH repetitive transmission in consideration of multiple TRPs and a method of performing PH reporting in consideration of multiple TRPs in a CA environment will now be described in detail.

For convenience of description, a cell, a panel, a beam and/or a transmission direction, which may be identified by a higher layer/L1 parameter such as a TCI sate or spatial relation information, or an indicator such as a cell ID, TRP ID, panel ID, or the like will now be collectively referred to as a TRP. Therefore, in actual applications, the TRP may be appropriately substituted with one of the terms described above.

Hereinafter, in the disclosure, when the UE determines whether to apply the cooperative communication, the UE may use various methods by which PDCCH(s) that allocates a PDSCH to which the cooperative communication is applied has a particular format, PDCCH(s) that allocates a PDSCH to which the cooperative communication is applied includes a particular indicator to indicate whether the cooperative communication is applied, PDCCH(s) that allocates a PDSCH to which the cooperative communication is applied is scrambled by a particular RNTI, application of the cooperative communication in a particular section indicated by higher layer signaling is assumed, or the like. Hereinafter, for convenience of description, a case in which the UE receives the PDSCH to which the cooperative communication is applied based on conditions similar to those as described above will now be referred to as a NC-JT case.

Hereinafter, in the following description of the disclosure, higher layer signaling may refer to signaling corresponding to at least one or a combination of signaling below.

- MIB
- SIB or SIB X (X=1, 2, . . . )
- RRC
- MAC CE

Also, L1 signaling may refer to signaling corresponding to at least one or a combination of signaling methods using a physical layer channel or signaling below.

- PDCCH
- DCI
- UE-specific DCI
- group common DCI
- common DCI
- scheduling DCI (e.g., DCI used for scheduling DL or UL data)
- non-scheduling DCI (e.g., DCI not used for scheduling DL or UL data)
- PUCCH
- uplink control information (UCI)

Hereinafter, in the disclosure, determining priorities between A and B may refer to selecting one of A and B which has a higher priority according to a preset priority rule and performing an operation corresponding thereto or omitting or dropping an operation for the other one having a lower priority.

Hereinafter, in the disclosure, the above examples will now be described in several embodiments, but the examples are not independent and one or more embodiments may be applied simultaneously or in combination.

First Embodiment: PUSCH Repetitive Transmission in Consideration of Multiple TRPs The first embodiment of the disclosure relates to a method of performing configuration by higher layer signaling and indication by L1 signaling for PUSCH repetitive transmission in consideration of multiple TRPs. PUSCH repetitive transmission in consideration of multiple TRPs may be performed by single- or multi-DCI based indication, and will now be described in a first-1 embodiment and a first-2 embodiment below. Also, in a first-3 embodiment of the disclosure, configured grant PUSCH repetitive transmission in consideration of multiple TRPs will be described. Also, in a first-4 embodiment of the disclosure, a method of configuring an SRS resource set for PUSCH repetitive transmission in consideration of multiple TRPs will be described.

First-1 Embodiment: Single-DCI Based PUSCH Repetitive Transmission in Consideration of Multiple TRPs In the first-1 embodiment as an embodiment of the disclosure, single-DCI based PUSCH repetitive transmission in consideration of multiple TRPs will now be described. A UE may report, via a UE capability report, that single-DCI based PUSCH repetitive transmission in consideration of multiple TRPs is available. A BS may configure by higher layer signaling the UE with which PUSCH repetitive transmission scheme is to be used, the UE having reported its UE capability (e.g., UE capability supporting single-DCI based PUSCH repetitive transmission in consideration of multiple TRPs). Here, higher layer signaling may select and configure one of two types that are PUSCH repetitive transmission type A and PUSCH repetitive transmission type B.

In the 3GPP standard Rel-15/16, both a codebook based transmission scheme and a non-codebook based transmission scheme for PUSCH repetitive transmission in consideration of single TRP are performed based on single DCI. In codebook-based PUSCH repetitive transmission, the UE may apply a same SRI or TPMI value to each PUSCH repetitive transmission by using the SRI or TPMI indicated by single DCI. Also, in non-codebook-based PUSCH repetitive transmission, the UE may apply a same SRI value to each PUSCH repetitive transmission by using the SRI indicated by single DCI. For example, when codebook-based PUSCH transmission and PUSCH repetitive transmission type A are configured by higher layer signaling, and a time resource allocation index where the number of PUSCH repetitive transmissions is set to 4, an SRI index of 0, and a TPMI index of 0 are indicated by DCI, the UE applies all of the SRI index of 0 and the TPMI index of 0 to each of four PUSCH repetitive transmissions. Here, an SRI may be associated with a transmission beam, and a TPMI may be associated with a transmission precoder. Unlike the PUSCH repetitive transmission in consideration of single TRP, PUSCH repetitive transmission in consideration of multiple TRPs may be performed by differently applying a transmission beam and transmission precoder to transmission to each TRP. Therefore, the UE may be indicated a plurality of SRIs or TPMIs by DCI and may perform PUSCH repetitive transmission in consideration of multiple TRPs by applying them to each PUSCH repetitive transmission.

When single-DCI based PUSCH repetitive transmission in consideration of multiple TRPs is indicated to the UE, methods of indicating a plurality of SRIs or TPMIs for a case where a PUSCH transmission scheme is codebook or non-codebook may be considered as described below.

[Method 1] Transmission of Single DCI Including a Plurality of SRI or TPMI Fields In order to support single-DCI based PUSCH repetitive transmission in consideration of multiple TRPs, the BS may transmit DCI including a plurality of SRI or TPMI fields. The DCI may be a new format (e.g., DCI format 0_3) or a legacy format (e.g., DCI format 0_1 or 0_2) configured by additional higher layer signaling (e.g., signaling for identifying whether a plurality of SRI or TPMI fields are supportable), such that, if corresponding configuration exists, it may be DCI where a plurality of SRIs or TPMIs exist, instead of single SRI or TPMI. For example, when codebook-based PUSCH transmission is configured by higher layer signaling, if the UE is configured by higher layer signaling for identifying whether a plurality of SRI or TPMI fields are supportable, the UE may receive a new format DCI or legacy format DCI having two SRI fields and two TPMI fields and may perform codebook-based PUSCH repetitive transmission in consideration of multiple TRPs. As another example, when non-codebook-based PUSCH transmission is configured by higher layer signaling, if the UE is configured by higher layer signaling for identifying whether a plurality of SRI or TPMI fields are supportable, the UE may receive a new format DCI or legacy format DCI having two SRI fields and may perform non-codebook-based PUSCH repetitive transmission in consideration of multiple TRPs. If a plurality of SRI fields are used for all of the codebook or non-codebook based PUSCH transmissions, at least two SRS resource sets for which usage configured by higher layer signaling is configured to codebook or non-codebook may be available, and here, each SRI field may indicate each SRS resource and each SRS resource may be included in different two SRS resource sets. Descriptions of a plurality of SRS resource sets will be provided in detail with reference to the first-4 embodiment below.

[Method 2] Transmission of DCI to which Improved SRI and TPMI Fields are Applied In order to support single-DCI based PUSCH repetitive transmission in consideration of multiple TRPs, the UE may receive, from the BS, a MAC-CE for supporting an improved SRI or TPMI field. The MAC-CE contains information to change interpretation of codepoint of a DCI field to allow a particular codepoint of an SRI field in DCI to indicate a plurality of transmission beams to allow a particular codepoint of a TPMI field to indicate a plurality of transmission precoders. As a method of indicating a plurality of transmission beams, two schemes described below may be considered.

- Reception of MAC-CE to activate a particular codepoint of an SRI field to indicate one SRS resource associated with a plurality of SRS spatial relation infos
- Reception of MAC-CE to activate a particular codepoint of an SRI field to indicate a plurality of SRS resources associated with one SRS spatial relation info When a plurality of SRS resources are indicated by using an improved SRI field, a transmit power control parameter of an SRS resource is configured for each SRS resource set, such that, in order to configure different transmit power control parameters respectively for TPRs, each SRS resource may exist in different SRS resource sets. Accordingly, at least two SRS resource sets for which usage that configured by higher layer signaling is configured to codebook or non-codebook may exist.

First-2 Embodiment: Multi-DCI Based PUSCH Repetitive Transmission in Consideration of Multiple TRPs In the first-2 embodiment as an embodiment of the disclosure, multi-DCI based PUSCH repetitive transmission in consideration of multiple TRPs will now be described. As described above, a PUSCH repetitive transmission method in the 3GPP standard Rel-15/16 is a method performed in consideration of single TRP, and thus, it is possible to use a same value for a transmission beam, a transmission precoder, resource allocation, and power control parameters for all repetitive transmissions. However, in PUSCH repetitive transmission in consideration of multiple TRPs, there is a need to apply different PUSCH transmission-associated parameters to respective TRPs, the parameters being configured by higher layer signaling or indicated by DCI with respect to respective PUSCH repetitive transmissions to multiple TPRs. For example, when there are multiple TRPs in different directions with respect to the UE, a transmission beam or a transmission precoder may vary such that there is a need to configure or indicate a transmission beam or a transmission precoder for each TRP. As another example, when multiple TRPs exist within different ranges from the UE, there is a need for an independent power control scheme between the UE and each TRP, and accordingly, different time/frequency resource allocation may be performed. For example, for a TRP existing in a more remote range compared to a particular TRP, a relatively small number of RBs and a large number of symbols may be allocated to increase power per RE. Therefore, in order to transmit a plurality of pieces of different information, if the different information is transmitted to the UE by single DCI, a bit length of the DCI may be significantly large, and thus, it may be more efficient to indicate PUSCH repetitive transmission to the UE by multiple DCI.

The UE may report, via a UE capability report, that multi-DCI based PUSCH repetitive transmission in consideration of multiple TRPs is available. A BS may indicate the UE to perform PUSCH repetitive transmission in consideration of multiple TRPs by multiple DCIs by using configuration by higher layer signaling, indication by L1 signaling, or configuration and indication via a combination of higher layer signaling and L1 signaling, the UE having reported its UE capability (e.g., UE capability supporting multi-DCI based PUSCH repetitive transmission in consideration of multiple TRPs). The BS may use a method of configuring or indicating multi-DCI based PUSCH repetitive transmission in consideration of multiple TRPs, as described below.

In multi-DCI based PUSCH repetitive transmission in consideration of multiple TRPs, the UE may expect that time/frequency resource allocation method indicated by each DCI in consideration of TRPs within different ranges from the UE may vary. The UE may report to the BS via UE capability as to whether different time/frequency resource allocations are available. The BS may configure, by higher layer signaling, the UE with whether different time/frequency resource allocations are available, and the UE having received the configuration may expect that time/frequency resource allocation information to be indicated by each DCI may vary. Here, the UE may be configured or indicated, by the BS, multi-DCI based PUSCH repetitive transmission in consideration of multiple TRPs, based on higher layer signaling configuration and a condition between a plurality of DCI fields. When the UE is indicated transmission beam and transmission precoder information by the DCI, the UE may first apply an SRI and a TPMI in first-received DCI to a transmission beam mapping method of a second embodiment below, and may secondly apply an SRI and a TPMI in second-received DCI to the transmission beam mapping method of the second embodiment below.

The BS may configure the UE with CORESETPoolIndex that is higher layer signaling for each CORESET, and when the UE receives a certain CORESET, the UE may identify which TRP transmits the corresponding CORESET. For example, when CORESETPoolIndex is set to 0 for CORESET #1 and CORESETPoolIndex is set to 1 for CORESET #2, the UE may identify that CORESET #1 is transmitted from TRP #0 and CORESET #2 is transmitted from TRP #1. Also, when DCI that is transmitted in CORESETs respectively configured with 0 and 1 for CORESETPoolIndex value indicates repetitive PUSCHs, it may be implicitly regarded based on a condition between particular fields in a plurality of DCIs being transmitted. For example, when a HARQ process number field value in a plurality of DCIs transmitted from the BS to the UE is the same and a new data indicator (NDI) field value is the same, the UE may implicitly regard that the plurality of DCIs respectively schedule repetitive PUSCHs, in consideration of multiple TRPs. When the HARQ process number field value is the same and the NDI field value, there may be a limit in reception of the plurality of DCIs. For example, a maximum interval between the plurality of DCIs may be defined to be within a particular number of slots equal to or greater than 1 or a particular number of symbols equal to or greater than 1. Here, the UE may perform PUSCH transmission based on a minimum transport block size calculated (or identified) based on time/frequency resource allocation information being differently indicated in the plurality of DCIs.

First-3 Embodiment: Configured Grant PUSCH Repetitive Transmission in Consideration of Multiple TRPs In the first-3 embodiment as an embodiment of the disclosure, configured grant PUSCH repetitive transmission in consideration of multiple TRPs will now be described. The UE may report, via UE capability, configured grant PUSCH repetitive transmission in consideration of multiple TRPs to the BS. The BS may configure and indicate the UE with configured grant PUSCH repetitive transmission in consideration of multiple TRPs by using various methods below by configuration by higher layer signaling, indication by L1 signaling, or configuration and indication via a combination of higher layer signaling and L1 signaling.

[Method 1] Activation of Single DCI Based Single Configured Grant Configuration

The method 1 involves indicating a plurality of SRIs or TPMIs to the UE based on the single DCI, and activating single configured grant configuration with the indication. A method of indicating a plurality of SRIs or TPMIs by single DCI may follow the method of the first-1 embodiment, and if the UE is configured with only one configured grant configuration, all bits of a HARQ process number field and a redundancy version field in the corresponding DCI may be indicated as 0. If the UE is configured with a plurality of configured grant configurations and one of them is activated by the corresponding DCI, a HARQ process number field in the corresponding DCI may indicate an index of configured grant configuration, and all bits of a redundancy version field may be indicated as 0. The UE may map transmission beams and transmission precoders respectively to activated configured grant PUSCH repetitive transmissions, according to the transmission beam mapping method of the second embodiment below, by using the plurality of SRIs or TPMIs indicated by single DCI.

[Method 2] Activation of Multi-DCI Based Single Configured Grant Configuration

The method 2 involves indicating each SRI or TPMI to the UE by each DCI based on the multiple DCIs, and activating single configured grant configuration with the indication. A method of indicating each SRI or TPMI by each DCI based on the multiple DCIs may follow the method of the first-2 embodiment, and if the UE is configured with only one configured grant configuration, all bits of HARQ process number fields and redundancy version fields in the multiple DCIs may be indicated. as 0. If the UE is configured with a plurality of configured grant configurations and one of them is activated by the corresponding multiple DCIs, all HARQ process number fields in the corresponding multiple DCIs may indicate an index of the same configured grant configuration, and all bits of redundancy version fields in the corresponding multiple DCIs may be indicated as 0. According to a condition of a DCI field in the multi-DCI based PUSCH repetitive transmission, NDI fields as well as the HARQ process number fields may have the same value. The UE may map transmission beams and transmission precoders respectively to activated configured grant PUSCH repetitive transmissions according to the transmission beam mapping method, by using a plurality of SRIs or TPMIs indicated by multiple DCIs. For example, information associated with a transmission beam and transmission precoder indicated by first-received DCI may be SRI #1 and TPMI #1, information associated with a transmission beam and transmission precoder indicated by second-received DCI may be SRI #2 and TPMI #2, and a transmission beam mapping scheme configured by higher layer signaling may be cyclical. In this case, the UE may perform PUSCH transmission by applying SRI #1 and TPMI #1 to odd transmissions (1, 3, 5, . . . ) of the activated configured grant PUSCH repetitive transmission, and applying SRI #2 and TPMI #2 to even transmissions (2, 4, 6, . . . ).

[Method 3] Activation of Multi-DCI Based Multiple Configured Grant Configurations The method 3 involves indicating each SRI or TPMI to the UE by each DCI based on the multiple DCIs, and activating multiple configured grant configurations with the indication. A method of indicating each SRI or TPMI by each DCI based on the multiple DCIs may follow the method of the first-2 embodiment, the UE may be configured with a plurality of configured grant configurations, and an index of each configured grant configuration may be indicated by a HARQ process number field in each DCI. Also, all bits of all redundancy version fields in the corresponding multiple DCIs may be indicated as 0. According to a condition of a DCI field in the multi-DCI based PUSCH repetitive transmission, NDI fields as well as the HARQ process number fields may have the same value. The UE may receive MAC-CE signaling indicating (commanding) connection between a plurality of configured grant configurations activated by multiple DCIs. After the UE performs HARQ-ACK transmission with respect to MAC-CE signaling, e.g., after 3 ms, the UE may receive multiple DCIs from the BS, and if configured grant configuration indices indicated by respective DCIs match with configured grant configuration indices indicated (commanded) for connection by the MAC-CE signaling, the UE may perform PUSCH repetitive transmission in consideration of multiple TRPs based on the indicated configured grant configurations. Here, some configurations may be shared as a same value among the connected plurality of configured grant configurations. For example, repK that is higher layer signaling indicating the number of repetitive transmissions, repK-RV that is higher layer signaling indicating an order of a redundancy version in repetitive transmissions, and periodicity that is higher layer signaling indicating periodicity of repetitive transmissions may be configured to have the same value in connected configured grant configurations.

First-4 Embodiment: Method of Configuring SRS Resource Set for PUSCH Repetitive Transmission in Consideration of Multiple TRPs In the first-4 embodiment as an embodiment of the disclosure, a method of configuring an SRS resource set for PUSCH repetitive transmission in consideration of multiple TRPs will now be described. A power control parameter (e.g., alpha, p0, pathlossReferenceRS, srs-PowerControlAjdustmentStates, or the like which may be configured by higher layer signaling) may vary for each SRS resource set, and thus, the number of SRS resource sets may be increased by 2 or more to differ power control of the SRS for each TRP in PUSCH repetitive transmission in consideration of multiple TRPs, and different SRS resource sets may be used to support different TRPs. The method of configuring an SRS resource set considered in the present embodiment may be applied to the first-1 to first-3 embodiments. Basic descriptions of power control parameters of an SRS may be referred to the 3GPP standard TS 38.331.

In single-DCI based PUSCH repetitive transmission in consideration of multiple TRPs, a plurality of SRIs indicated by single DCI may be selected from among SRS resources existing in different SRS resource sets. For example, when two SRIs are indicated by single DCI, a first SRI may be selected from SRS resource set #1 and a second SRI may be selected from resource set #2.

In multi-DCI based PUSCH repetitive transmission in consideration of multiple TRPs, SRIs respectively indicated by two DCIs may be selected from SRS resources existing in different SRS resource sets, and the SRS resource sets may be explicitly or implicitly connected (may correspond) to higher layer signaling (e.g., CORESETPoolIndex) indicating TRPs. As an explicit connection method, there may be a method of notifying, to the UE, a semi-static connection state between a CORESET and an SRS resource set by configuring CORESETPoolIndex value in configuration of an SRS resource set which is configured to a higher layer. As another example, as a dynamic explicit connection method, there may be a method of using a MAC-CE to activate connection between a particular CORESET (including both a case where CORESETPoolIndex value is set to 0 or 1 and a case where it is not set) and an SRS resource set. After an elapse of a certain time (e.g., 3 ms when subcarrier spacing is 15 kHz) after the UE receives the MAC-CE to activate connection between the particular CORESET (including both a case where CORESETPoolIndex value is set to 0 or 1 and a case where it is not set) and the SRS resource set, the UE may regard that connection between the CORESET and the SRS resource set is activated. As an implicit method, there may be a method of assuming an implicit connection state by using a particular reference between CORESETPoolIndex and an index of an SRS resource set. For example, when it is assumed that the UE is configured with two SRS resource sets #0 and #1, the UE may assume that CORESETs for which CORESETPoolIndex is not configured or is set to 0 are connected to SRS resource set #0, and a CORESET for which CORESETPoolIndex is set to 1 is connected to SRS resource set #1.

For the single- or multi-DCI based methods, the UE that has received explicit or implicit configuration or indication of connection between different SRS resource sets and respective TRPs may expect that srs-PowerControlAdjustmentStates value configured by higher layer signaling in each SRS resource set is configured to sameAsFci2 and may not expect that srs-PowerControlAdjustmentStates value is configured to separateClosedLoop. Also, the UE may expect that usage configured by higher layer signaling in each SRS resource set is equally set to codebook or non-codebook.

First-5 Embodiment: Dynamic Switching Method for Determining Codebook-Based PUSCH Transmission in Consideration of Single TRP or PUSCH Transmission in Consideration of Multiple TRPs In the first-5 embodiment as an embodiment of the disclosure, a dynamic switching method for determining codebook-based PUSCH transmission in consideration of single TRP or PUSCH transmission in consideration of multiple TRPs will now be described.

The BS may receive a UE capability report from the UE capable of performing single-DCI codebook-based PUSCH repetitive transmission in consideration of multiple TRPs according to the first-1 embodiment and the first-4 embodiment, and may configure the UE with higher layer signaling for performing PUSCH repetitive transmission to multiple TRPs. Here, in single-DCI based PUSCH repetitive transmission in consideration of multiple TRPs as in the first-4 embodiment, the BS may transmit single DCI including a plurality of SRI fields to indicate SRS resources existing in different SRS resource set to the UE. Here, each of the plurality of SRI fields may be interpreted in the same manner as the 3GPP standard NR Release 15/16. In more detail, a first SRI field may select an SRS resource from a first SRS resource set and a second SRI field may select an SRS resource from a second SRS resource set. Similar to the plurality of SRI fields, in order to repeatedly transmit a PUSCH in consideration of multiple TRPs, the BS may transmit, to the UE, single DCI including a plurality of TPMI fields such that TPMIs corresponding to SRS resources indicated by respective SRI fields may be selected. Here, the plurality of TPMI fields may be indicated by the same DCI as DCI including the plurality of SRI fields. A plurality of TPMIs to be used in PUSCH transmissions to respective TRPs may be selected according to methods using a plurality of TPMI fields:

[Method 1] Each TPMI field may be interpreted in the same manner as the 3GPP standard NR Release 15/16. For example, a first TPMI field may indicate a TPMI index and layer information for an SRS resource indicated by a first SRI field, and a second TPMI field may indicate a TPMI index and layer information for an SRS resource indicated by a second SRI field. Here, the first TPMI field and the second TPMI field may indicate same layer information.

[Method 2]A first TPMI field is interpreted in the same manner as the 3GPP standard NR Release 15/16, and may indicate a TPMI index and layer information for an SRS resource indicated by a first SRI field. On the contrary, a second TPMI field may select a TPMI index for the same layer as a layer indicated by the first TPMI field and thus may not indicate layer information, and may indicate TPMI index information for an SRS resource indicated by a second SRI field.

When a plurality of TPMIs are selected by using the method 2, a bit length of the second TPMI field may be smaller than the first TPMI field. As the second TPMI field indicates one value (index) among same TPMI index candidates as a layer indicated by the first TPMI field, the second TPMI field may not indicate layer information.

The UE may receive single DCI including a plurality of SRI fields and a plurality of TPMI fields, and may support a dynamic switching method for determining PUSCH repetitive transmission in consideration of multiple TRPs or PUSCH repetitive transmission in consideration of single TRP, based on the single DCI. The UE may support the dynamic switching by using a reserved value with no meaning among values the plurality of TPMI fields or the plurality of SRI fields included in the received DCI may have. For example, when a bit length of an SRI field is 2 bits, a total of four cases may be expressed, and here, each of available cases may be defined as a codepoint. Also, if three codepoints among the four codepoints have the meaning as to which SRI is to be indicated, and the remaining one codepoint does not have any meaning, this codepoint may be a codepoint indicating a reserved value (in descriptions thereafter, the codepoint indicating a reserved value may be described that the codepoint is configured to "reserved"). This will be described in detail in descriptions below.

A case where PUSCH antenna ports are 4 is assumed to describe a particular example of the dynamic switching method the UE can support by using the reserved value of the plurality of TPMI fields. Also, it is assumed that a first TPMI field consists of 6 bits, higher layer parameter codebookSubset is configured to fullyAndPartialAndNonCoherent, and the first TPMI field is indicated in the same manner as the 3GPP standard NR Release 15/16. Here, in the first TPMI field, e.g., indices 0 to 61 may be configured to indicate valid TPMI index and layer information and indices 62 to 63 may be configured to "reserved". If a second TPMI field includes only TPMI index information excluding layer information as described in the method 2, the second TPMI field may indicate only TPMI index of a case where a layer for PUSCH transmission is limited to one value (e.g., one value among 1 to 4) according to the first TPMI field. Here, the number of bits of the second TPMI field may be configured based on the number of bits which can represent a layer with a largest number of candidates among TPMI index candidates which can be configured for each layer. For example, according to an example where layer 1 has candidates 0 to 27, layer 2 has candidates 0 to 21, layer 3 has candidates 0 to 6, and layer 4 has candidates 0 to 4, layer 1 has a largest number of candidates. Therefore, the number of bits of the second TPMI field may be configured to 5 according to the number of TPMI index candidates of layer 1. In more descriptions of configuration of the second TPMI field, when layer 1 and a TPMI index thereof are indicated by the first TPMI field, the UE may interpret the second TPMI field as a codepoint indicating one value among TPMI indices 0 to 27 for layer 1 and a codepoint indicating a reserved value. For example, when layer 2 and a TPMI index thereof are indicated by the first TPMI field, the UE may interpret the second TPMI field as a codepoint indicating one value among TPMI indices 0 to 21 for layer 2 and a codepoint indicating a reserved value. Also, for example, when layer 3 or layer 4 and a TPMI index thereof are indicated by the first TPMI field, the UE may interpret the second TPMI field in a similar manner to those described above. Here, when there are two or more codepoints each indicating a reserved value, in addition to a codepoint indicating a TPMI index in the second TPMI field, the codepoints indicating two reserved values may be used to indicate dynamic switching. That is, a second-last codepoint (i.e., $31^{st}$ codepoint in the example) which corresponds to a codepoint indicating a reserved value among codepoints of the second TPMI field consisting of 5 bits may be used to indicate PUSCH repetitive transmission in consideration of single TRP to a first TRP, and a last codepoint (i.e., $32^{nd}$ codepoint in the example) may be used to indicate PUSCH repetitive transmission in consideration of single TRP to a second TRP. Here, the UE may be indicated, by the first TPMI field, layer information and TPMI index information for PUSCH repetitive transmission in consideration of single TRP. However, the assumption as described above is only for convenience of description, and thus, the disclosure is not limited thereto.

For convenience of description, when describing the particular example above for two TRPs as a general case, the UE may receive single DCI including two SRI fields and two TPMI fields, and may perform dynamic switching according to a codepoint indicated by the second TPMI field. If the codepoint of the second TPMI field indicates a TPMI index for a layer indicated by the first TPMI field, the UE may perform PUSCH repetitive transmission in consideration of multiple TRPs. If the second TPMI field indicates the second-last codepoint which corresponds to a codepoint indicating a reserved value, the UE may perform PUSCH repetitive transmission in consideration of single TRP on TRP 1, and may identify, from the first TPMI field, layer information and TPMI index information for codebook-based PUSCH transmission. If the second TPMI field indicates a last codepoint which corresponds to a codepoint indicating a reserved value, the UE may perform PUSCH repetitive transmission in consideration of single TRP on TRP 2, and may identify, from the first TPMI field, layer information and TPMI index information for codebook-based PUSCH transmission.

In the example described above, two reserved codepoints in the end of the second TPMI field are used to indicate dynamic switching, but the present embodiment is not limited thereto. That is, dynamic switching may be indicated by using codepoints indicating other two reserved values of the second TPMI field, and PUSCH repetitive transmission in consideration of single TRP to TRP 1 or PUSCH repetitive transmission in consideration of single TRP to TRP 2 may be indicated by being mapped to a codepoint indicating each reserved value.

In the example described above, the second TPMI field is determined according to the method 2, but, even when the second TPMI field is determined according to the method 1 in the same manner as the 3GPP standard NR Release 15/16, dynamic switching may be supported by using a reserved codepoint of a TPMI in the same manner as the example above.

For example, if the number of codepoints indicating reserved values in the second TPMI field is smaller than 2, the number of bits of the second TPMI field may be increased by 1, and a second-last codepoint and a last codepoint based on an increased number of bits may be used to support dynamic switching.

When two TPMI fields are determined according to the method 1, a method of supporting dynamic switching may be additionally considered according to whether each TPMI field is indicated to a codepoint indicating a reserved value. That is, when the first TPMI field is indicated to a codepoint indicating a reserved value, the UE may perform PUSCH repetitive transmission in consideration of single TRP on TRP 2, and when the second TPMI field is indicated to a codepoint indicating a reserved value, the UE may perform PUSCH repetitive transmission in consideration of single TRP on TRP 1. If both two TPMI fields indicate a codepoint for TPMI, not a codepoint indicating a reserved value, the UE may perform PUSCH repetitive transmission in consideration of multiple TRPs. If a codepoint having a reserved value does not exist, the number of bits of a TPMI field may be increased by 1, and a last codepoint based on an increased number of bits may be used to support dynamic switching.

As another method of supporting dynamic switching, there may be a method of indicating dynamic switching by two SRI fields, and identifying, from two TPMI fields, by the UE, layer information and TPMI index information for PUSCH repetitive transmission in consideration of multiple TRPs or single TRP. If at least one codepoint indicating a reserved value exists in each SRI field, dynamic switching may be supported according to whether a corresponding SRI field indicates a codepoint indicating a reserved value. If a first SRI field indicates codepoint indicating a reserved value, and a second SRI field indicates an SRS resource of a second SRS resource set, the UE may perform PUSCH repetitive transmission in consideration of single TRP on TRP 2. Here, the UE may identify layer information and TPMI index information from the first TPMI field so as to perform PUSCH repetitive transmission in consideration of single TRP on TRP 2. If the second SRI field indicates a codepoint indicating a reserved value and the second SRI field indicates the SRS resource of the second SRS resource set, the UE may perform PUSCH repetitive transmission in consideration of single TRP on TRP 1. Here, the UE may identify layer information and TPMI index information from the first TPMI field so as to perform PUSCH repetitive transmission in consideration of single TRP on TRP 1. If both two SRI fields indicate an SRS resource of each SRS resource set, not a codepoint indicating a reserved value, the UE may perform PUSCH repetitive transmission in consideration of multiple TRPs. Here, the UE may identify layer information and TPMI index information from the first TPMI field so as to perform PUSCH repetitive transmission on TRP 1, and may identify TPMI index information from a second TPMI field so as to perform PUSCH repetitive transmission on TRP 2. Here, when PUSCH transmission to TRP 1 and TRP 2 is performed, a layer may be equally configured. If a codepoint indicating a reserved value does not exist in two SRI fields, the number of bits of each SRI field may be increased by 1, and a last codepoint among codepoints indicating a reserved value based on an increased number of bits may be used to support dynamic switching.

First-6 Embodiment: Dynamic Switching Method for Determining Non-Codebook Based PUSCH Transmission in Consideration of Single TRP or PUSCH Transmission in Consideration of Multiple TRPs In the first-6 embodiment as an embodiment of the disclosure, a dynamic switching method for determining non-codebook based PUSCH transmission in consideration of single TRP or PUSCH transmission in consideration of multiple TRPs will now be described.

According to the first-1 embodiment and the first-4 embodiment, the BS receives a UE capability report from the UE capable of performing single DCI and non-codebook based PUSCH repetitive transmission in consideration of multiple TRPs, and may configure the UE with higher layer signaling for performing PUSCH repetitive transmission to multiple TRPs. Here, in single-DCI based PUSCH repetitive transmission in consideration of multiple TRPs as in the first-4 embodiment, the BS may transmit single DCI including a plurality of SRI fields to indicate SRS resources existing in different SRS resource set to the UE. Here, the plurality of SRI fields may be selected according to methods described below.

[Method 1] Each of the plurality of SRI fields may be selected in the same manner as the 3GPP standard NR Release 15/16. For example, a first SRI field may indicate an SRS resource for PUSCH transmission in a first SRS resource set, and a second SRI field may indicate an SRS resource for PUSCH transmission in a second SRS resource set. Here, the first SRI field and the second SRI field may indicate the same layer information.

[Method 2]A first SRI field may indicate SRS resource(s) for PUSCH transmission in a first SRS resource set in the same manner as the 3GPP standard NR Release 15/16. A second SRI field may indicate SRS resource(s) for PUSCH transmission in a second SRS resource set with respect to the same layer as a layer indicated by the first SRI field.

When a plurality of SRIs are selected by using the method 2, a bit length of the second SRI field may be smaller than the first SRI field. This is because a second SRI is determined among SRI candidates with respect to the same layer as a layer determined by the first SRI field among SRI candidates with respect to all available layers.

The UE may receive single DCI including a plurality of SRIs, and may support a dynamic switching method for determining PUSCH repetitive transmission in consideration of multiple TRPs or PUSCH repetitive transmission in consideration of single TRP, based on the single DCI. The UE may support the dynamic switching by using a codepoint indicating a reserved value of the plurality of SRI fields included in the received DCI.

In order to describe, in a particular example, the method of supporting dynamic switching by using the codepoint indicating the reserved value of the plurality of SRI fields, a case where a maximum number of PUSCH antenna ports is 4 and the number of SRS resources in each SRS resource set is 4 is assumed. Also, it is assumed that the first SRI field consists of 4 bits and is indicated in the same manner as the 3GPP standard NR Release 15/16. Here, in a first SRI region, indices 0 to 14 are configured to indicate an SRS resource for PUSCH transmission and a layer according to the selected SRS resource, and index 15 may be configured to a codepoint indicating a reserved value. If the second SRI field selects a same number of SRS resources as the number of layers indicated by the first SRI field as in the method 2, the second SRI field may indicate SRS resource selection candidates of a case in which a layer for PUSCH transmission is limited to one value (e.g., one value among 1 to 4) according to the first SRI field. Here, the number of bits of the second SRI field may be configured based on a layer having a maximum number of candidates among the number of SRS resource selection candidates, per each layer. For example, values of an SRI field indicating SRS resource selection candidates for layer 1 may be 0 to 3 and thus a total of four candidates may exist, values of an SRI field indicating SRS resource selection candidates for layer 2 may be 4 to 9 and thus a total of six candidates may exist, values of an SRI field indicating SRS resource selection candidates for layer 3 may be 10 to 13 and thus a total of four candidates may exist, and a value of an SRI field indicating SRS resource selection candidates for layer 4 may be 14 and thus a total of one candidate may exist. Here, candidates for layer 2 are 6 which is a maximum value, and thus, the number of bits of the second SRI field may be configured to 3. In more descriptions of configuration of the second SRI field, when the first SRI field indicates an SRI value of a case where layer for PUSCH transmission is 1, the UE may interpret the second SRI field as a codepoint indicating one value among 0 to 3 being an SRI candidate for layer 1 or another codepoint having a reserved value. For example, when the first SRI field indicates an SRI value of a case where layer for PUSCH transmission is 2, the UE may interpret the second SRI field as a codepoint indicating one value among 0 to 5 being an SRI candidate for layer 2 or another codepoint having a reserved value. Also, for example, when the first SRI field indicates an SRI value of a case where layer for PUSCH transmission is 3 or 4, the UE may interpret the second SRI field in a same manner. Here, when there are at least two codepoints each indicating a reserve value in addition to a codepoint indicating an SRI value according to layer in the second SRI field, the codepoints indicating two reserved values may be used to indicate dynamic switching. That is, a second-last codepoint (e.g., $7^{th}$ codepoint in the example) corresponding to a codepoint indicating a reserved value among codepoints of the second SRI field consisting of 3 bits may be used to indicate PUSCH repetitive transmission in consideration of single TRP to a first TRP and a last codepoint (e.g., $8^{th}$ codepoint in the example) may be used to indicate PUSCH repetitive transmission in consideration of single TRP to a second TRP. Here, the UE may receive an indication of an SRI by the first SRI field, the SRI being for PUSCH repetitive transmission in consideration of single TRP. However, the assumption as described above is only for convenience of description and thus, the disclosure is not limited thereto.

For convenience of description, when describing the particular example above for two TRPs as a general case, the UE may receive single DCI including two SRI fields, and may perform dynamic switching according to a codepoint indicated by the second SRI field. If the codepoint of the second SRI field indicates an SRI value for a layer indicated by the first SRI field, the UE may perform PUSCH repetitive transmission in consideration of multiple TRPs. If the second SRI field indicates the second-last codepoint which corresponds to a codepoint indicating a reserved value, the UE may perform PUSCH repetitive transmission in consideration of single TRP on TRP 1, and may identify, from the first SRI field, an SRI for non-codebook based PUSCH transmission. If the second SRI field indicates a last codepoint which corresponds to a codepoint indicating a reserved value, the UE may perform PUSCH repetitive transmission in consideration of single TRP on TRP 2, and may identify, from the first SRI field, an SRI for non-codebook based PUSCH transmission.

In the example described above, codepoints indicating two reserved values in the end of the second SRI field are used to indicate dynamic switching, but the present embodiment is not limited thereto. That is, dynamic switching may be indicated by using codepoints indicating other two reserved values of the second SRI field, and PUSCH repetitive transmission in consideration of single TRP to TRP 1 or PUSCH repetitive transmission in consideration of single TRP to TRP 2 may be indicated by being mapped to a codepoint indicating each reserved value.

In the example described above, the second SRI field is determined according to the method 2, but, even when the second SRI field is determined according to the method 1 in the same manner as the 3GPP standard NR Release 15/16, dynamic switching may be supported by using a codepoint of an SRI field indicating a reserved value in the same manner as the example above.

For example, if the number of codepoints indicating reserved values in the second SRI field is smaller than 2, the number of bits of the second SRI field may be increased by 1, and a second-last codepoint and a last codepoint based on an increased number of bits may be used to support dynamic switching.

When two SRI fields are determined according to the method 1, a method of supporting dynamic switching may be additionally considered according to whether each SRI field is indicated to a codepoint indicating a reserved value. That is, when the first SRI field is indicated to a codepoint indicating a reserved value, the UE may perform PUSCH repetitive transmission in consideration of single TRP on TRP 2, and when the second SRI field is indicated to a codepoint indicating a reserved value, the UE may perform PUSCH repetitive transmission in consideration of single TRP on TRP 1. If both SRI fields indicate a codepoint for SRI, and not a codepoint indicating a reserved value, the UE may perform PUSCH repetitive transmission in consideration of multiple TRPs. If a codepoint having a reserved value does not exist, the number of bits of an SRI region may be increased by 1, and a last codepoint based on an increased number of bits may be used to support dynamic switching.

Figure 23:
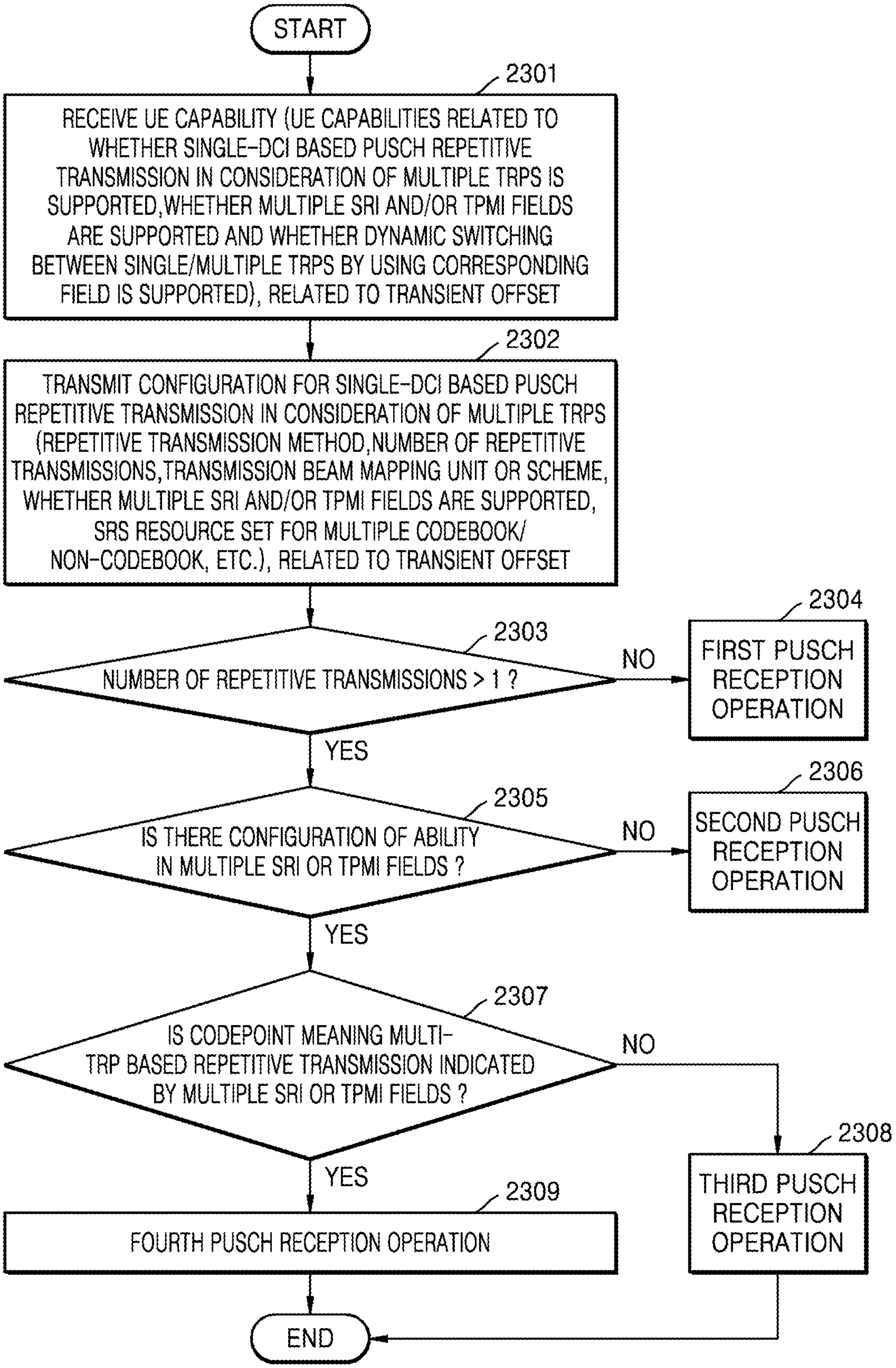
FIGS. 23 and 24 illustrate operations of a BS and a UE for PUSCH repetitive transmission in consideration of multiple transmission and reception points (TRPs), based on single DCI including a plurality of SRS resource indicator (SRI) or transmission precoding matrix indicator (TPMI) fields according to an embodiment of the disclosure.
Figure 24:
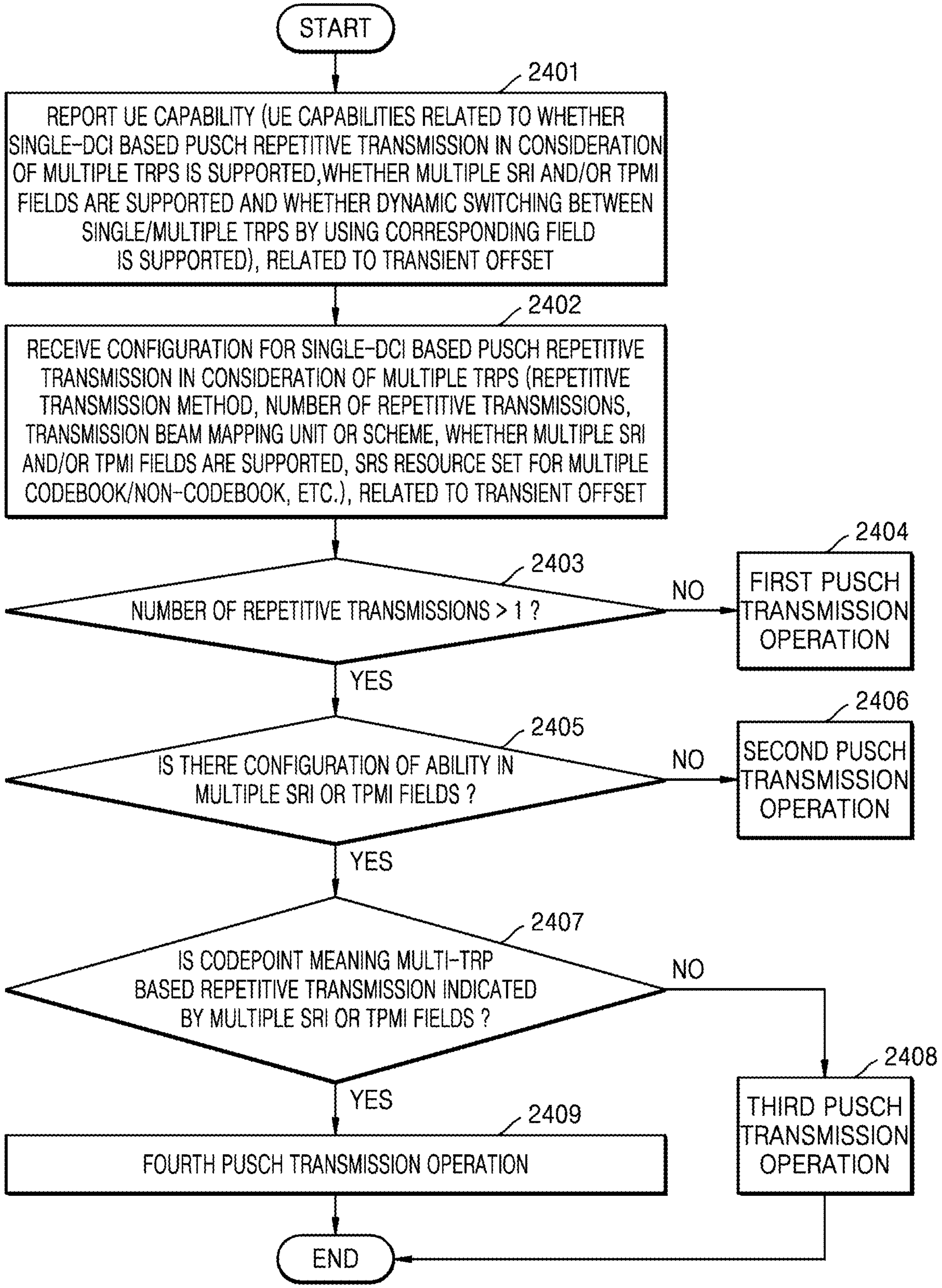

FIGS. 23 and 24 illustrate operations of the BS and the UE for PUSCH repetitive transmission in consideration of multiple TRPs, based on single DCI including a plurality of SRI or TPMI fields according to an embodiment of the disclosure.

Referring to FIGS. 23 and 24, the UE may perform UE capability reporting for whether to support single-DCI based PUSCH repetitive transmission in consideration of multiple TRPs, whether to support a plurality of SRI or TPMI fields, whether to support dynamic switching between single/multiple TRP operations using the fields, and transient offset associated information in transmission beam switching to be described in a second embodiment below (operation 2401), and the BS may report the UE capability reporting (operation 2301). The BS may transmit, to the UE, configuration information for single-DCI based PUSCH repetitive transmission in consideration of multiple TRPs (operation 2302), and the UE may receive the configuration information (operation 2402). Here, in the transmitted configuration information may include a repetitive transmission scheme, the number of times of repetitive transmission, a transmission beam mapping unit or scheme, whether a plurality of SRI or TPMI fields are supported, a plurality of SRS resource sets for codebook or non-codebook, and transient offset associated information for transmission beam switching to be described in the second embodiment below. When the UE receives the configuration, the UE may identify the number of times of repetitive transmission of PUSCH transmission that is configured by higher layer signaling or in a time resource allocation field in DCI (operation 2403). Here, when the number of times of repetitive transmission is not greater than 1, i.e., when repetitive transmission is not performed, the UE may perform a first PUSCH transmission operation (operation 2404). The first PUSCH transmission operation may be an operation of transmitting a PUSCH one time to a single TRP by using one transmission beam, that is, by using one SRI and TPMI field in a case of codebook-based PUSCH transmission or by using one SRI field in a case of non-codebook based PUSCH transmission. If the number of times of repetitive transmission is greater than 1, the UE may determine whether there is configuration of ability in a plurality of SRI or TPMI fields (operation 2405). If the UE does not receive the configuration of ability in a plurality of SRI or TPMI fields from the BS, the UE may perform a second PUSCH transmission operation (operation 2406). The second PUSCH transmission operation may be an operation of repeatedly transmitting a PUSCH to a single TRP by using one transmission beam, that is, by using one SRI and TPMI field in a case of codebook-based PUSCH transmission or by using one SRI field in a case of non-codebook based PUSCH transmission. If the UE receives the configuration of ability in a plurality of SRI or TPMI fields from the BS, the UE may determine whether a codepoint meaning multi-TRP based repetitive transmission is indicated by the plurality of SRI or TPMI fields (operation 2407). If the codepoint meaning multi-TRP based repetitive transmission is not indicated by the plurality of SRI or TPMI fields in DCI the UE receives but a codepoint meaning single-TRP based repetitive transmission is indicated as described above in the first-5 and first-6 embodiments, the UE may perform a third PUSCH transmission operation (operation 2408). The third PUSCH transmission operation may be an operation of repeatedly transmitting a PUSCH to a particular single TRP by using one transmission beam via a codepoint indicating single TRP transmission among codepoints of each field, that is, by using two SRI and TPMI fields in a case of codebook-based PUSCH transmission or by using two SRI fields in a case of non-codebook based PUSCH transmission. Therefore, according to whether which codepoint is indicated by a plurality of SRI or TPMI fields, repetitive transmission to TRP #1 or TRP #2 may be indicated. If the UE receives the configuration of ability in a plurality of SRI or TPMI fields from the BS, and a codepoint meaning multi-TRP based repetitive transmission is indicated by the plurality of SRI or TPMI fields in DCI the UE receives, the UE may perform a fourth PUSCH transmission operation (operation 2409). The fourth PUSCH transmission operation may be an operation of repeatedly transmitting a PUSCH to a plurality of TRPs by using two transmission beams via a codepoint indicating multiple TRP transmissions among codepoints of each field, that is, by using two SRI and TPMI fields in a case of codebook-based PUSCH transmission or by using two SRI fields in a case of non-codebook based PUSCH transmission. In FIG. 23, operations of the BS according to operation 2303 to operation 2309 correspond to operations of the UE according to operation 2403 to operation 2409 in FIG. 24, and thus, detailed descriptions thereof are not provided here.

Second Embodiment: Definition of Transient Period in Consideration of UE Capability Report and Method of Transmitting UL Signal According to an embodiment of the disclosure, the UE may perform UE capability reporting by defining a transient period (e.g., expressions such as transient period, transient offset, transient gap, and the like are available) that may be requested between a plurality of UL transmissions or may be configured from the BS, and may apply the transient period between each of UL transmissions when transmitting a UL signal, in consideration of the configuration. In order to transmit a UL signal, the UE may switch at least one of a UL beam, transmit power, or a frequency before signal transmission. Also, in order to transmit a UL signal, the UE may switch a panel before signal transmission. Therefore, in order to transmit a UL signal, the UE may switch at least one of a UL beam, transmit power, a frequency, or a panel before signal transmission. Here, for example, when a plurality of beams are grouped to a plurality of beam groups, a panel corresponding to each group may be configured such as panel #1 to beam group #1, panel #2 to beam group #2, and the like. As another example, when a plurality of antenna modules for beam forming are included in the UE and are installed at different positions, a panel corresponding to each antenna module may be configured. In addition, a plurality of panels may be configured in various manners to distinguish between a plurality of beams having different beam widths, beam directions, and the like. Such switching for UL signal transmission may be performed in at least one of Case 1) to Case 3):

Case 1) In a case where a UL signal (e.g., PUCCH or PUSCH or SRS and the like) is repeatedly transmitted to multiple TRPs, when a UL beam or transmit power or a frequency is switched to perform transmission by changing TRPs between repetitive transmissions or when the UE switches a panel to perform transmission by changing TRPs between repetitive transmissions Case 2) In a case where the BS indicates UL signal transmission by L1 signaling including DCI or MAC CE signaling, when the UE switches a UL beam or transmit power or a frequency so as to transmit a UL signal or switches a panel to transmit a UL signal Case 3) When SRS transmission is indicated or configured, SRS resources included in an SRS resource set are used or a UL beam or transmit power or a frequency is switched to use a plurality of SRS resource sets, or the UE switches a panel for SRS transmission In Case 1 above, a case where transmission information is changed for TRP switching between repetitive transmissions may be determined according to a mapping pattern between repetitive transmissions and TRPs. Here, repetitive transmissions indicate a case where a same UL signal is transmitted. In the 3GPP Release 16 standard, when the BS repeatedly transmits a PDSCH, two mapping patterns (e.g., 'Sequential' and 'Cyclical') are supported. The UE may apply a mapping pattern for PDSCH repetitive transmission to multiple TRPs so as to repeatedly transmit a UL signal to multiple TRPs. 'Sequential' mapping is a scheme of performing transmission by switching TRPs in a unit of two repetitive transmissions such as {TRP1, TRP1, TRP2, TRP2}, and 'Cyclical' mapping is a scheme of performing transmission by switching TRPs such as {TRP1, TRP2, TRP1, TRP2} for every repetitive transmission. When at least one of a UL beam, transmit power, or a transmission frequency (or a frequency hop) so as to transmit a UL signal to multiple TRPs is determined, the UE may transmit the UL signal by applying UL transmission change information determined according to a mapping scheme. Alternatively, when a panel to transmit a UL signal to multiple TRPs is determined, the UE may transmit the UL signal by applying the UL transmission change information determined according to the mapping scheme. Here, the UL transmission change information may indicate at least one of a UL beam, transmit power, or a transmission frequency to transmit the UL signal. Alternatively, the UL transmission change information may indicate a panel to transmit the UL signal. When a PUSCH is repeatedly transmitted to multiple TRPs, cases of PUSCH repetitive transmission type A and PUSCH repetitive transmission type B may be both included. The PUSCH repetitive transmission type B may consider both nominal repetition and actual repetition as a repetitive transmission unit.

In Case 2 above, the BS may configure the UE with a higher layer parameter for UL signal transmission and may indicate, to the UE, transmission of a UL signal (e.g., PUCCH or PUSCH or SRS and the like) by L1 signaling (e.g., DCI). Here, when a time gap between signaling by which the BS indicates UL signal transmission to the UE and a UL signal transmitted by the UE is defined as 'time offset' which may be substituted with 'scheduling interval', 'scheduling offset', 'time interval', 'transient period', 'transient offset', 'transient time' and the like. When the BS indicates UL signal transmission to the UE by L1 signaling including DCI, time offset may be calculated as 'time after a last symbol on which a PDCCH including DCI is transmitted before a first symbol on which a UL (e.g., aperiodic/semi-persistent SRS or PUSCH or PUCCH including HARQ-ACK with respect to PDSCH) is transmitted'. If a DCI decoding time of the UE is additionally considered, time offset may be calculated as 'time after a last symbol on which a PDCCH including DCI is transmitted before a first symbol on which a UL signal is transmitted'. When the BS indicates UL signal transmission by MAC CE signaling, time offset may be calculated by using at least one of methods below.

Method 1: Time after the end of a last symbol on which a PDSCH including MAC CE signaling is transmitted before the start of a first symbol on which a UL signal (e.g., aperiodic/semi-persistent SRS) is transmitted Method 2: Time after the end of a last symbol on which PUCCH/PUSCH including HARQ-ACK with respect to a PDSCH including MAC CE signaling is transmitted before the start of a first symbol on which a UL signal is transmitted Method 3: Time after the end of a last symbol on which PUCCH/PUSCH including HARQ-ACK with respect to a PDSCH including MAC CE signaling is transmitted and then an elapse of MAC CE application latency (e.g., a first start slot after 3 ms) before the start of a first symbol on which a UL signal is transmitted The time offset may be converted into an absolute time unit (e.g., ms) or a symbol unit. When the UE receives an indication of UL signal transmission from the BS, the UE may switch at least one of a UL beam, transmit power, or a frequency for UL transmission during the time offset. Alternatively, the UE may switch a panel for UL transmission during the time offset.

In Case 3 above, when the UE transmits an SRS scheduled by the BS, the UE may switch a UL beam, transmit power, and a frequency according to higher layer configuration of an SRS resource included in an SRS resource set for transmission and may transmit the SRS. Alternatively, the UE may switch a panel according to higher layer configuration of an SRS resource and may transmit the SRS.

The UE may need a transient time to switch at least one of a UL beam, transmit power, or a frequency, according to UE capability. Alternatively, the UE may need a transient time to switch a panel for UL transmission, according to UE capability. Such transient time may be considered in a case of repetitive transmission in a long subslot unit or repetitive transmission in a short subslot unit. The transient time in response to the UE capability may be applied to some or all of a UL beam or transmit power or a frequency determined to transmit a UL signal according to whether the UE capability is satisfied between repetitive transmissions of the UL signal or during time offset. As described above, a certain time may be requested for the UE to perform switching of a UL beam or transmit power or a frequency, and in order to satisfy this, an offset interval may be added between repetitive transmissions or the BS may indicate UL signal transmission to the UE so as to allow time offset to be greater than the certain time for switching. Alternatively, a certain time may be requested for the UE to additionally perform panel switching for UL transmission, and in order to satisfy this, an offset interval may be added between repetitive transmissions or the BS may indicate UL signal transmission to the UE so as to allow time offset to be greater than the certain time for switching.

Hereinafter, offset in a time domain for UL transmission by the UE may be understood as a meaning that collectively includes the time offset or the time interval between repetitive transmissions of a UL signal.

According to the disclosure, particular embodiments of a method by which the BS determines offset in a time domain so as to guarantee a time requested for the UE to switch a UL beam or transmit power or a frequency according to UE capability and a method by which the UE transmits a UL signal indicated by the BS will now be described in detail in a second-1 embodiment and a second-2 embodiment below. The division of the second-1 embodiment and the second-2 embodiment is for convenience of description, and embodiments of the disclosure may be implemented by itself or a combination of at least one embodiment.

Second-1 Embodiment: Method by which BS Determines Offset According to UE Capability Report and Configures UE with Offset As an example of a method of determining offset in a time domain for UL signal transmission, the UE may report, to the BS, UE capability information including at least one of UE capability for performing UL beam switching, UE capability for performing transmit power switching, or UE capability for performing frequency switching in consideration of frequency hopping. Alternatively, each of the three UE capabilities may be separately reported to the BS. Alternatively, the UE may select and report some of the three UE capabilities. Also, the UE may report a representative value of the three UE capabilities for changing transmission configuration of a UL signal.

In addition, if the UE can transmit a UL signal by using a plurality of panels, the UE may also consider UE capability for panel switching in an operation of determining the UE capability to be reported. Here, the panel may be understood as a UE element to separately manage an antenna or an antenna port. For example, panel(s) may be used to support efficient power management (the UE may selectively perform ON/OFF operation on a plurality of panels according to a network state), and simultaneous transmission and reception using a plurality of beams. However, this is merely an example, and definition of the panel is not limited to the example above.

That is, the UE may report, to the BS, UE capability information including at least one of UE capability for performing UL beam switching, UE capability for performing transmit power switching, UE capability for performing frequency switching in consideration of frequency hopping, or UE capability of performing panel switching. Alternatively, the UE may separately report each of the four UE capabilities to the BS. Alternatively, the UE may select and report some of the four UE capabilities. Alternatively, the UE may report a representative value of UE capability for switching transmission configuration of a UL signal.

Hereinafter, in the disclosure, the term "UE capability" and the term "UE capability information" may be interchangeably used and understood.

This is to provide information necessary for the BS to determine offset for a case where a part or entirety of a UL beam or transmit power or a frequency is changed in transmission of a UL signal. In addition, if the UE supports a plurality of panels, information necessary for the BS to determine offset for a case where a panel is switched. The UE may report UE capability about UL beam switching or transmit power or frequency switching, by using one of the methods described below. In addition, the UE may also report UE capability about panel switching, by using one of the methods described below:

The UE may report UE capability about UL transmission configuration change of the 3GPP standard NR Release 15/16. For example, the UE may configure, as in the NR Release 15/16, 'beamSwitchTiming' to one of {14, 28, 48} for a UE capability report for beam switching and may report it to the BS. The UE may configure 'beamSwitchTiming' to one of {224, 336} for a UE capability report for panel switching and may report it to the BS. Here, a number indicating 'beamSwitchTiming' is a symbol unit, and for example, when 'beamSwitchTiming' is configured to "224" in the UE capability report for panel switching, it means that a processing time for beam switching in UE capability for panel switching requires 224 symbols. Also, 'beamSwitchTiming' described above may be configured for each subcarrier spacing.

The UE may report a required time for switching in a symbol or absolute time unit (e.g., ms).

The BS and the UE may predefine a processing time to indicate processing capability. A processing time for N processing capabilities may be predefined, and may vary according to an indication of subcarrier spacing. Table 32 and Table 33 below indicate examples of a processing time the BS and the UE predefined with respect to processing capabilities n and n_1 for switching of UL beam or transmit power or frequency. Here, a value of a required time domain may be configured to achieve a relation of $\{a1<a2<a3<a4\}$, $\{b1<a1, b2<a2, b3<a3\}$. A unit of the required time may be configured to a symbol or ms.

TABLE 33

| Processing capability n | |
|---|---|
| μ | Required time |
| 0 | a1 |
| 1 | a2 |
| 2 | a3 |
| 3 | a4 |

TABLE 34

| Processing capability n + 1 | |
|---|---|
| μ | Required time |
| 0 | b1 |
| 1 | b2 |
| 2 | b3 |

When the UE reports, as UE capability, a processing time for switching at least one of a UL beam, transmit power, or a frequency, the UE may determine a value to be reported, in consideration of each UL signal. For example, when the UE reports, as UE capability, a processing time for UL beam switching, the UE may distinguish among UE capability for beam switching with respect to a PUCCH, UE capability for beam switching with respect to a PUSCH, and UE capability for beam switching with respect to an SRS and may perform reporting. The UE may distinguish between UE capability for transmit power switching and UE capability for frequency switching according to PUCCH or PUSCH or SRS and may perform reporting. When the UE reports UE capability for switching of at least one of a UL beam, transmit power, or a frequency with respect to a PUCCH, the UE may determine the UE capability by considering the number of PUCCH resources, the number of configured spatial relation infos, the number of activated spatial relation infos, frequency hopping configuration, and the like. When the UE reports UE capability for switching of at least one of a UL beam, transmit power, or a frequency with respect to a PUSCH, the UE may determine the UE capability by considering a precoding method of the PUSCH (e.g., 'Codebook' or 'Non-codebook'), the number of SRS resource sets associated with PUSCH transmission, the number of SRS resources configured in an associated SRS resource set, a relation between the PUSCH and an SRS antenna port, frequency hopping configuration, and the like. When the UE reports UE capability for switching of at least one of a UL beam, transmit power, or a frequency with respect to an SRS, the UE may determine the UE capability by considering an SRS transmission indication method (e.g., DCI-based or MAC CE-based transmission), SRS time domain information (e.g., periodic SRS or semi-persistent SRS or aperiodic SRS), usage of the SRS (e.g., 'beamManagement' or 'codebook' or 'nonCodebook' or 'antennaSwitching'), the number of SRS resource sets, the number of SRS resources, and the like. In addition, when the UE that supports multiple panels reports a processing time for panel switching, as UE capability, the UE may determine a value to be reported, in consideration of a UL signal. Alternatively, the UE may not distinguish between UE capabilities with respect to UL signals, and may determine and report UL capability for switching of at least one of a UL beam, transmit power, or a frequency. The UE may determine and report UE capability for panel switching without distinguishing between UE capabilities with respect to UL signals.

The UE may additionally report UE capability for indicating whether simultaneous switching of a UL beam, transmit power, and a frequency is available or whether each of them is to be sequentially switched. Here, the UE that supports multiple panels may report UE capability whether the UE can simultaneously switch a panel. That is, the UE may report UE capability about whether a UL beam, transmit power, a frequency, a panel, and the like are simultaneously switched. As an example of corresponding UE capability, the UE may select and report one of 'simultaneous' or 'sequential' to the BS. When the UE reports UE capability as 'simultaneous', it means that the UE can simultaneously switch a UL beam, transmit power, and a frequency. The UE that supports multiple panels means that the UE can simultaneously switch a panel. When the UE reports UE capability as 'sequential', it means that the UE can sequentially switch a UL beam, transmit power, and a frequency. The UE that supports multiple panels additionally means that the UE can sequentially switch a panel.

In addition to UE capability for supporting switching of a UL beam, transmit power, a frequency, and a panel, the UE may report UE capability 'beamCorrespondenceWithoutUL-BeamSweeping' to the BS so as to notify whether a beam correspondence requirement is satisfied. The beam correspondence indicates capability with which the UE can select a beam for UL transmission based on DL measurement, without being dependent on UL beam sweeping. If the UE reports 'supported' for 'beamCorrespondenceWithoutUL-BeamSweeping' that is UE capability with respect to the beam correspondence, the UE may select a UL beam for UL transmission without UL beam sweeping and may transmit a UL signal by using the UL beam.

The BS may determine an offset to ensure a required time to apply the UL transmission change information, based on the UE capability reported by the UE. The BS may determine the offset, in consideration of one or a combination of options below:

Option 1) The BS may determine the offset based on a maximum value with respect to at least one of UE capability about UL beam switching, UE capability about transmit power switching or UE capability about frequency switching, which are reported by the UE.

Option 2) The BS may determine the offset based on a maximum value among UE capabilities about necessary switching to perform actual UL transmission, from among UE capabilities reported by the UE. For example, when the BS indicates a UL signal to the UE so as to allow only switching of UL beam and transmit power to be performed, the BS may determine the offset based on a maximum value among UE capability for UL beam switching and UE capability for transmit power switching. The BS may determine the offset with respect to UL transmission change information combination in a same manner as the example above.

Option 3) The BS may determine the offset, based on a total sum of UE capability about UL beam switching, UE capability about transmit power switching and UE capability about frequency switching, which are reported by the UE.

Option 4) The BS may determine the offset based on a total sum of UE capabilities about necessary switching to perform actual UL transmission, from among UE capabilities reported by the UE. For example, when the BS indicates a UL signal to the UE so as to allow only switching of UL beam and transmit power to be performed, the BS may determine the offset based on a total sum of UE capability for UL beam switching and UE capability for transmit power switching. The BS may determine the offset with respect to UL transmission change information combination in a same manner as the example above.

Option 5) When the BS determines the offset via one option among the option 1 to option 4, the BS may determine the offset by considering configuration of each UL transmission signal. For example, when the BS configures the offset for PUCCH repetitive transmission to multiple TRPs to Option 1, the BS may determine the offset based on UE capability reported by the UE considering configuration of a PUCCH. Alternatively, when the UE does not report UE capability by distinguishing between UL signals, the BS may determine the offset by estimating an additional required time due to PUCCH configuration in addition to UE capability reported by the UE. This may be applied to a case where the BS determines the offset for transmission of another UL signal (e.g., PUSCH or SRS).

Option 6) When the BS determines the offset via one option among the option 1 to option 4, the BS may determine the offset without distinguishing between configurations of respective UL transmission signals.

Option 7) The BS may determine a random value as the offset. Here, higher layer parameter configuration, UL resource configuration, or the like of a UL signal may be considered.

Option 8) In a case where the UE supports multiple panels, when the BS determines offset via the option 1 to option 6, the BS may determine the offset by additionally considering UE capability for panel switching.

Each option is an example of a case where the UE reported all UE capabilities about three pieces of UL transmission change information, and if the UE reported only some of UE capabilities, the BS may determine the offset by applying only reported UE capability to each option.

When the UE reported that the UE can simultaneously switch a UL beam, transmit power, and a frequency, the BS may determine the offset by selecting the option 1 or the option 2. When the UE reported that the UE can sequentially switch a UL beam, transmit power, and a frequency, the BS may determine the offset by selecting the option 3 or the option 4. When the UE reported that the UE can simultaneously switch (at least two of) a UL beam, transmit power, a frequency, and a panel, the BS may determine the offset by additionally considering UE capability for panel switching in addition to the option 1, according to the option 8, or may determine offset by additionally considering UE capability for panel switching in addition to the option 2, according to the option 8. This is an example of the embodiment of the disclosure, and the BS may determine the offset by considering one or a combination of the option 1 to the option 8, according to UE capability reported by the UE.

The BS may adjust an offset value determined based on the option described above, according to whether beam correspondence is supported, which is reported by the UE via UE capability. For example, when the UE supports the beam correspondence, the BS may determine the offset value determined based on the option to be a final offset value or may adjust the offset value to be a smaller value. When the UE does not support the beam correspondence, the BS may add a required time to the offset value determined based on the option.

The BS may adjust the offset value determined based on the option, according to whether the UE performed reporting of a UL beam to be UL transmitted to multiple TRPs. If the UL beam is reported to the BS, it may mean that the UL beam is a 'known' beam to the UE. If the UL beam is not reported to the BS, it may mean that the UL beam is an 'unknown' beam to the UE. If the UE reported, to the BS, the UL beam to be UL transmitted, the BS may determine the offset value determined based on the option to be a final offset value or may adjust the offset value to be a smaller value. If the UE has not reported, to the BS, the UL beam to be UL transmitted, the BS may add an additional required time to the offset value determined based on the option.

The BS may notify the UE of the determined offset. Here, the BS may notify the UE of the determined offset in an explicit or implicit manner as described below.

A case where the BS explicitly configures the determined offset for the UE: The BS may configure the offset as a new higher layer parameter and may explicitly inform it to the UE. For example, the BS may add new higher layer parameter 'timeDurationForULSwitch' to PUCCH transmission configuration information such as PUCCH-FormatConfig or PUCCH-Config. Even for a PUSCH or an SRS, the BS may add a new parameter for the offset to a higher layer parameter for PUSCH transmission and a higher layer parameter for SRS transmission. The example is one of the methods of configuring a new higher layer parameter to indicate, to the UE, an offset determined by the BS, and may be defined as a higher layer parameter with a different name and a same function.

A case where the BS implicitly configures the determined offset for the UE: The BS may not directly configure the offset as a higher layer parameter as in the operation described above but may implicitly indicate the offset via configuration(s) for transmitting a different UL signal. For example, the offset may be indicated via 'startingSymbolIndex' configured in PUCCH-format [a] (where, "a" may be 0, 1, 2, 3 or 4) in higher layer parameter PUCCH-Resource. In more detail, as an example of a supplementary method for indicating PUSCH repetitive transmission in a slot, the BS may configure startingSymbolIndex in PUCCH-format[a] of PUCCH-Resource by the number of times a PUCCH is repeated in a slot. In more detail, when the number of repetitions in a slot is, for example, 2, startingSymbolIndex may indicate a transmission start symbol of a first PUCCH repetitive transmission occasion in a slot, and 'startingSymbolIndex2' that may be newly added may indicate a second PUCCH repetitive transmission occasion in a slot. Here, a symbol position indicated by startingSymbolIndex has to be earlier than a symbol position indicated by startingSymbolIndex2, and a gap between two symbols may be configured by the BS to allow the gap to be a value greater than one PUCCH transmission symbol nrofSymbols and offset determined by the BS. The example is merely exemplary, and the BS may implicitly notify the UE of the offset via PUCCH resource configuration for PUCCH transmission. Alternatively, when the BS schedules a PUCCH including HACK information of a PDSCH to the UE, the BS may indicate, to the UE, a PDSCH-to-HARQ_feedback timing indicator to allow time offset to be a value greater than determined offset. The BS may implicitly notify the UE of the offset for a UL signal (e.g., PUSCH or SRS) other than PUCCH, via higher layer parameter configuration of the UL signal or transmission timing indicated by DCI.

Second-2 Embodiment: Method of Transmitting UL Signal Indicated by BS According to UE Capability When the UE is indicated repetitive transmission of a UL signal from the BS, the UE may determine an operation for UL repetitive transmission according to whether the offset determined by the BS is explicitly configured or is implicitly indicated. When the UE is explicitly configured the offset from the BS, the UE may transmit a UL signal by configuring a gap between repetitive transmissions according to the offset in a time domain. If the UE is implicitly indicated the offset, the UE transmits a UL signal according to higher layer parameter configuration for the UL signal configured by the BS. When the UE is explicitly configured or implicitly indicated the offset and thus applies the offset to repetitive transmission of a UL signal, the UE may transmit the UL signal by switching at least one of a UL beam, transmit power or a frequency during the offset, according to UE capability. If the offset determined by the BS is set to be greater than the UE capability for switching a UL beam or transmit power or a frequency, the UE may switch a UL beam or transmit power or perform frequency switching for frequency hopping so as to transmit the UL signal by performing switching between TRPs in repetitive transmissions. If the offset determined by the BS is set to be smaller than the UE capability for switching a UL beam or transmit power or a frequency, the BS and the UE may predefine a default UL transmission method by considering one or a combination of operations below for repeatedly transmitting a UL signal:

Operation of transmitting UL signal on UL beam, transmit power, and frequency which are the same as previous repetitive transmission: Because the offset determined by the BS is smaller than UE capability, the UE cannot satisfy a time for switching of a beam or transmit power or a frequency between repetitive transmissions. Therefore, the UE may perform next repetitive transmission on a beam, transmit power, and a frequency which were applied to previous repetitive transmission. Here, the previous repetitive transmission indicates a repetitive transmission occasion immediately before a repetitive transmission occasion to be transmitted. Also, it is possible that at least one of a UL beam, transmit power, or a frequency is used in the same manner as previous (repetitive) transmission and the others are switched. For example, the UL beam and the frequency may be used in the same manner as previous (repetitive) transmission, and the transmit power may be switched in next repetitive transmission.

Operation of transmitting UL signal on UL beam, transmit power, and frequency which configured to be default: Because the offset determined by the BS is smaller than UE capability, the UE cannot satisfy a time for switching of a beam or transmit power or a frequency between repetitive transmissions. Therefore, the UE may perform next repetitive transmissions on a default UL beam, default transmit power, and a default frequency which are predefined. Here, the BS and the UE may define default transmission information for each UL signal (PUCCH or PUSCH or SRS). Alternatively, the BS and the UE may define common default transmission information for UL signals. Also, at least one a UL beam, transmit power, or a frequency may be used as default configuration, and the others may be switched. For example, the UL beam and the frequency may be used as default configuration, and the transmit power may be switched in next repetitive transmission.

Operation of transmitting UL signal by switching UL beam or transmit power or frequency depending on condition: When mapping between UL repetitive transmissions and TRPs is configured to 'Sequential', the UE may transmit a UL signal by switching a UL beam or transmit power or a frequency in a repetitive transmission occasion that satisfies UE capability. In a repetitive transmission occasion that does not satisfy UE capability, the UE may transmit a UL signal with the same configuration as previous repetitive transmission. For example, when mapping is configured as {TRP1, TRP1, TRP2, TRP2}, the UE may transmit first two repetitive transmission occasions with a UL beam, transmit power, and a frequency for TRP1. The UE has to transmit a third repetitive transmission occasion by switching a UL beam, transmit power, and a frequency for TRP2, but, as the offset is smaller than UE capability, the UE transmits a UL signal with configuration for TRP1 without a change in UL transmission information. The UE may transmit a fourth repetitive transmission occasion by changing a UL beam, transmit power, and a frequency for TRP2.

Operation of transmitting UL repetitive signal by applying switchable configuration of UL beam or transmit power or frequency: When the UE compares values of the offset configured by the BS and UE capability, the UE may apply some switchable configuration to a next repetitive transmission occasion, wherein UE capability of the some switchable configuration is smaller than the offset among UE capabilities. For example, when the offset is greater than UE capability for UL beam switching and is smaller than UE capability for transmit power switching or frequency switching, the UE may transmit a next repetitive transmission occasion by switching only a UL beam and equally applying transmit power and a frequency of a previous repetitive transmission occasion. If the UE sequentially switches a UL beam, transmit power, and a frequency, the UE compares offset determined by the BS with a total sum of a combination of UE capabilities for switching of a UL beam or transmit power or a frequency. Here, when a value of the combination of UE capabilities is smaller than the offset, the UE determines UL signal repetitive transmission according to a priority order of switching of a UL beam or transmit power or a frequency which is predefined by the BS and the UE. For example, when the offset determined by the BS is smaller than a total sum of all UE capabilities, a sum of UE capabilities about switching of UL beam and transmit power, a sum of UE capabilities about switching of UL beam and frequency, and a sum of UE capabilities about switching of transmit power and frequency are smaller than the offset, and the BS and the UE predefined an order of priorities as, for example, {UL beam>transmit power>frequency}, the UE may transmit a UL signal by switching a UL beam and transmit power.

Operation of transmitting UL signal by dropping some symbols or repetitive transmission occasion: In order to repeatedly transmit a UL signal by applying UL transmission change information, the UE may drop some front symbols in a repetitive transmission occasion for which at least one of a beam, transmit power or a frequency is switched, and may transmit the UL signal on the rest of resources. For example, when mapping between PUCCH repetitive transmissions and TRPs is configured as {TRP1, TRP1, TRP2, TRP2}, the UE in a third repetitive transmission does not transmit a PUCCH during a front symbol until a required time for switching a UL beam, transmit power, and a frequency for TRP2 is satisfied. After the required time for switching a UL beam, transmit power, and a frequency is satisfied, the UE may repeatedly transmit a third PUCCH on the rest of symbols.

As another example, when a required time for switching of a UL beam or transmit power or a frequency is not satisfied for repetitive transmission in which a TRP is switched, the UE may drop a UL repetitive transmission occasion corresponding thereto. For example, when mapping between PUCCH repetitive transmissions and TRPs is configured as {TRP1, TRP1, TRP2, TRP2}, the UE may drop a third PUCCH repetitive transmission occasion. Afterward, the UE may transmit a fourth PUCCH repetitive transmission occasion by switching to a UL beam, transmit power, and a frequency for TRP2. As another example, when mapping between PUCCH repetitive transmissions and TRPs is configured as {TRP1, TRP2, TRP1, TRP2}, second and fourth PUCCH repetitive transmission occasions may be dropped to support single TRP-based PUCCH repetitive transmission.

When PUCCH repetitive transmission is performed in consideration of a channel state for each TRP by using the methods provided in the embodiments of the disclosure, coverage extension of a UL control signal may be expected. Also, as transmit power is controlled for each TRP, efficient battery management by the UE may be expected.

This may be equally applied to a relation of values of time offset and UE capability with respect to UL signal transmission. If time offset is greater than UE capability for switching of a UL beam or transmit power or a frequency, the UE may transmit a UL signal. If time offset is smaller than UE capability for switching of a UL beam or transmit power or a frequency, the UE may transmit a UL signal by considering one or a combination of operations below, similarly to a case where offset between repetitive transmissions does not satisfy UE capability.

Operation of transmitting a UL signal on a UL beam, transmit power, and a frequency which are the same for previous UL signal transmission Operation of transmitting a UL signal on a UL beam, transmit power, and a frequency which are configured to be default Operation of transmitting a UL repetitive signal by applying switchable configuration of a UL beam or transmit power or a frequency Operation of transmitting a UL signal by dropping some symbols of a first repetitive transmission occasion or the first repetitive transmission occasion The operations according to the condition are associated with a method by which the UE that supports single panel switches a UL beam or transmit power or a frequency. If the UE can support multiple panels, the UE may check whether the offset determined by the BS is configured to be smaller than UE capability for changing/switching of a UL beam or transmit power or a frequency or a panel. When the offset determined by the BS is greater than the UE capability for switching of a UL beam or transmit power or a frequency or a panel, the UE may transmit a UL signal. If the offset is configured to be smaller than the UE capability for changing/switching of a UL beam or transmit power or a frequency or a panel, the UE may transmit a UL signal according to one or a combination of operations below, in further consideration of UE capability for changing/switching of a panel, similarly to a case where the offset between repetitive transmissions does not satisfy UE capability.

Operation of transmitting a UL signal on a UL beam, transmit power, a frequency, and a panel which are the same for previous UL signal transmission Operation of transmitting a UL signal on a UL beam, transmit power, a frequency, and a panel which are configured to be default Operation of transmitting a UL repetitive signal by applying switchable configuration of a UL beam or transmit power or a frequency or a panel Operation of transmitting a UL signal by dropping some symbols of a first repetitive transmission occasion or the first repetitive transmission occasion Here, a previous UL signal indicates a physical channel that is most-recently transmitted and is the same as a UL signal (PUCCH or PUSCH or SRS) to be transmitted. The BS and the UE may define default transmission information for each UL signal (PUCCH or PUSCH or SRS). Alternatively, the BS and the UE may define common default transmission information for UL signals.

Third Embodiment: Method of Generating PH Information for Multiple TRPs

According to an embodiment of the disclosure, a method by which the UE generates PH information (may be referred to as a PH, a PHR, a PH value, or PHR information; and is not limited to these terms and may be referred by terms having the same meaning) when the UE performs PUSCH repetitive transmission to multiple TPRs according to the first embodiment or the second embodiment of the disclosure will now be described. When the UE reports PH information for a particular cell, the UE may select and report one of two types of PH information. The first type is PH information calculated, as an actual PHR, based on PUSCH transmit power that is actually transmitted according to Equation 7 described above. The second type is PH information that is a virtual PHR (or reference format) without actually-transmitted PUSCH, as in Equation 8, and is calculated based on a transmit power parameter configured by a higher layer signal. After a PHR is triggered, when a first PUSCH capable of transmitting corresponding PHR information is a scheduled PUSCH resource, the UE may determine whether a PHR to be calculated for a particular cell based on higher layer signal information and L1 signal received up to a PDCCH monitoring occasion in which the PUSCH is scheduled is an actual PHR or a virtual PHR. Alternatively, after a PHR is triggered, when a first PUSCH capable of transmitting corresponding PHR information is a configured PUSCH resource, the UE may determine whether a PHR to be calculated for a particular cell based on higher layer signal information and L1 signal received before a first reference symbol $T_{proc,2}$ for the PUSCH is an actual PHR or a virtual PHR. Here, a value obtained via calculation according to Equation 2 with d2,1=1 and d2,2=0 may be applied to $T_{proc,2}$ but this is merely an example and a result obtained with another value may be applied thereto. Equation 7 to Equation 8 described above are first-type PH information. The first-type PH information in a communication system to which the disclosure is applicable may indicate PH information about PUSCH transmit power, the second-type PH information may indicate PH information about PUCCH transmit power, and a third-type PH information may indicate PH information about SRS transmit power. However, the disclosure is not limited thereto.

As illustrated in FIG. 19, when one UE communicates with multiple TRPs, there may be a possibility that path attenuation and physical channel environment may vary for each TRP, and thus, there is a need to differently operate transmit power configuration and adjustment for each TRP. For example, in PUSCH transmit power equation in Equation 6, parameters excluding $PL_{b,f,c}(q_d)$ are information pre-indicated by the BS by a higher layer signal or L1 signal, but, as the UE finally determines a PUSCH transmit power value based on measurement of a reference signal with respect to $PL_{b,f,c}(q_d)$, the UE may calculate different transmit power for each TRP and may apply this to multi-TRP based PUSCH repetitive transmissions. Also, in a situation where the UE communicates with first TRP and second TRP, when the UE is closer to the first TRP than the second TRP, it is possible for the UE to have a smaller transmit power value for PUSCH or PUCCH or SRS transmission to the first TRP, compared to the second TRP. Also, a panel and an antenna structure feature may vary for each TRP, and thus, codebook or beam configuration information based on the difference may vary, and transmit power determined by the UE based on the difference may vary for each TRP.

As described above with reference to Equation 6, when determining PUSCH transmit power, the UE is configured a plurality of pieces of configuration information for different parameters by a higher layer signal or L1 signal, and for multiple TRPs, the UE may be enabled to determine transmit power based on different signal information for each TRP or may be configured common signal information but may be enabled to determine transmit power based on different indices or indication information in the signal information.

The UE may transmit or receive control and data information with multiple TRPs on one serving cell. In this case, the UE may transmit PH information to the first TRP or the second TRP. In more detail, the UE may transmit a PUSCH including PH information to the first TRP or the second TRP, and the PUSCH may be scheduled by a same TRP having transmitted a PUSCH or another TRP or may be preconfigured by a higher layer signal. If the BS receives PH information of FIG. 16, there is a need for the UE to predefine whether the PH information is PH information about PUSCH transmit power based on the first TRP or is PH information about PUSCH transmit power based on the second TRP according to Equation 7 or Equation 8. Hereinafter, according to each embodiment of the disclosure, a method of configuring MAC CE information in consideration of multiple TRPs will now be described. In the disclosure, when the UE transmits a PUSCH including PH information to a TRP, it may mean that the UE transmits the PH information (or transmits a MAC CE including the PH information) on a PUSCH resource associated with CORESETPoolIndex corresponding to the TRP. For example, when the UE transmits a PUSCH including PH information to a first TRP among the first TRP and a second TRP, it may mean that the UE transmits a MAC CE including the PH information on a PUSCH resource associated with CORESETPoolIndex 1 corresponding to the first TRP. Also, in the disclosure, when the UE calculates PH information based on one TRP among a plurality of TRPs, it may mean that the UE calculates PH information (actual PHR) based on actual transmit power (actual PUSCH) of a PUSCH associated with CORESETPoolIndex corresponding to the TRP, or it may mean that, although a PUSCH is not actually transmitted to the TRP, PH information (virtual PHR) is calculated based on a transmit power parameter (virtual PUSCH) configured by a higher layer signal with respect to the PUSCH associated with CORESETPoolIndex corresponding to the TRP. Alternatively, when the UE transmits a PUSCH including PH information to a TRP, it may mean that the UE transmits PH information (or transmits a MAC CE including the PH information) about a PUSCH resource associated with an SRI corresponding to the TRP or an SRS resource set (SRS resource set) corresponding to the TRP. However, it should be noted that the disclosure is not limited thereto.

Third-1 Embodiment: Single Entry PHR MAC CE Type 1

Figure 16:
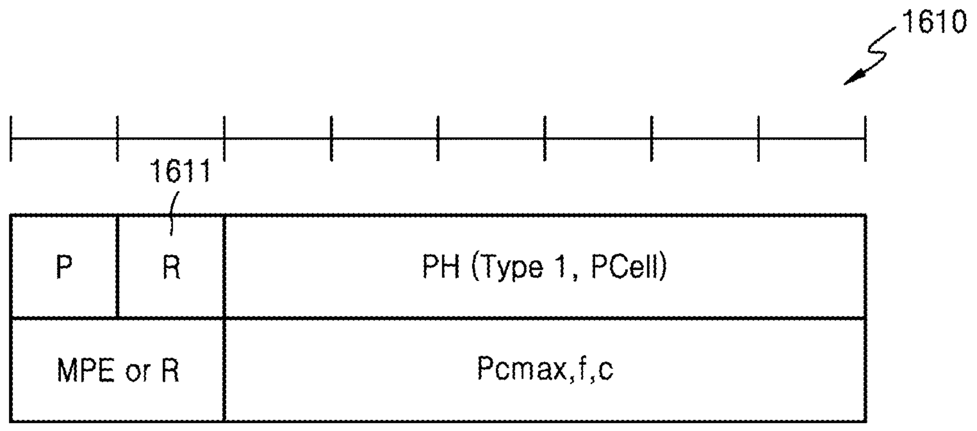
FIG. 16 illustrates a diagram of a structure of a MAC CE including single power headroom (PHR) information according to an embodiment of the disclosure.
Figure 17:
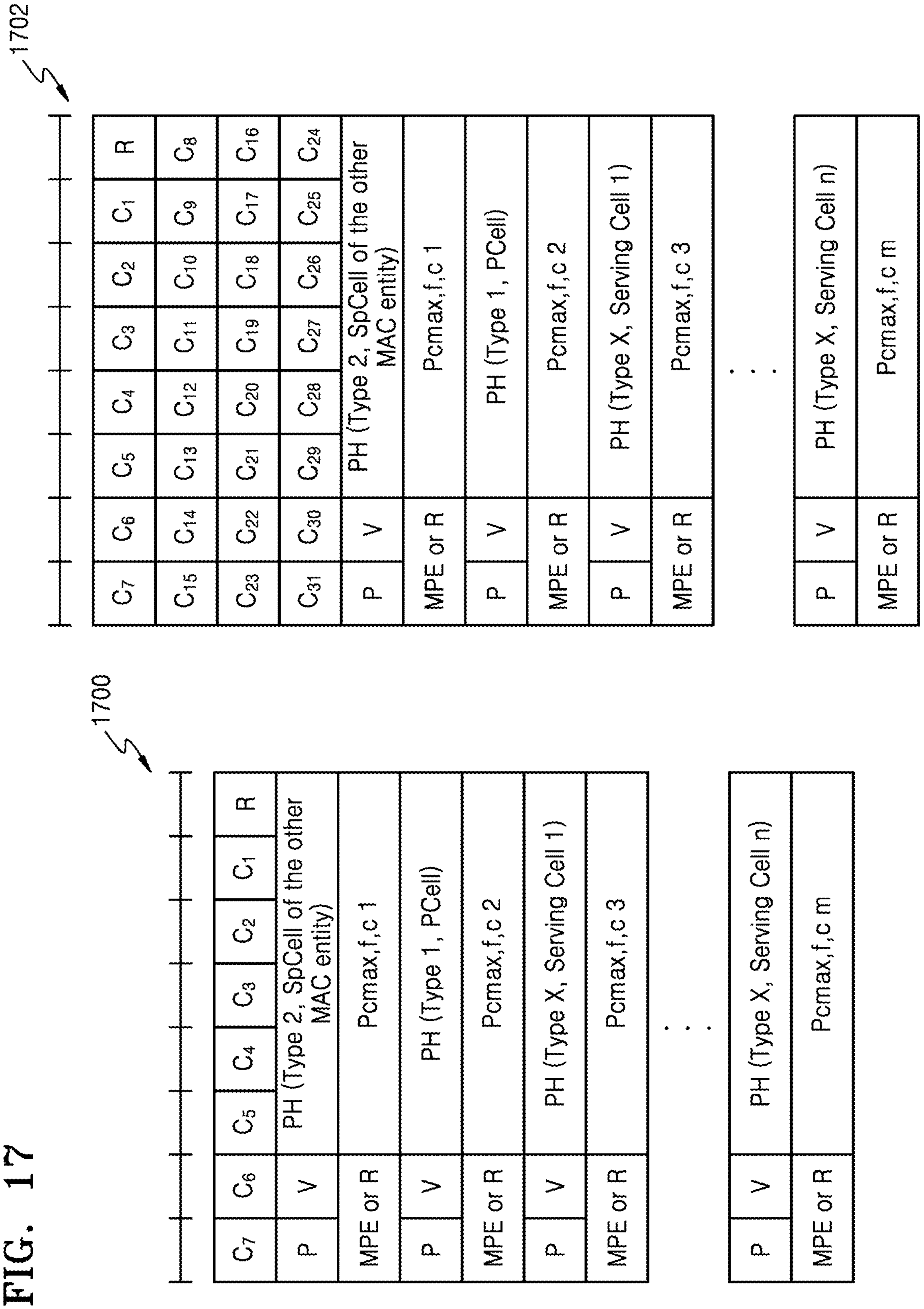
FIG. 17 illustrates is a diagram of a structure of a MAC CE including a plurality of pieces of PHR information according to an embodiment of the disclosure.

The third-1 embodiment proposes a method of using a MAC CE format of FIG. 16 and using a reserved bit R 1611 in a case of multi-TRP based transmission and reception. That is, in response to a value of the reserved bit R being 0 or 1, whether corresponding PH information is a PH based on actual PUSCH or a PH based on a virtual PUSCH may be indicated. Based on the indication, the BS may determine with which TRP information (e.g., a TRP index or CORESETPoolIndex corresponding to the TRP index or an associated SRS resource set or a corresponding SRI field, or the like) the UE calculated PH information. Here, R is used for convenience of description, but the disclosure is not limited thereto and other term, e.g., V may be used. For example, when, in a situation where a first TRP and a second TRP are connected with the UE, the UE transmits a PUSCH including a MAC CE to the first TRP and a value of a reserved bit R is set to 0 (actual PUSCH) in the MAC CE format, the BS may determine that the UE has calculated PH information based on the first TRP. That is, the BS may determine that the UE has calculated PH information based on transmit power for the PUSCH that has been actually transmitted to the first TRP. As another example, when, in a situation where the first TRP and the second TRP are connected with the UE, the UE transmits a PUSCH including a MAC CE to the first TRP and a value of a reserved bit R is set to 1 (virtual PUSCH) in the MAC CE format, the BS may determine that the UE has calculated PH information based on the second TRP. That is, the BS may determine that, although the UE did not actually transmit a PUSCH to the second TRP, the UE has calculated PH information based on higher layer signal information about PUSCH transmit power. As another example, when, in a situation where the first TRP and the second TRP are connected with the UE, the UE transmits a PUSCH including a MAC CE to the second TRP and a value of a reserved bit R is set to 0 (actual PUSCH) in the MAC CE format, the BS may determine that the UE has calculated PH information based on the second TRP. That is, the BS may determine that the UE has calculated PH information based on transmit power for the PUSCH that has been actually transmitted to the second TRP. As another example, when, in a situation where the first TRP and the second TRP are connected with the UE, the UE transmits a PUSCH including a MAC CE to the second TRP and a value of a reserved bit R is set to 1 (virtual PUSCH) in the MAC CE format, the BS may determine that the UE has calculated PH information based on the first TRP. That is, the BS may determine that, although the UE did not actually transmit a PUSCH to the first TRP, the UE has calculated PH information based on higher layer signal information about PUSCH transmit power. When collecting the examples above, based on determination about for which TRP PH information is calculated and to which TRP a PUSCH including the PH information is to be transmitted, the BS determines whether the PH information is calculated based on an actual PUSCH or is calculated based on a virtual PUSCH. When a reference TRP for calculation of PH information and a TRP to which a PUSCH including the PH information is transmitted are equal, the UE may generate the PH information based on an actual PUSCH. When a reference TRP for calculation of PH information and a TRP to which a PUSCH including the PH information is transmitted are not equal, the UE may generate the PH information based on a virtual PUSCH.

Third-2 Embodiment: Single Entry PHR MAC CE Type 2

Figure 25:
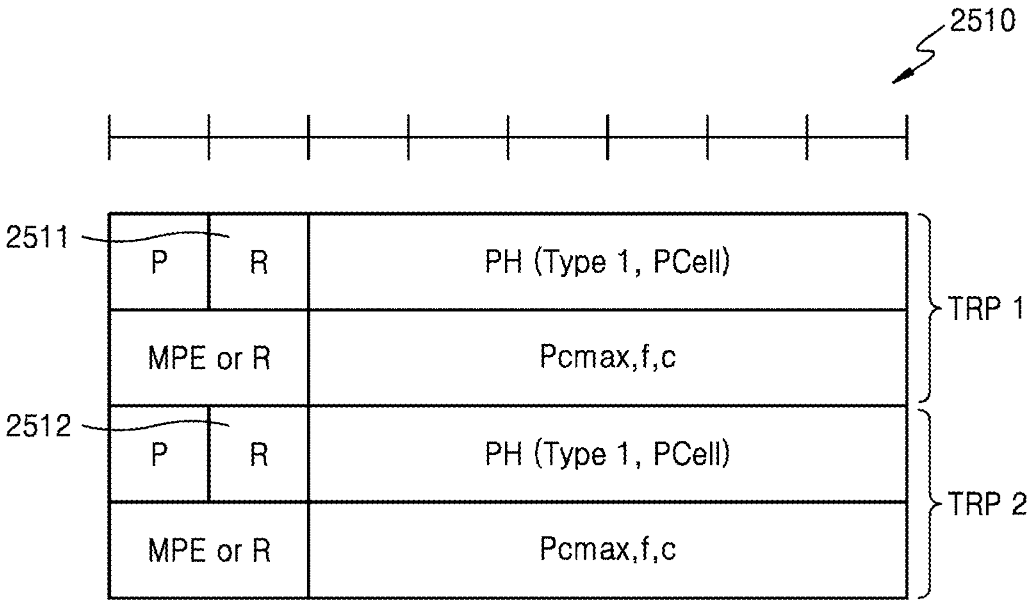
FIG. 25 illustrates a diagram of a structure of a MAC CE including PHR information according to an embodiment of the disclosure.

According to the third-1 embodiment of the disclosure, the UE cannot provide a MAC CE format including PH information about at least two TRPs among multiple TRPs in one serving cell. Therefore, in the third-2 embodiment of the disclosure, a bitmap is configured as in FIG. 25 to generate PH information for each TRP in a situation where the UE is configured with one serving cell. In FIG. 25, it is assumed that the number of TRPs is 2, but the disclosure is not limited thereto, and it is possible for the bitmap to be configured for N TRPs. Also, in FIG. 25, the MAC CE format may include information in which reserved bits 2511 and 2512 are used for V fields of FIG. 17 so as to indicate whether PH information the UE calculates for each TRP is based on an actual PUSCH or is based on a virtual PUSCH. Also, when a virtual PUSCH is indicated by the V field, the UE may omit MPE field and Pcmax,f,c field for a corresponding TRP. FIG. 25 is similar to FIG. 17 but a field indicating a serving cell is not present and PH information bitmaps may be determined according to a configured number of TRPs and may be determined in ascending order or descending order according to TRP indices. Alternatively, in the third-2 embodiment, without referring to the reserved bits 2511 and 2512 of FIG. 25, in which reference PH information is generated for each TRP may be determined based on a TRP having received a PUSCH including the PH information. For example, when a first TRP receives PHR information of FIG. 25, the BS may determine that PH information is calculated based on an actual PUSCH with respect to the first TRP, and may determine that PH information is calculated based on a virtual PUSCH with respect to a TRP other than the first TRP.

Third-3 Embodiment: Single Entry PHR MAC CE Type 3

Figure 26:
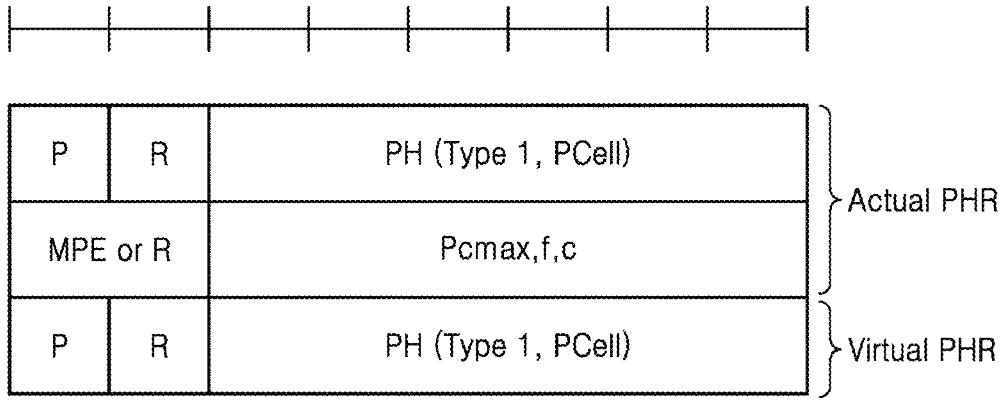
FIG. 26 illustrates a diagram of a structure of a MAC CE including PHR information according to an embodiment of the disclosure.

According to the third-3 embodiment of the disclosure, a bitmap for which actual PHR is calculated and a bitmap for which virtual PHR is calculated are fixed without a need for the UE to use a reserved bit of FIG. 16 for other purpose. As shown in FIG. 26, an actual PHR may be first configured as two octets, and a virtual PHR may be configured as one octet. However, the disclosure is not limited thereto, and thus, the virtual PHR may be first configured as one octet and the actual PHR may be configured as two octets, or other various configurations may be available. In FIG. 26, two TRPs are assumed and illustrated, but the disclosure is not limited thereto and is applicable to multiple TRPs. In this case, a bitmap for a virtual PHR may be configured for each TRP, and TRPs excluding a TRP for an actual PHR may be mapped in ascending order or descending order. In FIG. 26, a TRP for which the UE calculates with respect to a bitmap with an actual PHR may be a TRP that receives a PUSCH transmitting corresponding PH information. For other TRPs, PH information may be calculated based on a virtual PUSCH. Therefore, in FIG. 26, MPE and Pcmax,f,c are present only in a bitmap corresponding to an actual PHR, and MPE and Pcmax,f,c information may be omitted in a bitmap corresponding to a virtual PHR.

Third-4 Embodiment: Single Entry PHR MAC CE Type 4

Figure 27:
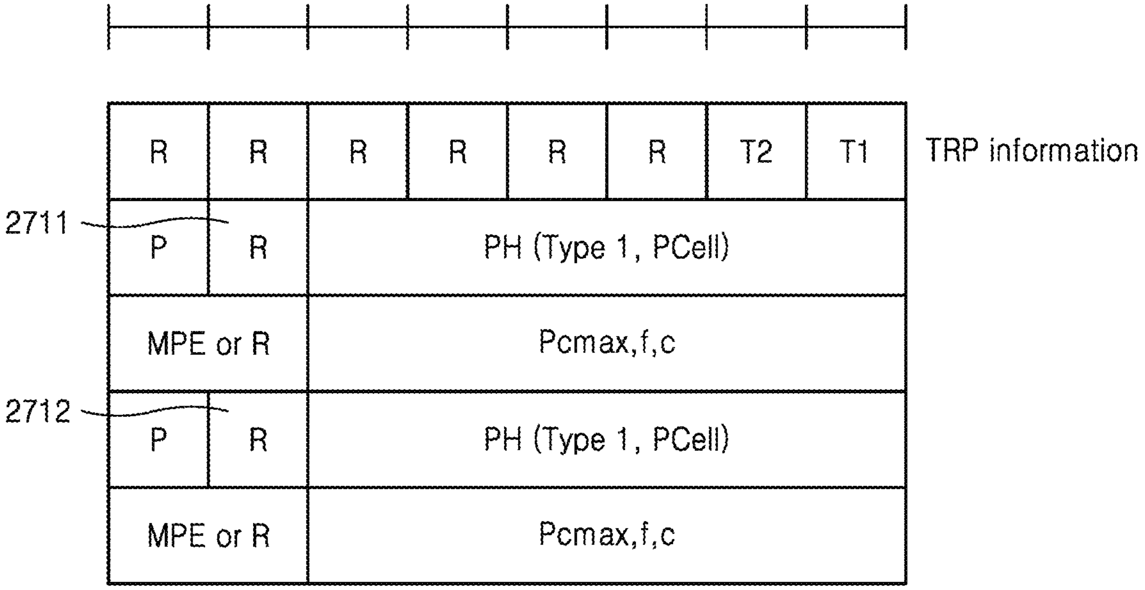
FIG. 27 illustrates a diagram of a structure of a MAC CE including PHR information according to an embodiment of the disclosure.

According to the third-3 embodiment of the disclosure, as illustrated in FIG. 27, an octet including index information for each TRP may be first included, and then a plurality of pieces of PH information configured of one or two octets based on corresponding TRP index information may be mapped in ascending order or descending order of TRP indices. In FIG. 27, it is assumed a case where two TRPs are configured for one UE, but the MAC CE of FIG. 27 may be applicable to two or more TRPs. Similar to the case of FIG. 25, reserved bits R 2711 and 2712 may be used to indicate whether it is an actual PHR or a virtual PHR. Alternatively, it is possible to determine whether it is an actual PHR or a virtual PHR depending on TRP having received a PUSCH including PHR MAC CE information. This is similar to the third-3 embodiment of the disclosure but is different in that an octet including information about TRPs including PH information is added and thus a TRP and PH information are mapped according to the information about TRPs.

The third-1 to third-4 embodiments of the disclosure are related to a method by which the UE generates PH information for a case where the UE is configured with one serving cell in a multi-TRP situation. Embodiments thereafter are related to a method by which the UE generates PH information for a case where the UE is configured with a plurality of serving cells in a multi-TRP situation.

Third-5 Embodiment: Multiple Entry PHR MAC CE Type 1

Figure 28:
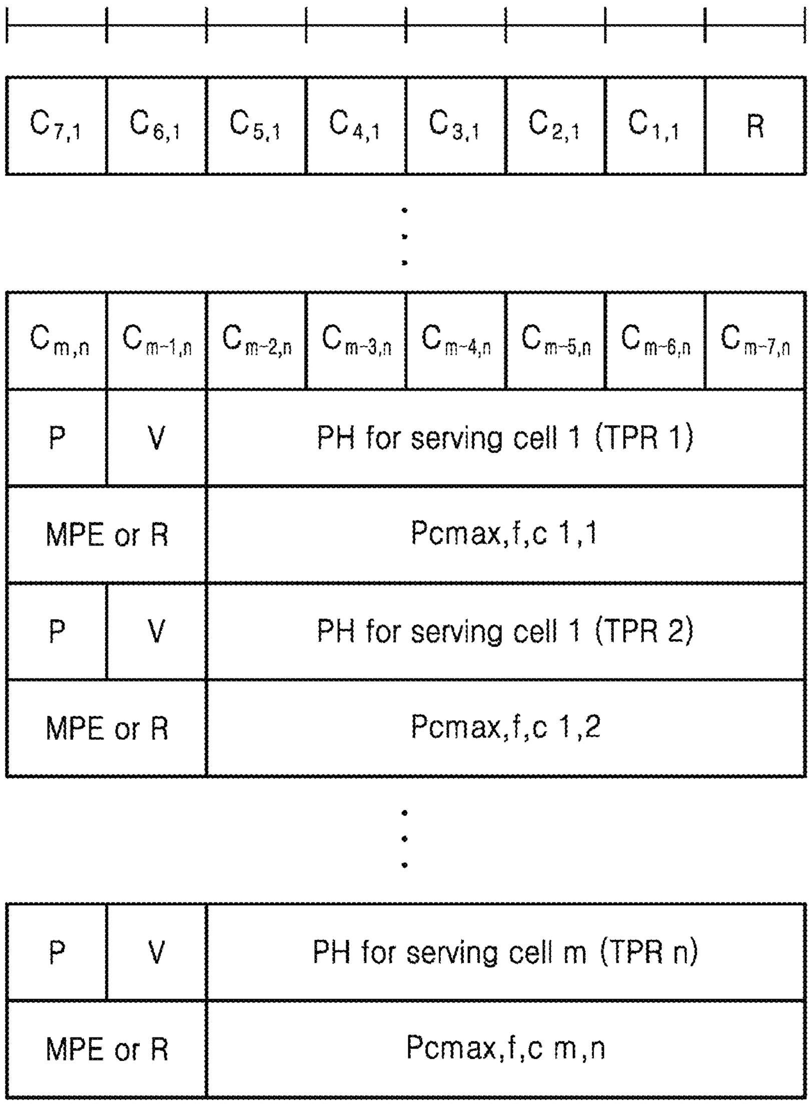
FIG. 28 illustrates a diagram of a structure of a MAC CE including PHR information according to an embodiment of the disclosure.

FIG. 28 illustrates a diagram of a method by which the UE generates PH information in a situation where the UE is configured with multiple TRPs and multiple cells according to the third-5 embodiment of the disclosure. Similar to the case of FIG. 17, octets respectively including information about serving cells are present and simultaneously include TRP information for each serving cell. For example, Cm,n indicates mth serving cell and nth TRP, and when its value is 1, PH information therefor may be configured of up to two different octets. In FIG. 28, it is illustrated that a plurality of pieces of PH information are mapped to TRP indices in a corresponding serving cell index based on the serving cell index, but this is merely an example, and thus, the plurality of pieces of PH information may be mapped to serving cell indices in a corresponding TRP index based on the TRP index. In other words, PH information may be mapped based on a serving cell index and a TRP index. For example, when m is 7 and n is 2, the UE may configure a total of 14 pieces of PH information, and may indicate, by a V value, whether PH information is calculated based on an actual PUSCH or is calculated based on a virtual PUSCH. When calculated based on the virtual PUSCH, Pcmax,f,c field and MPE field may be omitted.

Third-6 Embodiment: Multiple Entry PHR MAC CE Type 2

Figure 29:
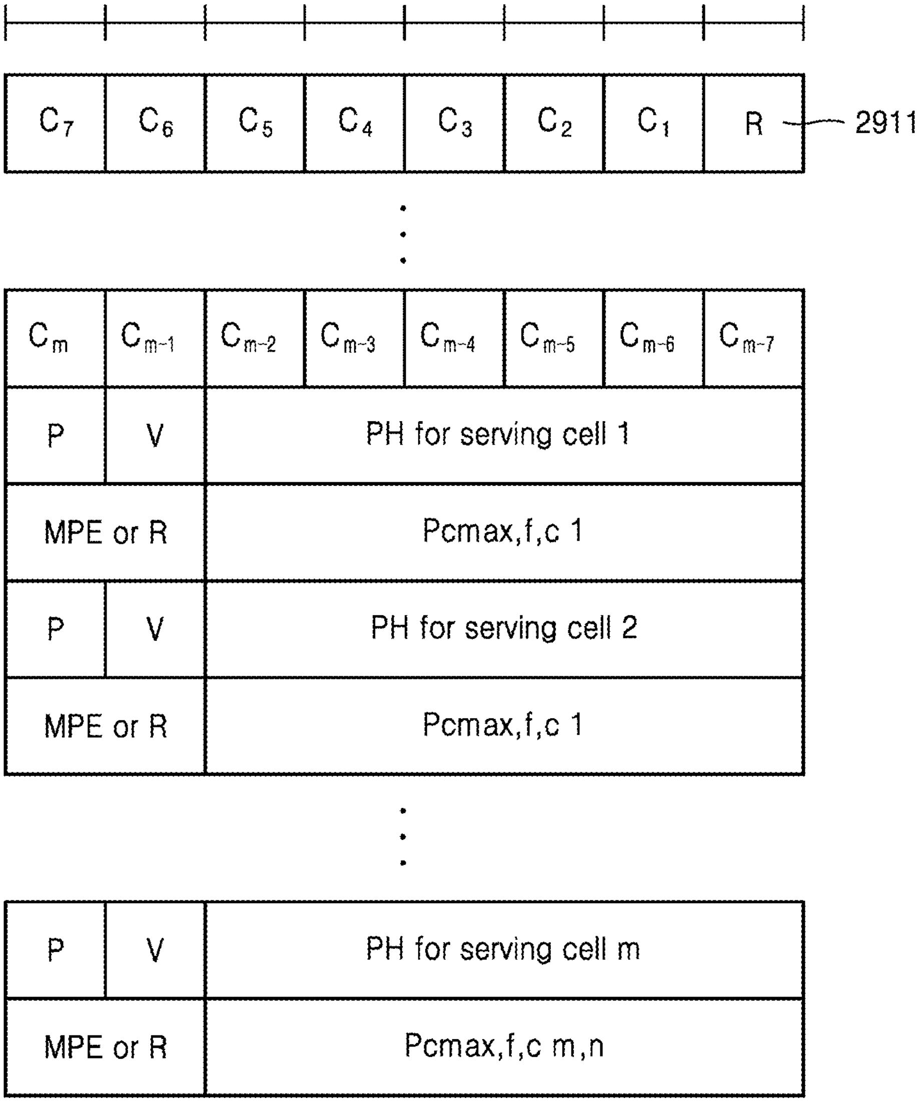
FIG. 29 illustrates a diagram of a structure of a MAC CE including PHR information according to an embodiment of the disclosure.

FIG. 29 illustrates a diagram of a method by which the UE generates PH information: in a situation of multiple TRPs according to the third-6 embodiment of the disclosure. Similar to the case of FIG. 17, octets capable of respectively indicating serving cell indices are included, and a plurality of pieces of PH information therefor are arrayed based on serving indices. TRP information may be indicated by a reserved bit R 2911 of FIG. 29. For example, when an R value indicates 0, it may indicate that PH information about each serving cell is determined based on a first TRP, and when the R value indicates 1, it may indicate that PH information about each serving cell is determined based on a second TRP. The UE may report a MAC CE having a MAC CE format of FIG. 29 to the BS, and the BS may determine, based on information indicated by the R value, for which TRP the UE has generated PH information.

Third-7 Embodiment: Multiple Entry PHR MAC CE Type 3

The UE may report, to the BS, a PHR MAC CE having a MAC CE format shown in FIG. 17. However, for which TRP the UE has calculated PH information may be determined based on a TRP to which a PUSCH including the PH information is transmitted. For example, when the PUSCH including the PH information is transmitted to a first TRP, the UE may pre-calculate PH information for a plurality of serving cells, based on the first TRP, and when a PHR is triggered, the UE may transmit a MAC CE including the PH information to the BS, and the BS may regard that the UE pre-calculated the PH information for the plurality of serving cells, based on the first TRP. According to the present embodiment of the disclosure, there is a merit that it is not necessary to newly define a separate MAC CE format and it is possible to re-use an existing MAC CE format.

In the third-1 to third-7 embodiments of the disclosure, with respect to a method by which a TRP to and from a PUSCH including PH information is transmitted and received in an operation of determining for which TRP the PH information is determined, when the transmission and reception of the PUSCH are executed with respect to only one TRP, there is no problem. However, when the PUSCH is repeatedly transmitted to multiple TRPs (e.g., PUSCH repetitive transmission is performed for each of a first TRP and a second TRP), the methods may not be applicable. In this case, the UE and the BS may refer to a TRP for which the PUSCH is initially transmitted and received or a TRP for which the PUSCH is last transmitted and received.

Also, a MAC entity in the embodiments described above may determine for which TRP the PH information is determined, based on a TRP for which the PUSCH including the PH information is transmitted and received. In more detail, when the MAC entity determines a TRP for which PH information is generated (or calculated), the MAC entity may consider the TRP for which a PUSCH including the PH information is transmitted. and received. For example, the MAC entity may determine that PH information included in a PUSCH transmitted and received to and from the first TRP is calculated based on the first TRP. Alternatively, the MAC entity may determine that PH information included in a PUSCH transmitted and received to and from the second TRP is calculated based on the second TRP. Here, the MAC entity may indicate a MAC entity of the BS or a MAC entity of the UE.

Figure 30:
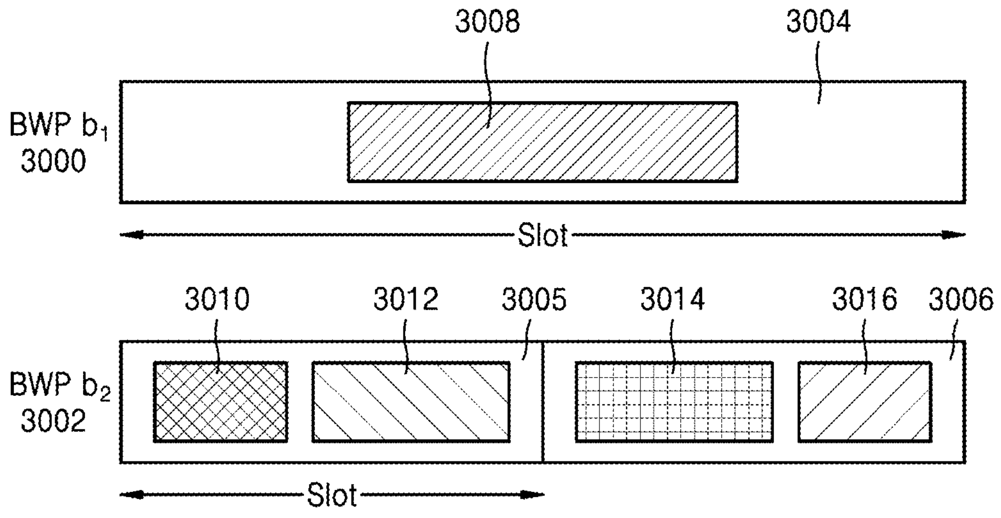
FIG. 30 illustrates a diagram of a resource for a PUSCH including PH information scheduled in a multi-cell environment according to an embodiment of the disclosure.

Fourth Embodiment: UE Operation for Determining Particular PUSCH Resource when Reporting PH Information in Multi-Cell Environment FIG. 30 illustrates a diagram of that a resource for a PUSCH including PH information is scheduled in a multi-cell environment according to an embodiment of the disclosure. When the UE operates a plurality of cells for PUSCH transmission, a PUSCH transmission resource being transmitted in particular cell A includes PH information for another cell and a plurality of PUSCHs are scheduled in the other cell, there is a need to determine based on which PUSCH transmission resource the PH information is reported.

For example, in a situation where the UE is configured with a plurality of cells for PUSCH transmission and a subcarrier value $\mu_1$ of UL BWP $b_1$ 3000 of carrier $f_1$ of serving cell $c_1$ is smaller than a subcarrier value $\mu_2$ of UL BWP $b_2$ 3002 of carrier $f_2$ of serving cell $c_2$, if the UE provides Type 1 PHR included in one PUSCH transmission 3008 in one slot 3004 on activated UL BWP $b_1$ 3000 which overlaps with a plurality of slots 3005 and 3006 on activated UL BWP $b_2$ 3002, the UE provides Type 1 PHR with respect to a first PUSCH 3010 in the first slot 3005 among the plurality of slots 3005 and 3006 on the activated UL BWP $b_2$ 3002 which completely overlap with the slot 3004 on the activated UL BWP $b_1$ 3000.

As another example, in a situation where the UE is configured with the plurality of cells for PUSCH transmission and the subcarrier value $\mu_1$ of the UL BWP $b_1$ 3000 of the carrier $f_1$ of the serving cell $c_1$ is equal to the subcarrier value $\mu_2$ of the UL BWP $b_2$ 3002 of the carrier $f_2$ of the serving cell $c_2$, if the UE provides Type 1 PHR included in one PUSCH transmission in one slot on the activated UL BWP $b_1$ 3000, the UE provides Type 1 PHR with respect to a first PUSCH in a slot on the activated UL BWP $b_2$ 3002 which overlaps with a slot on the activated UL BWP $b_1$ 3000.

As another example, when the UE is configured with a plurality of cells for PUSCH transmission and transmits Type 1 PHR in PUSCH transmission that is PUSCH repetitive transmission Type B having nominal repetitive transmissions over a plurality of slots on the activated UL BWP $b_1$ 3000 which are overlap with one or more slots on the activated UL BWP $b_2$ 3002, the UE transmits Type 1 PHR on a first PUSCH in a first slot among one or more slots on the activated UL BWP $b_2$ 3002 which overlap with the plurality of slots for the nominal repetitive transmissions on the activated UL BWP $b_1$ 3000.

In the disclosure, determination of a first PUSCH 3010 with reference to FIG. 30 may vary based on whether a PUSCH 3008 is a dynamic PUSCH transmitted according to scheduling DCI or a configured grant-based PUSCH periodically transmitted without scheduling DCI. If the PUSCH 3008 is indicated by scheduling DCI, the UE considers PUSCH resources determined by an upper layer signal or L1 signal until a time point at which the scheduling DCI is transmitted and received. If the PUSCH 3008 is a grant-based PUSCH configured without scheduling DCI, the UE considers PUSCH resources determined by an upper layer signal or L1 signal before a time point of $T_{proc,2}$ value described with reference to Equation 2 associated with a first symbol reference of the PUSCH 3008. For example, in a case where a PUSCH 3010 is not scheduled and a PUSCH 3012 is scheduled until the time point, the UE determines the PUSCH 3012 as a first PUSCH.

For example, when the UE can perform repetitive transmission for each of a plurality of TRPs as described with reference to FIG. 19, there is a need for the UE to determine for which TRP the UE has to calculate PH information about a PUSCH from among PUSCHs that are being repeatedly transmitted. For example, with reference to FIG. 30, PH information may be included in the PUSCH 3008 transmitted to TRP 1, and PUSCHs 3010, 3012, 3014, and 3016 may be repeatedly transmitted to different TRPs on BWP $b_2$ or may be transmitted to different TRPs without repetitive transmission. In this situation, when the UE reports PH information about a plurality of cells, different operations may be possible according to MAC CE PHR formats.

Case 30-1: A case where, in an MAC CE PHR format, PH information for one PUSCH may be generated based on one TRP for each serving cell. In the case, PH information may be included for each serving cell as in FIG. 29, but PH information for one PUSCH based on a plurality of TRPs in one serving cell may not be included. With reference to FIG. 29, a plurality of pieces of PH information included in a corresponding MAC CE PHR format are based on the same TRP information with respect to all serving cells, but an amended case where PH information for one PUSCH based on different TRPs is included for each serving cell may be possible and this is the same as that of FIG. 17.

When the UE includes PH information in the PUSCH 3008 as in FIG. 30, the UE generates (actual) PH information with respect to the first PUSCH 3010 included in a first slot among slots on the activated UL BWP $b_2$ 3002 which overlap with a corresponding slot on the activated UL BWP $b_1$ 3000. For example, when the first PUSCH 3010 is transmitted to TRP 1, the UE calculates (actual) PH information with respect to the PUSCH 3010 determined based on TRP 1 and includes the PH information when reporting a PHR. Here, TRP 1 may be amended and applied as a different TRP index.

Alternatively, when the UE includes PH information in the PUSCH 3008 as in FIG. 30, the UE generates (actual) PH information with respect to the first PUSCH 3010 transmitted (or associated with the same CORESETPoolIndex) at the same TRP as the PUSCH 3008 among PUSCHs in a first slot among slots on the activated UL BWP $b_2$ 3002 which overlap with a corresponding slot on the activated UL BWP $b_1$ 3000. For example, in a case where the PUSCH 3008 is transmitted to TRP 1, for the first PUSCH 3012 transmitted to TRP 1 among PUSCHs in a first slot among slots overlapping with a slot on the activated UL BWP $b_1$ 3000, the UE calculates (actual) PH information with respect to the PUSCH 3012 and includes the PH information when reporting a PHR. Here, TRP 1 may be amended and applied as a different TRP index.

Alternatively, when the UE includes PH information in the PUSCH 3008 as in FIG. 30, the UE generates (actual) PH information with respect to a first PUSCH indicated by a higher layer signal or L1 signal (or associated with CORESETPoolIndex) among PUSCHs in a first slot among slots on the activated UL BWP $b_2$ 3002 which overlap with a corresponding slot on the activated UL BWP $b_1$ 3000. For example, with respect to the first PUSCH, TRP 1 is indicated by a higher layer signal and the PUSCH 3010 is transmitted to TRP 1, the UE calculates (actual) PH information about the PUSCH 3010 and includes the PH information when reporting a PHR.

Alternatively, when the UE includes PH information in the PUSCH 3008 as in FIG. 30, the UE generates (actual) PH information about a first PUSCH that satisfies a timeline among PUSCHs in a first slot among slots on the activated UL BWP $b_2$ 3002 which overlap with a corresponding slot on the activated UL BWP $b_1$ 3000. Here, the meaning of satisfying the timeline indicates the first PUSCH among PUSCHs which is associated with the same CORESETPoolIndex indicating the PUSCH 3008. For example, when the PUSCH 3008 is indicated by a PDCCH associated with a particular CORESETPoolIndex, the PUSCH 3008 may indicate a first PUSCH among PUSCHs having the same value as the CORESETPoolIndex among PUSCHs determined by a higher layer signal or L1 signal the UE has received until a time point of transmission and reception of PDCCH. As another example, in a case where the PUSCH 3008 is a configured grant PUSCH without scheduling DCI and the UE receives information indicating association with a particular CORESETPoolIndex by a higher layer signal or L1 signal, the UE may generate (actual) PH information based on a first PUSCH among same PUSCHs as the CORESETPoolIndex among PUSCH resources determined by a higher layer signal or L1 signal the UE has received before a time point of $T_{proc,2}$ according to Equation 2 on a start symbol of the PUSCH 3008, and may generate the PH information. With reference to FIG. 30, when the UE determines, based on the higher layer signal or L1 signal received until the time point, that only the PUSCH 3008 and PUSCHs 3012 and 3014 associated with the PUSCH 3008 exist on the BWP $b_2$ 3002, the UE may generate and report (actual) PH information with respect to the PUSCH 3012. These are descriptions of a timeline at which existence of a PUSCH resource in the BWP $b_2$ 3002 is determined, and the descriptions are applied to other embodiments of the disclosure and thus the UE may determine it.

Alternatively, in a case where the UE includes PH information in the PUSCH 3008 as in FIG. 30, when there is no PUSCH included in a first slot among slots on the activated UL BWP $b_2$ 3002 which overlap with a corresponding slot on the activated UL BWP $b_1$ 3000, the UE has to determine for which TRP the UE is to determine virtual PH information. For reference, a time point when the UE determines non-existence of the PUSCH is a last symbol on which a PDCCH is transmitted when the PUSCH 3008 is scheduled by DCI of the PDCCH, and when the PUSCH 3008 is a grant PUSCH configured without a PDCCH, the time point may be a time point before a first symbol reference $T_{proc,2}$ of the PUSCH 3008. However, this is merely an example, and thus, other time point may be applied. Then, the UE determines PUSCH resource allocation, based on information received until the time point by a higher layer signal or L1 signal from the BS. When the PUSCH does not exist, the UE calculates virtual PH information based on the same CORESETPoolIndex as the PUSCH 3008. Alternatively, when the PUSCH does not exist, the UE calculates virtual PH information based on a particular CORESETPoolIndex pre-indicated by a higher layer signal or L1 signal. Alternatively, when the PUSCH does not exist, the UE calculates virtual PH information always based on a value of CORESETPoolIndex 0.

Case 30-2: A case where, in an MAC CE PHR format, PH information for a plurality of PUSCHs may be generated based on multiple TRPs respectively for serving cells. That is, the UE is able to report PH information of each of PUSCHs based on a plurality of TRPs for one serving cell according to the MAC CE PHR format described with reference to FIG. 28.

When the UE includes PH information in the PUSCH 3008 as in FIG. 30, the UE generates (actual) PH information about first PUSCHs each being associated with CORESETPoolIndex and included in a first slot among slots on the activated UL BWP $b_2$ 3002 which overlap with a corresponding slot on the activated UL BWP $b_1$ 3000. For example, when the PUSCH 3010 is a first PUSCH associated with CORESETPoolIndex 0 (or is for TRP 1) and the PUSCH 3012 is a first PUSCH associated with CORESETPoolIndex 1 (or is for TRP 2), the UE considers the PUSCH 3010 so as to generate (actual) PH information based on TRP 1 and considers the PUSCH 3012 so as to generate (actual) PH information based on TRP 2. If the PUSCH 3012 does not exist in FIG. 30, when the UE generates PH information based on TRP 2, the UE generates virtual PH information as there is no scheduled PUSCH. If the PUSCH 3010 does not exist in FIG. 30, when the UE generates PH information based on TRP 1, the UE generates virtual PH information as there is no scheduled PUSCH. As another example, in a case where the PUSCH 3010 or the PUSCH 3012 is not allocated to a first slot, when a first PUSCH exists in not-first slots among slots on the activated UL BWP $b_2$ 3002 which completely overlap with a slot on the activated UL BWP $b_1$ 3000 in which the PUSCH 3008 including PH information is transmitted and received, the UE does not calculate virtual PH information about a corresponding TRP but may calculate actual PH information based on the PUSCH. For example, when the PUSCH 3010 is not allocated but the PUSCH 3014 is allocated and it is PUSCH transmission for TRP 1 (or PUSCH transmission associated with CORESETPoolIndex 0), the UE considers the PUSCH 3014 so as to generate actual PH information based on TRP 1. As another example, when the PUSCH 3012 is not allocated but the PUSCH 3016 is allocated and it is PUSCH transmission for TRP 2 (or PUSCH transmission associated with CORESETPoolIndex 1), the UE considers the PUSCH 3016 so as to generate actual PH information based on TRP 2.

Alternatively, when the UE includes PH information in the PUSCH 3008 as in FIG. 30, the UE generates (actual) PH information only about a first PUSCH included in a first slot among slots on the activated UL BWP $b_2$ 3002 which overlap with a corresponding slot on the activated UL BWP $b_1$ 3000, and generates virtual PH information about other PUSCHs even when the other PUSCHs exist in the first slot. For example, when the PUSCH 3010 is a first PUSCH associated with CORESETPoolIndex 0 and the PUSCH 3012 is a first PUSCH associated with CORESETPoolIndex 1, the UE may generate (actual) PH information for the PUSCH 3010 based on TRP 1 and may generate virtual PH information based on TRP 2 without consideration of the PUSCH 3012.

Alternatively, when the UE includes PH information in the PUSCH 3008 as in FIG. 30, the UE generates (actual) PH information only about a first PUSCH associated with the same CORESETPoolIndex as the PUSCH 3008 included in a first slot among slots on the activated UL BWP $b_2$ 3002 which overlap with a corresponding slot on the activated UL BWP $b_1$ 3000, and generates virtual PH information about other PUSCHs even when the other PUSCHs exist in the first slot. For example, when the PUSCH 3008 is a PUSCH associated with CORESETPoolIndex 1, the PUSCH 3010 is a first PUSCH associated with CORESETPoolIndex 0, and the PUSCH 3012 is a first PUSCH associated with CORESETPoolIndex 1, the UE may generate (actual) PH information about the PUSCH 3012 based on TRP 2 and may generate virtual PH information based on TRP 1 without consideration of the PUSCH 3010.

Alternatively, in a case where the UE includes PH information in the PUSCH 3008 as in FIG. 30, when there is no PUSCH included in a first slot among slots on the activated UL BWP $b_2$ 3002 which overlap with a corresponding slot on the activated UL BWP $b_1$ 3000, the UE determines virtual PH information about all of a plurality of TRPs. For reference, a time point at which non-existence of the PUSCH is determined may be a last symbol on which a PDCCH is transmitted when the PUSCH 3008 is scheduled by DCI of the PDCCH, and may be a time point before a first symbol reference $T_{proc,2}$ of the PUSCH 3008 when the PUSCH 3008 is a grant PUSCH configured without the PDCCH. However, this is merely an example, and thus, it is possible that other time point is applied. Then, the UE determines PUSCH resource allocation, based on information received until the time point by a higher layer signal or L1 signal from the BS.

FIG. 30 illustrates a situation in which subcarrier spacings of the BWP $b_1$ 3000 and the BWP $b_2$ 3002 are different, but all embodiments described above may be applied to the same subcarrier spacing. In the disclosure, the PUSCH 3008 including PH information as illustrated in FIG. 30 may be applied only on a PUSCH resource including initial transmission data but the disclosure is not limited thereto.

Fifth Embodiment: Amended PH Information Equation

The above methods are described assuming that the UE calculates PH information using Equation 7 or Equation 8. However, unlike this, a method by which the UE that operates communication based on a plurality of TRPs calculates amended PH information and reports the amended PH information to the BS may be possible. For example, when the UE is configured with 5 serving cells and performs transception with respect to a total of two TRPs, the UE has to calculate each of up to 10 pieces of PH information and to transmit them by including them in an MAC CE PHR format. Therefore, a size of the format may be increased as the number of serving cells or the number of TRPs is increased. Accordingly, a method of configuring one PH information, regardless of the number of TRPs, for each serving cell may be available in the form of Equation 9 below.

$$PH_{type1,b,f,c}(i,j,q_d,l)=PH_{type1,b,f,c,t1}(i,j,q_d,l)*PH_{type1,b,f,c,t2}(i,j,q_d,l) \quad \text{Equation 9}$$

$PH_{type1,b,f,c,t1}(i,j,q_d,l)$ is equal to Equation 7 or Equation 8, and t1 indicates PH information about TRP 1 (or associated with CORESETPoolIndex 0). $PH_{type1,b,f,c,t2}(i,j,q_d,l)$ is equal to Equation 7 or Equation 8, and t2 indicates PH information about TRP 2 (or associated with CORESETPoolIndex 0). The meaning of Equation 9 is that a value of $PH_{type1,b,f,c,t1}(i,j,q_d,l)$ corresponds to a result value obtained by the particular function (■) of $PH_{type1,b,f,c,t1}(i,j,q_d,l)$ and $PH_{type1,b,j,c,t2}(i,j,q_d,l)$. Here, the particular function may include various methods, and ■ may be the four fundamental arithmetic operations such as addition, subtraction, division, multiplication, and the like or a maximum value (A■B=maximum(A,B)) or a minimum value (A ■B=minimum(A,B)) or an average value (A■B=Average(A,B)). Other four fundamental arithmetic operations defined by the combinations above may be available.

If the UE performs PUSCH simultaneous transmission with respect to a plurality of TRPs in one serving cell, the UE is able to calculate PH information by using Equation 10 below.

$$PH'_{type1,b,f,c}(i,j,q_d,l) = P_{CMAX,f,c}(i) - \sum_t PH'_{type1,b,f,c,t}(i,j,q_d,l)\ [\text{dBm}] \quad \text{Equation 10}$$

The meaning of Equation 10 may indicate that the UE includes information of a value of remaining transmit power (power headroom) excluding PUSCH transmission power being simultaneously transmitted for each TRP, compared to maximum transmit power. Also, $P_{CMAX,f,c}(i)$ the UE determines for Equation 10 may be determined assuming at least one or some of values of MPR or A-MPR or P-MPR as a different value, unlike in Equation 7 or Equation 8. $PH'_{type1,b,f,c,t}(i,j,q_d,l)$ in Equation 10 may correspond to at least one of actual transmit power equation as Equation 11 or virtual transmit power equation as Equation 12 with respect to particular TRP t.

$$PH'_{type1,b,f,c,t}(i,j,q_d,l) = P_{O_{PUSCH},b,f,c}(j) + 10\log_{10}\left(2^{\mu}\cdot M^{PUSCH}_{RB,b,f,c}(i)\right) + \alpha_{b,f,c}(j)\cdot PL_{b,f,c}(q_d) + \Delta_{TF,b,f,c}(i) + f_{b,f,c}(i,l) \quad \text{Equation 11}$$

$$PH'_{type1,b,f,c,t}(i,j,q_d,l)=P_{O_{PUSCH},b,f,c}(j)+\alpha_{b,f,c}(j)\cdot PL_{b,f,c}(q_d)+f_{b,f,c}(i,l) \quad \text{Equation 12}$$

According to Equation 9 to Equation 12 described above, the UE may sufficiently apply the fifth embodiment to at least one or a combination of the embodiments of the disclosure.

When the UE is configured with a plurality of serving cells according to the method provided in the fifth embodiment of the disclosure, the UE may not need to report PH information for each serving cell and each TRP as illustrated in FIG. 28, and may provide a PHR to the BS by using the PHR MAC CE format as in FIG. 17 or 29.

Figure 31:
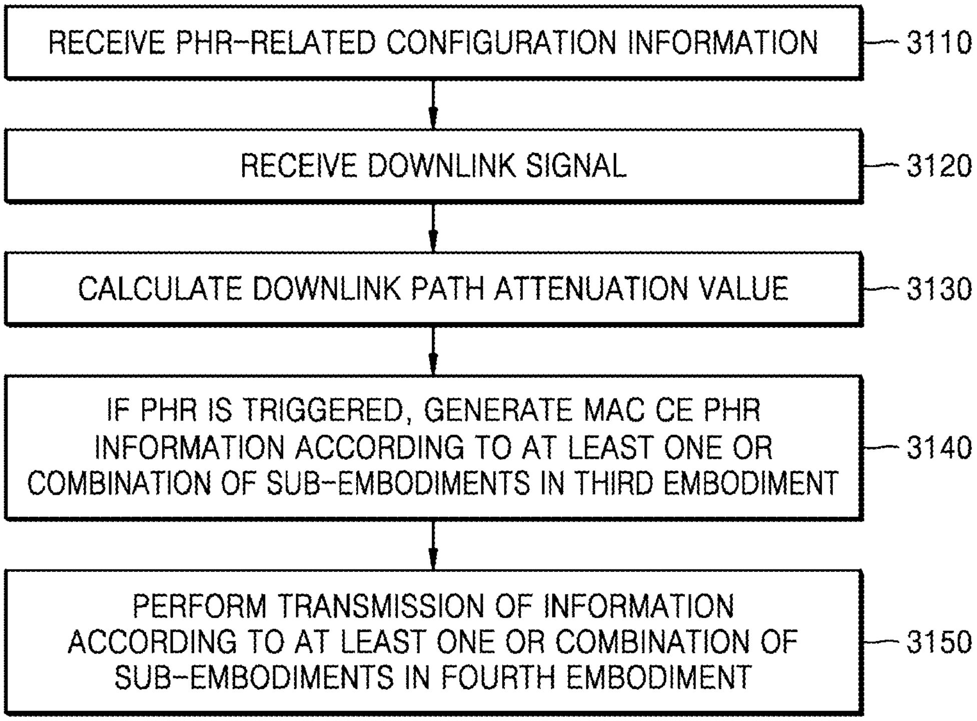
FIG. 31 illustrates a diagram of operations of a UE according to an embodiment of the disclosure.

FIG. 31 illustrates a diagram of operations of the UE according to an embodiment of the disclosure.

Referring to FIG. 31, the UE may receive PHR-related configuration information from the BS in operation 3110. The PHR-related configuration information may include a time value associated with a PHR, an indicator indicating an MAC CE format to be used for a PHR, a PHR configuration parameter for PUSCH transmission in FR2, a value indicating variation of a DL path attenuation (or transmit power) so as to satisfy a PHR trigger condition, or the like. The PHR-related configuration information may be received via a higher layer signal.

In operation 3120, the UE may receive a DL signal (e.g., CSI-RS, SSB, or the like) from a first TRP or a second TRP.

In operation 3130, the UE may calculate a DL path attenuation value, based on a measurement result of a DL signal received in operation 3120.

In operation 3140, if a PHR is triggered, the UE (MAC entity) may generate an MAC CE having an MAC CE format according to the third embodiment or an MAC CE having an MAC CE format according to a combination of the embodiments above. In the disclosure, when a timer configured according to a timer value included in the PHR-related configuration information expires or variation of a DL path attenuation value is equal to or greater than a particular threshold, the PHR may be triggered.

In operation 3150, the UE may transmit a PUSCH including the MAC CE generated in operation 3140 to a TRP among at least one TRP. When the UE is configured with a plurality of serving cells, the UE calculates PH information, in consideration of one or a combination of sub-embodiments described with reference to the fourth embodiment or the fifth embodiment.

Operations 3110 to 3150 of FIG. 31 may be simultaneously performed or some of them may be omitted.

Figure 32:
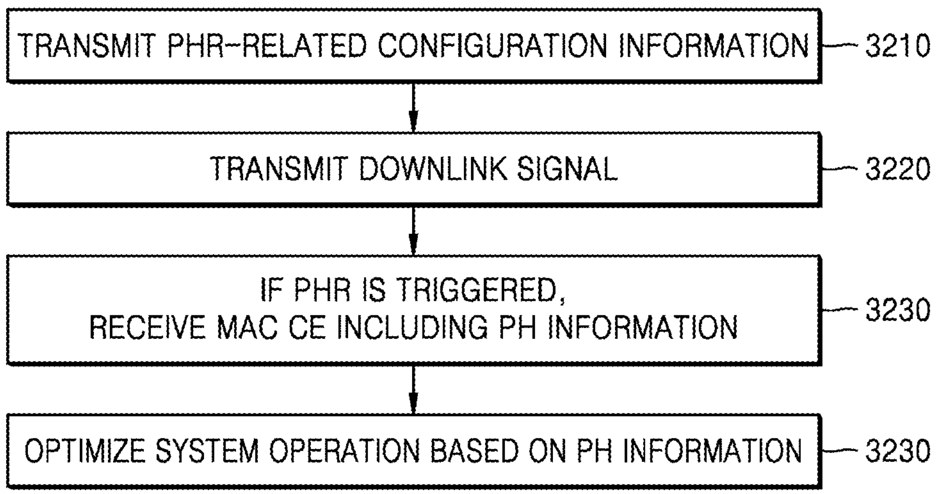
FIG. 32 illustrates a diagram of operations of a BS according to an embodiment of the disclosure.

FIG. 32 illustrates a diagram of operations of the BS according to an embodiment of the disclosure.

Referring to FIG. 32, the BS may transmit PHR-related configuration information in operation 3210. The PHR-related configuration information may include a timer value associated with a PHR, an indicator indicating an MAC CE format to be used for a PHR, or the like. The PHR-related configuration information may be transmitted via a higher layer signal.

In operation 3220, the BS may transmit, to the UE, a DL signal (e.g., CSI-RS, SSB, or the like) via at least one TRP.

In operation 3230, if a PHR is triggered, the BS may receive an MAC CE including PH information via one TRP among at least one TRP. In the disclosure, when a timer configured according to a timer value included in the PHR-related configuration information expires or variation of a DL path attenuation value is equal to or greater than a particular threshold, the PHR may be triggered. In operation 3230, a PH value the BS receives from the UE is determined to include the assumption determined based on the fourth embodiment or the fifth embodiment of the disclosure.

In operation 3240, the BS may optimize system operation based on the PH information received in operation 3230. For example, when PH information reported by a particular UE is the amount of remaining power with a positive value, the BS may increase system efficiency by allocating more resources to the particular UE, but when the PH information is the amount of remaining power with a negative value, because transmit power of the particular UE already exceeded its maximum value, the BS may re-indicate scheduling according to maximum transmit power and may allocate a remaining resource to another UE, thereby optimizing the system efficiency.

Operations 3210 to 3240 of FIG. 32 may be simultaneously performed or some of them may be omitted.

Sixth Embodiment: PH Information Calculation for Each TRP and PHR Reporting Method in PUSCH Repetitive Transmission in Consideration of Multiple TRPs Hereinafter, a method of calculating type 1 PH information for each TRP and reporting the PH information in PUSCH repetitive transmission in consideration of multiple TRPs according to an embodiment of the disclosure will now be described in detail.

As described above in the first embodiment of the disclosure, the UE may support single-DCI based PUSCH repetitive transmission in consideration of multiple TRPs. Here, among the various methods described in the first-1 embodiment of the disclosure, the BS may indicate a field indicating a plurality of SRIs and/or a precoding information and number of layers (PINL) field indicating a plurality of TPMIs to the UE by DCI. In this case, PUSCH transmission may be performed based on codebook. Also, in the disclosure below, a TPMI may be defined to indicate a precoding index and the number of layers. Alternatively, as described above in the first-3 embodiment of the disclosure, in configured-grant based PUSCH repetitive transmission in consideration of multiple TRPs, the BS may indicate a plurality of SRI fields and/or a plurality of TPMI fields to the UE by higher layer signaling and/or L1 signaling (e.g., DCI). Alternatively, the BS may configure the UE such that, when the UE performs PUSCH repetitive transmission in consideration of multiple TRPs, each PUSCH repetitive transmission is associated with a plurality of SRS resource sets of which usage is ‘codebook’ (or ‘nonCodebook’).

As in examples related to the configuration, when the BS schedules PUSCH repetitive transmission in consideration of multiple TRPs (or indicates configured-grant based PUSCH transmission) to the UE via parameter configuration by higher layer signaling and/or via L1 signaling (e.g., DCI), the UE may determine transmit power of a PUSCH transmission occasion for transmission to each TRP, based on a parameter (e.g., SRI) indicated by L1 signaling (e.g., DCI) or a parameter (e.g., SRI) configured in higher layer signaling for configured-grant based transmission.

Here, an example of a method by which the UE determines transmit power when the UE performs PUSCH repetitive transmission in consideration of multiple TRPs will now be described in detail. According to an embodiment of the disclosure, when the UE performs single-DCI based PUSCH repetitive transmission in consideration of multiple TRPs and the single DCI includes two SRI fields, the UE may calculate transmit power of a transmission occasion of a PUSCH transmitted to two TRPs by using each of the SRI fields. If a first SRI field is associated with an SRS resource set (e.g., a first SRS resource set among two SRS resource sets of which usage is ‘codebook’ (or ‘nonCodebook’) or an SRS resource set including SRS-ResourceSetId of a smaller value of the two SRS resource sets) for TRP 1, the UE may use a transmit power parameter so as to calculate transmit power for a PUSCH to be transmitted to TRP 1, the transmit power parameter being mapped to a value indicated by a first SRI field of SRI-PUSCH-PowerControl associated with a first SRI field in higher layer parameter sri-PUSCH-MappingToAddModList. If a second SRI field is associated with an SRS resource set (e.g., a second SRS resource set among two SRS resource sets of which usage is ‘codebook’ (or ‘nonCodebook’) or an SRS resource set including SRS-ResourceSetId of a greater value of the two SRS resource sets) for TRP 2, the UE may use a transmit power parameter so as to calculate transmit power for a PUSCH to be transmitted to TRP 2, the transmit power parameter being mapped to a value indicated by a second SRI field of SRI-PUSCH-PowerContol associated with a second SRI field in higher layer parameter sri-PUSCH-MAppingToAddModList (or new higher layer parameter such as sri-PUSCH-MAppingToAddModList2-r17 to be described below). Here, higher layer parameter sri-PUSCH-Mapping- ToAddModList may be configured of two sets (e.g., sri-PUSCH-MappingToAddModList for TRP 1 and sri-PUSCH-MappingToAddModList2-r17 for TRP 2) to respectively correspond to two TRPs. Alternatively, higher layer parameter sri-PUSCH-MappingToAddModList may be configured of higher layer parameters SRI-PUSCH-PowerControls including SRS-ResourceSetId of an SRS resource set which respectively correspond to two TRPs. Alternatively, in addition to the above method, any method capable of defining mapping between each SRI field and PUSCH-PowerControl configured by higher layer signaling may be considered. Similarly, when the UE transmits a configured grant PUSCH in consideration of multiple TRPs, the UE may calculate transmit power for a PUSCH transmitted to each TRP, by using two SRI fields configured by a higher layer parameter or indicated by DCI.

If the number of SRS resources in two SRS resource sets (or one SRS resource set among two SRS resource sets) of which usage is 'codebook' or 'nonCodebook' is configured to 1, two SRI fields (or one SRI field among two SRI fields) may not exist in DCI. In this case, the UE may calculate transmit power for a PUSCH transmitted to a TRP associated with an SRI field not existing in the DCI, based on a higher layer parameter for PUSCH transmission in consideration of multiple TRPs. That is, transmit power for the PUSCH transmitted to the TRP associated with the SRI field that does not exist may be determined by the UE according to a default PUSCH transmit power method. According to an example of the default PUSCH transmit power method, the UE may calculate transmit power of the PUSCH to be transmitted to the TRP, by using a transmit power parameter configured in first sri-PUSCH-PowerContol of higher layer parameter sri-PUSCH-PowerControl associated with an SRS resource set corresponding to each TRP. Alternatively, when higher layer parameter twoPUSCH-PC-AdjustmentStates indicating allowance of transmit power management using two closed loops is configured, the UE determines a transmit power parameter of a PUSCH to be transmitted to TRP 1, based on a first value in higher layer parameter P0-AlphaSet and a pathloss value of which PUSCH-PathlossRefereceRS-Id corresponds to 0 and a transmit power control value of a closed loop of which closed-loop index l is 0. Similarly, the UE determines a transmit power parameter of a PUSCH to be transmitted to TRP 2, based on a second value in higher layer parameter P0-AlphaSet and a pathloss value of which PUSCH-PathlossReferenceRS-Id corresponds to 1 and a transmit power control value of a closed loop of which closed-loop index l is 1. If higher layer parameter twoPUSCH-PC-AdjustmentStates is not configured, the UE assumes closed-loop index l of all closed loops as 0 and applies a default transmit power method for two TRPs as described above. This case corresponds to assumption in which all of two SRI fields do not exist in DCI, but when only some SRI fields do not exist, the default transmit power method may be applied only to a TRP associated with an SRI field that does not exist, and the UE may determine transmit power for a PUSCH to be transmitted to the TRP. The default transmit power method in consideration of multiple TRPs is merely an example, and various default transmit power methods may be considered by the UE to transmit a PUSCH to each TRP when an SRI does not exist in DCI.

When the UE performs PUSCH repetitive transmission in consideration of multiple TRPs, PH reporting is triggered, and thus, the UE transmits an MAC CE including PH information to a corresponding PUSCH, the UE may calculate type 1 PH information about PUSCH transmission occasion i by using Equation 7 so as to calculate actual PHR based on actual PUSCH transmission according to the NR Release 15/16. However, when actual PHR is calculated by using Equation 7 according to the NR Release 15/16, only one PUSCH transmission occasion i is calculated and is reported to the BS, and thus, even when the UE is able to calculate actual transmit power of a PUSCH to be transmitted to all TRPs for PUSCH repetitive transmissions in consideration of multiple TRPs, the UE calculates a power headroom, as an actual PHR, only for one PUSCH transmission occasion i and reports it to the BS. Therefore, when the UE performs PUSCH repetitive transmission in consideration of multiple TRPs in a corresponding activated serving cell, PH reporting is triggered, and thus, the UE performs PH reporting for a corresponding PUSCH, the UE may perform PH reporting to the BS by using one of methods below.

Figure 33:
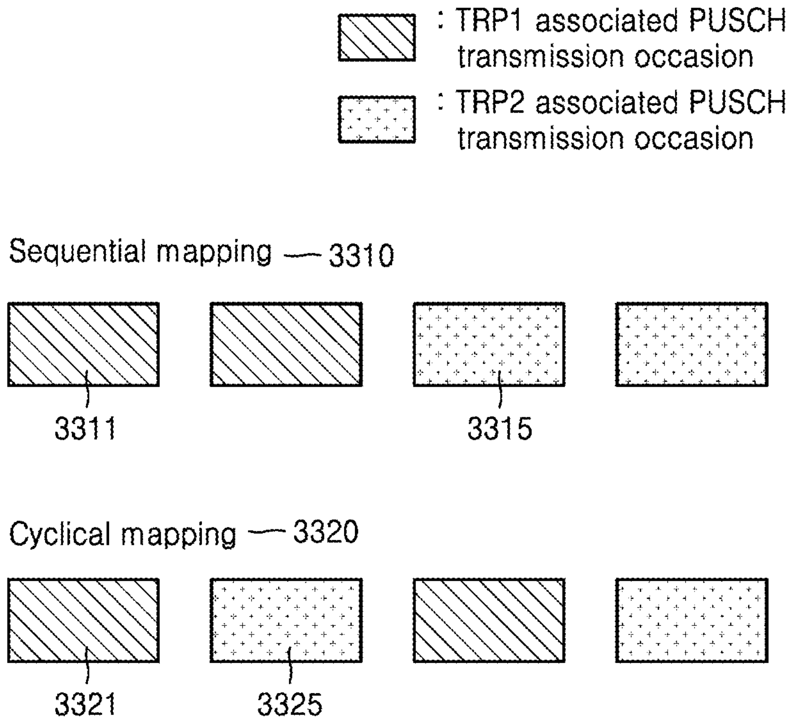
FIG. 33 illustrates an example of two PUSCH transmission occasions determined, for PH reporting with respect to PUSCH repetitive transmission in consideration of multiple TRPs according to an embodiment of the disclosure.

[Method 6-1] The UE may perform type 1 PHR about an activated serving cell based on actual PUSCH transmission, and a plurality of SRS resource sets may be configured for the activated serving cell of which usage is 'codebook' (or 'nonCodebook'). Here, the UE may determine a plurality of pieces of type 1 PH information based on two actual PUSCH transmissions with respect to PUSCH transmission occasion $i_1$ and PUSCH transmission occasion $i_2$. Here, PUSCH transmission occasion $i_1$ may be a PUSCH transmission occasion corresponding to a first PUSCH transmission occasion with respect to activated UL BWP b of carrier f of serving cell c. Also, PUSCH transmission occasion $i_2$ may be a PUSCH transmission occasion corresponding to a first PUSCH transmission occasion associated with an SRS resource set (or TRP or associated SRI field) having SRS-ResourceId being different from an SRS resource set (or TRP or associated SRI field) associated with PUSCH transmission occasion $i_1$. Here, the UE may calculate actual PHR of PUSCH transmission occasion $i_1$ by using Equation 7 based on a transmit power parameter (e.g., $P_{CMAX,f,c}(i_1)$, $P_{O\_PUSCH,b,f,c}(j_1)$,$\alpha_{b,f,c}(j_1)$,$PL_{b,f,c}(q_{d,1})$, $f_{b,f,c}(i_1,l_1)$ determined with respect to the associated SRS resource set (or TRP, or associated SRI field) according to the method described above. Also, the UE may calculate actual PHR of PUSCH transmission occasion $i_2$ by using Equation 7 based on a transmit power parameter (e.g., $P_{CMAX,f,c}(i_2)$, $P_{O\_PUSCH,b,f,c}(j_2)$, $\alpha_{b,f,c}(j_2)$, $PL_{b,f,c}(q_{d,2})$, $f_{b,f,c}(i_2,l_2)$)) determined with respect to the associated SRS resource set (or TRP, or associated SRI field) according to the method described above. In an operation of determining a transmit power parameter by using the method described above, single DCI that schedules a PUSCH may include multiple (e.g., two) SRI fields, and a first SRI field may be associated with PUSCH transmission occasion $i_1$ and a second SRI field may be associated with PUSCH transmission occasion $i_2$. Alternatively, a field for indicating a TRP order is included in DCI, a first SRI field may be associated with PUSCH transmission occasion $i_2$ and a second SRI field may be associated with PUSCH transmission occasion $i_1$. The UE may use two sets of transmit power parameters to be mapped to respective SRI fields so as to calculate PH information of PUSCH transmission occasion $i_1$ and PH information of PUSCH transmission occasion $i_2$. FIG. 33 illustrates an example of two PUSCH transmission occasions determined for PH reporting with respect to PUSCH repetitive transmission in consideration of multiple TRPs. When performing repetitive transmission, a transmission occasion the UE refers to calculate PH information so as to perform PH reporting may vary according to a mapping scheme with respect to repetitive transmission and a transmission beam for a TRP. For example, as illustrated in FIG. 33, transmission occasions according to sequential mapping 3310 may be $i_1$ 3311 and $i_2$ 3315, transmission occasions according to cyclical mapping 3320 may be $i_1$ 3321 and $i_2$ 3325, and transmission occasions may vary according to each mapping scheme.

When the UE calculates PH information about all TRPs based on an actual scheme so as to configure PH information of a PUSCH in consideration of multiple TRPs, the UE may use the method 6-1 described above. However, when the UE is configured with a plurality of cells (e.g., carrier aggregation (CA)), performs PH reporting triggered via a cell being different from a cell for which PUSCH repetitive transmission in consideration of multiple TRPs is considered, and PUSCH repetitive transmission in consideration of multiple TRPs is not performed, the UE may configure PH information as a virtual PHR and may report the virtual PHR to the BS, the PH information being about an activated serving cell for which a higher layer parameter for PUSCH repetitive transmission in consideration of multiple TRPs is considered and the virtual PHR being based on reference PUSCH transmission. Here, according to the NR Release 15/16, the UE may calculate the virtual PHR by using Equation 8. However, in a similar manner to a method of calculating an actual PHR, Equation 8 and a transmit power parameter therefor are calculated with only parameters for one default transmit power determination (e.g., p0 value and alpha value for p0-PUSCH-AlphaSetId being 0, a pathloss value of a reference signal for which pusch-PathlossReferenceRS-Id is indicated as 0, and a transmit power control amount of a closed loop with which closed loop l corresponds to 0). Due to that, a virtual PHR for a plurality of TRPs cannot be calculated, and thus, there is a need to define default transmit power for reference PUSCH transmission with respect to the plurality of TRPs. Various methods may be considered to determine default transmit power for each TRP with respect to PUSCH repetitive transmission in consideration of multiple TRPs.

For example, the UE may determine two transmit power parameter sets by using first sri-PUSCH-PowerControl of higher layer parameter sri-PUSCH-PowerControl associated with each SRS resource set so as to determine transmit power for each TRP. That is, two transmit power parameter sets may be respectively determined from first sri-PUSCH-PowerControl (SRI-PUSCH-PowerControlId has the smallest value) of sri-PUSCH-PowerControl associated with a first SRS resource set and first sri-PUSCH-PowerControl (SRI-PUSCH-PowerControlId has the smallest value) of sri-PUSCH-PowerControl associated with a second SRS resource set. Here, a transmit power parameter set includes p0, alpha, a pathloss value, and a transmit power control amount of a closed loop. As another example, the UE may determine a transmit power parameter set for a first TRP by using p0 value and alpha value for p0-PUSCH-AlphaSetId being 0, a pathloss value of a reference signal for which pusch-PathlossReferenceRS-Id is indicated as 0, and a transmit power control amount of a closed loop with which closed loop l corresponds to 0, may determine a transmit power parameter set for a second TRP by using p0 value and alpha value for p0-PUSCH-AlphaSetId being 1, a pathloss value of a reference signal for which pusch-PathlossReferenceRS-Id is indicated as 1, and a transmit power control amount of a closed loop with which closed loop l corresponds to 1 (if twoPUSCH-PC-AdjustmentStates are configured for the UE) (if twoPUSCH-PC-AdjustmentStates are not configured for the UE, a transmit power control amount of a closed loop with which closed loop l corresponds to 0).

In addition to the two embodiments described above, various methods for determining default transmit power for each TRP with respect to PUSCH repetitive transmission in consideration of multiple TRPs may be applied.

In various embodiments of the disclosure, the UE may calculate a virtual PHR for a plurality of TRPs as in a method 6-2 below by using the method of determining default transmit power for each TRP and Equation 8.

[Method 6-2] The UE may perform type 1 PHR about an activated serving cell based on reference PUSCH transmission, and a plurality of SRS resource sets may be configured for the activated serving cell of which usage is 'codebook' (or 'nonCodebook'). Here, the UE may determine, for activated UL BWP b of carrier f of serving cell c, a plurality of pieces of type 1 PH information based on reference PUSCH transmission with respect to PUSCH transmission occasion $i_1$ and PUSCH transmission occasion $i_2$. Here, the UE may calculate a virtual PHR of PUSCH transmission occasion $i_1$ and PUSCH transmission occasion $i_2$ according to a method of determining a default transmit power parameter for each TRP. Detailed methods related thereto are as described below.

[Method 6-2-1] The UE may calculate a virtual PHR of PUSCH transmission occasion $i_1$ by using Equation 8 based on a transmit power parameter (e.g., $P_{O\_PUSCH,b,f,c}(j_1)$, $\alpha_{b,f,c}(j_1)$, $PL_{b,f,c}(q_{d,1})$, $f_{b,f,c}(i_1,l_1)$) indicated by first sri-PUSCH-PowerControl of sri-PUSCH-PowerControl associated with a first SRS resource set. Also, the UE may calculate a virtual PHR of PUSCH transmission occasion $i_2$ by using Equation 8 based on a transmit power parameter (e.g., $P_{O\_PUSCH,b,f,c}(j_2)$, $\alpha_{b,f,c}(j_2)$, $PL_{b,f,c}(q_{d,2})$, $f_{b,f,c}(i_2,l_2)$) indicated by first sri-PUSCH-PowerControl of sri-PUSCH-PowerControl associated with a second SRS resource set.

[Method 6-2-2] The UE may calculate a virtual PHR of PUSCH transmission occasion $i_1$ by using Equation 8 based on a transmit power parameter (e.g., $P_{O\_PUSCH,b,f,c}(j)$, $\alpha_{b,f,c}(j_1)$, $PL_{b,f,c}(q_{d,1})$, $f_{b,f,c}(i_1,l_1)$)) determined by using p0 value NS alpha value for p0-PUSCH-AlphaSetId being 0, a pathloss value of a reference signal for which pusch-PathlossReferenceRS-Id is indicated as 0, and a transmit power control amount of a closed loop with which closed loop l corresponds to 0. Also, the UE may calculate a virtual PHR of PUSCH transmission occasion $i_2$ by using Equation 8 based on a transmit power parameter (e.g., $P_{O\_PUSCH,b,f,c}(j_2)$, $\alpha_{b,f,c}(j_2)$, $PL_{b,f,c}(q_{d,2})$, $f_{b,f,c}(i_2,l_2)$)) determined by using p0 value and alpha value for p0-PUSCH-AlphaSetId being 1, a pathloss value of a reference signal for which pusch-PathlossReferenceRS-Id is indicated as 1, and a transmit power control amount of a closed loop with which closed loop l corresponds to 1 (if twoPUSCH-PC-AdjustmentStates are configured for the UE) (if twoPUSCH-PC-AdjustmentStates are not configured for the UE, a transmit power control amount of a closed loop with which closed loop l corresponds to 0).

In addition to the methods 6-2-1 to 6-2-2 described above, the UE may calculate virtual PHR for PUSCH transmission occasions $i_1$ and $i_2$ for each TRP by using Equation 8 based on a transmit power parameter determined according to a method of determining default transmit power for TRP 1 and a method of determining default transmit power for TRP 2.

According to the NR Release 17, in addition to the support of PUSCH repetitive transmission in consideration of multiple TRPs, a dynamic switching function may be supported by adding, to DCI, a new field indicating whether to perform PUSCH repetitive transmission in consideration of multiple TRPs or to perform PUSCH (repetitive) transmission in consideration of single TRP at a particular time.

Here, the new field added to the DCI may be configured of, for example, 2 bits. Four codepoints indicated by 2 bits may respectively indicate PUSCH (repetitive) transmission in consideration of single TRP by using TRP1, PUSCH (repetitive) transmission in consideration of single TRP by using TRP2, PUSCH repetitive transmission in consideration of two TRPs (TRP order is mapped to PUSCH repetitive occasions in order of TRP2-TRP1), and PUSCH repetitive transmission in consideration of two TRPs (TRP order is mapped to PUSCH repetitive occasions in order of TRP2-TRP1). The above example is merely an example, and operations indicated by respective codepoints of the new field of 2 bits in the DCI may be performed in a different order or may indicate different meanings. The new field may be used as a field for indicating (repetitive) transmission in consideration of single TRP or repetitive transmission in consideration of multiple TRPs. In an embodiment of the disclosure, the BS may indicate PUSCH repetitive transmission in consideration of single TRP by using the new field in the DCI for the UE that supports repetitive transmission in consideration of multiple TRPs. In this case, the UE performs PUSCH transmission to only a TRP among two TRPs which is indicated by DCI. Here, two SRI fields may be included in DCI indicating dynamic switching, and the UE may use only an SRI field mapped to a TRP to which a PUSCH is transmitted. Even when the UD is configured to support multiple TRPs according to dynamic switching, if the UE performs PUSCH transmission in consideration of single TRP and reports PH information about a corresponding cell to the BS in response to PH reporting being triggered, the UE may determine PH information for PH reporting to the BS by using a method 6-3 below.

[Method 6-3] The UE may perform type 1 PHR about an activated serving cell based on actual PUSCH transmission, a plurality of SRS resource sets may be configured for the activated serving cell of which usage is ‘codebook’ (or ‘nonCodebook’), and a new field (e.g., ‘dynamicSwitching’) indicated by DCI may indicate PUSCH repetitive transmission associated with one SRS resource set (or one TRP or one SRI field). In this case, the UE may determine type 1 PH information based on actual PUSCH transmission for PUSCH transmission occasion i with respect to activated UL BWP b of carrier f of serving cell c. Here, the UE may calculate an actual PHR of PUSCH transmission occasion i by using Equation 7 based on a transmit power parameter (e.g., $P_{CMAX,f,c}(i)$, $P_{O\_PUSCH,b,f,c}(i)$, $\alpha_{b,f,c}(j)$, $PL_{b,f,c}(q_d)$, $f_{b,f,c}(i,l)$) determined for an associated SRS resource set (or TRP or associated SRI field) according to the method described above. For an SRS resource set (or TRP or SRI field) which is not associated with PUSCH repetitive transmission according to a new field in DCI, the UE may determine type 1 PH information based on reference PUSCH transmission. Here, the UE may determine a virtual PHR for the SRS resource set not associated with PUSCH repetitive transmission, by using the method 6-2-1 or the method 6-2-2. For example, when the SRS resource set not associated with PUSCH repetitive transmission is a second SRS resource set, the UE may calculate the virtual PHR by using Equation 8 based on a transmit power parameter (e.g., $P_{O\_PUSCH,b,f,c}(j_2)$, $\alpha_{b,f,c}(j_2)$, $PL_{b,f,c}(q_{d,2})$, $f_{b,f,c}(i_2,l_2)$) indicated by first sri-PUSCH-PowerControl of sri-PUSCH-PowerControl associated with the second SRS resource set according to the method 6-2-1. Even when the first SRS resource set is not associated with PUSCH repetitive transmission, the UE may calculate a virtual PHR in a similar manner to the example above. The example above is merely an example of virtual PHR calculation using the method 6-2-1, and the UE may calculate a virtual PHR for an SRS resource set not associated with PUSCH repetitive transmission according to the method 6-2-2 or another method of determining default transmit power.

Apart from the method 6-3, even when the BS indicates PUSCH repetitive transmission in consideration of single TRP by using a new field (e.g., ‘dynamicSwitching’) in DCI for dynamic switching, meaningful values may be indicated to two SRI fields included in the DCI. In descriptions with a particular example, if the BS indicates PUSCH repetitive transmission in consideration of single TRP which is associated with a first SRS resource set (or TRP 1 or first SRI field), the UE may calculate a beam and transmit power and actual PHR for PUSCH repetitive transmission, based on the first SRI field (if exists). Also, even when the UE does not use a second SRI field (if exists) for PUSCH repetitive transmission, the UE may calculate an actual PHR by using the second SRI field. This is because the UE can determine a transmit power parameter associated with a second SRS resource set by using a value indicated by an SRI field. Therefore, even when the UE is indicated, by the BS, to perform PUSCH repetitive transmission in consideration of single TRP, if two SRI fields are configured to efficient values, the UE may configure, as an actual PHR, PH information for all TRPs when performing PH reporting. Also, even when the BS indicates PUSCH repetitive transmission in consideration of single TRP which is associated with the second SRS resource set, the UE may configure, as an actual PHR, PH information for all TRPs by using two SRI fields in a similar manner to the method described above. In the operation above, UE capability report by the UE and even when the BS indicates PUSCH repetitive transmission in consideration of single TRP via a dynamic switching function to the UE supporting PUSCH repetitive transmission in consideration of TRPs, a new higher layer parameter for configuring an indication of two SRI fields with efficient values may be required. Based on the reporting and configuration, the UE may perform PH reporting in consideration of multiple TRPs according to a method 6-4.

[Method 6-4] The UE may perform type 1 PHR for an activated serving cell, based on actual PUSCH transmission, a plurality of SRS resource sets of which usage is ‘codebook’ (or ‘nonCodebook’) may be configured for the activated serving cell, a new field (e.g., ‘dynamicSwitching’) indicated by DCI scheduling a PUSCH may indicate PUSCH repetitive transmission associated with one SRS resource set (or one TRP or one SRI field), and a new higher layer parameter (e.g., ‘enableTwoSRIforActualPHR’) for indicating that two SRI fields in the same DCI all indicate efficient values may be configured for the UE. Here, the UE may calculate an actual PHR associated with two SRS resource sets (or TRP or SRI field) by using Equation 7 based on a transmit power parameter (e.g., $P_{CMAX,f,c}(i)$, $P_{O\_PUSCH,b,f,c}(j)$, $\alpha_{b,f,c}(q_d)$, $f_{b,f,c}(i,l)$)) determined by the two SRI fields in the DCI.

PH information the UE calculates for two TRPs in the sixth embodiment of the disclosure may be reported to the BS via one of various MAC CE formats for performing PHR in consideration of multiple TRPs which are described with reference to the third embodiment of the disclosure.

Figure 34:
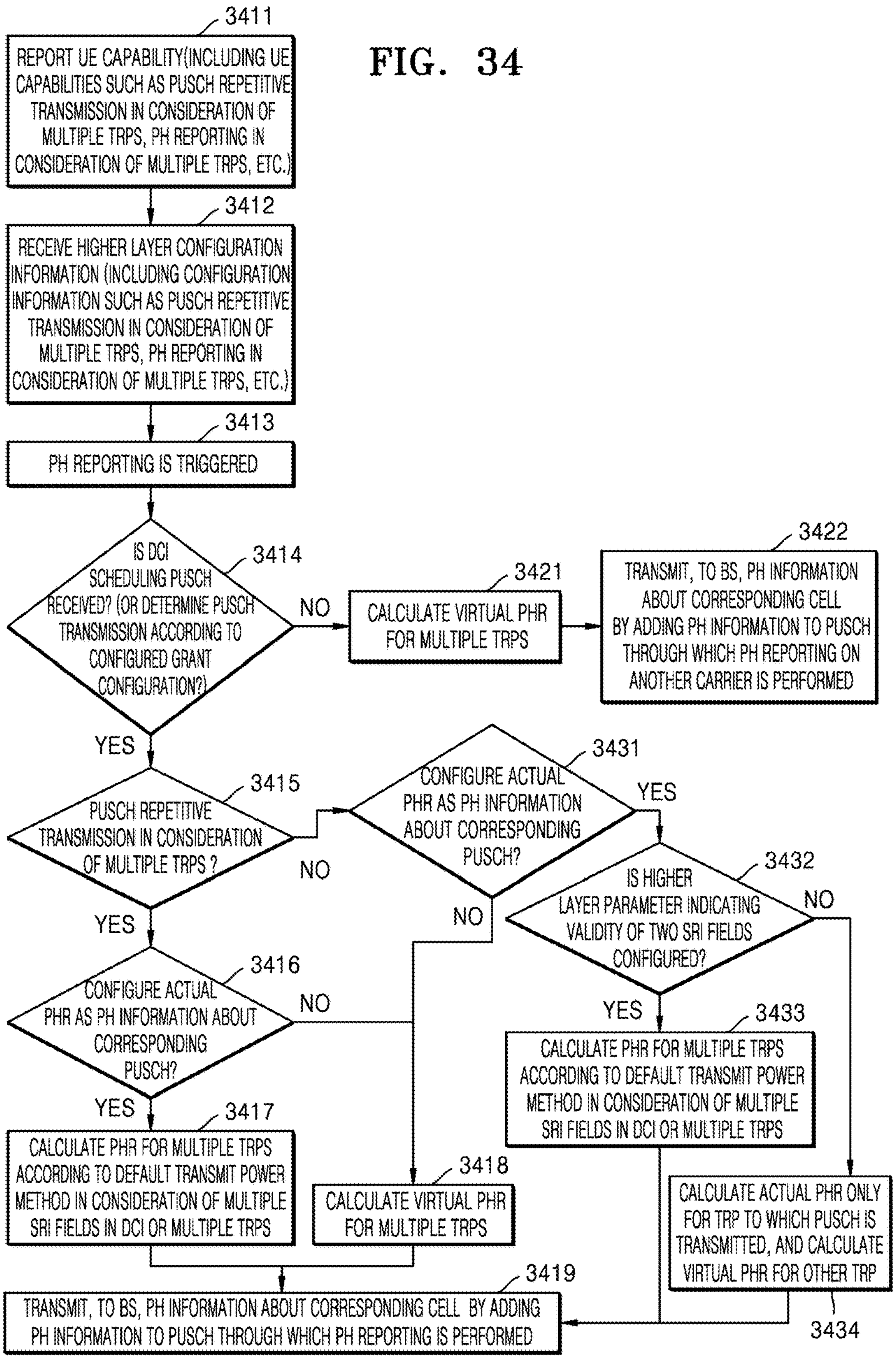
FIG. 34 illustrates a diagram for describing UE operations for PH reporting with respect to a particular activated serving cell according to an embodiment of the disclosure.

FIG. 34 illustrates a diagram for describing UE operations for PH reporting with respect to a particular activated serving cell according to an embodiment of the disclosure.

In FIG. 34, the UE reports UE capability to the BS (operation 3411). Here, the reported UE capability may include requested capabilities for various NR supports, whether PUSCH repetitive transmission in consideration of multiple TRPs is supportable, whether PH reporting in consideration of multiple TRPs is possible, and the like. Afterward, the UE receives, from the BS, a plurality of pieces of higher layer configuration information for support (operation 3412). The configured higher layer information may include higher layer configuration for performing PUSCH repetitive transmission in consideration of multiple TRPs, higher layer configuration for performing PH reporting in consideration of multiple TRPs, and the like. Afterward, PH reporting may be triggered (operation 3413). For convenience of description, operation 3413 for triggering of PH reporting is illustrated that it is performed between operation 3412 and operation 3414, but a time point when PH reporting is triggered may be after another operation to be described below. For example, operation 3413 may be performed after operation 3414.

The UE determines whether DCI scheduling a PUSCH is received from the BS or whether to perform PUSCH transmission according to configured grant configuration (operation 3414). If the UE does not perform PUSCH transmission with respect to the corresponding activated serving cell, the UE calculates a virtual PHR for a plurality of TRPs according to higher layer configuration (operation 3421). Afterward, the UE transmits, to the BS, a MAC CE to which PH information about the corresponding cell is added, by using a PUSCH being transmitted on another carrier (or another activated serving cell) with which PH reporting is performed (operation 3422).

If the UE transmits a PUSCH on the corresponding activated serving cell, the UE identifies whether it is PUSCH repetitive transmission in consideration of multiple TRPs or PUSCH (repetitive) transmission in consideration of single TRP by checking scheduling DCI or configured grant configuration information (operation 3415). If repetition transmission in consideration of multiple TRPs is performed, it is checked whether PH calculation for a PUSCH to be transmitted is to be performed as an actual PHR (operation 3416). If the calculation is performed as the actual PHR, an actual PHR for a plurality of TRPs is calculated (operation 3417). Afterward, PH information calculated for the corresponding cell is added to a MAC CE and transmitted to the BS by using the PUSCH with which PH reporting is performed (operation 3419).

If the UE does not perform the calculation as an actual PHR, the UE calculates a virtual PHR for the plurality of TRPs (operation 3418). Afterward, PH information calculated for the corresponding cell is added to a MAC CE and transmitted to the BS by using the PUSCH with which PH reporting is performed (operation 3419).

If the UE performs PUSCH (repetitive) transmission in consideration of single TRP, the UE checks whether to perform PH calculation for a PUSCH to be transmitted, as an actual PHR (operation 3431). If the UE does not perform the calculation as an actual PHR, the UE calculates a virtual PHR for the plurality of TRPs (operation 3418). Afterward, PH information calculated for the corresponding cell is added to a MAC CE and transmitted to the BS by using the PUSCH with which PH reporting is performed (operation 3419).

If the UE performs the calculation as an actual PHR, and a new higher layer parameter to indicate whether two SRI fields included in DCI are all efficient (e.g., as described above, 'enableTwoSRIforActualPHR' is set to 'enable' or is configured to indicate usability) is configured, the UE calculates an actual PHR for the plurality of TRPs (operation 3433). Afterward, PH information calculated for the corresponding cell is added to a MAC CE and transmitted to the BS by using the PUSCH with which PH reporting is performed (operation 3419).

If the higher layer parameter to indicate whether two SRI fields included in DCI are all efficient is not configured (or is configured but is set to a value such as "false" not to indicate a corresponding operation), the UE may perform calculation, as an actual PHR, with respect to only an SRI field (or TRP or SRS resource set) associated with the PUSCH being transmitted on the corresponding activated serving cell, and may perform calculation, as a virtual PHR, with respect to other TRP (or TRP or SRS resource set) (operation 3434). Afterward, PH information calculated for the corresponding cell is added to a MAC CE and transmitted to the BS by using the PUSCH with which PH reporting is performed (operation 3419).

Figure 35:
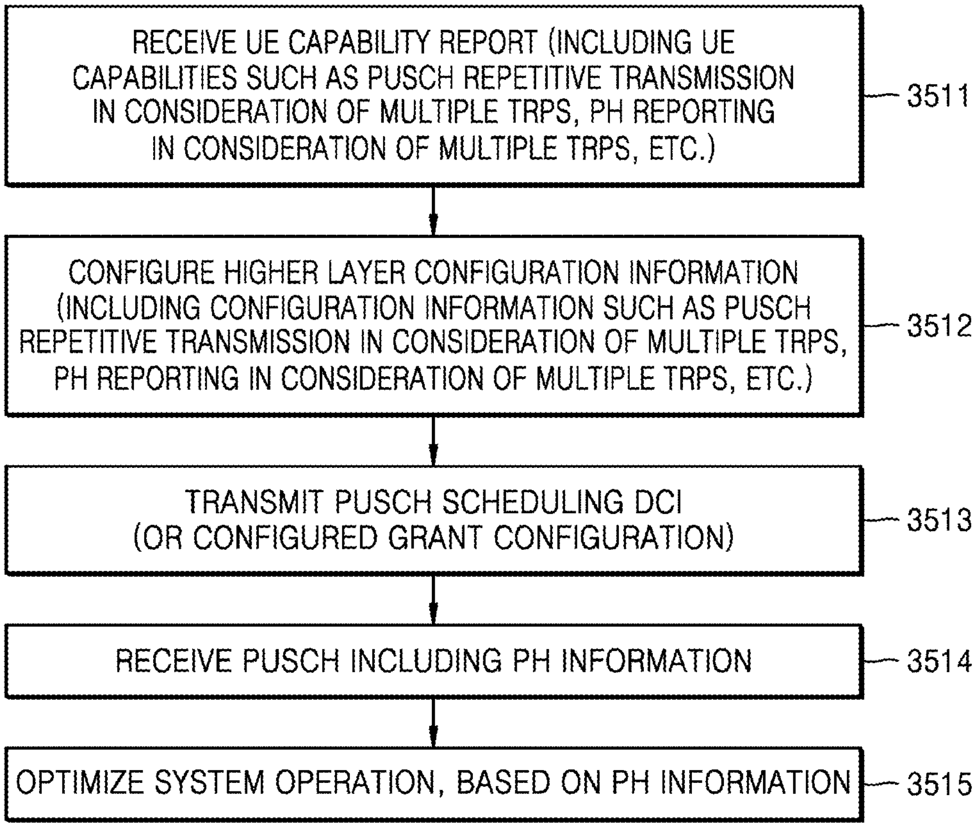
FIG. 35 illustrates a diagram of BS operations of receiving PH reporting with respect to a particular activated serving cell according to an embodiment of the disclosure.

FIG. 35 illustrates a diagram of BS operations of receiving PH reporting with respect to a particular activated serving cell according to an embodiment of the disclosure.

In FIG. 35, the BS receives UE capability from the UE (operation 3511). Here, the reported UE capability may include requested capabilities for various NR supports, whether PUSCH repetitive transmission in consideration of multiple TRPs is supportable, whether PH reporting in consideration of multiple TRPs is possible, and the like. Afterward, the BS configures the UE with a plurality of pieces of higher layer configuration information (operation 3512). The configured higher layer information may include higher layer configuration for performing PUSCH repetitive transmission in consideration of multiple TRPs, higher layer configuration for performing PH reporting in consideration of multiple TRPs, and the like. The BS may transmit, to the UE, DCI for scheduling a PUSCH (operation 3513). Alternatively, configured grant based PUSCH transmission by configured higher layer information without scheduling DCI may be scheduled (operation 3513). Afterward, the BS may receive a PUSCH including PH information from the UE (operation 3514). Here, only when the UE triggers PH reporting and thus transmits, on the PUSCH, a MAC CE including PH information, the BS receives the PUSCH including the PH information according to operation 3514, and when the UE does not trigger PH reporting, the received PUSCH does not include the PH information. Afterward, the BS may perform optimization on system operation such as PUSCH scheduling, based on the PH information received from the UE (operation 3515).

Sixth-1 Embodiment: Method of Determining Specific Transmit Power Parameter in Calculation of Actual PH Information for Each TRP According to an embodiment of the disclosure, a method by which the UE determines a transmit power parameter value used to calculate an actual PHR for a plurality of TRPs will now be described. In the method 6-1 of the sixth embodiment of the disclosure, the UE may determine a plurality of pieces of type 1 PH information based on two actual PUSCH transmissions with respect to PUSCH transmission occasion $i_1$ and PUSCH transmission occasion $i_2$. A time point when an actual PHR for PUSCH transmission occasions $i_1$ and $i_2$ is calculated is when transmission of first PUSCH transmission occasion $i_1$ is prepared. Therefore, an actual PHR for PUSCH transmission occasion $i_1$ may be calculated based on power of a PUSCH to be actually transmitted. An actual PHR for PUSCH transmission occasion $i_2$ may also be calculated at a time point when transmission of PUSCH transmission occasion $i_1$ is prepared. In this case, it may be difficult for the UE to calculate an actual PHR for PUSCH transmission occasion $i_2$ based on power of a PUSCH being actually transmitted, the PUSCH transmission occasion $i_2$ not occurring yet in a time domain. However, the UE may predict PUSCH transmit power to be transmitted in PUSCH transmission occasion $i_2$ by using a transmit power parameter value, scheduling information, and the like which are associated with PUSCH transmission occasion $i_2$ and may calculate an actual PHR based on the predicted PUSCH transmit power. That is, the UE calculates an actual PHR for each TRP by using a transmit power parameter value with respect to each TRP the UE obtained (e.g., configured by the BS or measured base on a DL reference signal) at a time point when the actual PHR is calculated. For example, the UE may calculate PUSCH transmission occasion $i_1$ by using Equation 7 based on a transmit power parameter (e.g., $P_{CMAX,f,c}(l_1)$, $P_{O\_PUSCH,b,f,c}(j_1)$, $\alpha_{b,f,c}(j_1)$, $PL_{b,f,c}(q_{d,1})$, $f_{b,f,c}(i_1,l_1)$)) determined with respect to an SRS resource set (or TRP or associated SRI field) equally associated with the method described in the method 6-1. As $P_{O\_PUSCH,b,f,c}(j_2)$, $\alpha_{b,f,c}(j_2)$ among transmit power parameters for the UE to calculate an actual PHR for PUSCH transmission occasion $i_2$ is determined based on information for scheduling PUSCH repetitive transmission in consideration of multiple TRPs, regardless of a transmission occasion, $P_{O\_PUSCH,b,f,c}(j_2)$, $\alpha_{b,f,c}$ $(j_2)$ may be used to calculate the actual PHR for PUSCH transmission occasion $i_2$. As a pathloss value $PL_{b,f,c}(g_{d,2})$ for PUSCH transmission occasion $i_2$, a transmit power control value $f_{b,f,c}(i_2,l_2)$ of a closed loop, and maximum transmit power $P_{CMAX,f,c}(i_2)$ cannot be obtained at a time point of PHR calculation, i.e., a time point when transmission of PUSCH transmission occasion $i_1$ is prepared, $PL_{b,f,c}(q_{d,2})$, $f_{b,f,c}(i_1,l_2)$ and $P_{CMAX,f,c}(i_1')$ the UE has at a time point when transmission is prepared may be used in calculation of an actual PHR. Here, $P_{CMAX,f,c}(i_1')$ may be estimated maximum transmit power with respect to PUSCH transmission occasion $i_2$ based on scheduling information received by the UE at a time point when transmission of PUSCH transmission occasion $i_1$ is prepared. Alternatively, $P_{CMAX,f,c}(i_1')$ may be the same value as maximum transmit power $P_{CMAX,f,c}(i_1)$ of PUSCH transmission occasion $i_1$.

The method of determining a transmit power parameter for actual PHR calculation described in the sixth-1 embodiment may be applied to other embodiments of the disclosure. In particular, when the UE calculates an actual PHR for a PUSCH transmission occasion other than a PUSCH transmission occasion associated with a time of calculating the actual PHR, the method of the sixth-1 embodiment described above may be used by the UE to determine a transmit power parameter to be used in calculating the actual PHR.

Seventh Embodiment: Method of Determining PUSCH Transmission Occasion for Performing PH Reporting for Plurality of TRPs when Reporting PH Information in Multi-Cell Environment According to an embodiment of the disclosure, a method of determining a PUSCH transmission occasion that is a reference of configuring PH information in a PUSCH that is repeatedly transmitted to perform PH reporting for a plurality of TRPs when PH reporting is performed in a multi-cell (CA) environment will now be described.

As described above in the fourth-embodiment of the disclosure, according to the NR Release 15/16, when performing PH reporting in a multi-cell environment, type 1 PHR for a first PUSCH in a first slot among slot(s) of a serving cell on which a PHR MAC CE is not transmitted which overlap with a slot with respect to a serving cell on which a PHR MAC CE is transmitted may be provided as PH information of a corresponding activated serving cell. According to the NR Release 15/16, only PUSCH transmission or repetitive transmission in consideration of single TRP is supported, even when only PH information about a first PUSCH in an overlapping first slot is reported, the BS could use this information. However, according to the NR Release 17, PUSCH repetitive transmission in consideration of multiple TRPs can be performed for an activated serving cell, and thus, when PH reporting is performed only for a first PUSCH in an overlapping first slot, information about only one TRP is reported to the BS. Therefore, there may be a disadvantage that PH reporting has to be performed by the number of least-supported TRPs so as to obtain, by the BS, PH information about all TRPs. Therefore, as in the fourth embodiment of the disclosure, a method of generating and reporting PH information for supporting multiple TRPs may be considered. However, in the fourth embodiment of the disclosure, a type of PH information for multiple TRPs is determined as actual or virtual depending on an overlapping slot, and PH information is calculated as an actual PHR for a particular TRP and is calculated as a virtual PHR for other TRP. Thus, even when the UE already obtained, by DCI, information about actual transmit power for a PUSCH being transmitted to each TRP for actual PUSCH repetitive transmission in consideration of multiple TRPs, the UE may configure, as a virtual PHR, PH information about some TRPs. In the seventh-embodiment of the disclosure, a method of calculating and reporting PH information according to a slot on other serving cell overlapping with a slot on a serving cell including a PHR MAC CE in a multi-cell environment and higher layer configuration information and scheduling information of a PUSCH in the slot will now be described.

When PH reporting is triggered in the multi-cell environment, the UE may determine PH information for all activated serving cells. The UE identifies overlapping slots on other activated serving cell (hereinafter, referred to as serving cell $c_2$) based on a slot on which a PUSCH including a PHR MAC CE is transmitted, with respect to a serving cell (hereinafter, referred to as serving cell $c_1$) on which the PUSCH including the PHR MAC CE is transmitted. Here, the slot on which the PUSCH including the PHR MAC CE is transmitted is assumed to be one slot for convenience of description. The UE calculates type 1 PH information for one PUSCH in a first slot among slot(s) for which subcarrier spacing is $\mu_2$ with respect to activated UL BWP $b_2$ of carrier $f_2$ of serving cell $c_2$ which overlap with a slot for which subcarrier spacing is $\mu_1$ with respect to activated UL BWP $b_1$ of carrier $f_1$ of serving cell $c_1$. Here, the UE may calculate a plurality of pieces of type 1 PH information in consideration of multiple TRPs according to one of methods below.

Figure 36:
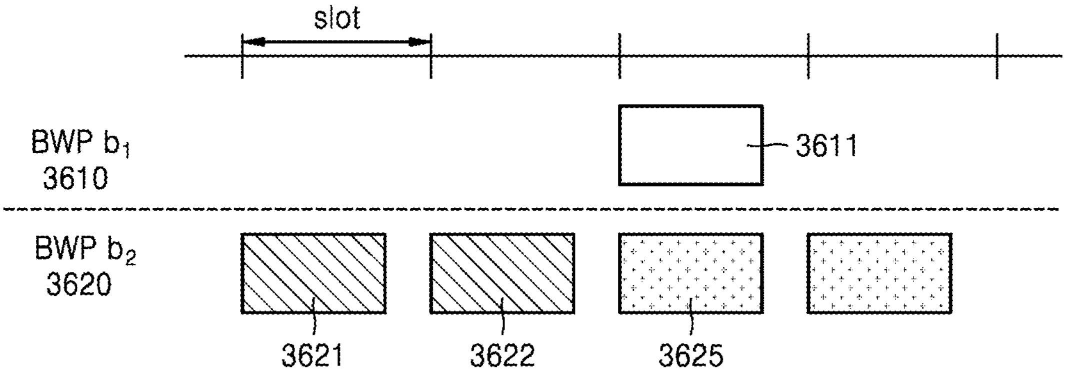
FIG. 36 illustrates a diagram of an example where a PUSCH is transmitted on activated UL BWPs $b_1$ and $b_2$ with respect to different serving cells $c_1$ and $c_2$ having the same subcarrier spacing according to an embodiment of the disclosure.

[Method 7-1] The UE may be provided higher layer configuration for the support of PUSCH repetitive transmission in consideration of multiple TRPs with respect to activated UL BWP $b_2$ of carrier $f_2$ of serving cell $c_2$ and a first PUSCH in a first slot among slots overlapping with a slot in which a PUSCH including a PHR MAC CE is transmitted on serving cell $c_1$ may be scheduled to perform PUSCH repetitive transmission in consideration of multiple TRPs. In this case, the UE may calculate additional type 1 PH information based on PUSCH repetitive transmission scheduled (or transmitted with the same configured grant configuration and period) by the same DCI and associated with other SRS resource set (of which usage is configured as ‘codebook’ or ‘nonCodebook’) not an SRS resource set (of which usage is configured as ‘codebook’ or ‘nonCodebook’) associated with the first PUSCH in the first slot among overlapping slots. Here, higher layer configuration for the support of PUSCH repetitive transmission in consideration of multiple TRPs may indicate configuration of at least two SRS resource sets of which usage is configured as ‘codebook’ or ‘nonCodebook’ or may indicate higher layer configurations for configuring at least two SRI fields in DCI or may indicate all higher layer configurations capable of explicitly or implicitly indicating a plurality of TRPs. These definitions may be equally applied to a method 7-2 to a method 7-3. When there are multiple PUSCH repetitive transmissions scheduled (or transmitted with the same configured grant configuration and period) by the same DCI and associated with other SRS resource set (of which usage is configured as ‘codebook’ or ‘nonCodebook’) not an SRS resource set (of which usage is configured as ‘codebook’ or ‘nonCodebook’) associated with a first PUSCH in a first slot among overlapping slots, the UE may select one of the multiple PUSCH repetitive transmissions and may calculate additional type 1 PH information. For example, the UE may use a first PUSCH repetitive transmission among the multiple PUSCH repetitive transmissions according the descriptions above so as to calculate additional type 1 PH information. FIG. 36 illustrates a diagram of an example where a PUSCH is transmitted on activated UL BWPs $b_1$ 3610 and $b_2$ 3620 with respect to different serving cells $c_1$ and $c_2$ having the same subcarrier spacing. In FIG. 36, the UE assumes that a PHR MAC CE may be included in a PUSCH 3611 transmitted on BWP $b_1$ 3610 and may be reported to the BS, and a PUSCH transmitted on BWP $b_2$ 3620 may be repeatedly transmitted in consideration of multiple TRPs and an actual PHR may be calculated based on actual PUSCH transmission according to a timeline condition for determining the PH calculation method described above. Here, the UE may calculate an actual PHR as first type 1 PH information for a first PUSCH 3625 in a first slot among slots of BWP $b_2$ 3620 which overlap with a slot including a PUSCH 3611 transmitted to BWP $b_1$ 3610. Then, the UE may identify that the corresponding PUSCH 3625 is repeatedly transmitted in consideration of multiple TRPs according to scheduling DCI (or configured grant configuration). Afterward, the UE may calculate an actual PHR corresponding to second type 1 PH information by one of PUSCH repetitive transmission occasions 3621 and 3622 scheduled by same DCI (or the same configured grant configuration) associated with other SRS resource set (or TRP1 in the corresponding example) not an SRS resource set (or TRP2 in the corresponding example) associated with the PUSCH 3625. For example, the UE may calculate an actual PHR based on the second type 1 PH information based on the first PUSCH transmission occasion 3621. That is, the UE may calculate two actual PHRs based on the two PUSCH transmission occasions 3621 and 3625 with respect to BWP $b_2$ 3620, and may use the method 6-1 of the sixth embodiment of the disclosure so as to calculate an actual PHR. The UE may configure PH information with the two actual PHRs calculated for BWP $b_2$ 3620 by using one of PHR MAC CE formats defined in the fourth-embodiment of the disclosure and may report the PH information to the BS on a PUSCH 3611 on BWP $b_1$ 3610.

[Method 7-2] The UE is provided higher layer configuration for the support of PUSCH repetitive transmission in consideration of multiple TRPs with respect to activated UL BWP $b_2$ of carrier $f_2$ of serving cell $c_2$, and it is assumed that a first PUSCH in a first slot among slots overlapping with a slot in which a PUSCH including a PHR MAC CE is transmitted on serving cell $c_1$ is scheduled to perform PUSCH repetitive transmission in consideration of multiple TRPs. Here, the UE may be associated with other SRI field different from an SRI field associated with the first PUSCH in the first slot among overlapping slots, and may calculate additional type 1 PH information based on PUSCH repetitive transmission scheduled by the same DCI. When there are a plurality of PUSCH repetitive transmissions that are associated with other SRI field different from the SRI field associated with the first PUSCH in the first slot among overlapping slots and are scheduled by the same DCI, the UE may select one of a plurality of PUSCH repetitive transmission occasions and may calculate an actual PHR as the additional type 1 PH information. For example, the UE may use a first PUSCH transmission occasion among the plurality of PUSCH repetitive transmission occasions so as to calculate the actual PHR corresponding to the additional type 1 PH information. When PUSCH repetitive transmission in consideration of multiple TRPs are scheduled by DCI and a plurality of SRI fields are included in the scheduling DCI, the UE may use the method 7-2 so as to calculate the actual PHR as the additional type 1 PH information, in addition to type 1 PH information (actual PHR) calculated based on the first PUSCH in the first slot among slots overlapping with the slot in which the PUSCH including the PHR MAC CE is transmitted on serving cell $c_1$. The UE may configure PH information with the two actual PHRs calculated for BWP $b_2$ 3620 by using one of PHR MAC CE formats defined in the fourth-embodiment of the disclosure and may report the PH information to the BS on a PUSCH on BWP $b_1$ 3610.

Figure 37:
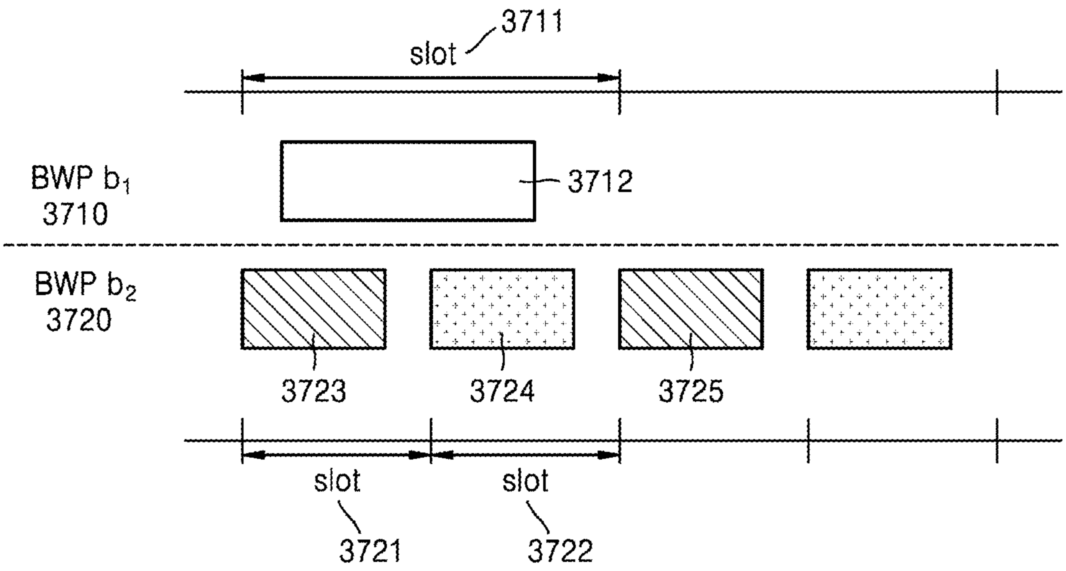
FIG. 37 illustrates a diagram for describing an example in which a PUSCH transmission occasion to be referred to by a UE to configure type 1 PH information in consideration of multiple TRPs is determined when a slot on BWP $b_1$ on which a PHR is reported overlaps with a plurality of slots on BWP $b_2$ according to an embodiment of the disclosure.

[Method 7-3] The UE is provided higher layer configuration for the support of PUSCH repetitive transmission in consideration of multiple TRPs with respect to activated UL BWP $b_2$ of carrier $f_2$ of serving cell $c_2$, and it is assumed that a first PUSCH in a first slot among slots overlapping with a slot in which a PUSCH including a PHR MAC CE is transmitted on serving cell $c_1$ is scheduled to perform PUSCH repetitive transmission in consideration of multiple TRPs. Here, the UE may include a PUSCH transmission occasion in which a slot including a PUSCH on which a PHR of serving cell $c_1$ is reported overlaps with a plurality of slots of activated UL BWP $b_2$ 3620 of carrier $f_2$ of serving cell $c_2$ and a first SRS resource set (of which usage is configured to ‘codebook’ or ‘nonCodebook’) (or TRP1 or first SRI field) and a second SRS resource set (of which usage is configured to ‘codebook’ or ‘nonCodebook’) (or TRP2 or second SRI field) are associated in multiple overlapping slots. In this case, the UE may calculate an actual PHR as type PH information by referring to PUSCH transmission occasions respectively associated with SRS resource sets (or TRPs or SRI fields) in the overlapping slot. If the number of PUSCH transmission occasions respectively associated with SRS resource sets (or TRPs or SRI fields) in the overlapping slot is greater than 1, the UE may select one associated PUSCH transmission occasion for each of the SRS resource sets and may calculate an actual PHR. For example, the UE may calculate an actual PHR based on a first PUSCH transmission occasion among a plurality of associated PUSCH transmission occasions respectively for the SRS resource sets in the overlapping slot. FIG. 37 illustrates a diagram for describing an example in which a PUSCH transmission occasion to be referred to by the UE to configure type 1 PH information in consideration of multiple TRPs is determined when a slot on BWP $b_1$ 3710 on which a PHR is reported overlaps with a plurality of slots on BWP $b_2$ 3720. In FIG. 37, PH reporting is performed through a PUSCH 3712 on BWP $b_1$ 3710, and a slot 3711 including the PUSCH on which PH is reported overlaps with a plurality of slots 3721 and 3722 on BWP $b_2$ 3720. When the plurality of slots 3721 and 3722 respectively include a PUSCH 3723 transmitted (associated with a first SRS resource set) to TRP1 and a PUSCH 3724 transmitted (associated with a second SRS resource set) to TRP2, the UE may calculate an actual PHR based on the PUSCHs 3723 and 3724 included in the overlapping plurality of slots 3721 and 3722. The UE may configure PH information with the two actual PHRs calculated for BWP $b_2$ 3720 by using one of PHR MAC CE formats defined in the fourth-embodiment of the disclosure and may report the PH information to the BS on the PUSCH 3712 on BWP $b_1$ 3710.

When configuring PH information according to the method 7-3, if overlapping slots do not include a PUSCH transmission occasion associated with a particular SRS resource set, the UE may configure PH information according to the method 7-1 or the method 7-2, not the method 7-3, or may calculate, as a virtual PHR, PH information about a PUSCH that is associated with a particular SRS resource set and is not included in the overlapping slots.

For convenience of description, for the methods 7-1 to 7-3, it is assumed that single PUSCH is transmitted on BWP $b_1$ on which a PHR is reported. However, even when PUSCH repetitive transmission is performed in BWP $b_1$, the UE may calculate PH information about BWP $b_2$ by using the methods 7-1 to 7-3. For example, when PUSCH repetitive transmission is performed in BWP $b_1$, the methods 7-1 to 7-3 may be applied based on a first PUSCH transmission occasion among PUSCH repetitive transmission occasions on BWP $b_1$. Alternatively, an actual PHR may be calculated by using the method 7-3, in consideration of slots on BWP $b_2$ which overlap with an entire PUSCH repetitive transmission occasion on BWP $b_1$. If PUSCH repetitive transmission on BWP $b_1$ is performed in consideration of multiple TRPs, the UE may calculate an actual PHR with respect to two TRPs as PH information about a corresponding PUSCH according to the method 6-1 of the sixth embodiment of the disclosure.

In order to support the method described above, the UE may need to have separate UE capability and such information may be reported to the BS by being included when the UE performs UE capability reporting 3411 described above with reference to FIG. 34. Based on the reporting, the BS may configure the UE with a higher layer parameter to support the methods 7-1 to 7-3, and when a new higher layer parameter (e.g., 'enableTwoActualPHRforCA') is configured, the UE may configure PH information according to one method among the methods 7-1 to 7-3 or a combination thereof, and when the new higher layer parameter is not configured, the UE may configure PH information according to a PH information reporting method in a multi-cell environment based on the NR Release 15/16 or a PH information reporting method improved based on an overlapping slot described in the fourth embodiment of the disclosure. The UE may be provided the new higher layer parameter in operation 3412 of receiving higher layer configuration information transmitted from the BS described with reference to FIG. 34.

Figure 38:
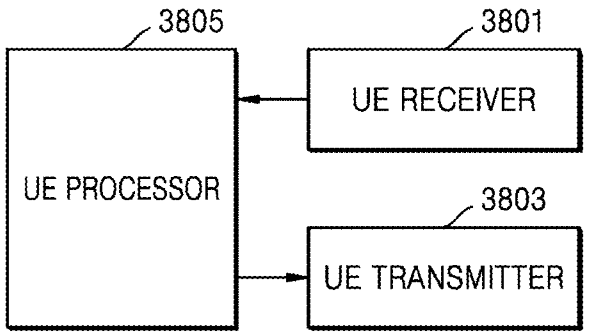
FIG. 38 illustrates a diagram of a structure of a UE in a wireless communication system according to an embodiment of the disclosure.

FIG. 38 illustrates a diagram of a structure of a UE in a wireless communication system according to an embodiment of the disclosure.

Referring to FIG. 38, the UE may include a transceiver collectively referring to a receiver 3801 and a transmitter 3803, a memory (not shown), and a UE processor 3805. The UE processor 3805 may be at least one processor and may also be called a controller or a control unit. Hereinafter, the UE processor 3805 will now be described as a processor. The processor may control all apparatuses of the UE so as to allow the UE to operate according to each of the embodiments of the disclosure or a combination of at least one embodiment. However, elements of the UE are not limited to the example above. For example, the UE may include more elements than those described above or may include fewer elements than those described above. In addition, the transceiver 3801 or 3803, the memory, and the processor 3805 may be implemented as one chip.

The transceiver 3801 or 3803 may transmit or receive a signal to or from a BS. Here, the signal may include control information and data. To this end, the transceiver 3801 or 3803 may include a radio frequency (RF) transmitter for up-converting and amplifying a frequency of signals to be transmitted, and an RF receiver for low-noise-amplifying and down-converting a frequency of received signals. However, this is merely an example of the transceiver 3801 or 3803, and elements of the transceiver 3801 or 3803 are not limited to the RF transmitter and the RF receiver.

Also, the transceiver 3801 or 3803 may receive signals through wireless channels and output the signals to the processor 3805, and may transmit signals output from the processor 3805, through wireless channels.

The memory may store programs and data required for the UE to operate. Also, the memory may store control information or data included in a signal transmitted or received by the UE. The memory may include any or a combination of storage media such as read-only memory (ROM), random access memory (RAM), a hard disk, a compact disc (CD)-ROM, a digital versatile disc (DVD), or the like. Also, the memory may include a plurality of memories.

Also, the processor 3805 may control a series of processes to allow the UE to operate according to the embodiments of the disclosure. For example, the processor 3805 may control a series of processes to decode a transmitted PDCCH and perform power headroom reporting, based on configuration information received from the BS. The processor 3805 may be provided in a multiple number, and may perform a control operation on element(s) of the UE by executing a program stored in the memory.

Figure 39:
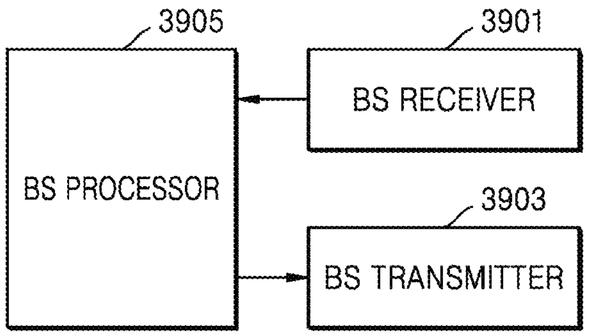
FIG. 39 illustrates a diagram of a structure of a BS in a wireless communication system according to an embodiment of the disclosure.

FIG. 39 illustrates a diagram of a structure of a BS in a wireless communication system according to an embodiment of the disclosure.

Referring to FIG. 39, the BS may include a transceiver collectively referring to a receiver 3901 and a transmitter 3903, a memory (not shown), and a BS processor 3905. The BS may include a communication interface (not shown) for wired or wireless communication with another BS via a backhaul link. Hereinafter, the BS processor 3905 will now be described as a processor. The processor may be at least one processor and may also be called a controller or a control unit. The processor may control all apparatuses of the BS so as to allow the BS to operate according to each of the embodiments of the disclosure or a combination of at least one embodiment. However, elements of the BS are not limited to the example above. For example, the BS may include more elements than those described above or may include fewer elements than those described above. In addition, the transceiver 3901 or 3903, the memory, and the processor 3905 may be implemented as one chip.

The transceiver 3901 or 3903 may transmit or receive a signal to or from a UE. Here, the signal may include control information and data. To this end, the transceiver 3901 or 3903 may include a RF transmitter for up-converting and amplifying a frequency of signals to be transmitted, and an RF receiver for low-noise-amplifying and down-converting a frequency of received signals. However, this is merely an example of the transceiver 3901 or 3903, and elements of the transceiver 3901 or 3903 are not limited to the RF transmitter and the RF receiver.

Also, the transceiver 3901 or 3903 may receive signals through wireless channels and output the signals to the processor 3905, and may transmit signals output from the processor 3905, through wireless channels.

The memory may store programs and data required for the BS to operate. Also, the memory may store control information or data included in a signal transmitted or received by the BS. The memory may include any or a combination of storage media such as ROM, RAM, a hard disk, a CD-ROM, a DVD, or the like. Also, the memory may include a plurality of memories.

Also, the processor 3905 may control a series of processes to allow the BS to operate according to the embodiments of the disclosure. For example, the processor 3905 may control a series of processes to transmit, to the UE, configuration information for PUSCH repetitive transmission in consideration of multiple TRPs and configuration information for configuring UE operations for power headroom reporting, and to receive a power headroom report from the UE. The processor 3905 may be provided in a multiple number, and may perform a control operation on element(s) of the BS by executing a program stored in the memory.

The methods according to the embodiments of the disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, elements included in the disclosure are expressed in a singular or plural form according to the embodiments of the disclosure. However, the singular or plural form is appropriately selected for convenience of description and the disclosure is not limited thereto. As such, an element expressed in a plural form may also be configured as a single element, and an element expressed in a singular form may also be configured as plural elements.

The embodiments of the disclosure described with reference to the present specification and the drawings are merely illustrative of specific examples to easily facilitate description and understanding of the disclosure, and are not intended to limit the scope of the disclosure. That is, it will be apparent to one of ordinary skill in the art that other modifications based on the technical ideas of the disclosure are feasible. Also, the embodiments of the disclosure may be combined to be implemented, when required. For example, the BS and the UE may be operated in a manner that portions of an embodiment of the disclosure are combined with portions of another embodiment of the disclosure. For example, the BS and the UE may be operated in a manner that portions of a first embodiment of the disclosure are combined with portions of a second embodiment of the disclosure. Also, although the embodiments are described based on a FDD LTE system, modifications based on the technical scope of the embodiments may be applied to other communication systems such as a TDD LTE system, a 5G or NR system, or the like.

The description order of the method of the disclosure as in the drawings may not exactly correspond to actual execution order, but may be performed reversely or in parallel.

In the drawings for describing the methods of the disclosure, some components may be omitted and only some components may be shown within a range that does not deviate the scope of the disclosure.

In the disclosure, the method(s) of the disclosure may be performed by combining some or all of the contents included in each of the embodiments of the disclosure within the scope of the disclosure.

Various embodiments of the disclosure are described above. The aforementioned embodiments of the disclosure are merely for illustration, and are not limited thereto. It is obvious to one of ordinary skill in the art that the disclosure may be easily embodied in many different forms without changing the technical concept or essential features of the disclosure. The scope of the disclosure is defined by the appended claims, rather than defined by the aforementioned detailed descriptions, and all differences and modifications that can be derived from the meanings and scope of the claims and other equivalent embodiments therefrom will be construed as being included in the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:

receiving, from a base station, sounding reference signal (SRS) configuration information including a first SRS resource set and a second SRS resource set;

receiving, from the base station, downlink control information (DCI) including a plurality of SRS resource indicators (SRIs) for physical uplink shared channel (PUSCH) repetition, wherein the plurality of SRIs includes a first SRI associated with the first SRS resource set and a second SRI associated with the second SRS resource set;

determining a power headroom report (PHR) for multiple transmit reception point (TRP) including a first PH related to the first SRS resource set and a second PH related to the second SRS resource set; and transmitting a multiple TRP medium access control control element (MAC CE) including the determined PHR on a PUSCH based on the DCI, wherein the determining of the PHR for multiple TRP comprises:

identifying whether a first PUSCH transmission related to the first PH and a second PUSCH transmission related to the second PHR is overlapped with a slot in which the PUSCH including the MAC CE is transmitted;

in case that the first PUSCH transmission is overlapped with the slot, determining the first PH based on an actual transmission;

in case that the first PUSCH transmission is not overlapped with the slot, determining the first PH based on a reference format;

in case that the second PUSCH transmission is overlapped with the slot, determining the second PH based on the actual transmission; and in case that the second PUSCH transmission is not overlapped with the slot, determining the second PH based on a reference format.

2. The method of claim 1, an SRS resource set for the PUSCH repetition is identified from the first SRS resource set and the second SRS resource set based on the first SRI and the second SRI.

3. The method of claim 1, wherein a transmit power parameter for the PUSCH repetition is identified using the first SRI and the second SRI.

4. The method of claim 1, wherein in case that the first PUSCH transmission is not overlapped with the slot, the first PH is determined based on a first parameter mapped to a first value indicated by a sri-PUSCH-PowerControl in a sri-PUSCH-MappingToAddModList.

5. The method of claim 1, wherein in case that the second PUSCH transmission is not overlapped with the slot, the second PH is determined based on a second parameter mapped to a second value indicated by a sri-PUSCH-PowerControl in a sri-PUSCH-MappingToAddModList2.

6. A user equipment (UE) in a wireless communication system, the UE comprising:

a transceiver; and at least one processor operably coupled to the transceiver, wherein the at least one processor is configured to:

receive, from a base station, sounding reference signal (SRS) configuration information including a first SRS resource set and a second SRS resource set;

receive, from the base station, downlink control information (DCI) including a plurality of SRS resource indicators (SRIs) for physical uplink shared channel (PUSCH) repetition, wherein the plurality of SRIs includes a first SRI associated with the first SRS resource set and a second SRI associated with the second SRS resource set;

determine a power headroom report (PHR) for multiple transmit reception point (TRP) including a first PH related to the first SRS resource set and a second PH related to the second SRS resource set; and transmit a multiple TRP medium access control control element (MAC CE) including the determined PHR on a PUSCH based on the DCI, wherein the at least one processor is further configured to:

identify whether a first PUSCH transmission related to the first PH and a second PUSCH transmission related to the second PHR is overlapped with a slot in which the PUSCH including the MAC CE is transmitted, in case that the first PUSCH transmission is overlapped with the slot, determine the first PH based on an actual transmission, in case that the first PUSCH transmission is not overlapped with the slot, determine the first PH based on a reference format, in case that the second PUSCH transmission is overlapped with the slot, determine the second PH based on the actual transmission, and in case that the second PUSCH transmission is not overlapped with the slot, determine the second PH based on a reference format.

7. The UE of claim 6, an SRS resource set for the PUSCH repetition is identified from the first SRS resource set and the second SRS resource set based on the first SRI and the second SRI.

8. The UE of claim 6, wherein the at least one processor is further configured to identify a transmit power parameter for the PUSCH repetition using the first SRI and the second SRI.

9. The UE of claim 6, wherein in case that the first PUSCH transmission is not overlapped with the slot, the first PH is determined based on a first parameter mapped to a first value indicated by a sri-PUSCH-PowerControl in a sri-PUSCH-MappingToAddModList.

10. The UE of claim 9, wherein in case that the second PUSCH transmission is not overlapped with the slot, the second PH is determined based on a second parameter mapped to a second value indicated by a sri-PUSCH-PowerControl in a sri-PUSCH-MappingToAddModList2.

11. A method performed by a base station in a wireless communication system, the method comprising:

transmitting, to a user equipment (UE), sounding reference signal (SRS) configuration information including a first SRS resource set and a second SRS resource set;

transmitting, to the UE, downlink control information (DCI) including a plurality of SRS resource indicators (SRIs) for physical uplink shared channel (PUSCH) repetition, wherein the plurality of SRIs includes a first SRI associated with the first SRS resource set and a second SRI associated with the second SRS resource set; and receiving, from the UE, a PUSCH including a power headroom report (PHR) for multiple transmission reception point (TRP) including a first PH related to the first SRS resource set and a second PH related to the second SRS resource set, and wherein in case that a first PUSCH transmission related to the first PH is overlapped with a slot in which the PUSCH including the PHR is transmitted, the first PH is determined based on an actual transmission, in case that the first PUSCH transmission is not overlapped with the slot, the first PH is determined based on a reference format;

in case that a second PUSCH transmission related to the second PH is overlapped with the slot, the second PH is determined based on the actual transmission; and in case that the second PUSCH transmission is not overlapped with the slot, the second PH is determined based on a reference format.

* * * * *